US012750207B2

(12) United States Patent
Miyamoto et al.

(10) Patent No.: US 12,750,207 B2
(45) Date of Patent: Sep. 29, 2026

(54) INFORMATION PROCESSOR, MOBILE BODY APPARATUS, AND COMMUNICATION SYSTEM

(71) Applicant: Sony Semiconductor Solutions Corporation, Kanagawa (JP)

(72) Inventors: Takashi Miyamoto, Kanagawa (JP); Hirotake Yamamoto, Kanagawa (JP); Toru Akishita, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 12 days.

(21) Appl. No.: 18/856,296

(22) PCT Filed: Nov. 10, 2022

(86) PCT No.: PCT/JP2022/041941

§ 371 (c)(1),
(2) Date: Oct. 11, 2024

(87) PCT Pub. No.: WO2023/228439

PCT Pub. Date: Nov. 30, 2023

(65) Prior Publication Data

US 2025/0192986 A1 Jun. 12, 2025

(30) Foreign Application Priority Data

May 23, 2022 (JP) ................................ 2022-083985
Jul. 4, 2022 (JP) ................................ 2022-108022

(51) Int. Cl.
*H04L 9/06* (2006.01)
*G06F 21/64* (2013.01)
(Continued)

(52) U.S. Cl.
CPC ............ *H04L 9/0643* (2013.01); *G06F 21/64* (2013.01); *H04L 9/12* (2013.01); *H04L 63/123* (2013.01);
(Continued)

(58) Field of Classification Search
CPC ....... H04L 9/0643; H04L 9/12; H04L 63/123; G06F 21/64; G06F 21/575; H04W 12/106
See application file for complete search history.

(56) References Cited

U.S. PATENT DOCUMENTS

2004/0193876 A1* 9/2004 Donley ................. H04L 1/1607
726/13
2006/0062188 A1* 3/2006 Nyberg ............... H04W 12/128
370/252

(Continued)

FOREIGN PATENT DOCUMENTS

EP 3451577 A 3/2019
JP H1042284 A 2/1998

(Continued)

OTHER PUBLICATIONS

"Draft MIPI Alliance Specification for Camera Serial Interface 2 (CSI-2)" In: "Draft MIPI Alliance Specification for Camera Serial Interface 2 (CSI-2)", Apr. 2, 2009 (Apr. 2, 2009), XP055165978.

(Continued)

*Primary Examiner* — Robert B Leung
(74) *Attorney, Agent, or Firm* — Michael Best & Friedrich LLP

(57) ABSTRACT

An information processor of an aspect of the disclosure includes: a protection part protecting at least a portion of first communication in which a frame is transmitted or received cyclically; and a frame counter incrementing a frame count value transmitted or received via the first communication for each frame. The frame includes first packet data including (Continued)

one piece of packet data, and second packet data including multiple pieces of packet data. The protection part calculates a first MAC using at least the frame count value and a portion or all of the first packet data, and calculates a second MAC using at least the frame count value and a portion or all of the second packet data. At least one of the first or second packet data includes abnormality notification information when there is abnormality in at least one of the frame count value or the frame counter.

21 Claims, 91 Drawing Sheets

(51) Int. Cl.

| | |
|---|---|
| ***H04L 9/12*** | (2006.01) |
| ***H04L 9/40*** | (2022.01) |
| ***H04W 12/106*** | (2021.01) |
| *G06F 21/57* | (2013.01) |

(52) U.S. Cl.

CPC ......... *H04W 12/106* (2021.01); *G06F 21/575* (2013.01)

(56) References Cited

U.S. PATENT DOCUMENTS

| | | | | |
|---|---|---|---|---|
| 2008/0075079 | A1* | 3/2008 | Smith | H04L 63/123 370/392 |
| 2019/0123908 | A1* | 4/2019 | Morita | H04L 9/3242 |
| 2020/0162436 | A1* | 5/2020 | Yang | H04L 63/12 |
| 2020/0186560 | A1* | 6/2020 | Ben-Noon | H04L 63/123 |
| 2021/0090202 | A1 | 3/2021 | Hall | |
| 2021/0120033 | A1* | 4/2021 | Gorrepati | H04W 12/106 |
| 2021/0406410 | A1* | 12/2021 | Mondello | G06F 21/64 |

FOREIGN PATENT DOCUMENTS

| | | |
|---|---|---|
| JP | 2017038365 A | 2/2017 |
| WO | 2022050057 A1 | 3/2022 |

OTHER PUBLICATIONS

International Search Report (PCT/ISA/210), International Application No. PCT/JP2022/041941, dated Feb. 7, 2023.

"Security Protocol and Data Model (SPDM) Specification," DMTF—Document Identifier: DSP0274, Version: 1.2.1, dated Jun. 23, 2022. https://www.dmtf.org/dsp/DSP0274.

* cited by examiner

FIG. 1

◆Secure Boot Modes (Example)

| Secure Boot Mode | Mode1 | Mode2 | Mode3 |
|---|---|---|---|
| Secure Boot Concept | Flexible & DMTF-defined | Flexible & Lighter | Quick & Lightest |
| Data Service Protocol(s) | ESS CCI Mode 1/2 (Enhanced Safety & Security CCI),<br>SEP/FSED (Service Extensions Packet, Frame-Based Service Extensions Data) | | |
| Secure Boot Protocols | DSP0274(SPDM)<br>over DSP0277, DSP0236<br>over I2C/I3C | DSP0274(SPDM)<br>over ESS CCI,<br>over I2C/I3C/A-PHY/D-PHY | |
| Key Schedule/ Algorithm Option | DMTF-defined HMAC-based | Vender-defined HMAC-based | Vender-defined AES-based |
| Crypto Algorithm Option | AES-128-GCM<br>AES-256-GCM | AES-128-CTR+AES-128-CMAC<br>AES-256-CTR+AES-256-CMAC<br>AES-128-CBC+AES-128-CMAC<br>AES-256-CBC+AES-256-CMAC | |
| Supports PSK | Yes | Yes | Yes |
| Supports DHE | Yes | Yes | No |
| Requires "SHA2/SHA3" -HMAC | Yes | Yes | No |
| Requires AES-GCM | Yes | No | No |
| Requires additional Protocols | Yes | No | No |

[ FIG. 11 ]
◆WSPDM and RSPDM Registers format (Example)
| Register Name | Description | Address Offset | Register Size(Bytes) |
| --- | --- | --- | --- |
| WSPDM | Write SPDM Message | N/A | Sparm |
| RSPDM | Read SPDM Message | Sparm | Sparm |
[ FIG. 12 ]
◆Byte Order Convertion between SPDM and ESS CCI(Example)
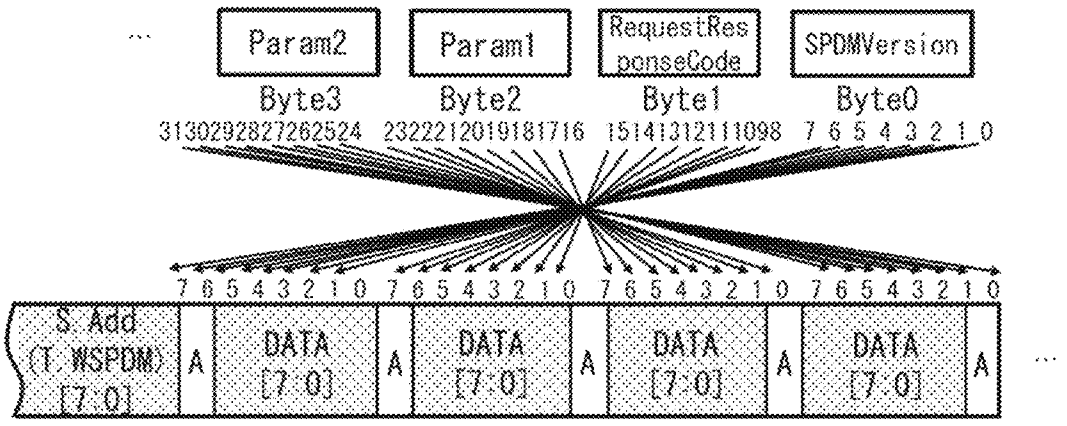

[ FIG. 13 ]
◆finished_key MAC Coverage for PSK (Example)
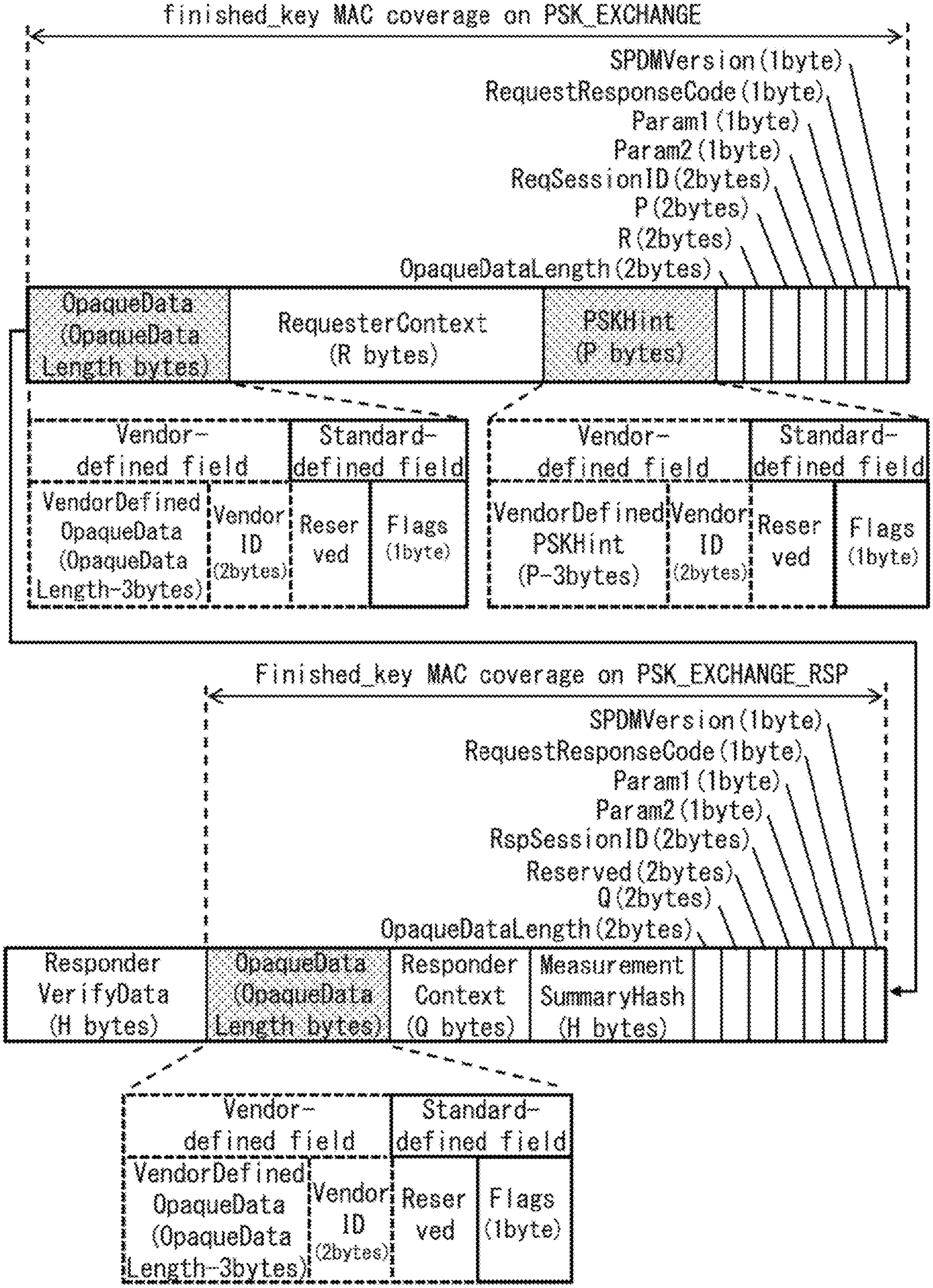

【FIG. 14A】

◆PSK_EXCHANGE request message format(Example)

| Byte offset | Field | Size (bytes) | Description |
|---|---|---|---|
| 0 | SPDMVersion | 1 | Shall be the SPDMVersion. |
| 1 | Request ResponseCode | 1 | 0xE6 = PSK_EXCHANGE. |
| 2 | Param1 | 1 | Type of measurement summary hash requested:<br>0x0: No measurement summary hash requested.<br>0x1: TCB measurements only.<br>0xFF: All measurements.<br>All other values reserved.<br>If a Responder does not support measurements<br>(MEAS_CAP=00b in CAPABILITIES response),<br>the Requester shall set this value to 0x0.<br>If the Sequre Boot Mode 3 is applied,<br>then this filed shall be 0x00. |
| 3 | Param2 | 1 | Session policy. |
| 4 | ReqSessionID | 2 | Two-byte Requester contribution to allow construction of a unique four-byte session ID between a Requester-Responder pair.<br>The final session ID<br>=Concatenate(ReqSessionID,RspSessionID) |
| 6 | P | 2 | Length of PSKHint in bytes. |

【FIG. 14B】

◆PSK_EXCHANGE request message format(Example)

| Byte offset | Field | Size (bytes) | Description |
|---|---|---|---|
| 8 | R | 2 | Length of RequesterContext in bytes. R shall be equal to or greater than H, where H is the size of the underlying HMAC used in the context of the Requester. If the Sequre Boot Mode 3 is applied, then this field shall be equal to or greater than 32 bytes. |
| 10 | OpaqueData Length | 2 | Size of the OpaqueData field that follows in bytes. The value should not be greater than 1024 bytes. Shall be 0 if no OpaqueData is provided. |
| 12 | PSKHint | P | Information required by the Responder to retrieve the PSK. Optional. |
| 12+P | Requester Context | R | The context of the Requester. Shall include a nonce (random number or monotonic counter) of at least 32 bytes and optionally relevant information contributed by the Requester. |
| 12 +P+R | OpaqueData | Opaque Data Length | Optional. If present, the OpaqueData sent by the Requester is used to indicate any parameters that Requester wishes to pass to the Responder as part of PSK-based key exchange. If present, this field shall conform to the selected opaque data format in OtherParamsSelection. |

【FIG. 15A】

◆PSK_EXCHANGE_RSP response message format (Example)

| Byte offset | Field | Size (bytes) | Description |
|---|---|---|---|
| 0 | SPDMVersion | 1 | Shall be the SPDMVersion. |
| 1 | Request ResponseCode | 1 | 0x66 = PSK_EXCHANGE_RSP. |
| 2 | Param1 | 1 | HeartbeatPeriod. The value of this field shall be zero if Heartbeat is not supported. Otherwise, the value shall be in units of seconds. Zero is a legal value if Heartbeat is supported, but means that a heartbeat is not desired on this session. |
| 3 | Param2 | 1 | Reserved. |
| 4 | RspSessionID | 2 | Two-byte Responder contribution to allow construction of a unique four-byte session ID between a Requester-Responder pair.<br>The final session ID =Concatenate(ReqSessionID, RspSessionID) |
| 6 | Reserved | 2 | Reserved. |
| 8 | Q | 2 | Length of ResponderContext in bytes. |

[ FIG. 15B ]

◆PSK_EXCHANGE_RSP response message format(Example)

| Byte offset | Field | Size (bytes) | Description |
|---|---|---|---|
| 10 | OpaqueData Length | 2 | Size of the OpaqueData field that follows in bytes. The value should not be greater than 1024 bytes. Shall be 0 if no OpaqueData is provided. |
| 12+H | Responder Context | Q | Context of the Responder. Optional. If present, shall include a nonce and/or information contributed by the Responder. |
| 12 +H+Q | OpaqueData | Opaque Data Length | Optional. If present, the OpaqueData sent by the Requester is used to indicate any parameters that Requester wishes to pass to the Responder as part of PSK-based key exchange. If present, this field shall conform to the selected opaque data format in OtherParamsSelection. |
| 12+H +Q +Opaque Data Length | Responder VerifyData | H | Data to be verified by the Requester using the finished_key of the Responder. If the Secure Boot Mode 3 is applied, then H shall be 16 bytes and this field shall be "CMAC = (finished_key, PSK_EXCHANGE\|\|PSK_EXCHANGE_RSP except the ResponderVerifyData field)". Where the finished_key is the Response Direction finished_key. |

【 FIG. 15C 】

◆PSK_EXCHANGE_RSP response message format(Example)

| Byte offset | Field | Size (bytes) | Description |
|---|---|---|---|
| 12 | MeasurementSummaryHash | H | If the Responder does not support measurements (MEAS_CAP=00b in CAPABILITIES response) or requested Param1 = 0x0, this field shall be absent.<br>If the requested Param1 = 0x1, this field shall be the combined hash of measurements of all measurable components considered to be in the TCB required to generate this response, computed as hash (Concatenation(MeasurementBlock[0], MeasurementBlock[1], ...)) where MeasurementBlock[x] denotes a measurement of an element in the TCB.<br>Measurements are concatenated in ascending order based on their measurement index.<br>When the requested Param1 = 0x1 and there are no measurable components in the TCB required to generate this response, this field shall be 0.<br>If requested Param1 = 0xFF, this field shall be computed as hash (Concatenation(MeasurementBlock[0], MeasurementBlock[1], ..., MeasurementBlock[n])) of all supported measurements available in the measurement index range 0x01 ~ 0xFE, concatenated in ascending index order.<br>Indices with no associated measurements shall not be included in the hash calculation.<br>If the Responder supports both raw bit stream and digest representations for a given measurement index, then the Responder shall use the digest form.<br>This field shall be in Hash byte order.<br>If the Secure Boot Mode 3 is applied, then this field shall be absent. |

【FIG. 16】

◆PSK_FINISH request message format(Example)

| Byte offset | Field | Size (bytes) | Description |
|---|---|---|---|
| 0 | SPDMVersion | 1 | Shall be the SPDMVersion. |
| 1 | Request ResponseCode | 1 | 0xE7 = PSK_FINISH. |
| 2 | Param1 | 1 | Reserved. |
| 3 | Param2 | 1 | Reserved. |
| 4 | Requester VerifyData | H | Data to be verified by the Responder by using the finished_key of the Requester. If the Secure Boot Mode 3 is applied, then H shall be 16 bytes and this field shall be "CMAC = (finished_key, PSK_EXCHANGE\|\|PSK_EXCHANGE_RSP except the ResponderVerifyData field)". Where the finished_key is the Request Direction finished_key. |

[ FIG. 17 ]

◆PSKHint filed format for PSK_EXCHANGE request message (Example)

| Byte offset | Field | Size (bytes) | Description |
|---|---|---|---|
| 0 | Flags | 1 | Bit[7] 1b' 0: Both the VendorID field and the VendorDefinedPSKHint field shall be absent.<br>Bit[7] 1b' 1: Both the VendorID field and the VendorDefinedPSKHint field shall be present.<br>All other values reserved. |
| 1 | VendorID | 2 | The Manufacturer ID assigned by MIPI identifies the vendor. |
| 3 | VendorDefined PSKHint | P-3 | Shall be the data defined by the vendor. |

[ FIG. 18 ]

◆OpaqueData filed format for "KEY/PSK" _EXCHANGE request message (Example)

| Byte offset | Field | Size (bytes) | Description |
|---|---|---|---|
| 0 | Flags | 1 | Bit[7] 1b' 0: Both the VendorID field and the VendorDefinedOpaqueData field shall be absent.<br>Bit[7] 1b' 1: Both the VendorID field and the VendorDefinedOpaqueData field shall be present.<br>All other values reserved. |
| 1 | VendorID | 2 | The Manufacturer ID assigned by MIPI identifies the vendor. |
| 3 | VendorDefined OpaqueData | Opaque Data Length - 3 | Shall be the data defined by the vendor. |

[ FIG. 19 ]

◆OpaqueData filed format for "KEY/PSK" _EXCHANGE_RSP response message (Example)

| Byte offset | Field | Size (bytes) | Description |
|---|---|---|---|
| 0 | Flags | 1 | Bit[7] 1b' 0: Both the VendorID field and the VendorDefinedOpaqueData field shall be absent.<br>Bit[7] 1b' 1: Both the VendorID field and the VendorDefinedOpaqueData field shall be present.<br>All other values reserved. |
| 1 | VendorID | 2 | The Manufacturer ID assigned by MIPI identifies the vendor. |
| 3 | VendorDefined OpaqueData | Opaque Data Length - 3 | Shall be the data defined by the vendor. |

【FIG. 22】

◆SPDM Session over ESS CCI Tag Registers format for AES-CTR+AES-CMAC (Example)

| Register Name | Description | Address Offset | Register Size (Bytes) |
|---|---|---|---|
| Reserved | Reserved | 0 (Base address) | 1 |
| WMC0 | Write Message Counter 0 (independent counter from WMC) | 1 | 1 |
| WMAC0(=WMAC) | Write Message Authentication Code (different address from WMAC) | 2 | 16 |
| WCRC0(=WCRC) | Write Cyclic Redundancy Check (different address from WCRC) | 18 | 2 |
| Reserved | Reserved | 20 | 1 |
| RMC0 | Read Message Counter 0 (independent counter from RMC) | 21 | 1 |
| RMAC0(=RMAC) | Read Message Authentication Code (different address from RMAC) | 22 | 16 |
| RCRC0(=RCRC) | Read Cyclic Redundancy Check (different address from RCRC) | 38 | 2 |

【FIG. 23】

◆SPDM Session over ESS CCI Tag Registers format for AES-CBC+AES-CMAC (Example)

| Register Name | Description | Address Offset | Register Size (Bytes) |
|---|---|---|---|
| Reserved | Reserved | 0 (Base address) | 1 |
| WMC0 | Write Message Counter 0 (independent counter from WMC) | 1 | 1 |
| WMAC0 (=WMAC) | Write Message Authentication Code (different address from WMAC) | 2 | 16 |
| WIV0 | Write Initialization Vector (different address from WIV) | 18 | 16 |
| WCRC0 (=WCRC) | Write Cyclic Redundancy Check (different address from WCRC) | 34 | 2 |
| Reserved | Reserved | 36 | 1 |
| RMC0 | Read Message Counter 0 (independent counter from RMC) | 37 | 1 |
| RMAC0 (=RMAC) | Read Message Authentication Code (different address from RMAC) | 38 | 16 |
| RIV0 | Read Initialization Vector (different address from RIV) | 54 | 16 |
| RCRC0 (=RCRC) | Read Cyclic Redundancy Check (different address from RCRC) | 70 | 2 |

[ FIG. 24 ]
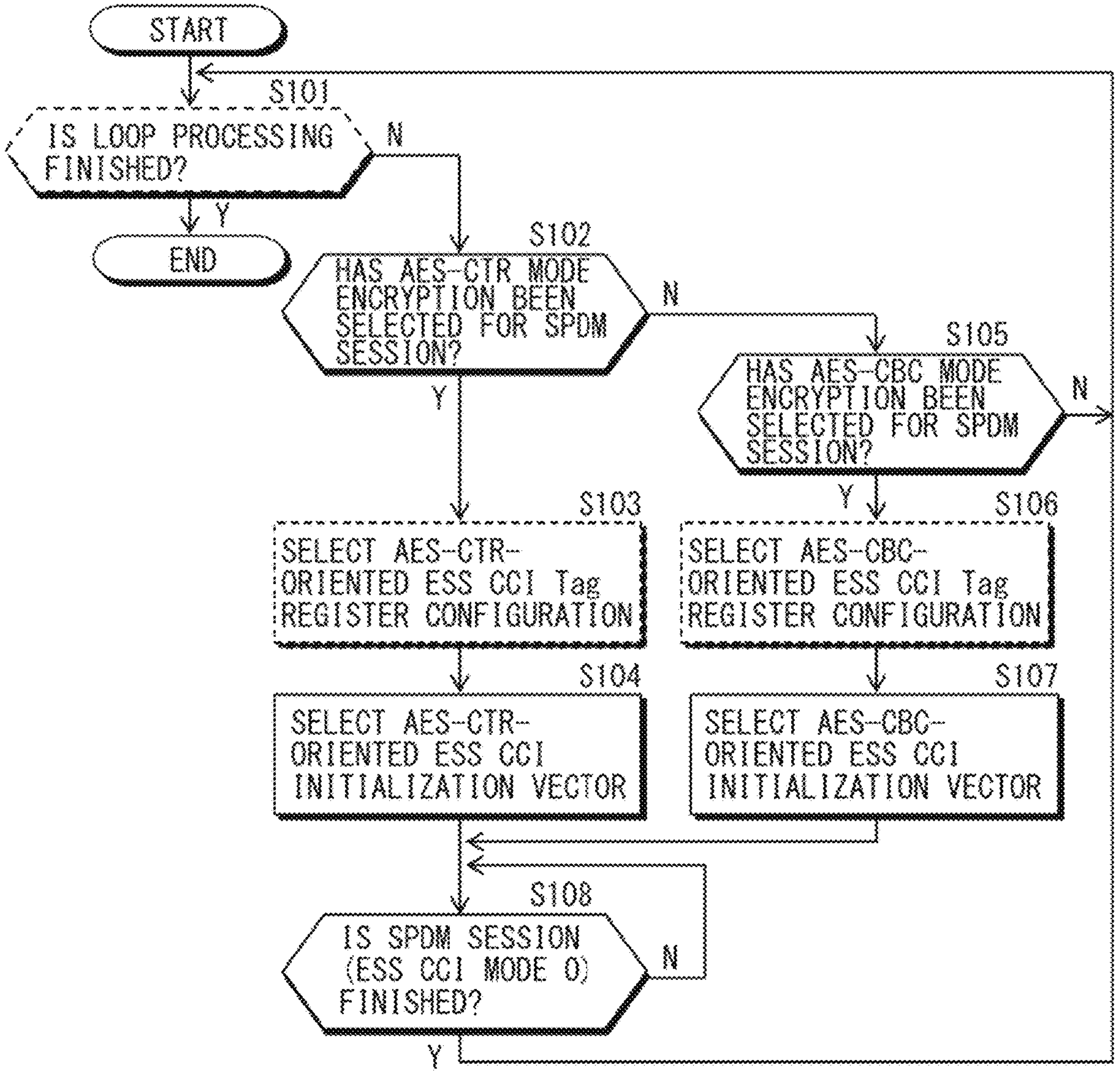

FIG. 25A

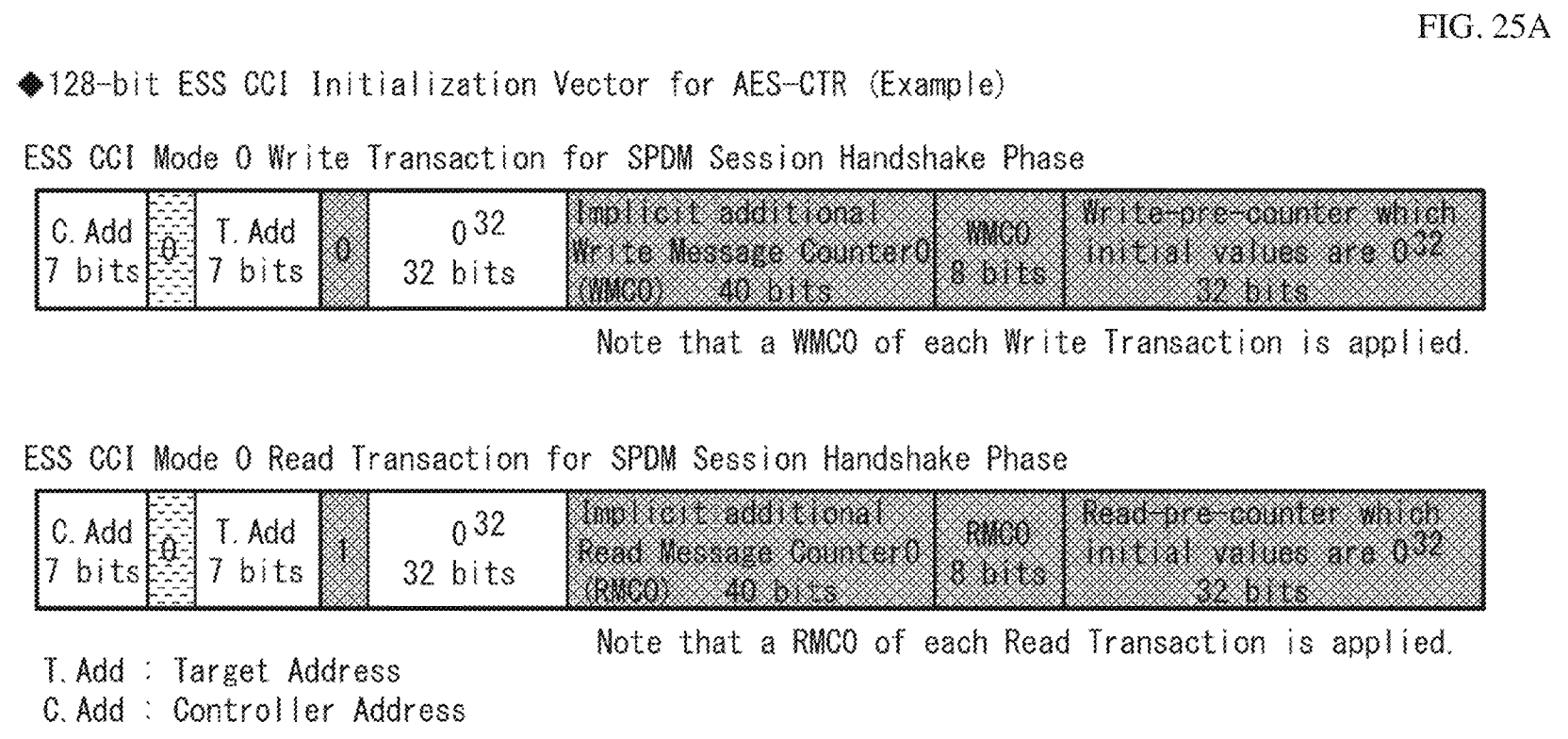

◆128-bit ESS CCI Initialization Vector for AES-CTR (Example)

ESS CCI Mode 0 Write Transaction for SPDM Session Handshake Phase

| | | | | | | | |
|---|---|---|---|---|---|---|---|
| C. Add 7 bits | 0 | T. Add 7 bits | 0 | $0^{32}$ 32 bits | Implicit additional Write Message Counter0 (WMCO) 40 bits | WMCO 8 bits | Write-pre-counter which initial values are $0^{32}$ 32 bits |

Note that a WMCO of each Write Transaction is applied.

ESS CCI Mode 0 Read Transaction for SPDM Session Handshake Phase

| | | | | | | | |
|---|---|---|---|---|---|---|---|
| C. Add 7 bits | 0 | T. Add 7 bits | 1 | $0^{32}$ 32 bits | Implicit additional Read Message Counter0 (RMCO) 40 bits | RMCO 8 bits | Read-pre-counter which initial values are $0^{32}$ 32 bits |

Note that a RMCO of each Read Transaction is applied.

T. Add : Target Address
C. Add : Controller Address

FIG. 25B

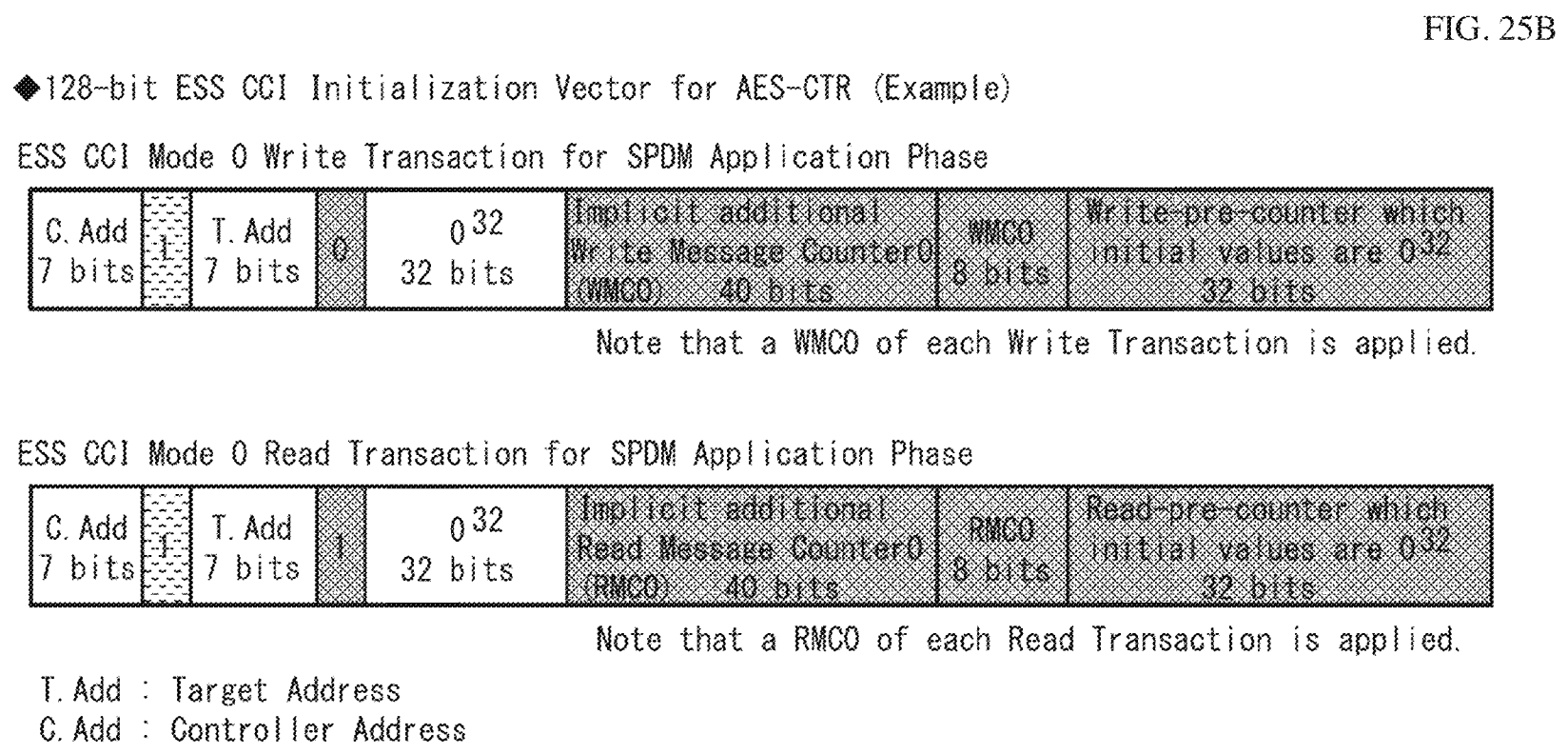

◆128-bit ESS CCI Initialization Vector for AES-CTR (Example)

ESS CCI Mode 0 Write Transaction for SPDM Application Phase

| | | | | | | | |
|---|---|---|---|---|---|---|---|
| C. Add 7 bits | 1 | T. Add 7 bits | 0 | $0^{32}$ 32 bits | Implicit additional Write Message Counter0 (WMCO) 40 bits | WMCO 8 bits | Write-pre-counter which initial values are $0^{32}$ 32 bits |

Note that a WMCO of each Write Transaction is applied.

ESS CCI Mode 0 Read Transaction for SPDM Application Phase

| | | | | | | | |
|---|---|---|---|---|---|---|---|
| C. Add 7 bits | 1 | T. Add 7 bits | 1 | $0^{32}$ 32 bits | Implicit additional Read Message Counter0 (RMCO) 40 bits | RMCO 8 bits | Read-pre-counter which initial values are $0^{32}$ 32 bits |

Note that a RMCO of each Read Transaction is applied.

T. Add : Target Address
C. Add : Controller Address

CCI payload bytes for any SUB ADDRESS of Session Key register(s) (i.e., these DATA) include only DATA of the Session Key(s) and are parts of VendorDefinedReqPayload C.WCRCO is transmitted only when the ESS CCI Mode 1 is applied.

【FIG. 28】

◆VENDOR_DEFINED_REQUEST request message format for Write Transaction(Example)

| Byte offset | Field | Size (bytes) | Description |
|---|---|---|---|
| 0 | SPDMVersion | 1 | Shall be the SPDMVersion. |
| 1 | RequestResponseCode | 1 | 0xFE = VENDOR_DEFINED_REQUEST. |
| 2 | Param1 | 1 | Reserved. |
| 3 | Param2 | 1 | Reserved. |
| 4 | StandardID | 2 | Shall indicate the registry or standards body by using one of the values in the ID column. |
| 6 | Len | 1 | Length of the Vendor ID field. If the VendorDefinedRequest is standard defined, Len shall be 0. If the VendorDefinedRequest is vendor-defined, Len shall equal Vendor ID Len. |
| 7 | VendorID | Len | Vendor ID, as assigned by the registry or standards body. Shall be in little endian format. |
| 7 +Len | ReqLength | 2 | Length of the VendorDefinedReqPayload. |
| 7 +Len+2 | VendorDefined ReqPayload | Req Length | The standard or vendor shall use this field to send the request payload. |

【FIG. 29】

◆Successful VENDOR_DEFINED_RESPONSE response message format for Write Transaction(Example)

| Byte offset | Field | Size (bytes) | Description |
|---|---|---|---|
| 0 | SPDMVersion | 1 | Shall be the SPDMVersion. |
| 1 | Request ResponseCode | 1 | 0x7E = VENDOR_DEFINED_RESPONSE. |
| 2 | Param1 | 1 | Reserved. |
| 3 | Param2 | 1 | Reserved. |
| 4 | StandardID | 2 | Shall indicate the registry or standard body by using one of the values in the ID column. |
| 6 | Len | 1 | Length of the Vendor ID field. If the VendorDefinedRequest is standard-defined, Len shall be 0.<br>If the VendorDefinedRequest is vendor-defined,<br>Length shall equal Vendor ID Len. |
| 7 | VendorID | Len | Shall indicate the Vendor ID, as assigned by the registry or standards body. Shall be in little endian format. |
| 7 +Len | RespLength | 2 | Length of the VendorDefinedRespPayload.<br>0x0000: The given VENDOR_DEFINED_REQUEST request message was successfully decrypted. |

[ FIG. 30 ]
◆Write Transaction for ECC CCI Mode 1 with Per-Multi-Transaction (Example)
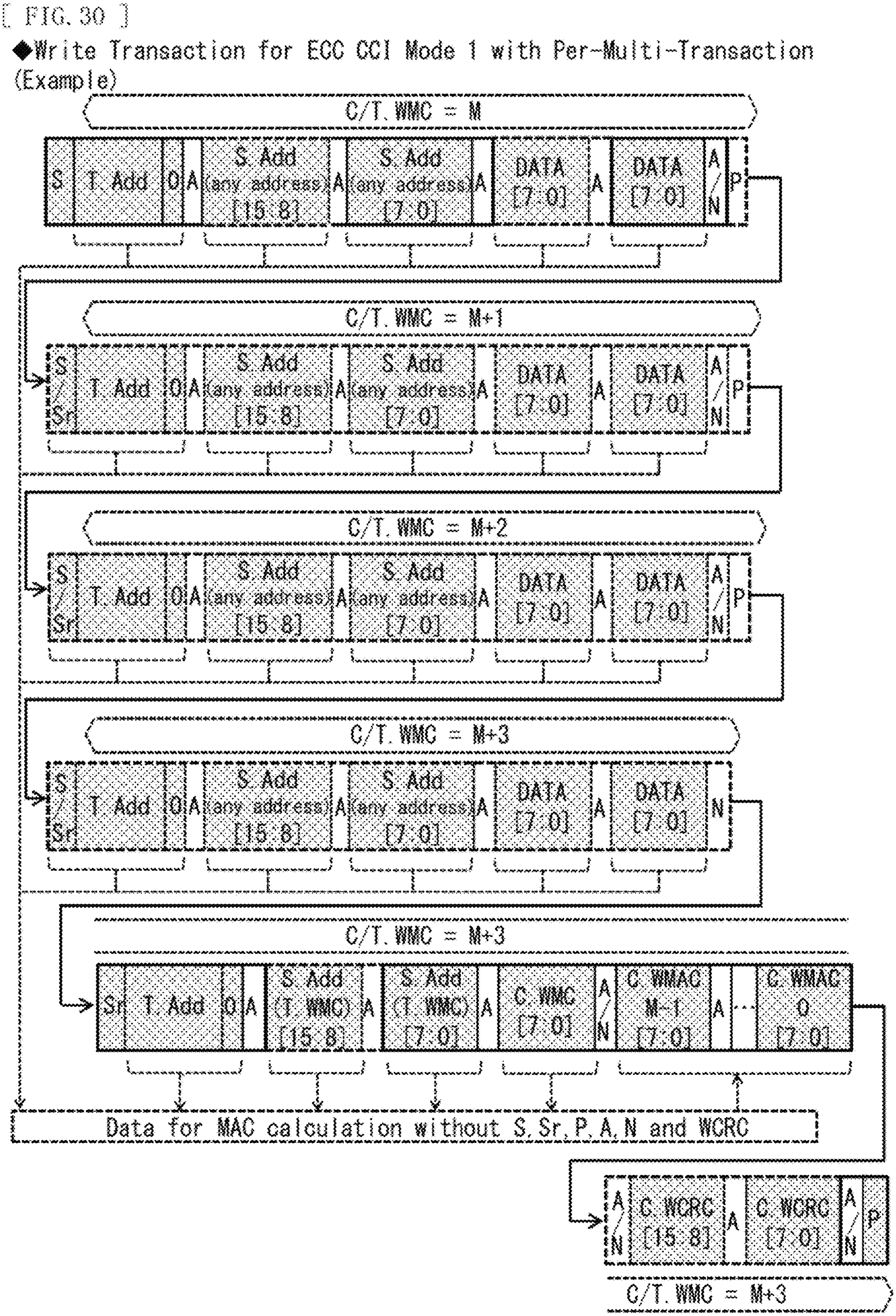

[ FIG. 31 ]
◆Read Transaction for ECC CCI Mode 1 with Per-Multi-Transaction (Example)
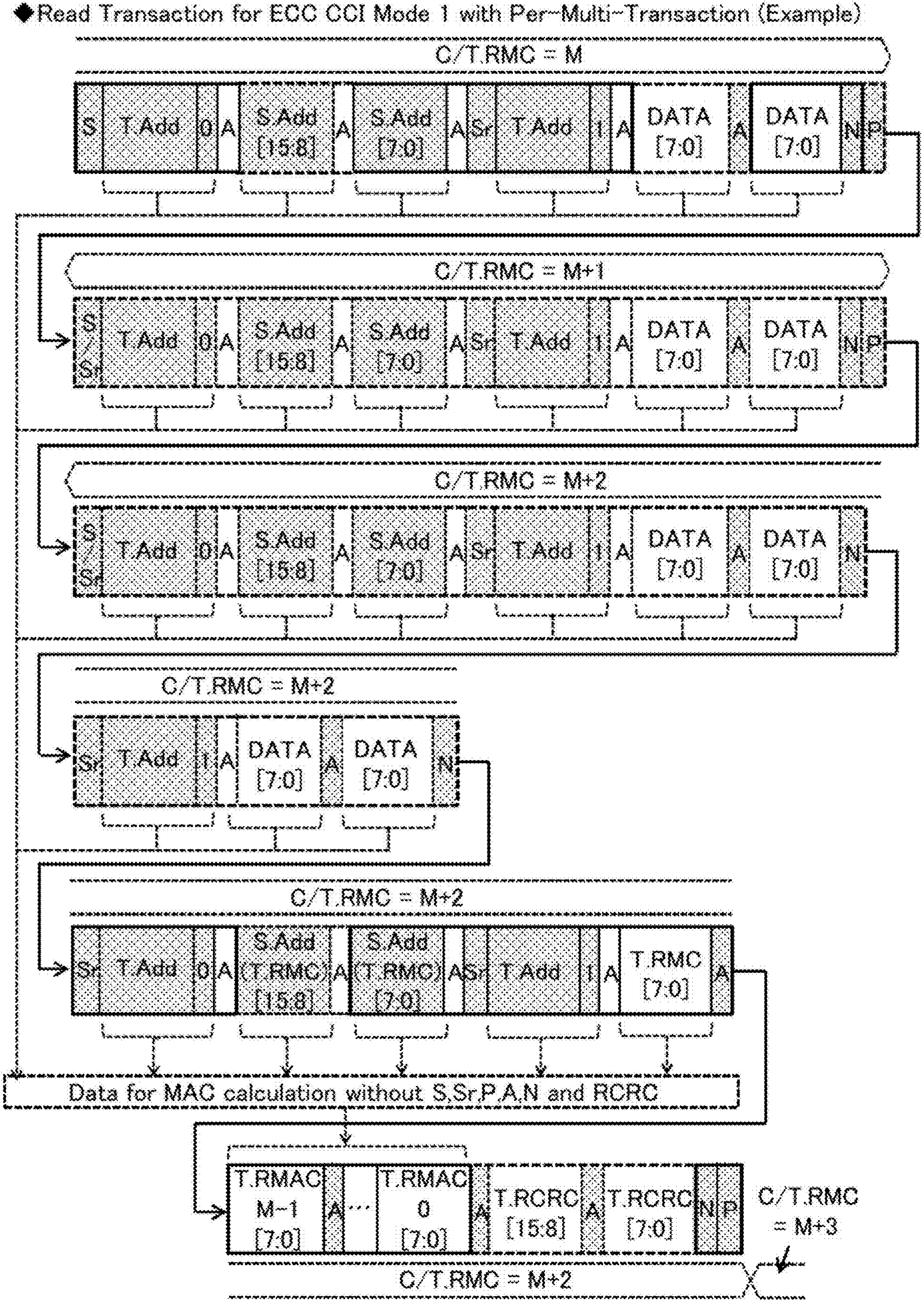

[ FIG. 32 ]
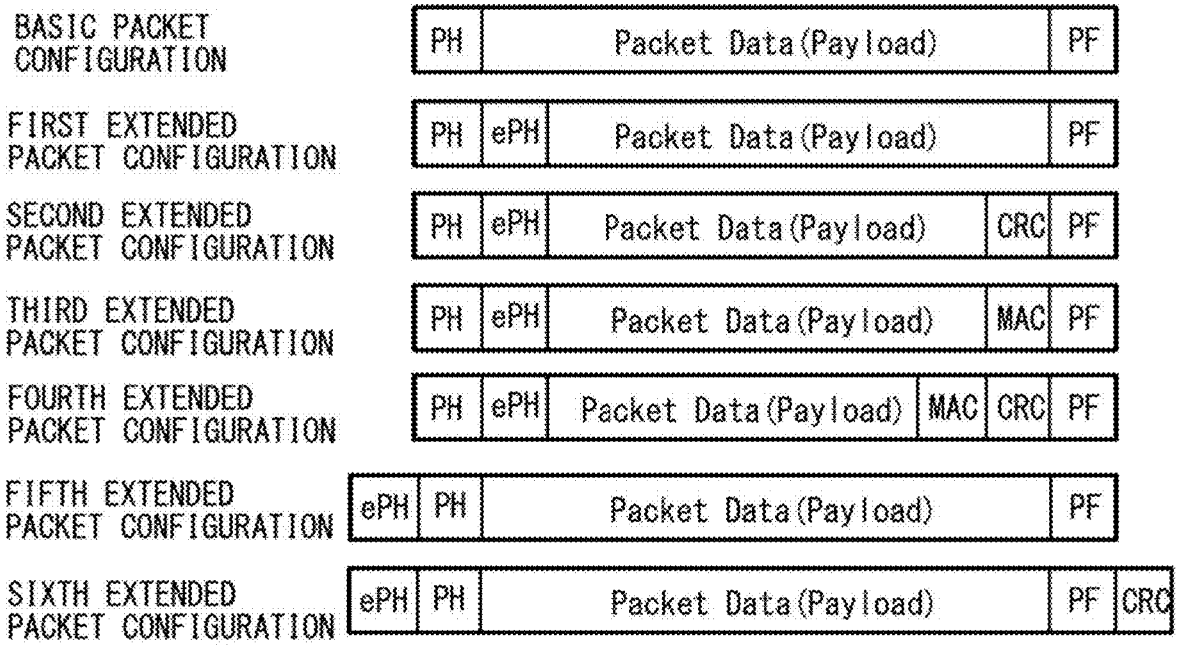

[ FIG. 33 ]
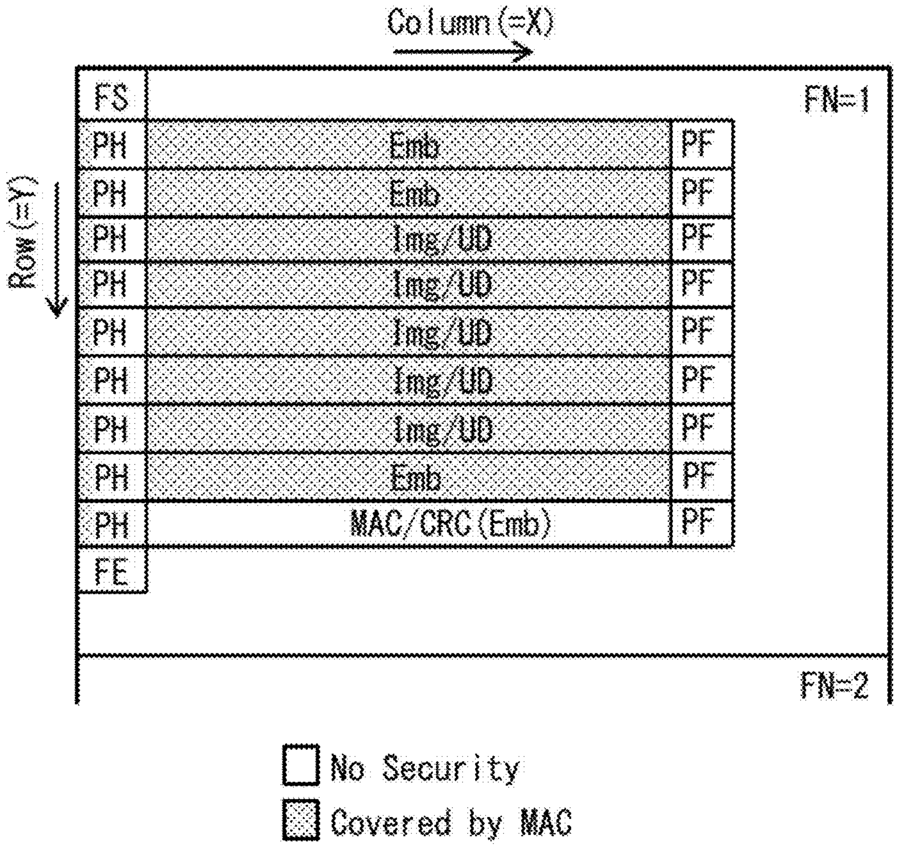
FS: Frame Start
PH: Packet Header
ePH: extended Packet Header
Emb: Embedded Data
Img: Image Data
UD: User Defined Data
FN: Frame Number
ePF: extended Packet Footer
PF: Packet Footer
FE: Frame End
CRC: Cyclic Redundancy Check
MAC: Message Authentication Code

[ FIG. 34 ]
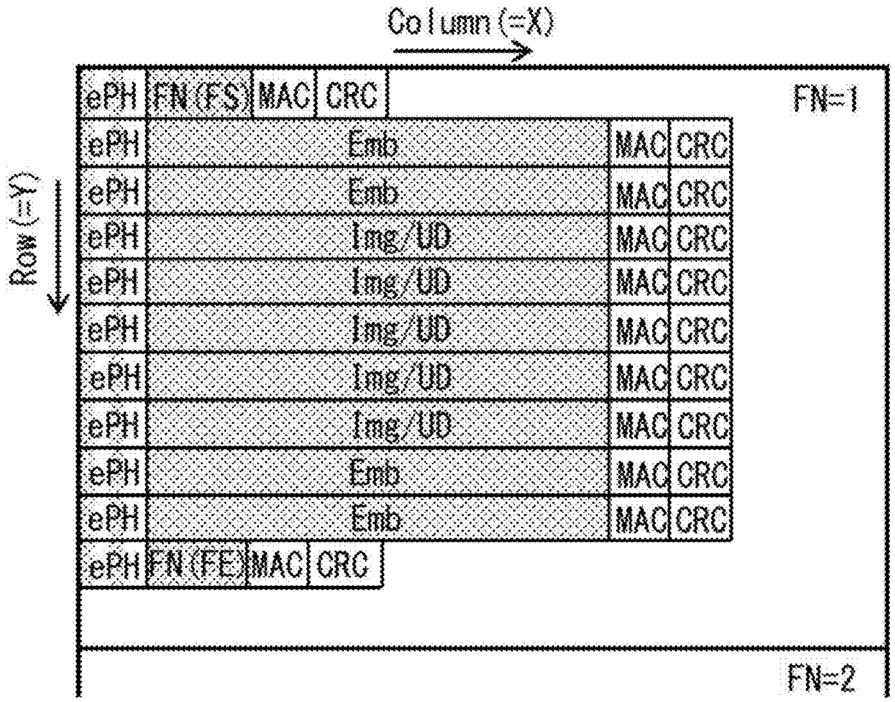

◆Flow of Sequre Boot Mode 2/3 (Flexible Example)

【FIG. 40A】

◆Secure Boot Capabilities Registers format (Example)

| Register Name | RW | Description | Address Offset | Register Size (Bytes) |
|---|---|---|---|---|
| Secure BootMode | RO | Bit map indicating combinations supported by this Sensor.<br>Bit[7:3]: Reserved<br>Bit[2]: Mode 3 using SPDM over ESS CCI Mode 0 (Quick & Lightest)<br>Bit[1]: Mode 2 using SPDM over ESS CCI Mode 0 (Flexible & Lighter)<br>Bit[0]: Mode 1 using SPDM over DSP0277 (Flexible & DMTF-defined)<br>Interpretation for each bit position:<br>1b' 1: The combination is supported by this Sensor.<br>1b' 0: The combination is not supported by this Sensor.<br>Any number of combinations may be indicated as supported by this Sensor. | N/A | 1 |

[ FIG. 40B ]

◆Secure Boot Capabilities Registers format (Example)

| Register Name | RW | Description | Address Offset | Register Size (Bytes) |
|---|---|---|---|---|
| DHEbased Algorithm | RO | Bit map indicating combinations supported by this Sensor.<br>Bit[7:6]: Reserved<br>Bit[5]: AES-256-GCM using the DMTF-defined HMAC-based Key Schedule.<br>Bit[4]: AES-128-GCM using the DMTF-defined HMAC-based Key Schedule.<br>Bit[3]: AES-256-CBC+AES-256-CMAC using the Vendor-defined HMAC-based Key Schedule.<br>Bit[2]: AES-128-CBC+AES-128-CMAC using the Vendor-defined HMAC-based Key Schedule.<br>Bit[1]: AES-256-CTR+AES-256-CMAC using the Vendor-defined HMAC-based Key Schedule.<br>Bit[0]: AES-128-CTR+AES-128-CMAC using the Vendor-defined HMAC-based Key Schedule.<br>Interpretation for each bit position:<br>1b' 1: The combination is supported by this Sensor.<br>1b' 0: The combination is not supported by this Sensor.<br>Any number of combinations may be indicated as supported by this Sensor. | 1 | 1 |

[ FIG. 40C ]

◆Secure Boot Capabilities Registers format (Example)

| Register Name | RW | Description | Address Offset | Register Size (Bytes) |
|---|---|---|---|---|
| PSKbased Algorithm | RO | Bit map indicating combinations supported by this Sensor.<br>Bit[15:14]: Reserved<br>Bit[13]: AES-256-GCM using the DMTF-defined HMAC-based Key Schedule.<br>Bit[12]: AES-128-GCM using the DMTF-defined HMAC-based Key Schedule.<br>Bit[11]: AES-256-CBC+AES-256-CMAC using the Vendor-defined HMAC-based Key Schedule.<br>Bit[10]: AES-128-CBC+AES-128-CMAC using the Vendor-defined HMAC-based Key Schedule.<br>Bit[9]: AES-256-CTR+AES-256-CMAC using the Vendor-defined HMAC-based Key Schedule.<br>Bit[8]: AES-128-CTR+AES-128-CMAC using the Vendor-defined HMAC-based Key Schedule.<br>Bit[7:4]: Reserved<br>Bit[3]: AES-256-CBC+AES-256-CMAC using the Vendor-defined AES-based Key Schedule.<br>Bit[2]: AES-128-CBC+AES-128-CMAC using the Vendor-defined AES-based Key Schedule.<br>Bit[1]: AES-256-CTR+AES-256-CMAC using the Vendor-defined AES-based Key Schedule.<br>Bit[0]: AES-128-CTR+AES-128-CMAC using the Vendor-defined AES-based Key Schedule.<br>Interpretation for each bit position:<br>1b' 1: The combination is supported by this Sensor.<br>1b' 0: The combination is not supported by this Sensor.<br>Any number of combinations may be indicated as supported by this Sensor. | 2 | 2 |

[ FIG. 41 ]
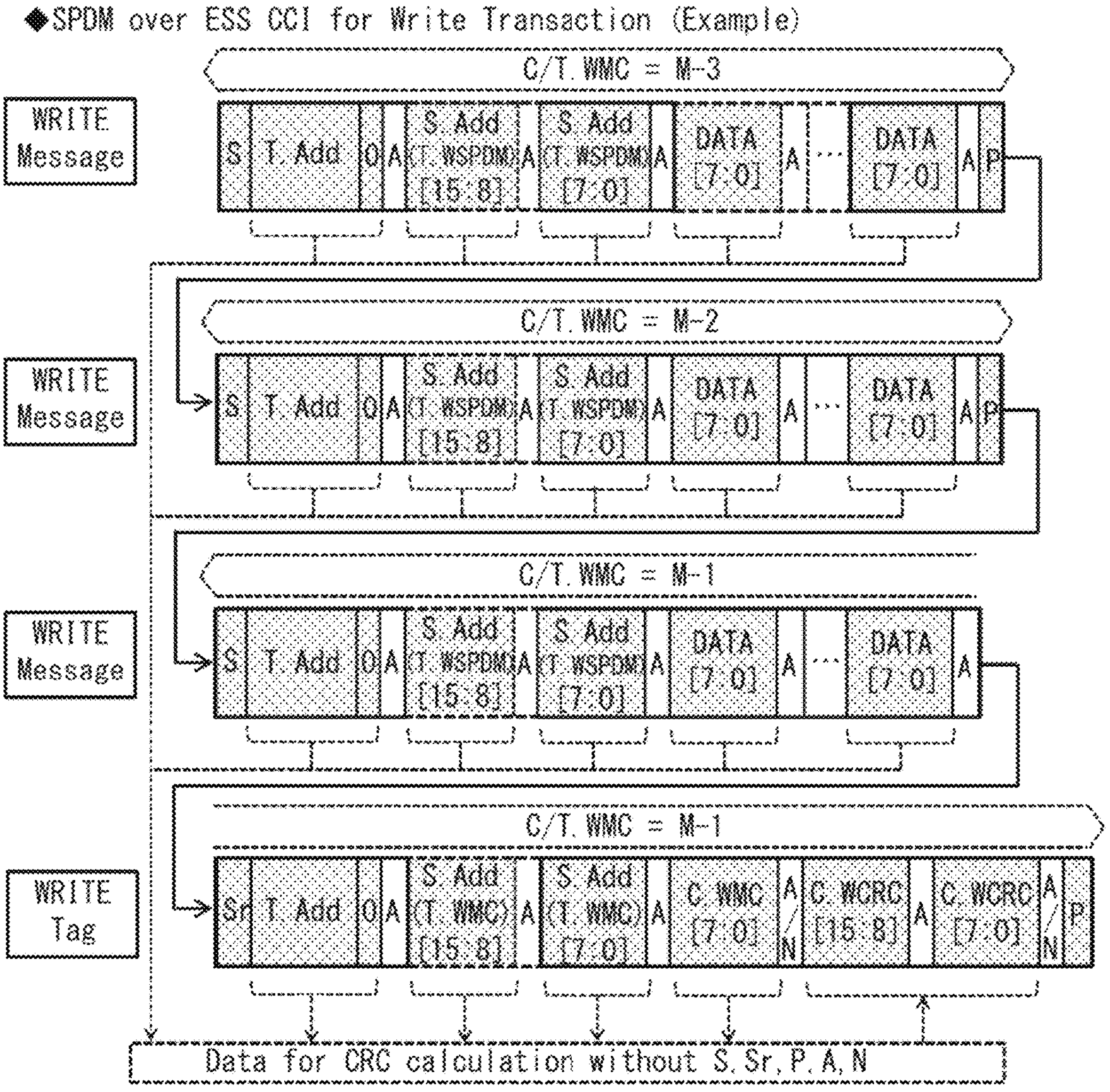

[ FIG. 42 ]
◆SPDM over ESS CCI for Read Transaction (Example)
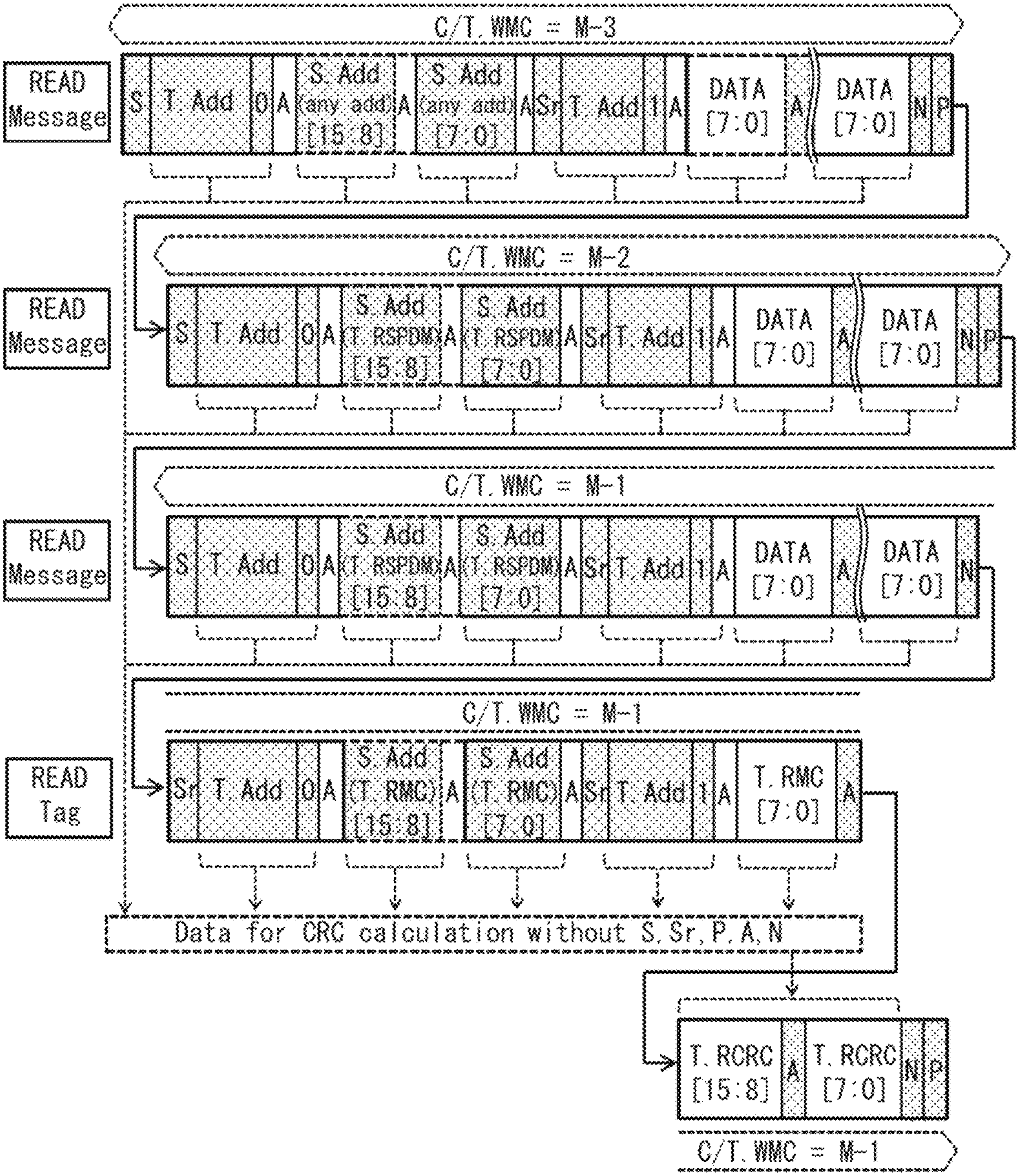

【FIG. 43】
◆finished_key MAC Coverage for PSK (Example)
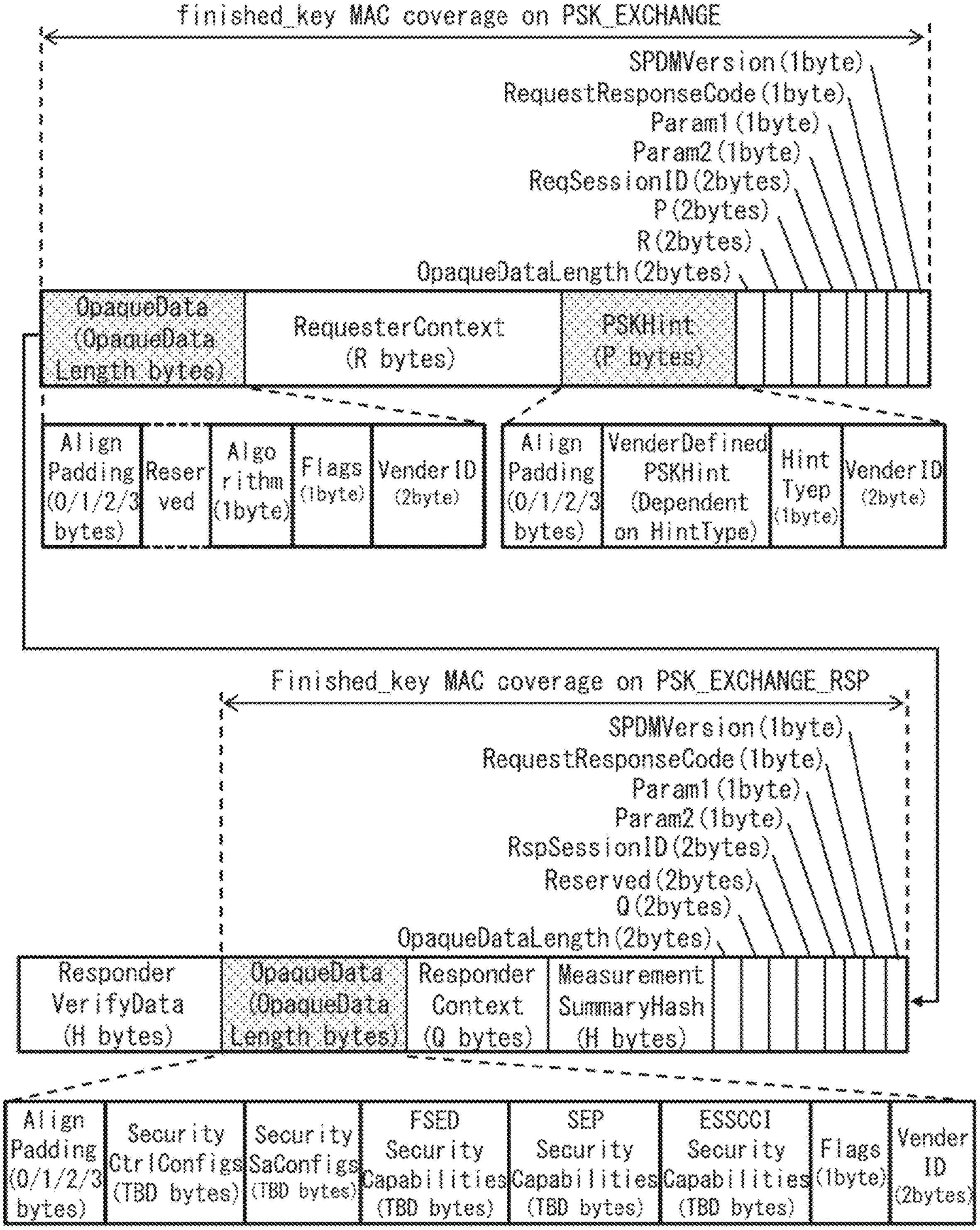

[ FIG. 44 ]

◆OpaqueData filed format for "KEY/PSK" _EXCHANGE request message (Example)

| Byte offset | Field | Size (bytes) | Description |
|---|---|---|---|
| 0 | VendorID | 2 | The Manufacturer ID assigned by MIPI identifies the vendor. |
| 2 | Flags | 1 | Bit[0] 1b' 0: The Algorithm field shall be absent and AlgoLen shall be 0.<br>Bit[0] 1b' 1: The Algorithm field shall be present and AlgoLen shall be 1.<br>All other values reserved. |
| 3 | Algorithm | AlgoLen | This field shall indicate which AEAD Algorithm will be used for PSK-based SPDM session(s).<br>0x00: AES-128-CTR+AES-128-CMAC using the Vendor-defined AES-based Key Schedule.<br>0x01: AES-256-CTR+AES-256-CMAC using the Vendor-defined AES-based Key Schedule.<br>0x02: AES-128-CBC+AES-128-CMAC using the Vendor-defined AES-based Key Schedule.<br>0x03: AES-256-CBC+AES-256-CMAC using the Vendor-defined AES-based Key Schedule.<br>0x04: AES-128-CTR+AES-128-CMAC using the Vendor-defined HMAC-based Key Schedule.<br>0x05: AES-256-CTR+AES-256-CMAC using the Vendor-defined HMAC-based Key Schedule.<br>0x06: AES-128-CBC+AES-128-CMAC using the Vendor-defined HMAC-based Key Schedule.<br>0x07: AES-256-CBC+AES-256-CMAC using the Vendor-defined HMAC-based Key Schedule.<br>0x08: AES-128-GCM using the DMTF-defined HMAC-based Key Schedule.<br>0x09: AES-256-GCM using the DMTF-defined HMAC-based Key Schedule.<br>All other values reserved. |
| 3+AlgoLen | Align Padding | AlignPaddingSize =0, 1, 2, or3 | If 3+AlgoLen does not fall on a 4-byte boundary, this field shall be present and of the correct length to ensure 3+AlgoLen+AlignPaddingSize is a multiple of 4. The value of this field shall be all zeros and the size of this field shall be 0, 1, 2 or 3. |

[ FIG. 45 ]
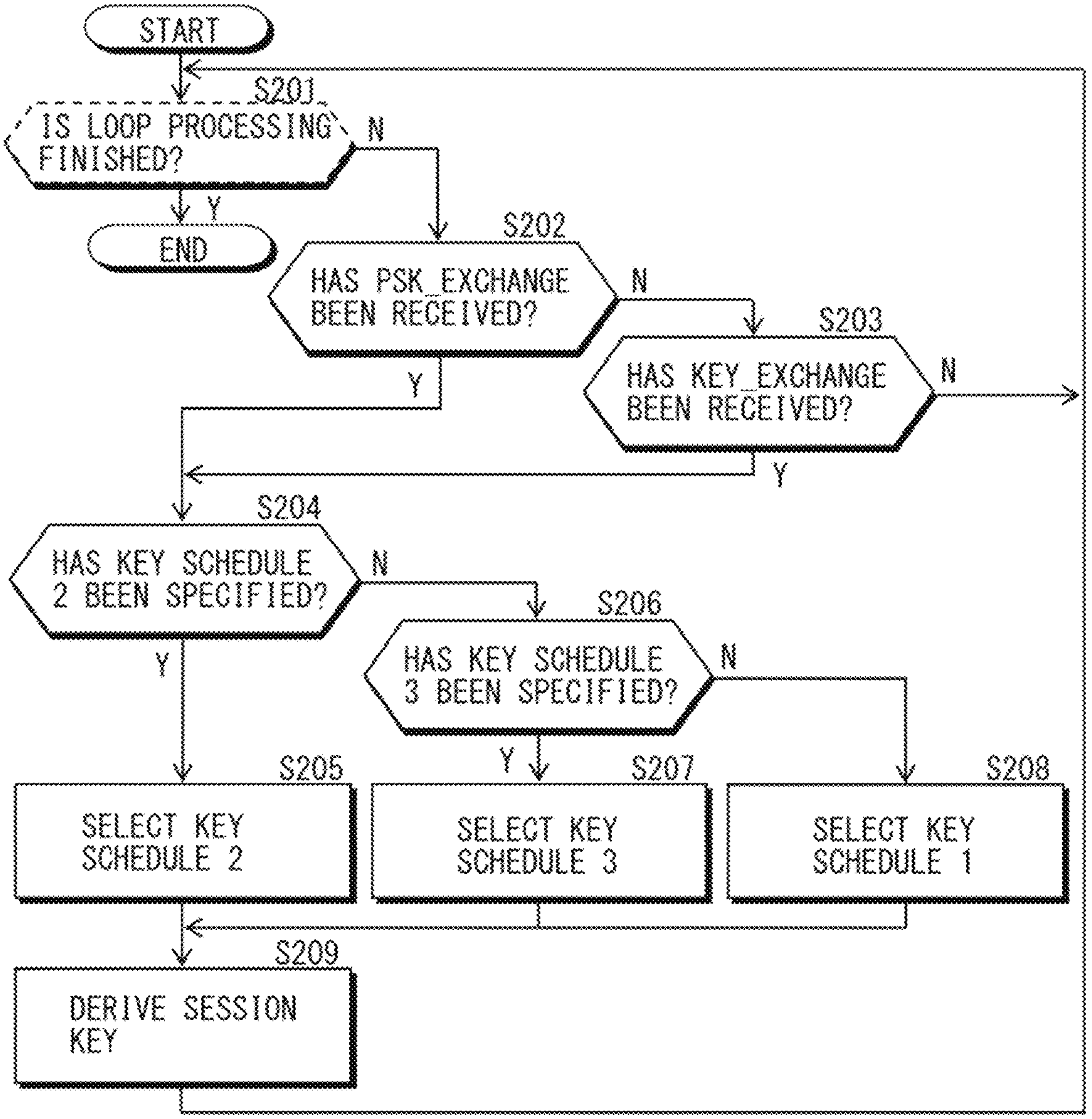

FIG. 46A

◆OpaqueData filed format for "KEY/PSK" _EXCHANGE_RSP response message (Example)

| Byte offset | Field | Size (bytes) | Description |
|---|---|---|---|
| 0 | VendorID | 2 | The Manufacturer ID assigned by MIPI identifies the vendor. |
| 2 | Flags | 1 | Bit[0] 1b' 0:<br>The ESSCCISecurityCapabilities field shall be absent and ESSCCISecCapLen shall be 0.<br>Bit[0] 1b' 1:<br>The ESSCCISecurityCapabilities field shall be present.<br>Bit[1] 1b' 0:<br>The SEPSecurityCapabilities field shall be absent and SEPSecCapLen shall be 0.<br>Bit[1] 1b' 1:<br>The SEPSecurityCapabilities field shall be present.<br>Bit[2] 1b' 0:<br>The FSEDSecurityCapabilities field shall be absent and FSEDSecCapLen shall be 0.<br>Bit[2] 1b' 1:<br>The FSEDSecurityCapabilities field shall be present. |

FIG. 46B

◆OpaqueData filed format for "KEY/PSK" _EXCHANGE_RSP response message (Example)

| Byte offset | Field | Size (bytes) | Description |
|---|---|---|---|
| 2 | Flags | 1 | Bit[3] 1b' 0:<br>The SecuritySaConfigs field shall be absent and SecSaLen shall be 0.<br>Bit[3] 1b' 1:<br>The SecuritySaConfigs field shall be present.<br>Bit[4] 1b' 0:<br>The SecurityCtrlConfigs field shall be absent and SecCtrlLen shall be 0.<br>Bit[4] 1b' 1:<br>The SecurityCtrlConfigs field shall be present.<br>All other values reserved. |
| 3 | ESSCCI Security Capabilities | ESSCCI SecCapLen | TBD. |
| 3+ESSCCI SecCapLen | SEPSecurity Capabilities | SEP SecCapLen | TBD. |
| 3+ESSCCI SecCapLen+ SEP SecCapLen | FSEDSecurity Capabilities | FSED SecCapLen | TBD. |

FIG. 46C

◆OpaqueData filed format for "KEY/PSK" _EXCHANGE _RSP response message (Example)

| Byte offset | Field | Size (bytes) | Description |
|---|---|---|---|
| 3+ ESSCCISecCapLen+ SEPSecCapLen+ FSEDSecCapLen | Security Sa Configs | SecSaLen | TBD. |
| 3+ ESSCCISecCapLen+ SEPSecCapLen+ FSEDSecCapLen+ SecSaLen | Security Ctrl Configs | SecCtrlLen | TBD. |
| 3+ ESSCCISecCapLen+ SEPSecCapLen+ FSEDSecCapLen+ SecSaLen+ SecCtrlLen | Align Padding | AlignPadding Size = 0, 1, 2, or 3 | If 3+ESSCCISecCapLen+SEPSecCapLen +FSEDSecCapLen+SecSaLen+SecCtrlLen does not fall on a 4-byte boundary, this field shall be present and of the correct length to ensure 3+ESSCCISecCapLen+SEPSecCapLen +FSEDSecCapLen+SecSaLen+SecCtrlLen +AlignPaddingSize is a multiple of 4. The value of this field shall be all zeros and the size of this field shall be 0, 1, 2 or 3. |

【FIG. 47】

◆PSKHint filed format for PSK_EXCHANGE request message (Example)

| Byte offset | Field | Size (bytes) | Description |
|---|---|---|---|
| 0 | VendorID | 2 | The Manufacturer ID assigned by MIPI identifies the vendor. |
| 2 | HintType | 1 | This field shall indicate which type of VendorDefinedPSKHint will be used in this particular session.<br>0x00: An identifier to specify which PSK will be used from multiple PSKs.<br>0x01: An immutable Unique Device Secret to derive a PSK.<br>0x02: A derivative value to derive a PSK.<br>0x03: A non-secret salt to derive a PSK.<br>All other values reserved. |
| 3 | Vendor Defined PSKHint | PSKHint Len | Information required by the Responder to retrieve the PSK. Optional. |
| 3+ PSKHint Len | Align Padding | Align Padding Size =0, 1, 2, or3 | If 3+PSKHintLen does not fall on a 4-byte boundary, this field shall be present and of the correct length to ensure 3+PSKHintLen+AlignPaddingSize is a multiple of 4. The value of this field shall be all zeros and the size of this field shall be 0, 1, 2 or 3. |

【FIG. 50】

◆VENDOR_DEFINED_REQUEST request message format for Read Transaction (Example)

| Byte offset | Field | Size (bytes) | Description |
|---|---|---|---|
| 0 | SPDMVersion | 1 | Shall be the SPDMVersion. |
| 1 | RequestResponseCode | 1 | 0xFE = VENDOR_DEFINED_REQUEST. |
| 2 | Param1 | 1 | Reserved. |
| 3 | Param2 | 1 | Reserved. |
| 4 | StandardID | 2 | Shall indicate the registry or standards body by using one of the values in the ID column. |
| 6 | Len | 1 | Length of the Vendor ID field. If the VendorDefinedRequest is standard defined, Len shall be 0. If the VendorDefinedRequest is vendor-defined, Len shall equal Vendor ID Len. |
| 7 | VendorID | Len | Vendor ID, as assigned by the registry or standards body. Shall be in little endian format. |
| 7+Len | ReqLength | 2 | Length of the VendorDefinedReqPayload.<br>0x0000: Start Read Transaction. |

[ FIG. 51 ]

◆Successful VENDOR_DEFINED_RESPONSE request message format for Read Transaction (Example)

| Byte offset | Field | Size (bytes) | Description |
|---|---|---|---|
| 0 | SPDMVersion | 1 | Shall be the SPDMVersion. |
| 1 | RequestResponseCode | 1 | 0x7E = VENDOR_DEFINED_RESPONSE. |
| 2 | Param1 | 1 | Reserved. |
| 3 | Param2 | 1 | Reserved. |
| 4 | StandardID | 2 | Shall indicate the registry or standard body using one of the values in the ID column. |
| 6 | Len | 1 | Length of the Vendor ID field. If the VendorDefinedRequest is standards-defined, length shall be 0. If the VendorDefinedRequest is vendor-defined, length shall equal Vendor ID Len. |
| 7 | VendorID | Len | Shall indicate the Vendor ID, as assigned by the registry or standards body. Shall be in little endian format. |
| 7+Len | ReqLength | 2 | Length of the VendorDefinedRespPayload. |
| 7+Len +2 | VendorDefinedRespPayload | ReqLength | Standard or vendor shall use this value to send the response payload. |

【 FIG. 55 】

◆Message Protocol field format (Example)

| Byte offset | Field | Size (bytes) | Description |
|---|---|---|---|
| 0 | Message Protocol ID | 1 | 0x00: SPDM over ESS CCI.<br>0x01: SPDM Session over ESS CCI.<br>0x02: SPDM over DSP0277.<br>0x03: SPDM Session over DSP0277.<br>All other values reserved. |

◆SCAP over ESS CCI Mode 0 for Write Transaction (Example)

【FIG. 59】

◆Message Protocol field format (Example)

| Byte offset | Field | Size (bytes) | Description |
|---|---|---|---|
| 0 | Message Protocol ID | 1 | 0x00: SPDM over ESS CCI.<br>0x01: SPDM Session over ESS CCI.<br>0x02: SCAP over ESS CCI.<br>All other values reserved. |

【 FIG. 60A 】

◆SCAP over ESS CCI Mode 0 for Read Transaction (Example)

[ FIG. 60B ]

◆SCAP over ESS CCI Mode 0 for Read Transaction (Example)

[ FIG. 61 ]

[ FIG. 63 ]
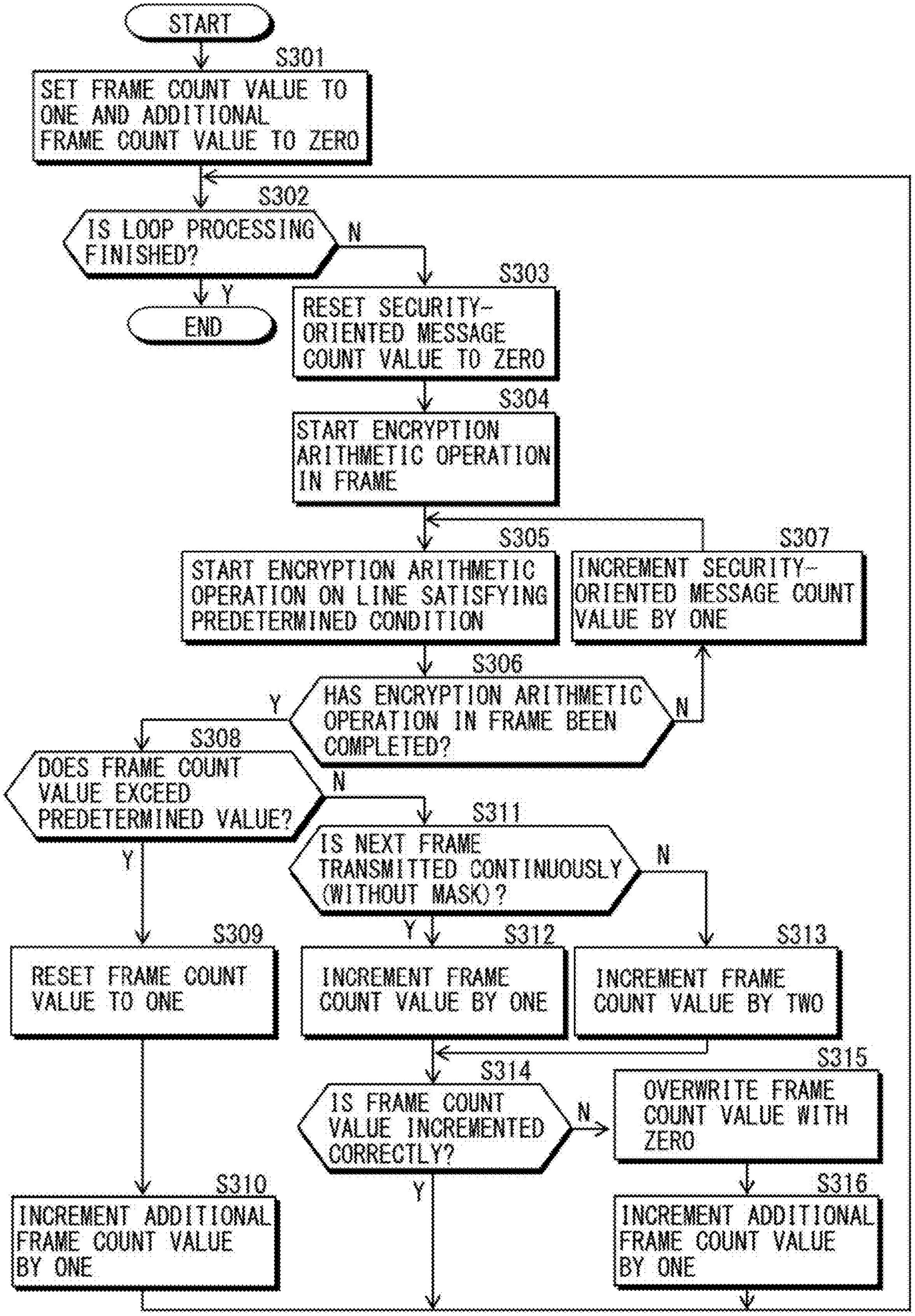

[ FIG. 64 ]
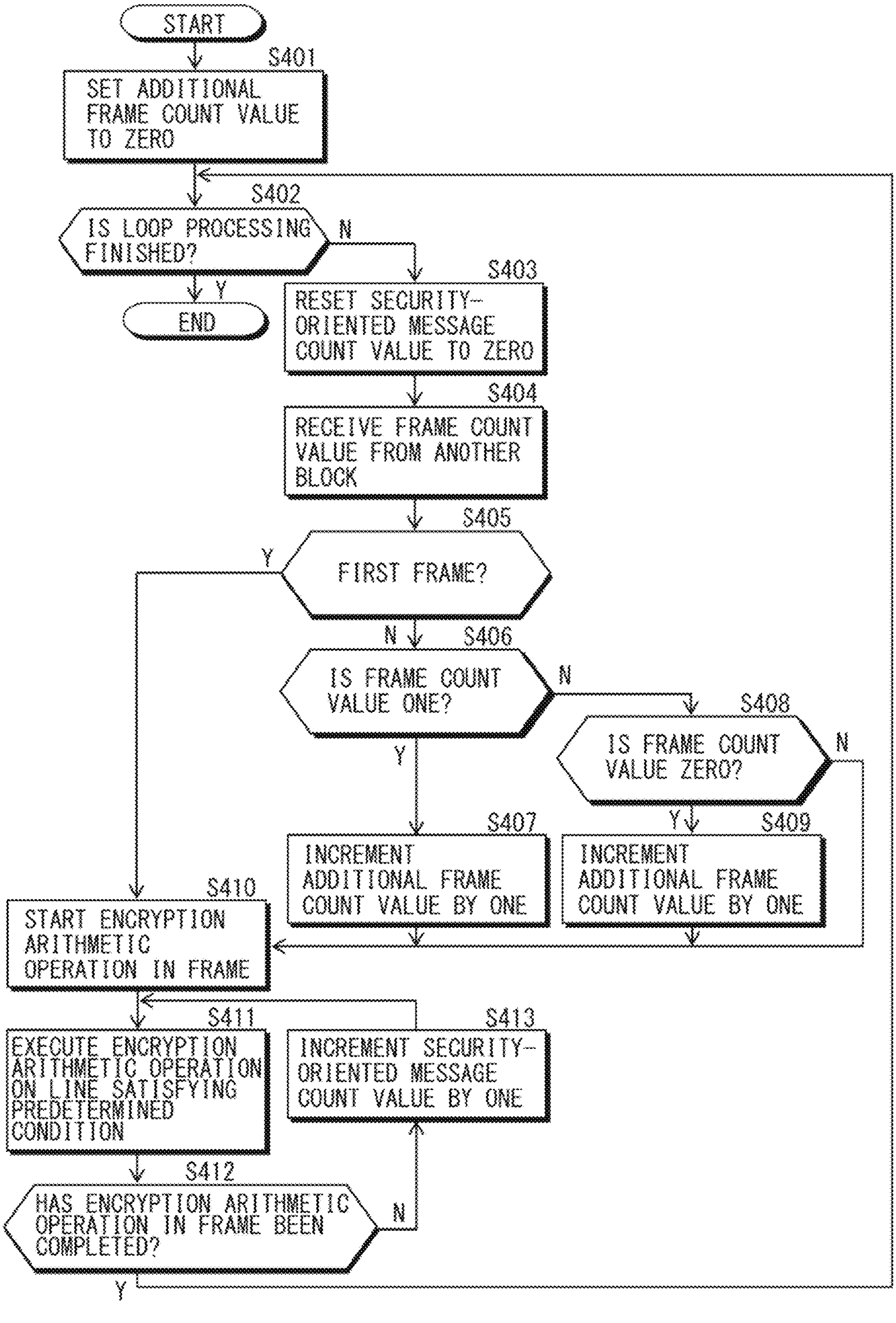

[ FIG. 65 ]
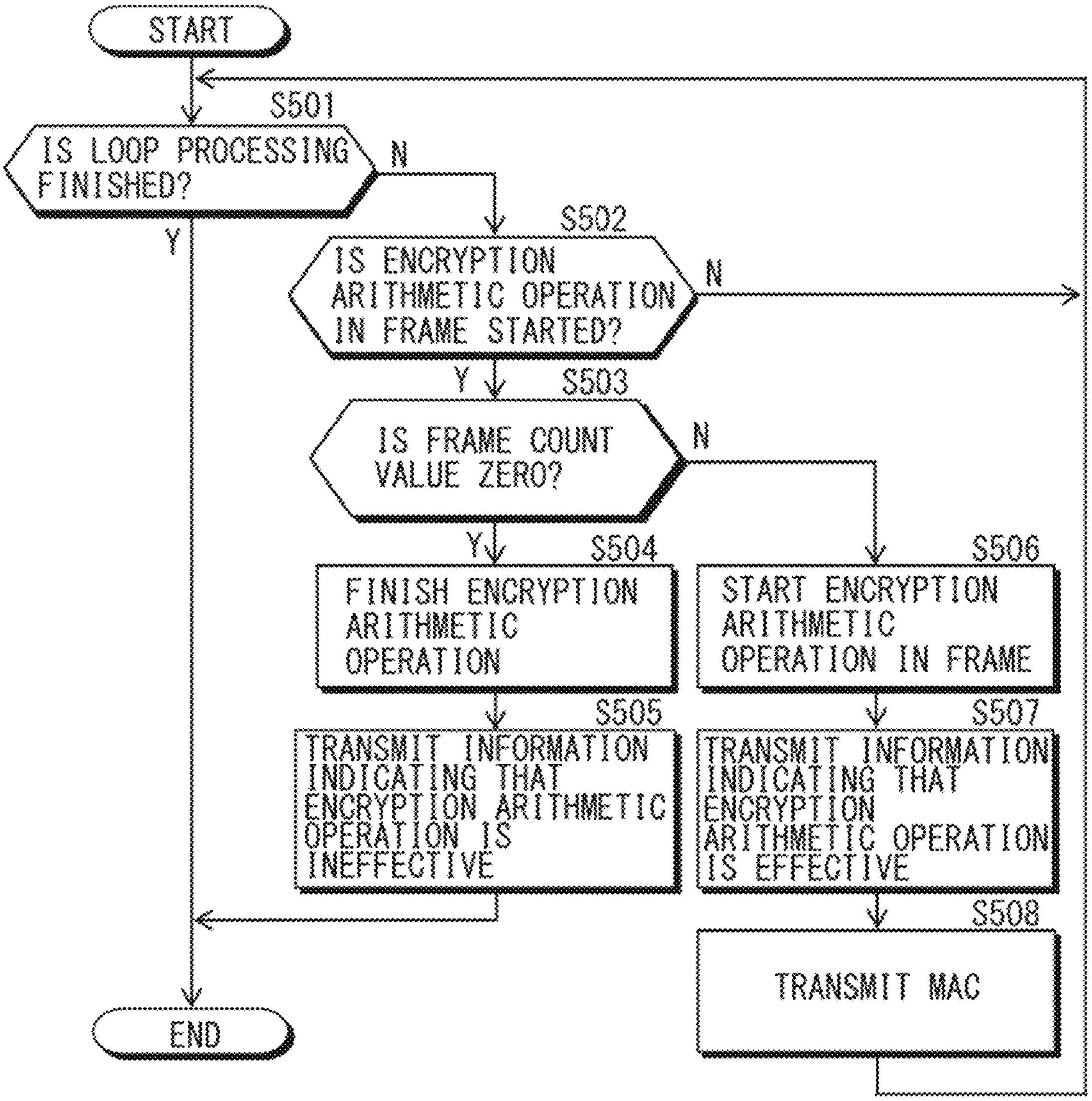

[ FIG. 66 ]
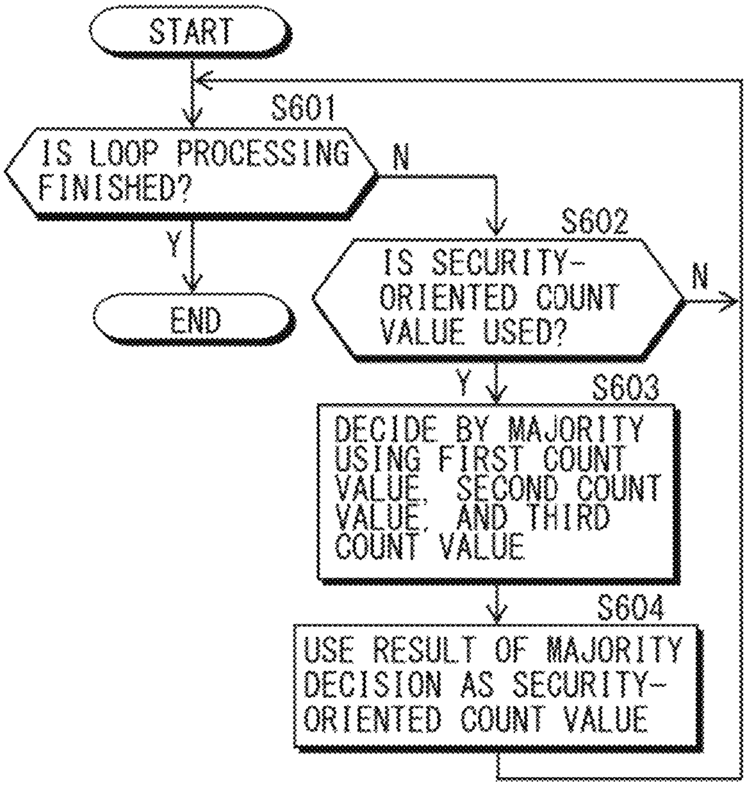

[ FIG. 67 ]
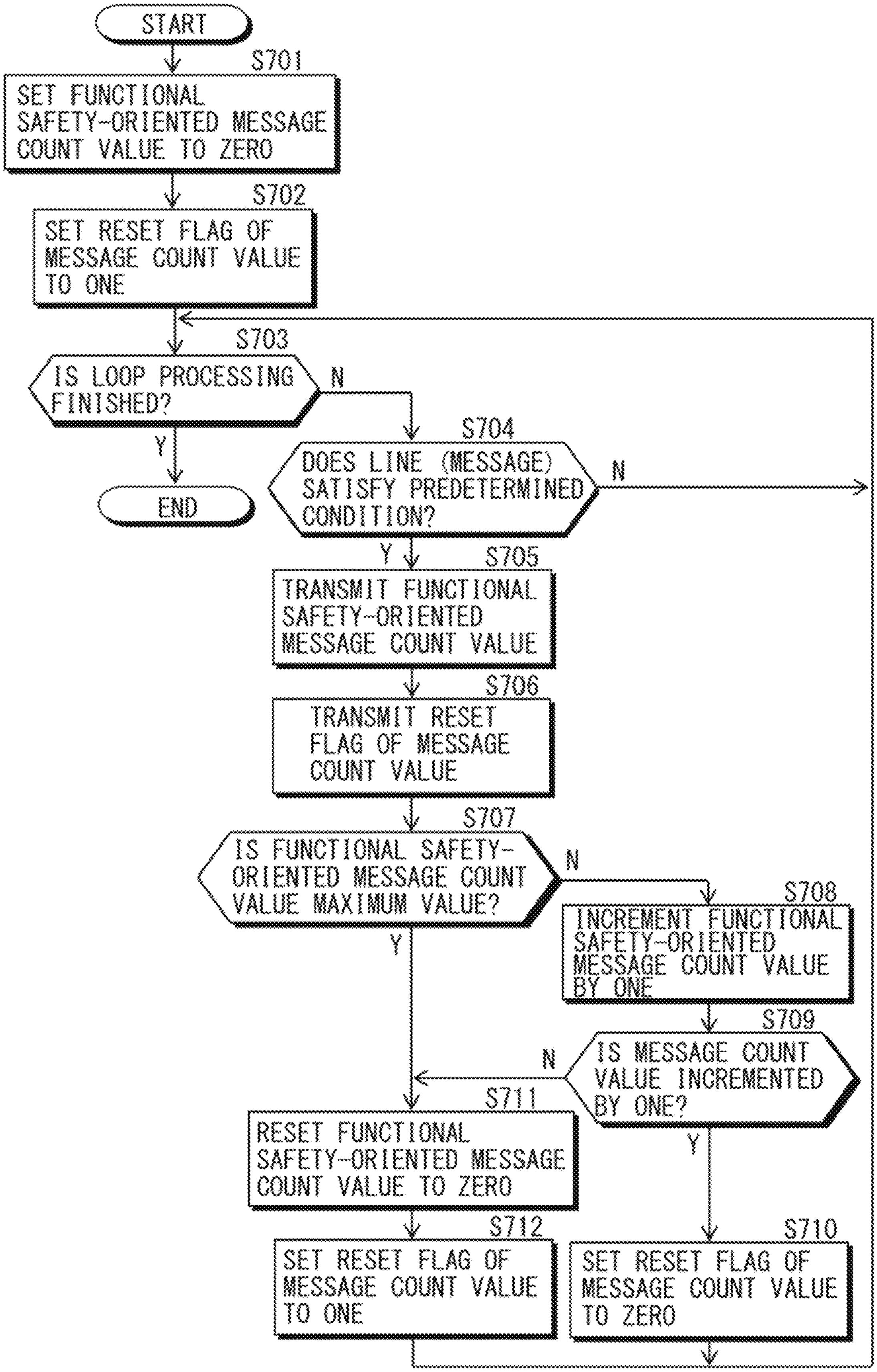

[ FIG. 68 ]
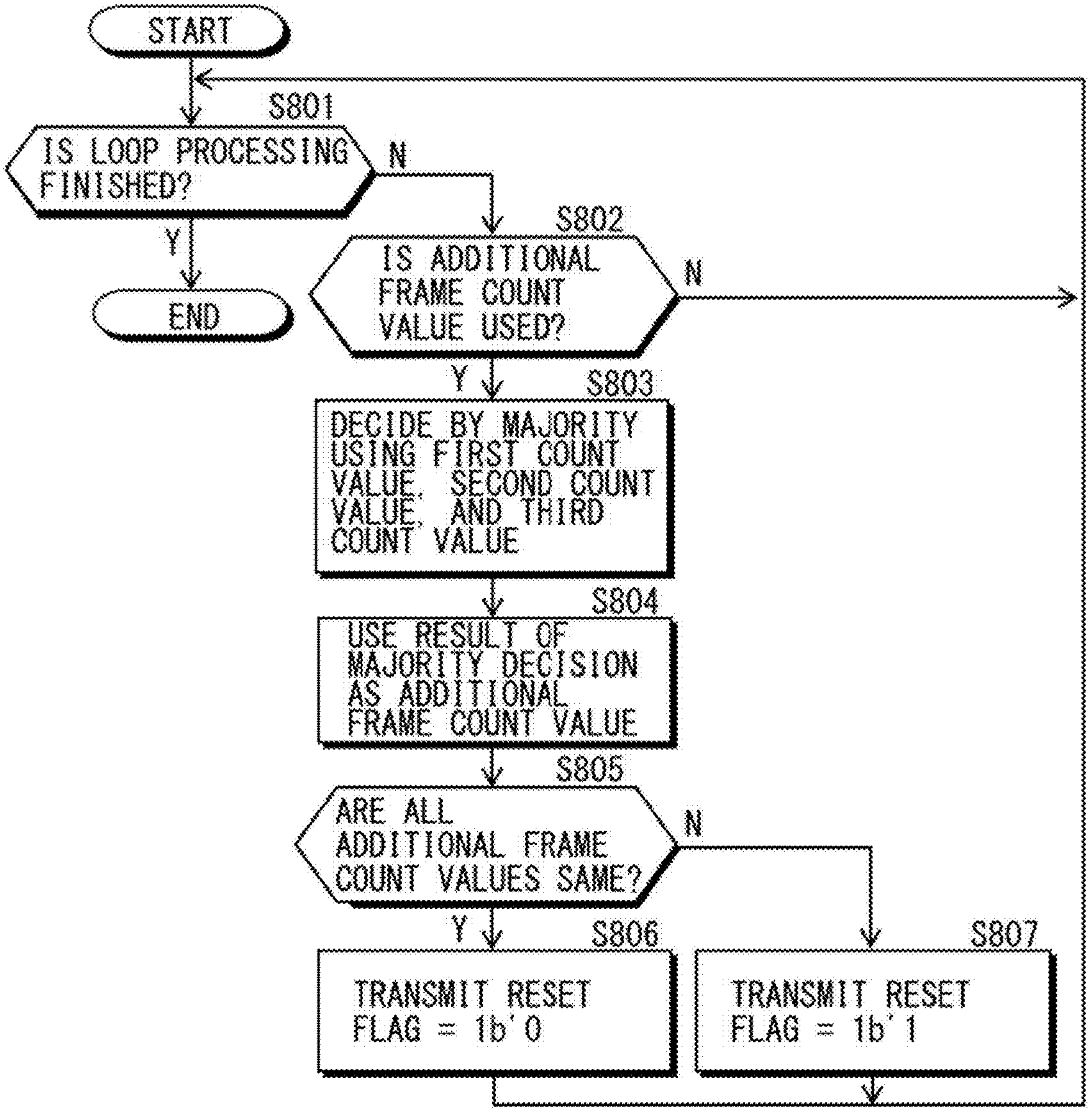

[ FIG. 69 ]
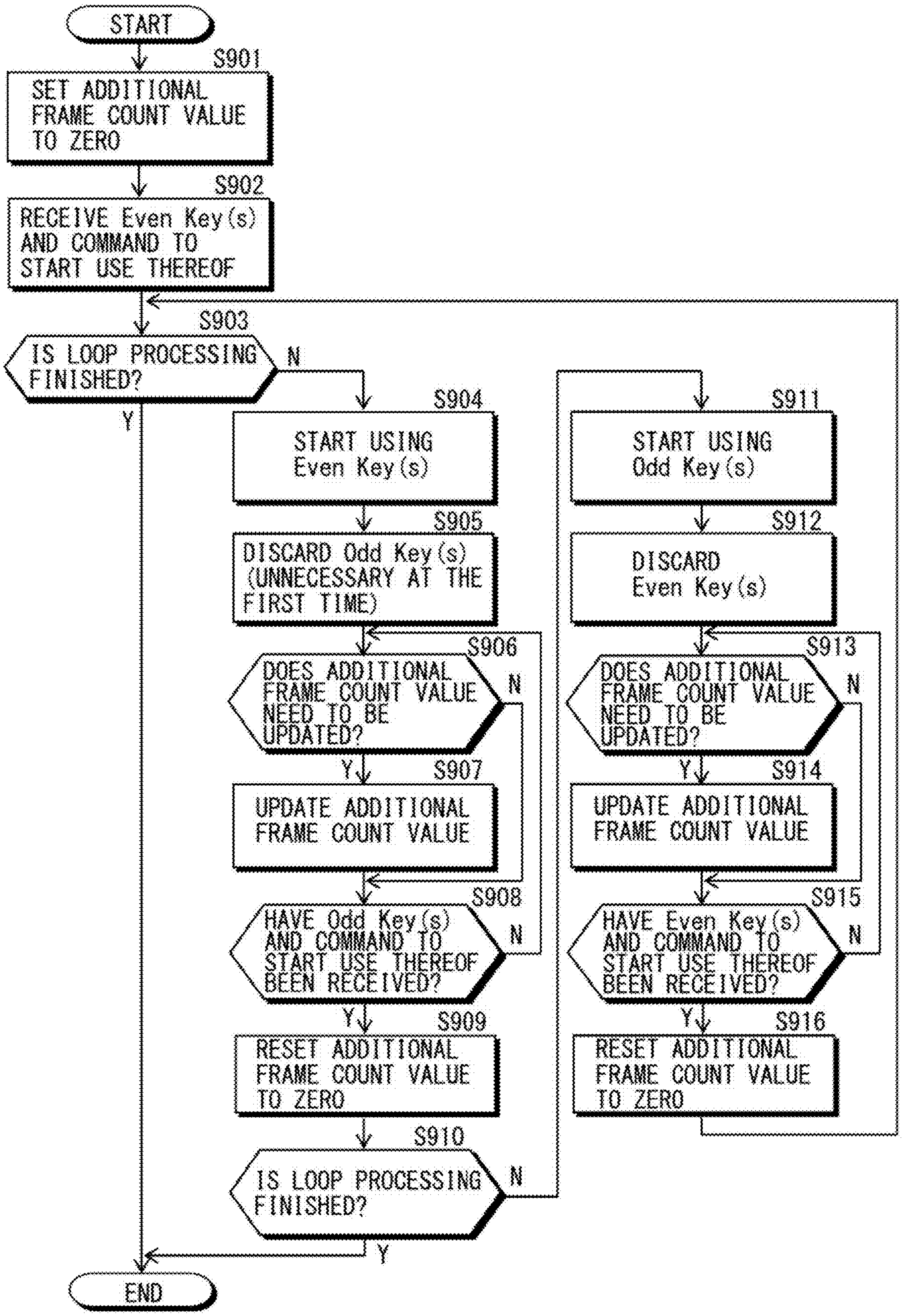

[ FIG. 70 ]

◆Frame Format (Example)

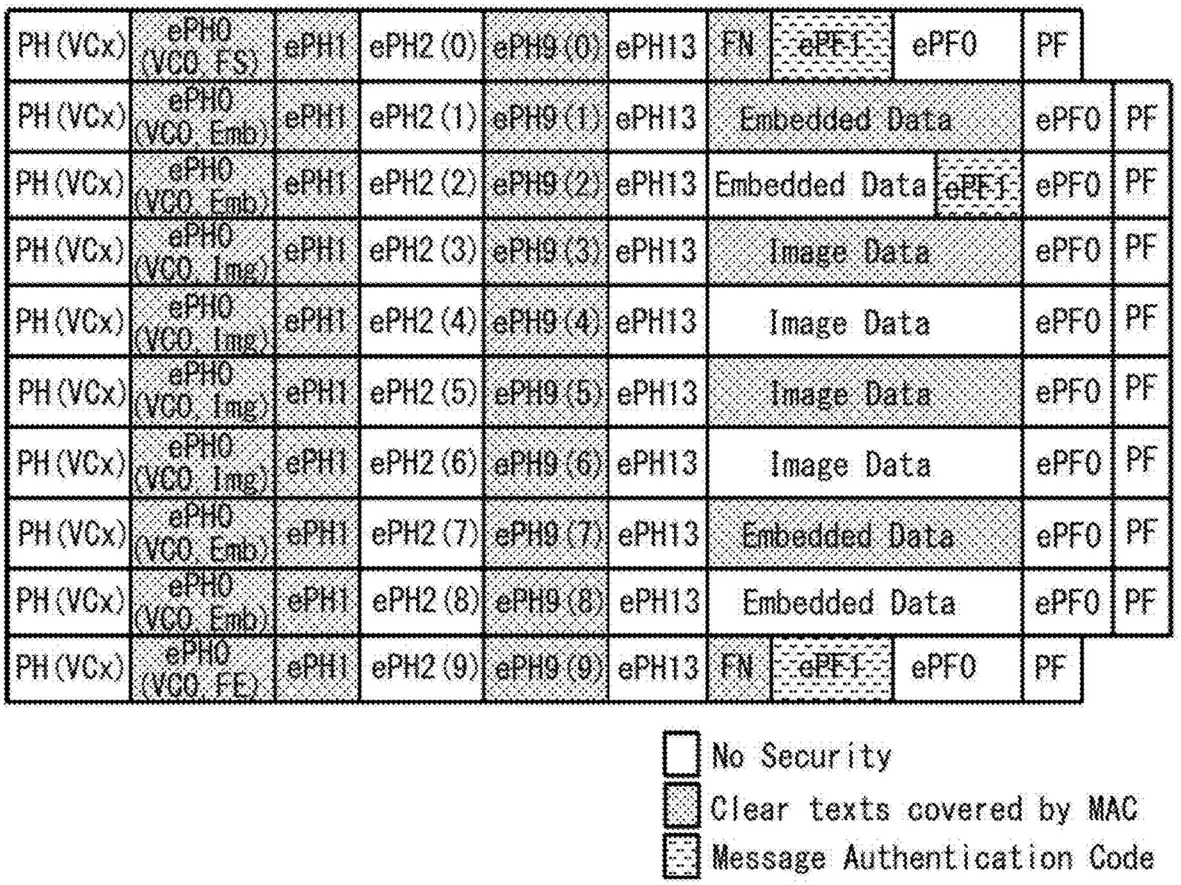

PH(VCn): Packet Header containing Virtual Channel n
PF: Packet Footer
ePH0(eVC, eDT): extended PH0 containing eVC and eDT
ePH1: extended PH1
ePH2(FMC): extended PH2 containing FuSa Message Counter
ePH9(SMC): extended PH2 containing Security Message Counter
ePH13: extended PH13
ePF1: extended PF1(MAC)
ePF0: extended PF0(CRC32)
FS: Frame Start
FE: Frame End
FN: Frame Number
Emb: Embedded Data
Img: Image Data

[ FIG. 71 ]
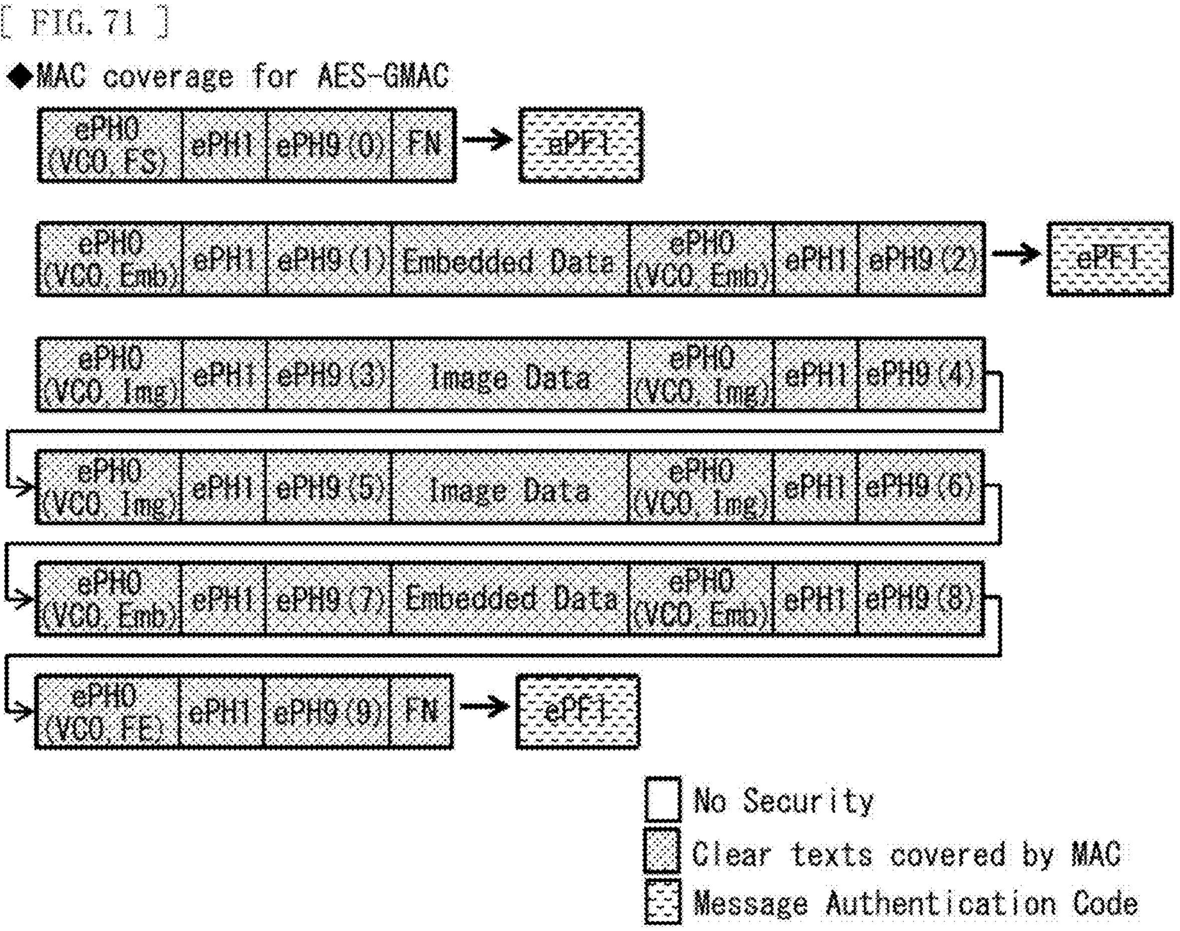

【FIG. 72】
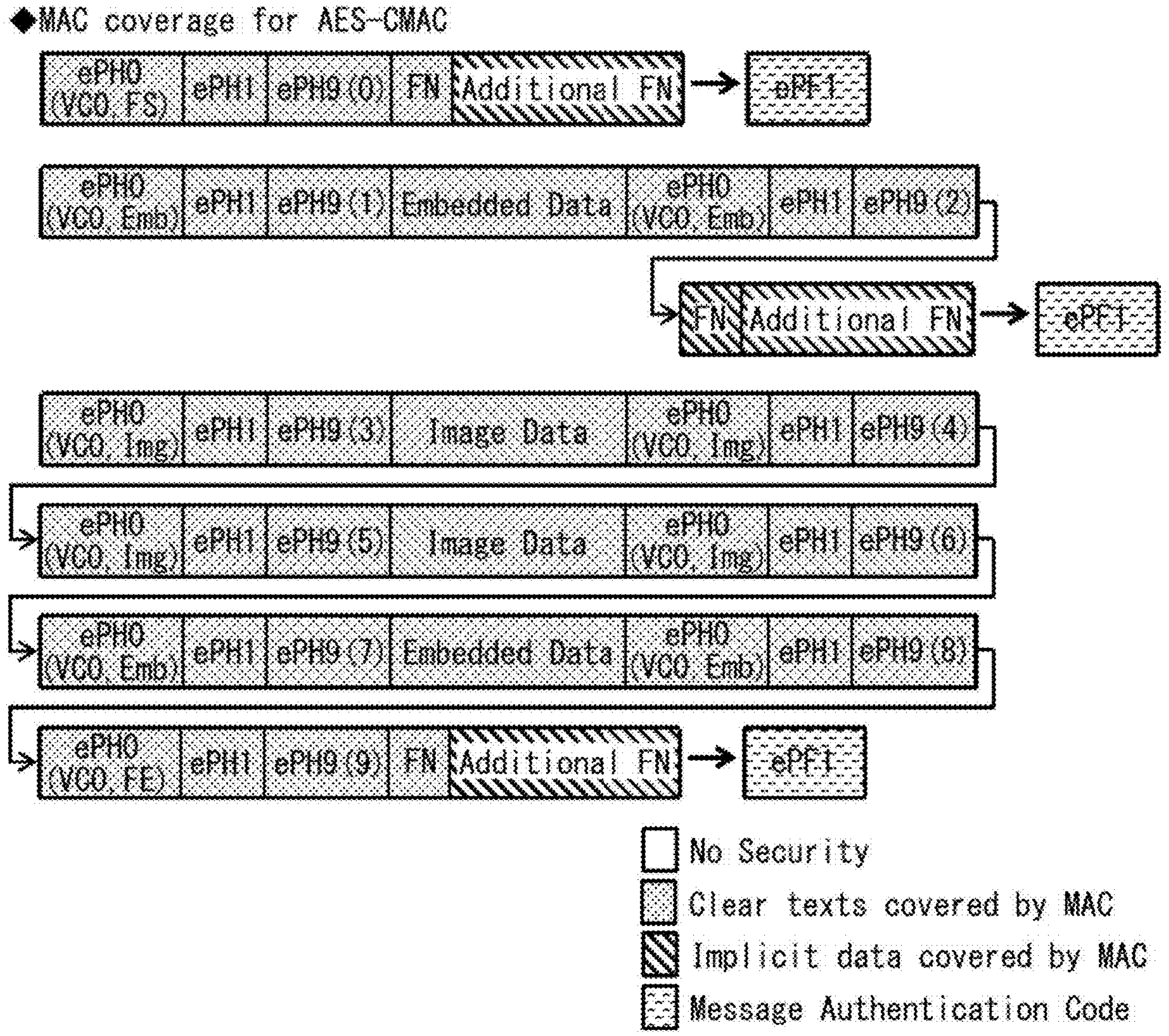

[ FIG. 73 ]
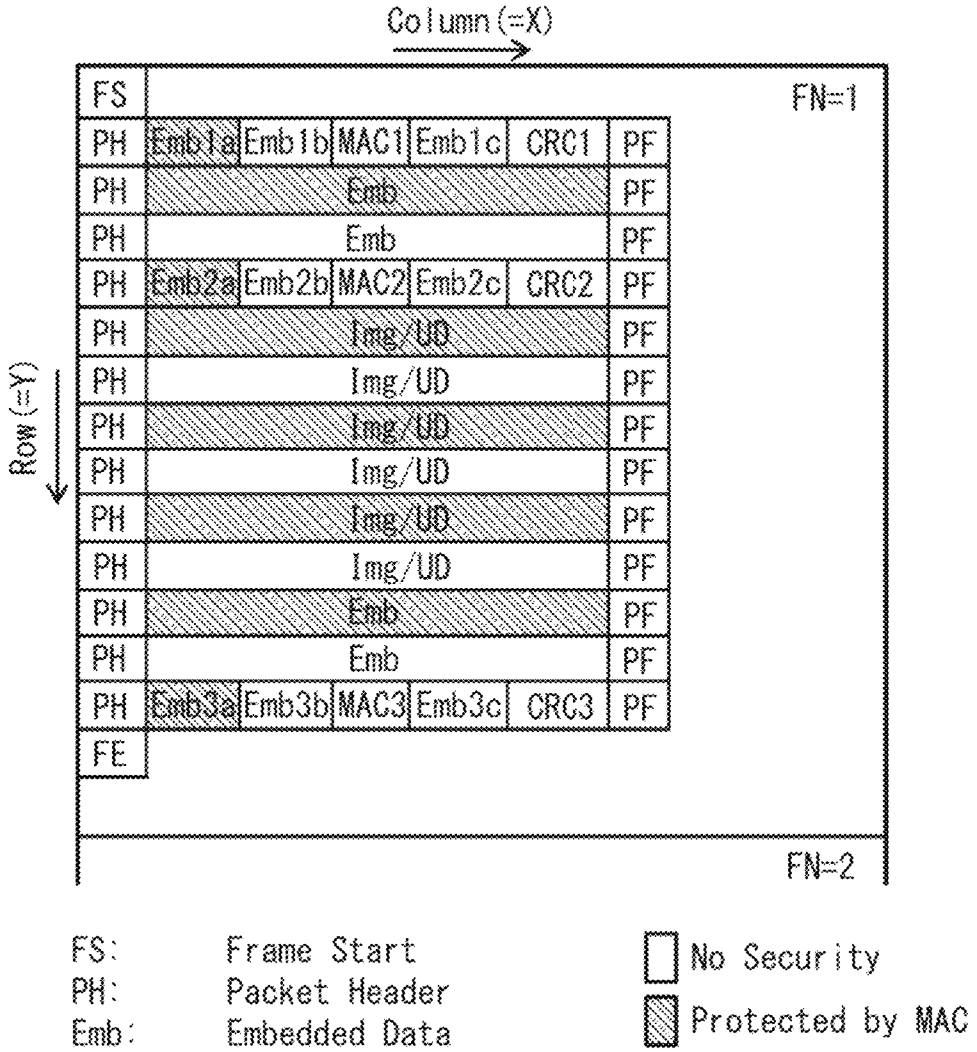
FS: Frame Start
PH: Packet Header
Emb: Embedded Data
Img: Image Data
UD: User Defined Data
MAC(Emb): Massage Authentication Code
CRC(Emb): Cyclic Redundancy Check
PF: Packet Footer
FE: Frame End
FN: Frame Number

FIG. 75A

◆FSED User-defined field in Embedded Data 1/2/3 format (Example)

| Name | Size (bytes) | Description |
|---|---|---|
| Additional Frame Number | 3 | Additional Frame Number (Additional Frame Counter) |
| Frame Number | 2 | Frame Number (Frame Counter) |
| FSED Message Counter | 2 | FSED Security Message Counter for Initialization Vector of AES-CRT Encryption. |
| FSED Security Flags | 1 | Bit[7:3]: Reserved<br>Bit[2:1]=2b' 11: Reserved<br>Bit[2:1]=2b' 10: This Embedded Data includes Emb3MAC.<br>Bit[2:1]=2b' 01: This Embedded Data includes Emb2MAC.<br>Bit[2:1]=2b' 00: This Embedded Data includes Emb1MAC.<br>Bit[0]=1b' 1: Additional Frame Number needs to be reset.<br>Bit[0]=1b' 0: Additional Frame Number doesn' t need to be reset. |

FIG. 75B

◆FSED User-defined field in Embedded Data 1/2/3 format (Example)

| Name | Size (bytes) | Description |
|---|---|---|
| ESS CCI Security Flags | 1 | Bit[7:3]: Reserved<br>Bit[2]=1b' 1: Target detected error(s) on WMAC(s) during previous frame (Negative Acknowledge)<br>Bit[2]=1b' 0: Target didn' t detect any error on WMAC(s) during previous frame (Acknowledge)<br>Bit[1]=1b' 1: Additional Read Security Message Counter needs to be reset.<br>Bit[1]=1b' 0: Additional Read Security Message Counter doesn' t need to be reset.<br>Bit[0]=1b' 1: Additional Write Security Message Counter needs to be reset.<br>Bit[0]=1b' 0: Additional Write Security Message Counter doesn' t need to be reset. |
| FSED FuSaFlags | 1 | Bit[7:1]: Reserved<br>Bit[0]=1b' 1: FSED Functional Safety (FuSa) Message Counter resets to 0 at this Embedded Data.<br>Bit[0]=1b' 0: FSED Functional Safety (FuSa) Message Counter increments at this Embedded Data. |

FIG. 80

◆ESS CCI Security Tag Registers format (Example)

| Register Name | Description | Address Offset | Register Size |
|---|---|---|---|
| WFLAG | Bit[7:1]: Reserved<br>Bit[0]=1b' 1: Sequential Write as Write Tag<br>Bit[0]=1b' 0: Sequential/Single Write as Write Message | 0 (Base address) | 1 (Bytes) |
| WSMC | Write Security Message Counter | 1 | 1 |
| WMAC | Write Message Authentication Code | 2 | Mparm |
| RFLAG | Bit[7:4]: Reserved<br>Bit[3]=1b' 1: Additional Read Security Message Counter needs to be reset.<br>Bit[3]=1b' 0: Additional Read Security Message Counter doesn' t need to be reset.<br>Bit[2]=1b' 1: Additional Write Security Message Counter needs to be reset.<br>Bit[2]=1b' 0: Additional Write Security Message Counter doesn' t need to be reset.<br>Bit[1]=1b' 1: Target didn' t detect an error on the last WMAC (Acknowledge)<br>Bit[1]=1b' 0: Target detected an error on the last WMAC (Negative Acknowledge)<br>Bit[0]=1b' 1: Sequential Read as Read Tag<br>Bit[0]=1b' 0: Sequential/Single Read as Read Message | 4+Mparm | 1 |
| RSMC | Read Security Message Counter | 5+Mparm | 1 |
| RMAC | Read Message Authentication Code | 6+Mparm | Mparm |

FIG. 81

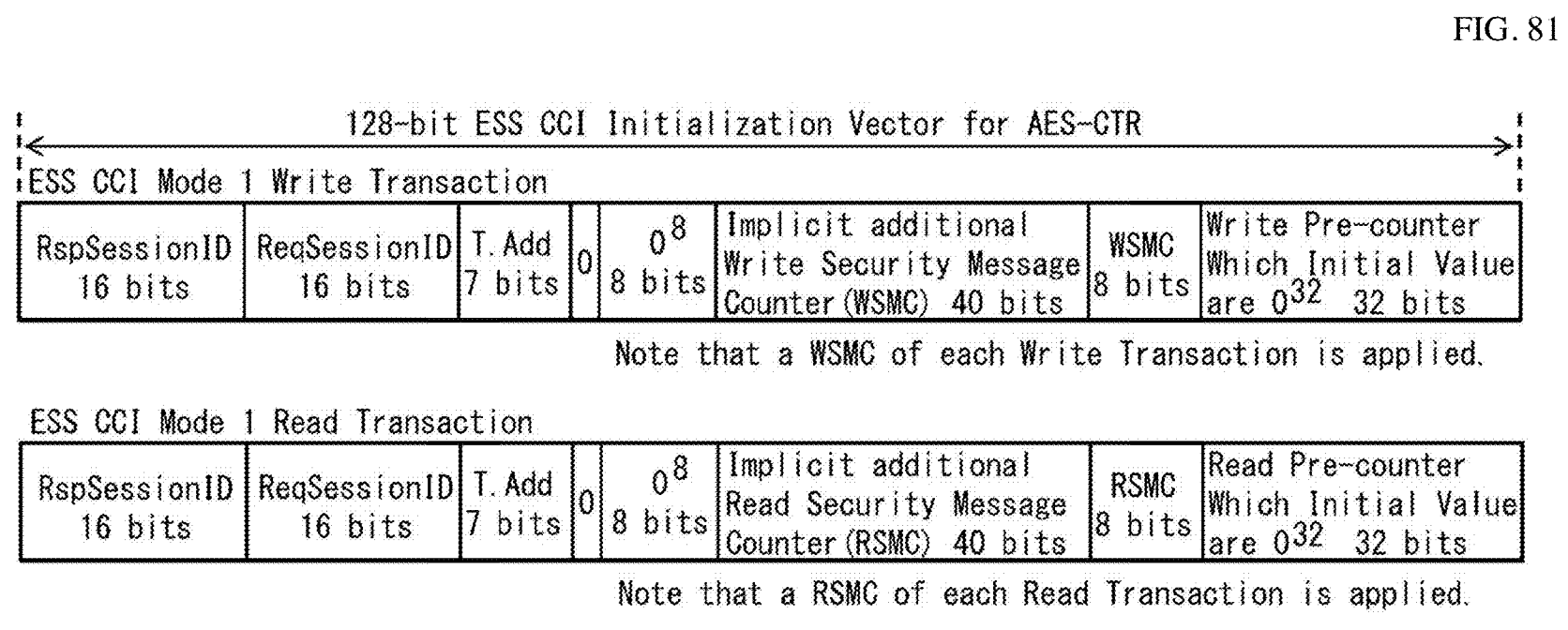

128-bit ESS CCI Initialization Vector for AES-CTR

ESS CCI Mode 1 Write Transaction

| | | | | | | | |
|---|---|---|---|---|---|---|---|
| RspSessionID 16 bits | ReqSessionID 16 bits | T. Add 7 bits | 0 | $0^8$ 8 bits | Implicit additional Write Security Message Counter (WSMC) 40 bits | WSMC 8 bits | Write Pre-counter Which Initial Value are $0^{32}$ 32 bits |

Note that a WSMC of each Write Transaction is applied.

ESS CCI Mode 1 Read Transaction

| | | | | | | | |
|---|---|---|---|---|---|---|---|
| RspSessionID 16 bits | ReqSessionID 16 bits | T. Add 7 bits | 0 | $0^8$ 8 bits | Implicit additional Read Security Message Counter (RSMC) 40 bits | RSMC 8 bits | Read Pre-counter Which Initial Value are $0^{32}$ 32 bits |

Note that a RSMC of each Read Transaction is applied.

[ FIG. 82 ]
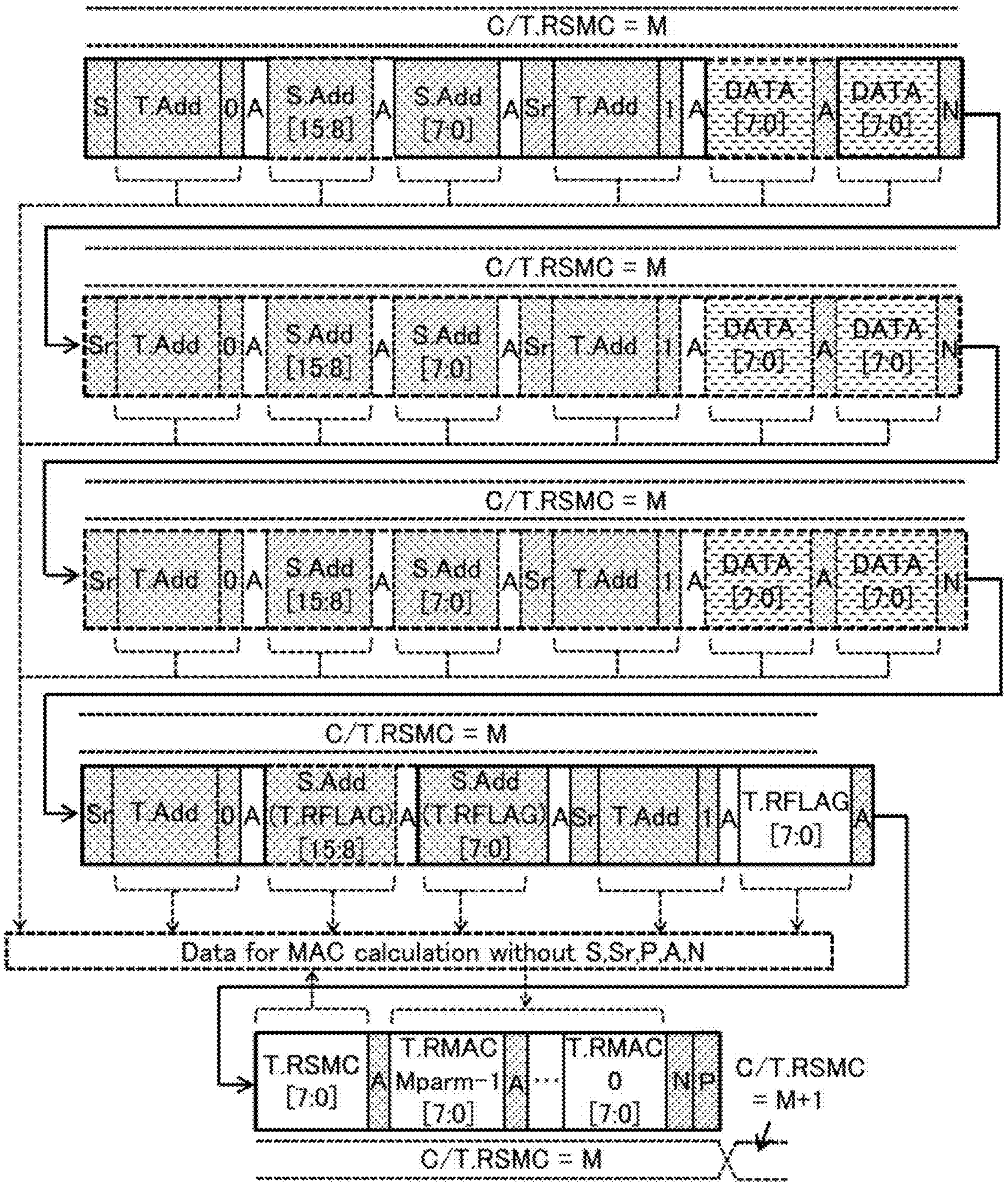
DATA[7:0] : Read Pre-counter in Initialization Vector increments by 1 for every encryption of 1-byte DATA
Clear texts from Controller to Target
Encrypted data from Target to Controller
Clear texts from Target to Controller
Note:The dashed boxes above are opitional.

[ FIG. 83 ]

◆CTRL_CONFIG Registers format (Example)

| Register Name | Description | Address Offset | Register Size (Bytes) |
|---|---|---|---|
| TBD | TBD | 0 (Base address) | TBD |
| TRIGGER | Bit[7:1]: Reserved<br>Bit[0]=1b' 1: Trigger for applying CTRL_CONFIG Registers on this Sensor<br>Bit[0]=1b' 0: No need to apply CTRL_CONFIG Registers on this Sensor | TBD | 1 |

INFORMATION PROCESSOR, MOBILE BODY APPARATUS, AND COMMUNICATION SYSTEM

TECHNICAL FIELD

The present disclosure relates to an information processor, a mobile body apparatus, and a communication system, and, in particularly, to an information processor, a mobile body apparatus, and a communication system that protect communication by a secure boot.

BACKGROUND ART

Currently, MIPI (Mobile Industry Processor Interface) Alliance has developed MIPI Security Framework that utilizes DSP0274 (SPDM: Security Protocol and Data Model) of a DMTF (Distributed Management Task Force) standard. The DMTF standard is disclosed, for example, in the following NPTL.

CITATION LIST

Patent Literature

PTL 1: International Publication No. WO2022/050057
Non-Patent Literature
NPTL 1: https://www.dmtf.org/dsp/DSP0274

SUMMARY OF THE INVENTION

Incidentally, a secure boot enables application of a security function to at least one Data Service Protocol of ESS CCI (Enhanced Safety & Security CCI) that is a control data communication protocol, SEP (Service Extensions Packet) that is an image data communication protocol, or FSED (Frame-Based Service Extensions Data) that is an image data communication protocol.

A countermeasure for failure is essential for this security function. For example, the above-listed PTL discloses an initialization vector including a frame number, an additional frame number, and a message count value. However, counters in which these elements are set may possibly break down; in a case where these counters break down, the security function collapses.

The present disclosure has been made in view of such a circumstance, and makes it possible to solve issues or tasks of an information processor, a mobile body apparatus, and a communication system that protect communication by a secure boot.

An information processor according to an aspect of the present disclosure includes: a protection part that protects at least a portion of first communication in which a frame is transmitted or received cyclically; and a frame counter that increments a frame count value transmitted or received via the first communication for each frame. The frame includes first packet data configured by one piece of packet data, and second packet data configured by a plurality of pieces of packet data. The protection part performs an arithmetic operation of a first MAC using at least the frame count value and a portion or all of the first packet data, and performs an arithmetic operation of a second MAC using at least the frame count value and a portion or all of the second packet data. At least one of the first packet data or the second packet data includes abnormality notification information in a case where there is abnormality in at least one of the frame count value or the frame counter.

A mobile body apparatus according to an aspect of the present disclosure includes: a protection part that protects at least a portion of first communication in which a frame is transmitted or received cyclically; and a frame counter that increments a frame count value transmitted or received via the first communication for each frame. The frame includes first packet data configured by one piece of packet data, and second packet data configured by a plurality of pieces of packet data. The protection part performs an arithmetic operation of a first MAC using at least the frame count value and a portion or all of the first packet data, and performs an arithmetic operation of a second MAC using at least the frame count value and a portion or all of the second packet data. At least one of the first packet data or the second packet data includes abnormality notification information in a case where there is abnormality in at least one of the frame count value or the frame counter.

A communication system according to an aspect of the present disclosure includes: a protection part that protects at least a portion of first communication in which a frame is transmitted or received cyclically; and a frame counter that increments a frame count value transmitted or received via the first communication for each frame. The frame includes first packet data configured by one piece of packet data, and second packet data configured by a plurality of pieces of packet data. The protection part performs an arithmetic operation of a first MAC using at least the frame count value and a portion or all of the first packet data, and performs an arithmetic operation of a second MAC using at least the frame count value and a portion or all of the second packet data. At least one of the first packet data or the second packet data includes abnormality notification information in a case where there is abnormality in at least one of the frame count value or the frame counter.

BRIEF DESCRIPTION OF THE DRAWINGS

FIG. 1 is a diagram illustrating a schematic example of three types of Secure Boot Modes.

FIG. 11 is an explanatory diagram of format examples of SPDM Registers and RSPDM Registers.

FIG. 12 is a diagram illustrating an example of conversion of an SPDM message into ESS CCI data.

FIG. 13 is a diagram illustrating an example of a MAC target region to be protected by an SPDM-finished key.

FIG. 14A is a diagram illustrating a format example of a request message of PSK_EXCHANGE.

FIG. 14B is a diagram illustrating a format example of the request message of the PSK_EXCHANGE.

FIG. 15A is a diagram illustrating a format example of a response message of PSK_EXCHANGE_RSP.

FIG. 15B is a diagram illustrating a format example of the response message of the PSK_EXCHANGE_RSP.

FIG. 15C is a diagram illustrating a format example of the response message of the PSK_EXCHANGE_RSP.

FIG. 16 is a diagram illustrating a format example of a request message of PSK_FINISH.

FIG. 17 is a diagram illustrating a format example of a PSKHint region in the request message of the PSK_EXCHANGE.

FIG. 18 is a diagram illustrating a format example of an OpaqueData region in request messages of KEY_EXCHANGE and PSK_EXCHANGE.

FIG. 19 is a diagram illustrating a format example of an OpaqueData region in response messages of the KEY_EXCHANGE_RSP and the PSK_EXCHANGE_RSP.

FIG. 22 is a diagram illustrating a format example of SPDM Session over ESS CCI Tag Registers.

FIG. 23 is a diagram illustrating a format example of the SPDM Session over ESS CCI Tag Registers.

FIG. 24 is an explanatory flowchart of an example of a flow of selection of Tag Register.

FIG. 25A is a diagram illustrating an example of an initialization vector.

FIG. 25B is a diagram illustrating an example of the initialization vector.

FIG. 28 is a diagram illustrating a format example of a request message of VENDOR_DEFINED_REQUEST.

FIG. 29 is a diagram illustrating a format example of a response message of VENDOR_DEFINED_RESPONSE.

FIG. 30 is a diagram illustrating an example of a packet configuration of write data.

FIG. 31 is a diagram illustrating an example of a packet configuration of read data.

FIG. 32 is a diagram illustrating a packet configuration example of image data communication.

FIG. 33 is a diagram illustrating a frame configuration example of image data.

FIG. 34 is a diagram illustrating a conversion example of a frame configuration of image data.

FIG. 40A is an explanatory diagram of a format example of Secure Boot Capabilities Registers.

FIG. 40B is an explanatory diagram of a format example of the Secure Boot Capabilities Registers.

FIG. 40C is an explanatory diagram of a format example of the Secure Boot Capabilities Registers.

FIG. 41 is a diagram illustrating an example of a packet configuration of write data.

FIG. 42 is a diagram illustrating an example of a packet configuration of read data.

FIG. 43 is a diagram illustrating an example of a MAC target region to be protected by the SPDM-finished key.

FIG. 44 is a diagram illustrating a format example of the OpaqueData region in the request messages of the KEY_EXCHANGE and the PSK_EXCHANGE.

FIG. 45 is an explanatory flowchart of an example of a flow of selection of a key schedule.

FIG. 46A is a diagram illustrating a format example of the OpaqueData region in the response messages of the KEY_EXCHANGE_RSP and the PSK_EXCHANGE_RSP.

FIG. 46B is a diagram illustrating a format example of the OpaqueData region in the response messages of the KEY_EXCHANGE_RSP and the PSK_EXCHANGE_RSP.

FIG. 46C is a diagram illustrating a format example of the OpaqueData region in the response messages of the KEY_EXCHANGE_RSP and the PSK_EXCHANGE_RSP.

FIG. 47 is a diagram illustrating a format example of the PSKHint region in a response message of the PSK_EXCHANGE.

FIG. 50 is a diagram illustrating a format example of the request message of the VENDOR_DEFINED_REQUEST.

FIG. 51 is a diagram illustrating a format example of the response message of the VENDOR_DEFINED_RESPONSE.

FIG. 55 is a diagram illustrating a format example of a Message Protocol region.

FIG. 63 is an explanatory diagram of an example of a countermeasure when there is a failure in an initialization vector.

FIG. 64 is an explanatory diagram of an example of a countermeasure when there is a failure in an initialization vector.

FIG. 65 is an explanatory diagram of an example of a countermeasure when there is a failure in an initialization vector.

FIG. 66 is an explanatory diagram of an example of a countermeasure when there is a failure in an initialization vector.

FIG. 67 is an explanatory diagram of an example of a countermeasure when there is a failure in an initialization vector.

FIG. 68 is an explanatory diagram of an example of a countermeasure when there is a failure in an initialization vector.

FIG. 69 is an explanatory diagram of an example of a countermeasure when there is a failure in an initialization vector.

FIG. 70 illustrates an example of a frame format.

FIG. 71 is a diagram illustrating an example of a MAC target region in AES-GMAC.

FIG. 72 is a diagram illustrating an example of a MAC target region in AES-CMAC.

FIG. 73 is a diagram illustrating an example of a frame format.

FIG. 75A is a diagram illustrating a format example of a user-defined region.

FIG. 75B is a diagram illustrating a format example of the user-defined region.

FIG. 80 is a diagram illustrating a format example of ESS CCI Security Tag Registers for being oriented to at least ESS CCI mode 1.

FIG. 81 is a diagram illustrating a configuration example of an ESS CCI initialization vector used in an AES-CTR encryption mode for being oriented to at least the ESS CCI mode 1.

FIG. 82 is a diagram illustrating an increment method of an initialization vector in CTR mode encryption of the ESS CCL FIG. 83 is a diagram illustrating an example of a format of a CTL_CONFIG register.

MODES FOR CARRYING OUT THE INVENTION

Hereinafter, description is given in detail, with reference to the drawings, of specific embodiments to which the present technology is applied.

<Secure Boot Mode>

FIG. 1 is a diagram illustrating an overview of three types of Secure Boot Modes. Currently, MIPI Alliance has developed MIPI Security Framework utilizing DSP0274 of a DMTF standard. The DSP0274 is compatible with formats or protocols of DSP0277 and DSP0236. Hereinafter, a secure boot using these formats or protocols is referred to as Secure Boot mode 1.

The secure boot enables application of a security function to at least one Data Service Protocol of ESS CCI (Enhanced Safety & Security CCI) mode 1 that is a control data communication protocol, ESS CCI mode 2 that is control data communication protocol, SEP (Service Extensions Packet) that is an image data communication protocol, or FSED (Frame-Based Service Extensions Data) that is an image data communication protocol. The applicable security function is at least one of Integrity (Integrity) by a message authentication code (MAC) and confidentiality (Confidentiality) by encryption (and decryption).

Incidentally, the DSP0277 and the DSP0236, which are portions of Secure Boot Protocols, are protocols that are applicable to at least one physical layer of I2C or I3C, in the same manner as the ESS CCI which is the Data Service Protocol. This results in an increase in the number of formats and protocols required for mounting, in a case where the DSP0277 and the DSP0236 are used.

Therefore, the present inventors have newly defined ESS CCI mode 0 as an SPDM session-oriented ESS CCI mode in order to suppress the number of the formats and the protocols required for mounting. Further, the present inventors have newly defined Secure Boot mode 2 and Secure Boot mode 3 that transmit and/or receive an SPDM message via at least one physical layer of the I2C, the I3C, A-PHY, CPHY or D-PHY and via at least one protocol of the ESS CCI mode 0, ESS CCI mode 1, or the ESS CCI mode 2 (SPDM over ESS CCI over I2C/I3C/A-PHY/C-PHY/D-PHY). Description is given later in detail of the Secure Boot mode 2 and the Secure Boot mode 3.

<Communication System>

Figure 2:
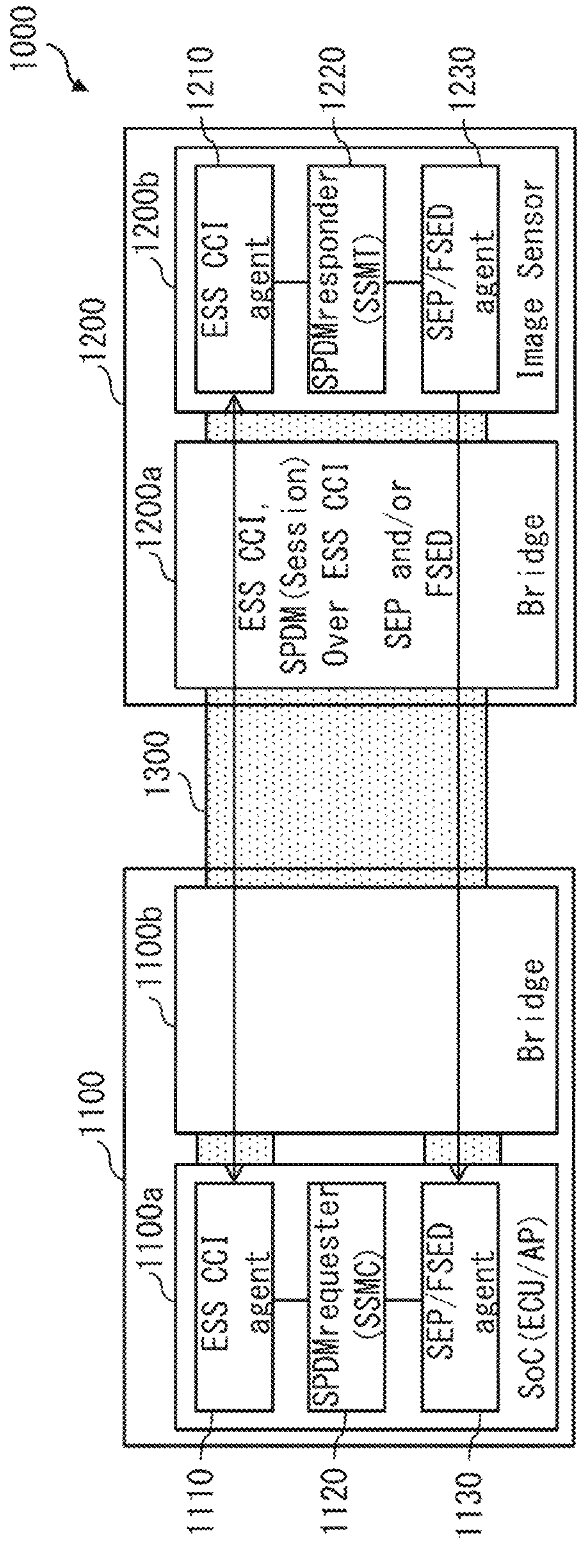
FIG. 2 is a block diagram illustrating a configuration example of an embodiment of a communication system to which the present technology is applied.

FIG. 2 is a block diagram illustrating a configuration example of an embodiment of a communication system to which the present technology is applied. A communication system 1000 illustrated in FIG. 2 includes an application processor 1100 and an image sensor 1200. The application processor 1100 and the image sensor 1200 are coupled to each other by one communication path 1300, for example. The communication path 1300 is a control communication path as well as an image communication path (e.g., the A-PHY, USL-compliant D-PHY or CPHY, etc.). It is to be noted that the application processor 1100 and the image sensor 1200 may be coupled to each other by a plurality of communication paths 1300. In addition, the application processor 1100 and the image sensor 1200 may be coupled to each other by a plurality of communication paths in which the control communication path and the image communication path are separately configured.

The application processor 1100 includes a communication control unit **1100*a* and a bridge (Bridge) one end 1100*b*. The communication control unit 1100*a* includes SSMC (Secure Session Manager Controller) or an application processor (also referred to as SoC or System on Chip). The communication control unit 1100*a* includes, for example, an ESS CCI agent 1110, an SPDM requester 1120 (e.g., CCI master), and an SEP/FSED agent 1130** (image data reception section).

The image sensor 1200 includes a sensor unit **1200*b* having a communication control function, and a bridge another end 1200*a*. The sensor unit 1200*b* includes SSMT (System Security Management Target). The sensor unit 1200*b* includes, for example, an imaging section, an ESS CCI agent 1210, an SPDM responder 1220 (e.g., CCI slave), and an SEP/FSED agent 1230 (image data transmission section). At least one of the bridge one end 1100*b* or the bridge another end 1200*a* may be omitted. The bridge one end 1100*b* may be configured on an outer side, instead of an inner side, of the application processor 1100. The bridge another end 1200*a* may be configured on an outer side, instead of an inner side, of the image sensor 1200. The communication control unit 1100*a* may be referred to as an application processor. The sensor unit 1200***b* may be referred to as an image sensor.

For example, in the communication path 1300, an SPDM session is established between the SPDM requester 1120 and the SPDM responder 1220 via the ESS CCI agents 1110 and 1210. In addition, for example, in the communication path 1300, a Data Plane session is established between the SEP/FSED agent 1130 and the SEP/FSED agent 1230.

Between the SPDM requester 1120 and the SPDM responder 1220, a request message that complies with SPDM is transmitted from the SPDM requester 1120 to the SPDM responder 1220 via the ESS CCI agents 1110 and 1210. In addition, between the SPDM requester 1120 and the SPDM responder 1220, a response message that complies with the SPDM is transmitted from the SPDM responder 1220 to the SPDM requester 1120 via the ESS CCI agents 1110 and 1210.

Between the ESS CCI agent 1110 and the ESS CCI agent 1210, Write Command (e.g., ESS CCI Write) or Read Command (e.g., ESS CCI Read) protected by an SPDM session key is transmitted from the ESS CCI agent 1110 to the ESS CCI agent 1210. In addition, between the ESS CCI agent 1110 and the ESS CCI agent 1210, Read Response (e.g., ESS CCI Read return value) protected by the SPDM session key is transmitted from the ESS CCI agent 1210 to the ESS CCI agent 1110.

Between the SEP/FSED agent 1130 and the SEP/FSED agent 1230, at least one of frame start, embedded data, image data, user-defined data, or frame end protected by Data Plane session key is transmitted from the SEP/FSED agent 1230 to the SEP/FSED agent 1130.

Performing such data transmission and reception makes it possible to perform data transmission and reception with higher safety between the application processor 1100 and the image sensor 1200. It is to be noted that a display may be provided instead of the image sensor 1200, and a display panel may be provided instead of the sensor unit 1200*b*. In this case, between the SEP/FSED agent 1130 and the SEP/FSED agent 1230, at least one of the frame start, the embedded data, the image data, the user-defined data, or the frame end protected by the Data Plane session key is transmitted from the SEP/FSED agent 1130 to the SEP/FSED agent 1230. In addition, Control plane may be referred to as an expression including a portion or all of the ESS CCI (Enhanced Safety and Security Camera Control Interface) or an expression including a portion or all of ACMP (A-PHY Control & Management Protocol). In addition, Data plane may be referred to as an expression including a portion or all of the SEP (Service Extension Packet). The Control plane or the Data plane may be applied not only to image-related applications, but also to non-image-related applications such as Power Management, IoT (Internet of Things), GNSS (Global Navigation Satellite System), or GPS (Global Positioning System or Global Positioning Satellite).

In addition, the communication system 1000 may include a control device (SoC), at least one of an imaging device (image sensor) or an unillustrated display apparatus (display), and optionally a relay device (Serializer and Deserializer bridge chip/device). The imaging device may be replaced by a display apparatus, or the image sensor may be replaced by a display; in that case, a communication direction of image data communication in the drawing may be an opposite direction. For example, in the image data communication, image-system data (at least one of image data or user-defined data) may be transmitted or received, while being stored in packet data (payload) of at least one of an SEP protocol extended packet or an FSED protocol packet (at least one of a basic packet or an extended packet), via at least one physical layer of the A-PHY, the CPHY and the D-PHY as a communication path and via at least one Low Level Protocol of CSI-2 (Camera Serial Interface) or DSI-2 (Display Serial Interface). In the control data communication, a write command (Write Command) and write data (Write Data) may be transmitted or received, a read command (Read Command) may be transmitted or received, or read data corresponding to a read command (Read Data; a read response; Read Response) may be transmitted or received, via at least one physical layer of the I2C, the I3C, the A-PHY, the CPHY, or the D-PHY as a communication path and via at least one of a CCI protocol or an ESS CCI protocol.

Some or all of the communication paths may be split (separated) into a communication path of the image data communication and a communication path of the control data communication. In addition, the communication path of the image data communication and the communication path of the control data communication may be integrated (combined). In addition, at least one communication path of the image data communication or the control data communication may be split (separated) into two or more communication paths. In addition, at least one communication path of the image data communication or the control data communication may be integrated (combined) into one communication path. In addition, in the communication system 1000, at least one topology of Unicast, multicast, multi-sensor, multi-SoC, aggregation, or disaggregation may be applied. In addition, in the communication system 1000, at least one of SPI (Serial Peripheral Interface) or Ethernet may be applied instead of the I2C.

Figure 3:
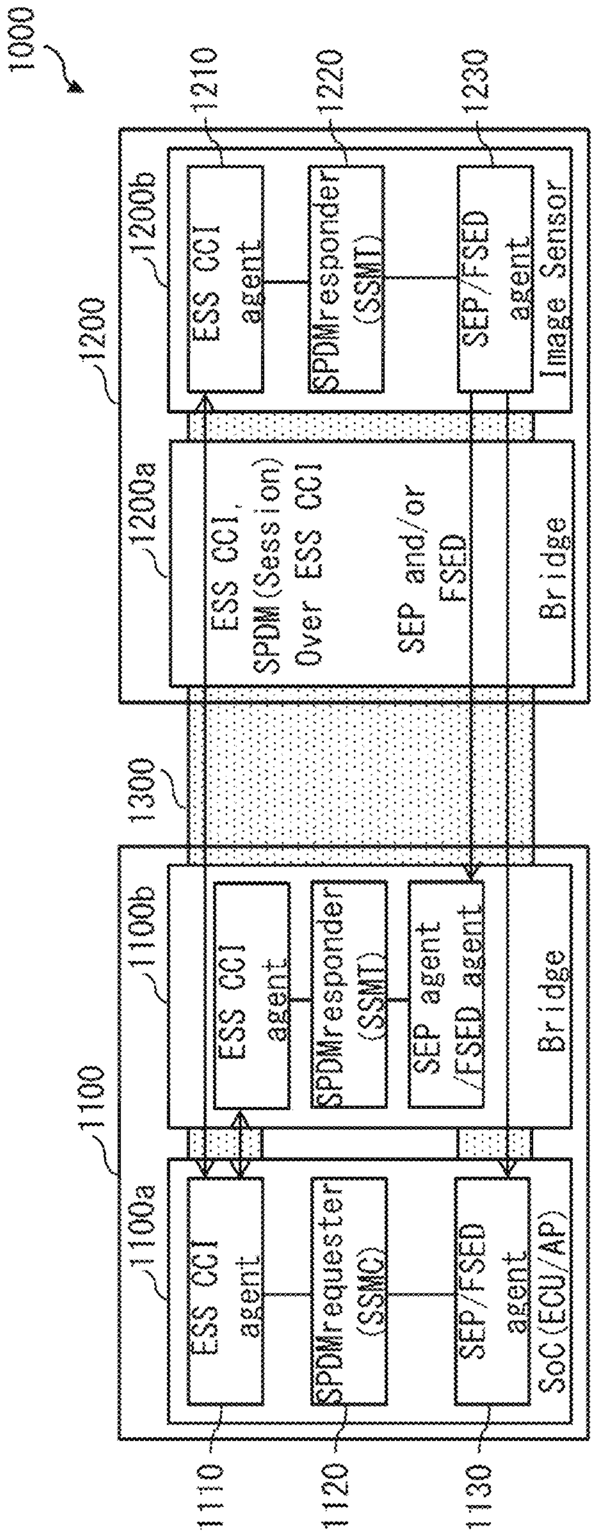
FIG. 3 is a block diagram illustrating a modification example of configurations of an image sensor and a processor.

It is to be noted that the bridge one end 1100*b* may include, for example, an ESS CCI agent, an SPDM responder, and an SEP/FSED agent, as illustrated in FIG. 3.

At this time, for example, in the communication path 1300, an SPDM session is established between the SPDM requester 1120 and the SPDM responder of the bridge one end 1100*b*. In addition, for example, in the communication path 1300, an SPDM session is established between the SPDM requester 1120 and the SPDM responder 1220 of the sensor unit 1200*b*. In addition, for example, in the communication path 1300, a Data Plane session is established between the SEP/FSED agent of the bridge one end 1100*b* and the SEP/FSED agent 1230 of the sensor unit 1200*b*.

Between the SPDM requester 1120 and the SPDM responder of the bridge one end 1100*b*, a request message that complies with the SPDM is transmitted from the SPDM requester 1120 to the SPDM responder of the bridge one end 1100*b* via the ESS CCI agent 1110 and the ESS CCI agent of the bridge one end 1100*b*.

Between the ESS CCI agent 1110 and the ESS CCI agent of the bridge one end 1100*b*, Write Command (e.g., the ESS CCI Write) or Read Command (e.g., the ESS CCI Read) protected by the SPDM session key is transmitted from the ESS CCI agent 1110 to the ESS CCI agent of the bridge one end 1100*b*.

Between the SEP/FSED agent of the bridge one end 1100*b* and the SEP/FSED agent 1230 of the sensor unit 1200*b*, at least one of the frame start, the embedded data, the image data, the user-defined data, or the frame end protected by the Data Plane session key is transmitted from the SEP/FSED agent 1230 of the sensor unit 1200*b* to the SEP/FSED agent of the bridge one end 1100*b*.

Performing such data transmission and reception makes it possible to perform data transmission and reception with higher safety between the application processor 1100 and the image sensor 1200.

Figure 4:
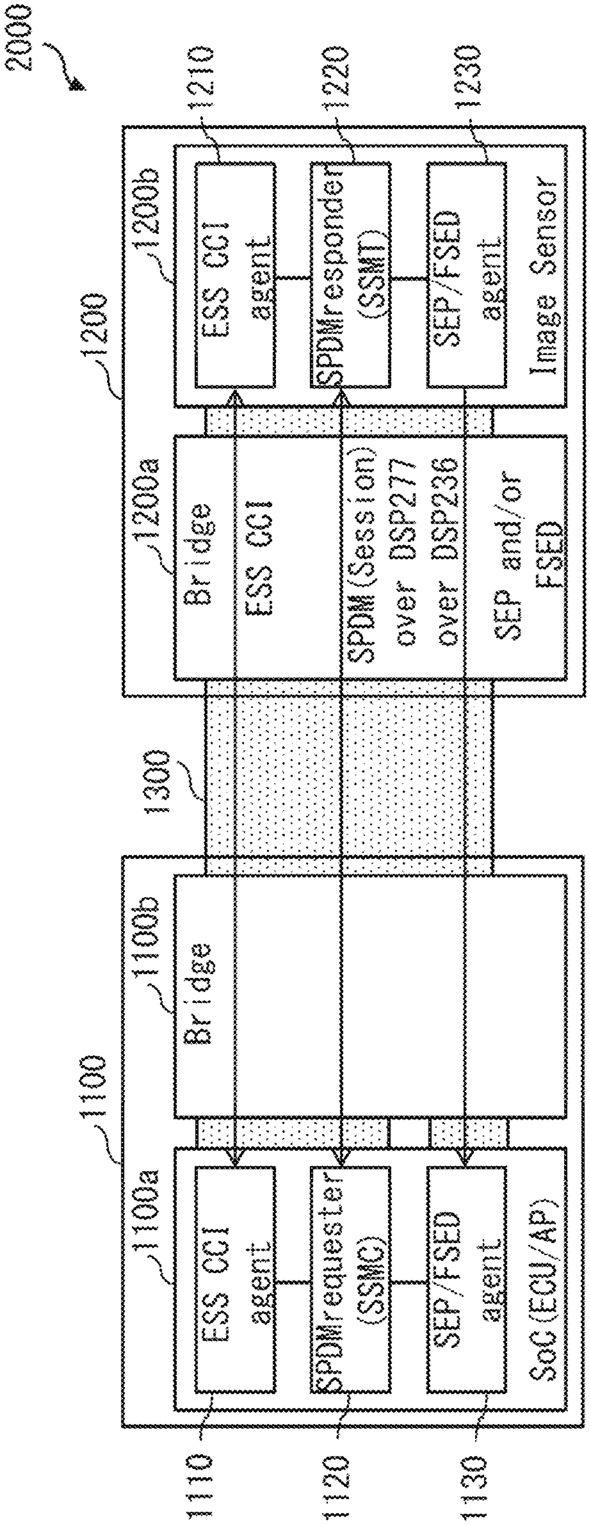
FIG. 4 is a block diagram illustrating a configuration example of a communication system according to a comparative example.

FIG. 4 is a block diagram illustrating a configuration example of a communication system 2000 according to a comparative example. In the communication system 2000, an SPDM session is established directly between the SPDM requester 1120 and the SPDM responder 1220 not via the ESS CCI agents 1110 and 1210, in the communication path 1300. This results in an increase in the number of formats and protocols required for mounting, in a case where the DSP0277 and the DSP0236 are utilized as the Secure Boot Protocols, in the communication system 2000.

Meanwhile, in the present embodiment, an SPDM session is established between the SPDM requester 1120 and the SPDM responder 1220 via the ESS CCI agents 1110 and 1210, in the communication path 1300. This makes it possible to use ESS CII as the Secure Boot Protocols, thus making it unnecessary to use the DSP0277 and the DSP0236. Here, the ESS CII is used as one of the Data Service Protocols, as illustrated in FIG. 1. Therefore, even in a case where the ESS CCI is used as the Secure Boot Protocols, the number of formats and protocols required for mounting is not increased.

Figure 5:
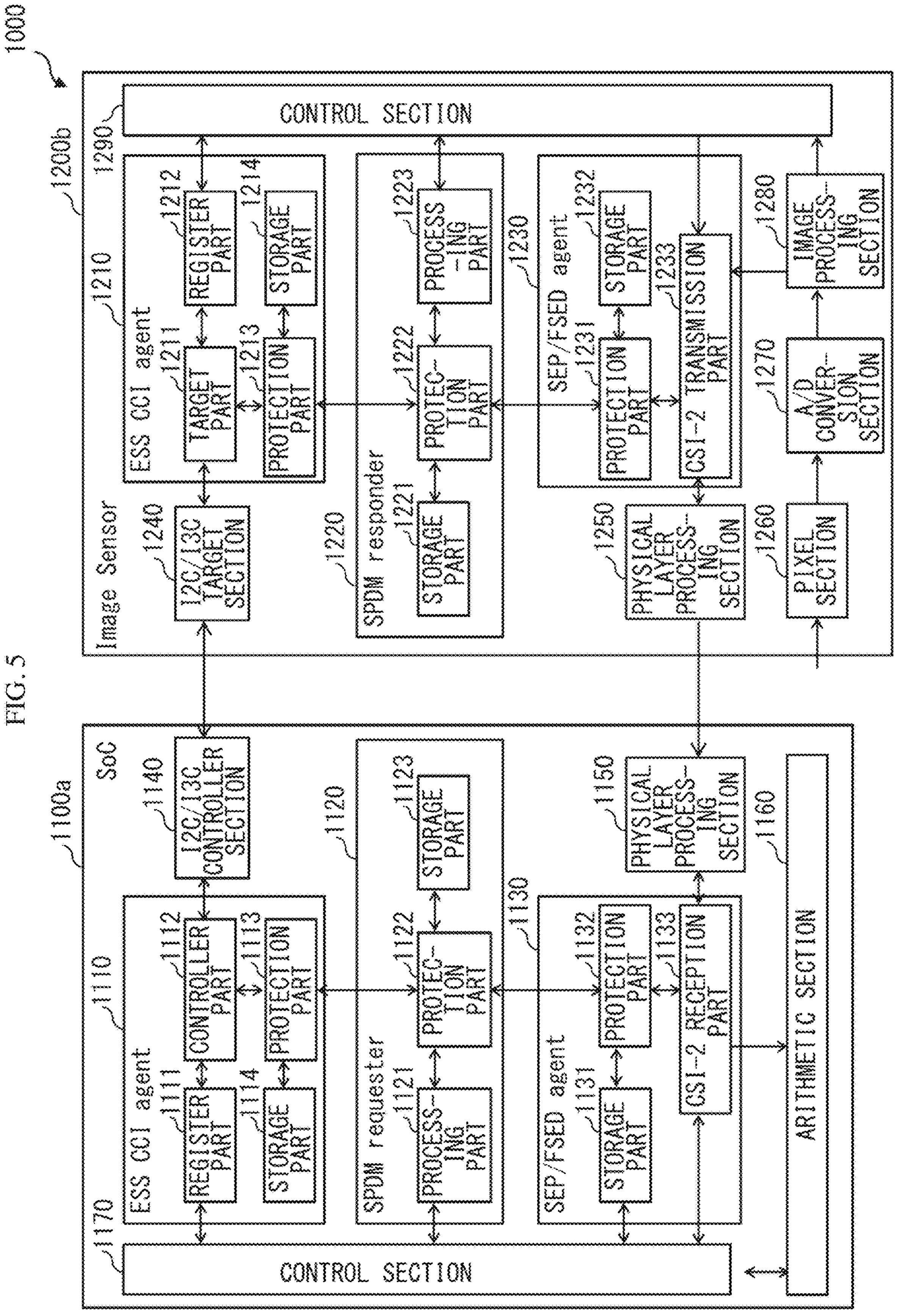
FIG. 5 is a block diagram illustrating a specific example of the configuration of the communication system of FIG. 2.

FIG. 5 is a block diagram illustrating a specific example of a configuration of the communication system 1000 according to the present embodiment.

The communication control unit 1100*a* includes, for example, the ESS CCI agent 1110, the SPDM requester 1120, the SEP/FSED agent 1130, an I2C/I3C controller section 1140, a physical layer processing section 1150, an arithmetic section 1160, and a control section 1170.

The ESS CCI agent 1110 includes, for example, a register part 1111, a controller part 1112, a protection part 1113, and a storage part 1114. The SPDM requester 1120 includes, for example, a processing part 1121, a protection part 1122, and a storage part 1123. The SEP/FSED agent 1130 includes, for example, a storage part 1131, a protection part 1132, and a CSI-2 reception part 1133.

The sensor unit 1200*b* includes, for example, the ESS CCI agent 1210, the SPDM responder 1220, the SEP/FSED agent 1230, an I2C/I3C target section 1240, a physical layer processing section 1250, a pixel section 1260, an A/D conversion section 1270, an image processing section 1280, and a control section 1290.

The ESS CCI agent 1210 includes, for example, a target part 1211, a register part 1212, a protection part 1213, and a storage part 1214. The SPDM responder 1220 includes, for example, a storage part 1221, a protection part 1222, and a processing part 1223. The SEP/FSED agent 1230 includes, for example, a protection part 1231, a storage part 1232, and a CSI-2 transmission part 1233.

At least one of the protection part 1113, 1122, 1132, 1213, 1222, or 1231 (hereinafter, referred to as "one or a plurality of protection parts PRT") executes an arithmetic operation that protects at least one of integrity or confidentiality of at least a portion of communication data. The one or the plurality of protection parts PRT protects data communication between the application processor 1100 and the image sensor 1200. The one or the plurality of protection parts PRT protects image data communication (first communication) and control data communication (second communication) using a portion or all of a register group. The one or the plurality of protection parts PRT may execute at least one of unidirectional authentication or bidirectional authentication (mutual authentication). The one or the plurality of protection parts PRT may be separated (split) or combined (integrated).

The one or the plurality of protection parts PRT may execute the following (1) to (3).

(1) Derive a write SPDM session key and a read SPDM session key from a key schedule by utilizing the control data communication (second communication).

(2) Generate a write SPDM message authentication code by using at least a portion or all of the write SPDM session key, a portion or all of a write SPDM message, and a write SPDM message counter.

(3) Generate a read SPDM message authentication code by using at least a portion or all of the read SPDM session key, a portion or all of a read SPDM message, and a read SPDM message counter.

Causing the one or the plurality of protection parts PRT to execute the above-described (1) to (3) makes it possible to protect a portion or all of the write SPDM message and the write SPDM message counter by the write SPDM message authentication code. Further, it becomes possible to protect a portion or all of the read SPDM message and the read SPDM message counter by the read SPDM message authentication code.

The control data communication (second communication) includes extra-SPDM session communication and intra-SPDM session communication. The write SPDM session key includes a write SPDM encryption key and a write SPDM message authentication code key. The read SPDM session key includes a read SPDM encryption key and a read SPDM message authentication code key.

The one or the plurality of protection parts PRT may further execute the following (4) to (7).

(4) Derive an SPDM-finished key from the key schedule by utilizing the control data communication (second communication).

(5) Perform an arithmetic operation of a message authentication code by using at least a portion or all of the write SPDM message, a portion of the read SPDM message, and the SPDM-finished key, in the extra-SPDM session communication, and store the message authentication code in a portion or all of the remainder of the read SPDM message.

(6) Turn a portion or all of the write SPDM message in the intra-SPDM session communication into a ciphertext (encrypted state) by using the write SPDM encryption key, and then generate the write SPDM message authentication code.

(7) Turn a portion or all of the read SPDM message in the intra-SPDM session communication into a ciphertext (encrypted state) by using the read SPDM encryption key, and then generate the read SPDM message authentication code.

Causing the one or the plurality of protection parts PRT to execute the above-described (4) to (7) makes it possible to protect a portion or all of the write SPDM message and a portion of the read SPDM message, in the extra-SPDM session communication, by the message authentication code obtained by the arithmetic operation using the SPDM-finished key. Further, it becomes possible, using the write SPDM message authentication code, to protect the write SPDM message in the intra-SPDM session communication in a state of being encrypted by the write SPDM encryption key. Further, it becomes possible, using the read SPDM message authentication code, to protect the read SPDM message in the intra-SPDM session communication in a state of being encrypted by the read SPDM encryption key.

The one or the plurality of protection parts PRT may further execute the following (8) and (9).

(8) Generate write CRC that protects at least a portion or all of the write SPDM message and the write SPDM message counter.

(9) Generate read CRC that protects at least a portion or all of the read SPDM message and the read SPDM message counter.

Causing the one or the plurality of protection parts PRT to execute the above-described (8) and (9) makes it possible to protect a portion or all of the write SPDM message and the write SPDM message counter by the write CRC. Further, it becomes possible to protect a portion or all of the read SPDM message and the read SPDM message counter by the read CRC.

The one or the plurality of protection parts PRT may further execute the following (10) and (11). Causing the one or the plurality of protection parts PRT to execute the following (10) and (11) allows a write SPDM initialization vector to be protected by the write SPDM message authentication code and a read SPDM initialization vector to be protected by the read SPDM message authentication code.

(10) Encrypt or decrypt a portion or all of the write SPDM message by using at least the write SPDM initialization vector and a portion or all of the write SPDM session key.

(11) Encrypt or decrypt a portion or all of the read SPDM message by using at least the read SPDM initialization vector and a portion or all of the read SPDM session key.

Causing the one or the plurality of protection parts PRT to execute the above-described (10) and (11) makes it possible to protect the write SPDM initialization vector by the write SPDM message authentication code. Further, it becomes possible to protect the read SPDM initialization vector by the read SPDM message authentication code.

A write initialization vector may include information indicating a write transaction and a value of the write SPDM message counter. The read initialization vector may include information indicating a read transaction and a value of the read SPDM message counter. At these times, the write initialization vector and the read initialization vector may include information indicating one of an SPDM session handshake stage or an SPDM application stage.

The one or the plurality of protection parts PRT may further execute the following (12).

(12) Protect, using the write SPDM message authentication code, a portion of the write SPDM message and a session key (Data Plane session key) of the image data communication (first communication) as a portion or all of the remainder of the write SPDM message in a state of being encrypted using a portion or all of the write SPDM session key for transmission or reception by the control data communication (second communication).

A portion or all of the write SPDM message may include a PSK_EXCHANGE request message including a PSKHint region in which hint information on a pre-shared key is stored. At this time, the PSKHint region may include a standard-defined region and a vendor-defined region.

A portion or all of the write SPDM message may include the PSK_EXCHANGE request message including the PSKHint region in which the hint information on the pre-shared key is stored. At this time, the PSKHint region may include information by which the type of the hint information is specified.

A portion or all of at least one of the write SPDM message or the read SPDM message may include at least one of the PSK_EXCHANGE request message, a KEY_EXCHANGE request message, a PSK_EXCHANGE_RSP response message, or a KEY_EXCHANGE_RSP response message including an OpaqueData region. At this time, the OpaqueData region may include the standard-defined region and the vendor-defined region.

A portion or all of the write SPDM message may include at least one of the PSK_EXCHANGE request message or the KEY_EXCHANGE request message including the OpaqueData region. At this time, the OpaqueData region may include at least one of information by which the type of an algorithm to protect the control data communication (second communication) is specified or information by which the type of a key schedule algorithm is specified.

A portion or all of the read SPDM message may include at least one of the PSK_EXCHANGE_RSP response message or the KEY_EXCHANGE_RSP response message including the OpaqueData region. At this time, the OpaqueData region may include at least one of information on non-SPDM communication in the control data communication (second communication) or information on the image data communication (first communication) in which a frame including a plurality of lines of packet data is transmitted or received.

The register parts 1111 and 1212 include the above-described register group. The above-described register group may include, for example, a first register of the write SPDM message, a second register of the read SPDM message, a third register of the write SPDM message counter, a fourth register of the read SPDM message counter, a fifth register of the write SPDM message authentication code, and a sixth register of the read SPDM message authentication code. The above-described register group may further include, for example, a register of the write SPDM initialization vector and a register of the read SPDM initialization vector. The above-described register group may further include, for example, a register of the write CRC and a register of the read CRC. The above-described register group may further include, for example, a register of the session key of the image data communication (first communication).

The first register and the second register may each be a register dedicated to the SPDM message. The first register and the second register may each be a register that is sharable among a plurality of protocols (e.g., a first protocol and a second protocol). At this time, the write SPDM message and the read SPDM message may include protocol ID information by which the first protocol and the second protocol are distinguished from each other. The one or the plurality of protection parts PRT may transmit or receive the above-described protocol ID information as encrypted data. The one or the plurality of protection parts PRT may transmit or receive the above-described protocol ID information as non-encrypted data.

Incidentally, the control data communication (second communication) may include the extra-SPDM session communication and the intra-SPDM session communication. At this time, the above-described register group may include a seventh register of a write message counter and an eighth register of a read message counter. The one or the plurality of protection parts PRT may execute the following (13) to (15). The one or the plurality of protection parts PRT may execute the following (16).

(13) Use the first register and the second register for the extra-SPDM session communication and the intra-SPDM session communication.

(14) Use the third register, the fourth register, the fifth register, and the sixth register for the intra-SPDM session communication.

(15) Use the seventh register and the eighth register for the extra-SPDM session communication.

(16) Use the first register, the second register, the third register, the fourth register, the fifth register, and the sixth register for the extra-SPDM session communication and the intra-SPDM session communication.

The control data communication (second communication) may include, for example, communication described in the following (17) to (19).

(17) SPDM communication not protected by at least one of the write SPDM message authentication code or the read SPDM message authentication code

(18) SPDM session communication protected by at least one of the write SPDM message authentication code or the read SPDM message authentication code

(19) Non-SPDM communication protected by a message authentication code that differs from the write SPDM message authentication code and the read SPDM message authentication code The one or the plurality of protection parts PRT may execute the following (20) and (21).

(20) Transmit or receive, by utilizing the control data communication (second communication), a start command of the image data communication (first communication) in which a frame including a plurality of lines of packet data is transmitted or received, while protecting (i.e., in a protected state) by at least one of the write SPDM message authentication code or another write message authentication code.

(21) In response to the start command, start protecting the image data communication (first communication) (i.e., start an arithmetic operation in which the image data communication (first communication) is protected), and start transmitting the image data communication (first communication).

At least one of the storage part 1114, 1123, 1131, 1214, 1221, or 1232 (hereinafter, referred to as "one or a plurality of storage parts MEM") may be configured by at least one of a memory or a register. In addition, at least some of the storage parts 1114, 1123, 1131, 1214, 1221, and 1232 may be omitted. The one or the plurality of storage parts MEM may be separated (split) or combined (integrated).

The one or the plurality of storage parts MEM may be protected from at least one of leakage or falsification of information in the storage part. The one or the plurality of storage parts MEM may store at least one of the following pieces of information on at least one of the ESS CCI, the SEP, or the FSED. In a case where encrypted data is written into an ESS CCI register for the one or the plurality of storage parts MEM, data after being decrypted by the one or the plurality of protection parts PRT may be stored in the one or the plurality of storage parts MEM that is inaccessible from the outside of the apparatus. In a case where data encrypted and stored in the ESS CCI register is read, data before the encryption may be stored in the one or the plurality of storage parts MEM that is inaccessible from the outside of the apparatus.

- Key information (e.g., the pre-shared key, a private key, a public key, a permanent key, or a session key)
- Certificate (e.g., a root certificate, an intermediate certificate, or a leaf certificate)
- Encryption algorithm information
- Functional information (e.g., Security Capabilities, Functional Safety Capabilities)
- Information on configuration of Security Service Association
- Information on configuration of Functional Safety Service Association
- Information on configuration of Security Control
- Information on configuration of Functional Safety Control
- Device information (e.g., source ID, destination ID, final destination ID)
- Firmware information
- Session information (e.g., session ID)
- Arithmetic values of the one or the plurality of protection parts PRT (e.g., an initial value, an intermediate value, a final value)
- Data during MAC verification
- Data before encryption
- Data after decryption
- Initialization vector
- Nonce (Number Used Once) value
- Message count value (message counter value)
- Frame count value (frame counter value)
- Frame number
- Additional frame number The control section 1170 may control at least one of the ESS CCI agent 1110, the SPDM requester 1120, the SEP/FSED agent 1130, the I2C/I3C controller section 1140, the physical layer processing section 1150, or the arithmetic section 1160. In addition, the control section 1290 may control at least one of the ESS CCI agent 1210, the SPDM responder 1220, the SEP/FSED agent 1230, the I2C/I3C target section 1240, the physical layer processing section 1250, the pixel section 1260, the A/D conversion section 1270, or the image processing section 1280.

The SPDM requester 1120 and the SPDM responder 1220 may execute at least one of processing or generation related to the SPDM message and the SPDM session on the basis of the SPDM (DSP0274) standard of the DMTF.

The ESS CCI may be CCI. The I2C/I3C controller section 1140 may perform communication at the initiative of the controller part 1112 on the basis of I2C or I3C standard. The I2C/I3C controller section 1140 may perform communication at the initiative of the controller part 1112 on the basis of at least one of a CSI-2 standard or a CSI-2 extension standard. The I2C/I3C target section 1240 may perform communication at the initiative of at least one of the controller part 1112 or the target part 1211 on the basis of the I2C or I3C standard. The I2C/I3C target section 1240 may perform communication at the initiative of at least one of the controller part 1112 or the target part 1211 on the basis of at least one of the CSI-2 standard or the CSI-2 extension standard.

In the register part 1111 in the ESS CCI agent 1110, various settings transmitted from at least one of the control section 1170 or the sensor unit 1200*b* may be written via at least one of the controller part 1112 or the I2C/I3C controller section 1140. In the register part 1212 in the ESS CCI agent 1210, various settings transmitted from at least one of the control section 1290 or the application processor 1100 may be written via at least one of the I2C/I3C target section 1240 or the target part 1211.

The settings written into the register parts 1111 and 1212 may be, for example, at least one of a communication setting that complies with the CSI-2 standard, an extension mode setting indicating presence or absence of the use of an extension mode, or a fixed communication setting required for communication in the extension mode. In the register part 1111, at least one of functional information or setting information may be read via at least one of the controller part 1112 or the I2C/I3C controller section 1140. In the register part 1212, at least one of the functional information or the setting information may be read via at least one of the I2C/I3C target section 1240 or the target part 1211.

The pixel section 1260 may output an analog pixel signal corresponding to a light amount of received light. The A/D conversion section (ADC: Analog-to-Digital Converter) 1270 may digitally convert a pixel signal outputted from the pixel section 1260 to supply the converted pixel signal to the image processing section 1280. The image processing section 1280 (ISP: Image Signal Processor) may supply image-system data obtained by performing various types of image processing on an image based on the pixel signal to the control section 1290 and the CSI-2 transmission part 1233 (corresponding to at least one of the SEP or the FSED).

The CSI-2 transmission part 1233 may generate at least one of a basic packet that complies with the CSI-2 standard or an extended packet that complies with the CSI-2 extension standard to provide it to the physical layer processing section 1250. The physical layer processing section 1250 may execute physical-layer processing of at least one of the A-PHY, the CPHY, and the D-PHY. The CSI-2 transmission part 1233 (corresponding to at least one of the SEP or the FSED) may acquire at least one of image-system data or a verification result (e.g., a message counter verification result, a frame counter verification result, a CRC verification result, or a MAC verification result) from at least one of the basic packet that complies with the CSI-2 standard or the extended packet that complies with the CSI-2 extension standard, and may supply it to another arithmetic section. The other arithmetic section may transmit at least one of the image-system data or the verification result to the outside of the image sensor 1200.

The image sensor 1200 may include at least one of the I2C/I3C controller or the ESS CCI controller. The sensor unit 1200*b* may include at least one of an I2C/I3C target or an ESS CCI target. The sensor unit 1200*b* may include a CSI-2 transmission circuit. A unidirectional arrow illustrated in FIG. 5 may be replaced by a bidirectional arrow. A bidirectional arrow illustrated in FIG. 5 may be replaced by a unidirectional arrow. Some of the components illustrated in FIG. 5 may be omitted. At least one of the arrangement or the order of the components illustrated in FIG. 5 may differ. Components unillustrated in FIG. 5 may be added.

Next, description is given of a specific example of various types of processing in the communication system 1000.

Figure 6:
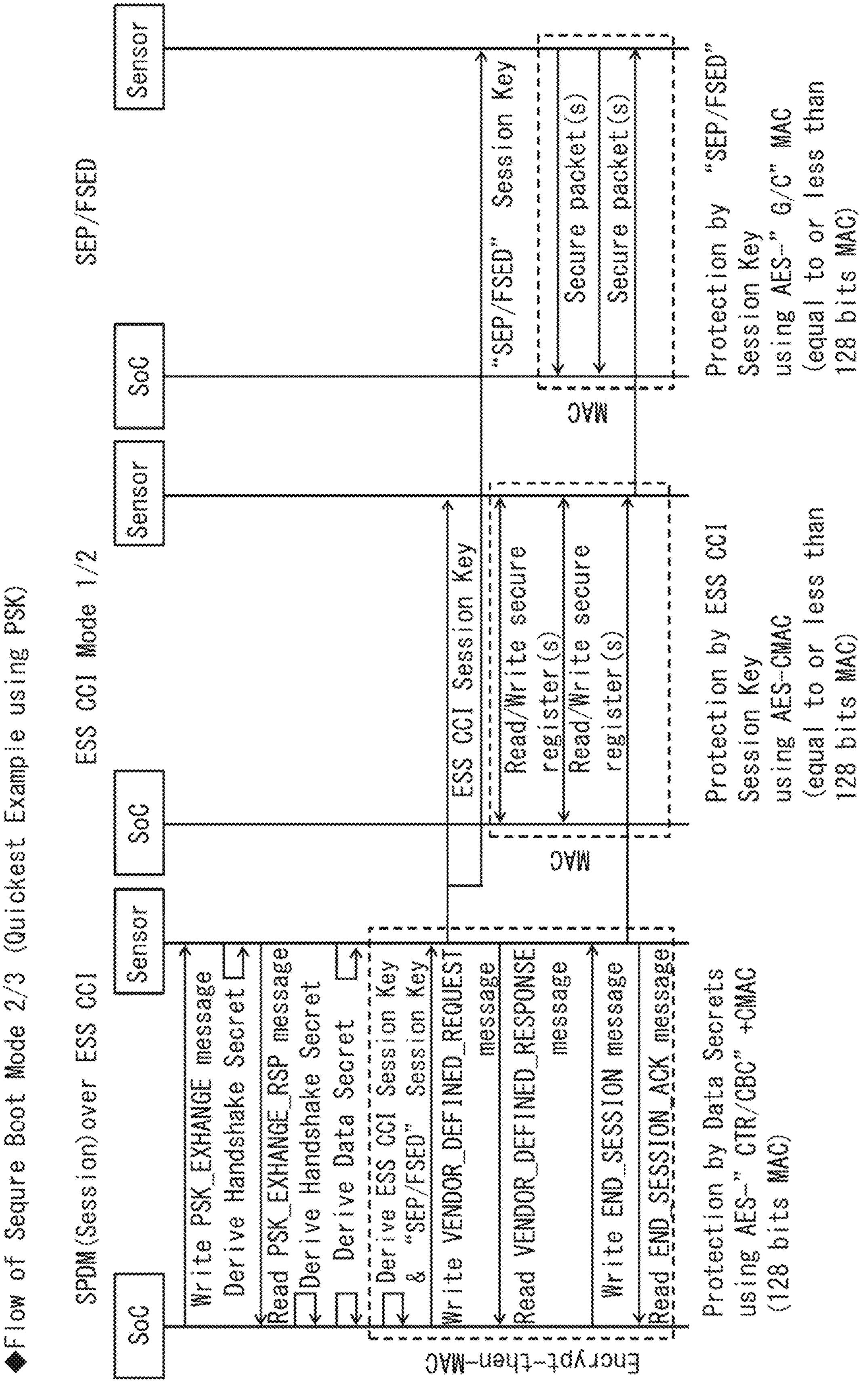
FIG. 6 is an explanatory flowchart of an example of a flow of processing in Secure Boot Mode 2/3.

FIG. 6 is an explanatory flowchart of an example of a flow of processing in Secure Boot Mode 2/3. FIG. 6 illustrates, as an example of a fast secure boot, an example of a flowchart in a case of using PSK (Pre-shared Key; pre-shared key) that is applicable to at least one of the Secure Boot mode 2 or the Secure Boot mode 3.

In the SPDM over ESS CCI (SPDM communication; extra-SPDM session communication), the application processor 1100 transmits (Write) a PSK_EXCHANGE message to the image sensor 1200. Upon receiving the PSK_EXCHANGE message, the image sensor 1200 derives a handshake secret from the key schedule, and derives the SPDM-finished key (finished_key) from the derived handshake secret. Thereafter, the image sensor 1200 transmits a PSK_EXCHANGE_RSP message to the application processor 1100, and the application processor 1100 receives (Read) the PSK_EXCHANGE_RSP message.

When the PSK_EXCHANGE_RSP message is transmitted and received, the application processor 1100 and the image sensor 1200 derive a data secret from the key schedule, and derives at least one of the write SPDM session key or the read SPDM session key from the derived data secret. Here, the write SPDM session key includes write data_Enc_key used for an arithmetic operation of at least one of encryption or decryption of a portion or all of write data, and write data_MAC_key used for an arithmetic operation of a write MAC. The read SPDM session key includes read data_Enc_key used for an arithmetic operation of at least one of decryption or encryption of a portion or all of read data, and a read data_MAC_key used for an arithmetic operation of a read MAC. In this manner, an SPDM session protected by at least some of the write SPDM session key and the read SPDM session key may be established.

The application processor 1100 may derive at least one session key of an ESS CCI session key, an SEP session key, and an FSED session key, and may transmit a portion or all of the derived session key to the image sensor 1200 via the protected SPDM session (SPDM Session over ESS CCI; SPDM session communication; intra-SPDM session communication). In that case, the application processor 1100 may transmit (Write) encrypted session key via a VENDOR_DEFINED_REQUEST message, for example, and the image sensor 1200 may receive the encrypted session key via the VENDOR_DEFINED_REQUEST message, for example. At this time, the image sensor 1200 may transmit, to the application processor 1100, for example, a VENDOR_DEFINED_RESPONSE message indicating that decryption of the session key has been completed, and the application processor 1100 may receive (Read), from the image sensor 1200, the VENDOR_DEFINED_RESPONSE message indicating that the decryption of the session key has been completed.

Thereafter, the ESS CCI session key is applied, and the image sensor 1200 may execute at least one of Read or Write with respect to a register (e.g., the register part 1212) in the sensor, for example, in at least one of the ESS CCI mode 1 or the ESS CCI mode 2 protected by the ESS CCI session key (ESS CCI session; non-SPDM communication; extra-SPDM session communication). Alternatively, the SEP session key may be applied, and the image sensor 1200 may transmit image-system data protected by the SEP session key to the application processor 1100 (SEP session). Alternatively, the FSED session key may be applied, and the image sensor 1200 may transmit image-system data protected by the FSED session key to the application processor 1100 (FSED session).

In a case where the application processor 1100 is desired to start image data communication, a start command commanding the start of image data communication may be transmitted to the image sensor 1200 via the SPDM Session over ESS CCI. At this time, the image sensor 1200 may receive the start command commanding the start of image data communication from the application processor 1100 via the SPDM Session over ESS CCI. The image sensor 1200 may further start protecting the image data communication in response to the start command, or may start transmitting the image data communication.

In a case where the application processor 1100 is desired to finish the SPDM session, an END_SESSION message may be transmitted (Write) to the image sensor 1200. When receiving the END_SESSION message from the application processor 1100, the image sensor 1200 may finish transmitting or receiving the SEP, the FSED, the ESS CCI mode 1, and the ESS CCI mode 2. In addition, the image sensor 1200 may discard all of the ESS CCI session key, the SEP session key, and the FSED session key, and may transmit, to the application processor 1100, an END_SESSION_ACK message indicating that the SPDM session can be finished. At this time, the application processor 1100 may receive, from the image sensor 1200, the END_SESSION_ACK message as a response to the END_SESSION message. The application processor 1100 and the image sensor 1200 may discard all of the session keys associated with the SPDM session.

It is to be noted that the SPDM session may be finished in response to the END_SESSION message, and at least one of the ESS CCI session, the SEP session, or the FSED session may be continued. In that case, there is an effect of being able to execute at least one of termination, updating, or restarting of the SPDM session, while continuing at least one of the protected control data communication or image data communication (i.e., the ESS CCI session, the SEP session, and the FSED session); it is particularly preferable in an application that does not allow forced termination of at least one of the control data communication or the image data communication. In that case, the protected image data communication (at least one of the SEP session or the FSED session) may be finished in response to transmission or reception of a write message (at least one of a write command or write data) in the protected control data communication (ESS CCI session).

Figure 7:
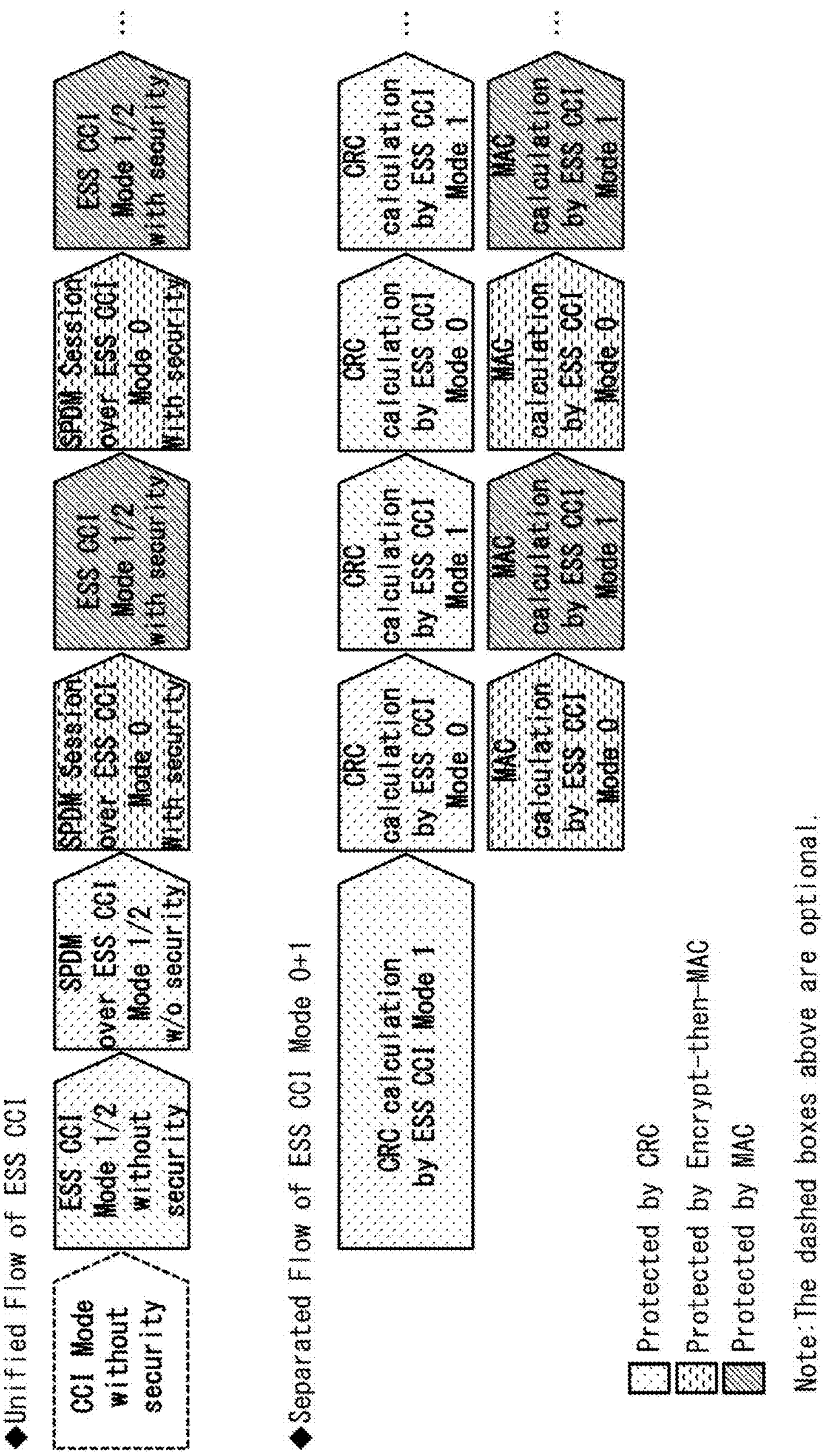
FIG. 7 is an explanatory diagram of an example of a flow of processing of ESS CCI.
Figure 8:
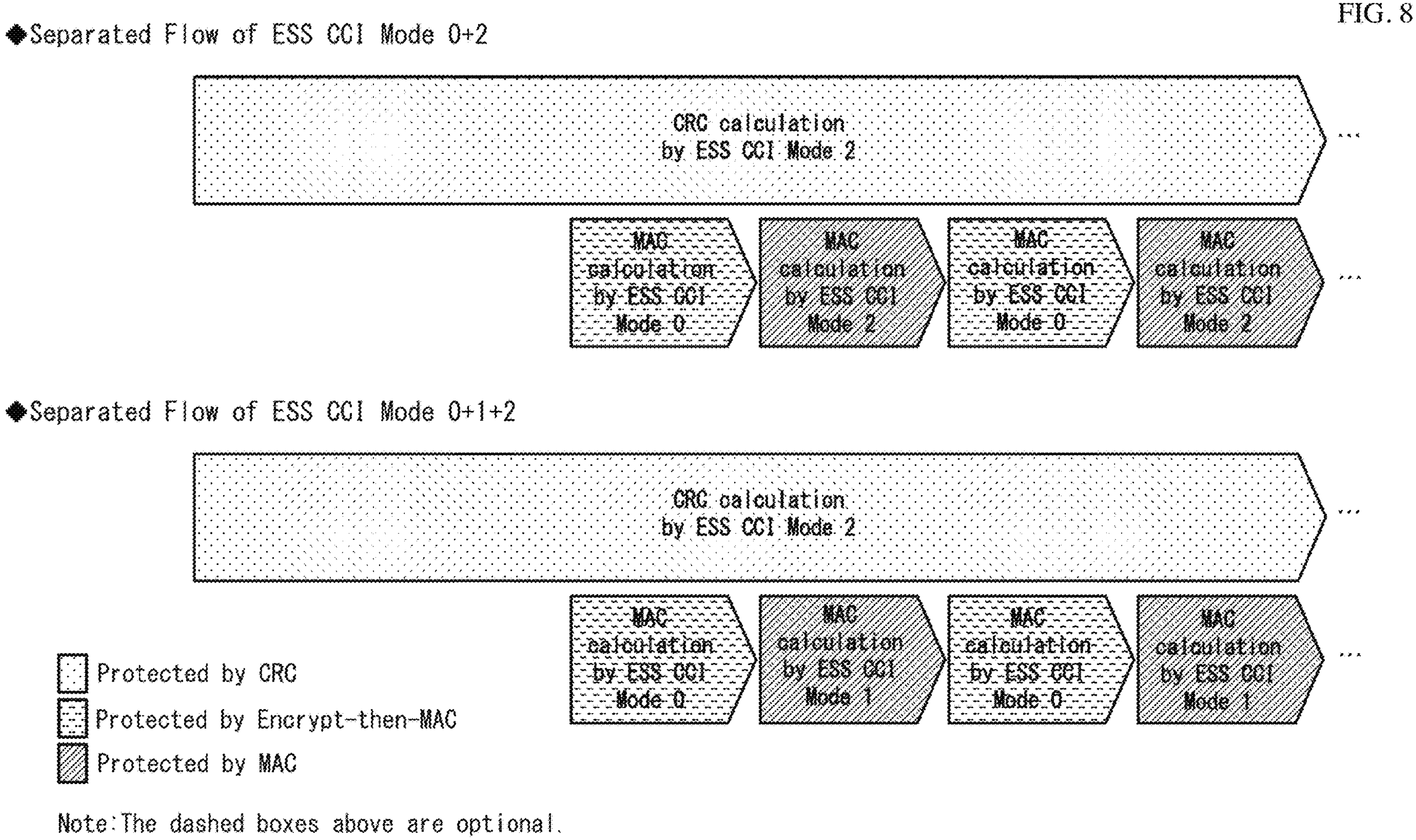
FIG. 8 is an explanatory diagram of an example of a flow of the processing of the ESS CCL

FIGS. 7 and 8 are each an explanatory diagram of an example of a flow of processing of the ESS CCI. FIG. 7 in the upper part illustrates Unified Flow as a flowchart example exemplifying a flow in a case of corresponding to at least one of a CCI mode (extra-SPDM session communication), the ESS CCI mode 0 (intra-SPDM session communication), the ESS CCI mode 1 (extra-SPDM session communication), or the ESS CCI mode 2 (extra-SPDM session communication). FIG. 7 in the lower part and FIG. 8 illustrate Separated Flow as a flowchart example exemplifying the flow of CRC arithmetic operation, MAC arithmetic operation, and encryption arithmetic operation (including decryption arithmetic operation). In the ESS CCI mode 0, MAC may be calculated for Encrypt-then-MAC, i.e., data after encryption. Description is given in detail later of the CCI mode, the ESS CCI mode 0, the ESS CCI mode 1, and the ESS CCI mode 2.

Figure 9:
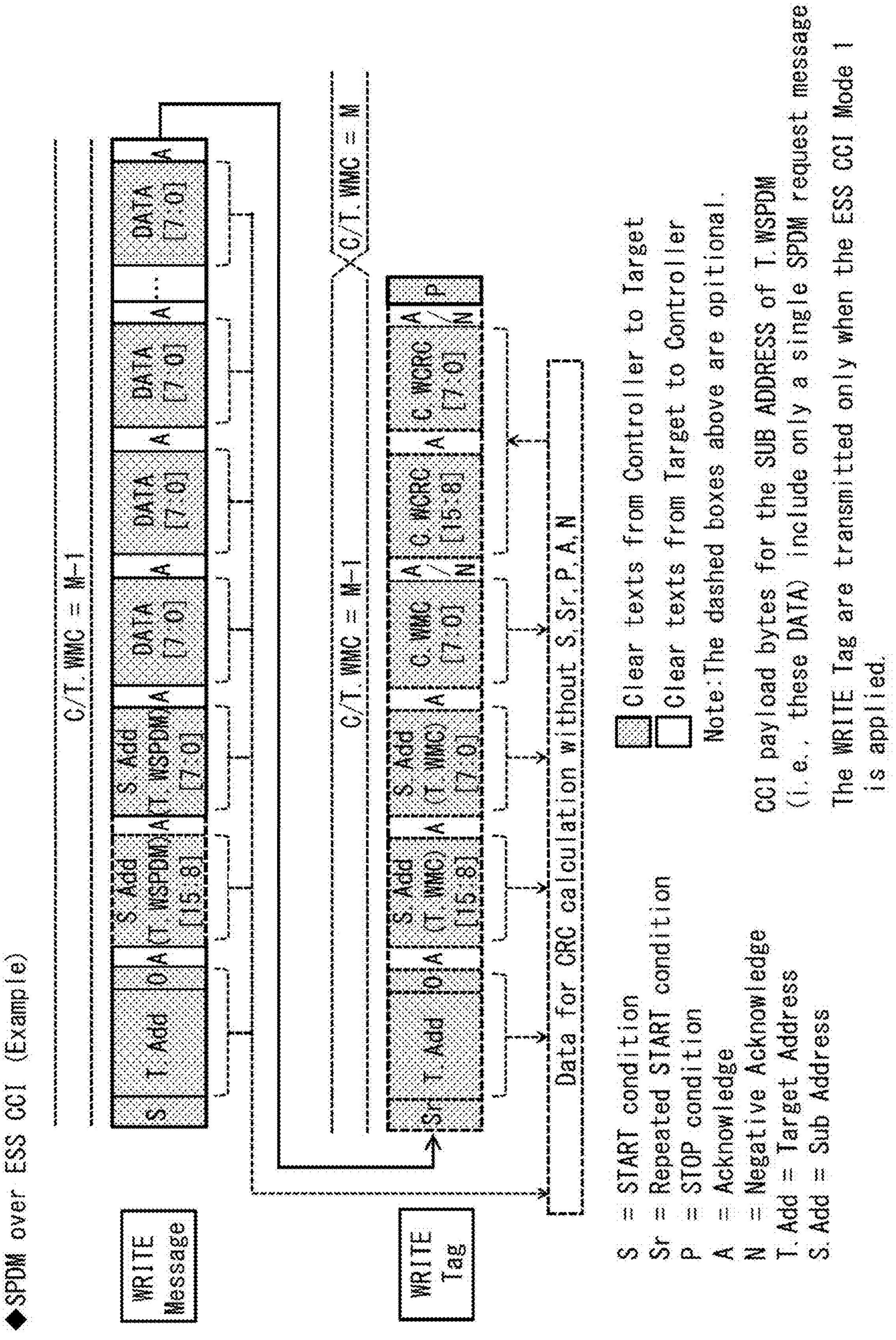
FIG. 9 is a diagram illustrating an example of a packet configuration of write data.
Figure 10:
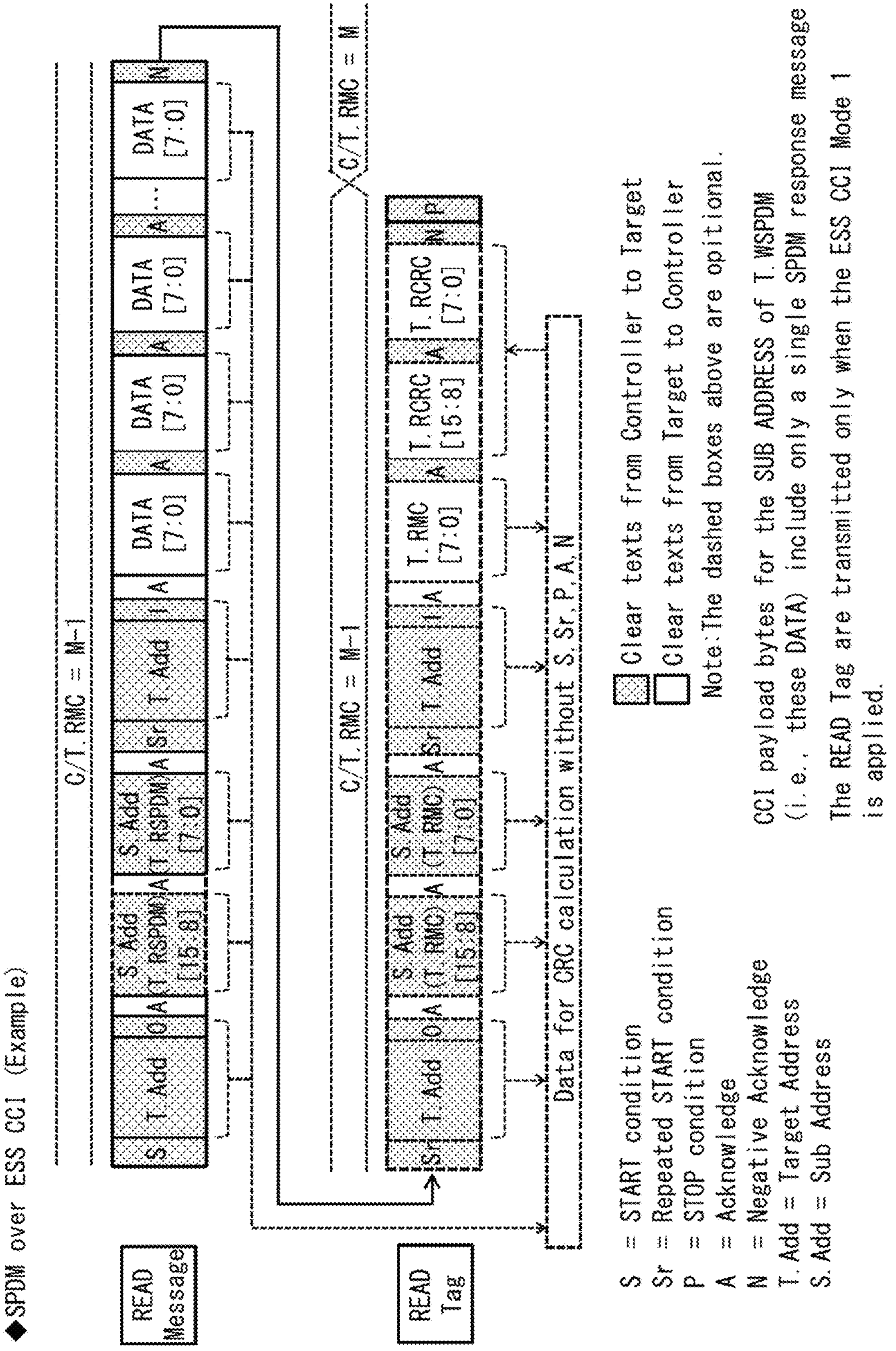
FIG. 10 is a diagram illustrating an example of a packet configuration of read data.

FIG. 9 is a diagram illustrating an example of a packet configuration of write data. FIG. 10 is a diagram illustrating an example of a packet configuration of read data. The write message (Write Message) includes a write command and write data, and the read message (Read Message) includes a read command and read data. A write message including a target-side write SPDM message-directed WSPDM (T. WSPDM) register, and a read message including a target-side read SPDM message-directed RSPDM (T. RSPDM) register may be executed as a pair. That is, a read command of the T. RSPDM register may be executed after execution of the write command of the T. WSPDM register. In FIGS. 9 and 10, WMC is Write Message Counter, WCRC is Write CRC, RMC is Read Message Counter, and RCRC is Read CRC.

FIG. 11 is a diagram illustrating format examples of SPDM Registers and RSPDM Registers. FIG. 11 illustrates register format examples of a write SPDM message-directed register WSPDM and a read SPDM message-directed register RSPDM in the SPDM over ESS CCI and the SPDM Session over ESS CCI. In FIG. 11, Sparm is desirably of at least 128 bytes, and may be specified or restricted through a private contract (e.g., datasheet) or through the ESS CCI Security Capabilities Register.

FIG. 12 is a diagram illustrating an example of conversion of the SPDM message into ESS CCI data. In a case where the ESS CCI data and the SPDM message differ from each other in the rule of data arrangement order (big endian or little endian), the data arrangement order of the SPDM message may be converted in order to efficiently store the SPDM message for the ESS CCI data. That is, at least one of the application processor 1100 or the image sensor 1200 may include a conversion section that converts the data arrangement order of the SPDM message. Further, at least one of the application processor 1100 and the image sensor 1200 may include a conversion section that converts the data arrangement order of the SPDM message.

FIG. 13 is a diagram illustrating an example of a MAC target region to be protected by the SPDM-finished key. FIG. 13 illustrates an example of a MAC target region to be protected by a finished key which is the SPDM-finished key derived from a handshake secret in accordance with a key schedule in a case where PSK is used to input the key schedule. This MAC target region is an input data region to perform arithmetic operation of Responder VerifyData using the finished_key.

This MAC target region may further include another SPDM message. The OpaqueData region and the PSKHint region (a region in which the hint information on the pre-shared key is stored) described in the DSP0274 of the DMTF standard may be extended as exemplified in FIG. 13. The OpaqueData region may be extended in the same manner as the case where the PSK is used to input the key schedule, in a case where a DHE (Diffie-Hellman key Exchange) secret is used to input the key schedule. A portion or all of a vendor-defined PSKHint region may be set as a standard-defined PSKHint region, or a portion or all of the standard-defined PSKHint region may be set as the vendor-defined PSKHint region. The PSKHint region may be configured only by the vendor-defined PSKHint region, or the PSKHint region may be configured only by the standard-defined PSKHint region. A portion or all of the vendor-defined OpaqueData region may be set as a standard-defined OpaqueData region, or a portion or all of the standard-defined OpaqueData region may be set as the vendor-defined OpaqueData region. The OpaqueData region may be configured only by the vendor-defined OpaqueData region, or the OpaqueData region may be configured only by the standard-defined OpaqueData region.

In the PSKHint region described in the DSP0274 of the DMTF standard, it is only possible to define at least one of standard-defined PSKHint or vendor-defined PSKHint. Meanwhile, it is possible, in the present embodiment, to use both of the standard-defined PSKHint and the vendor-defined PSKHint in combination. In the OpaqueData region described in the DSP0274 of the DMTF standard, it is only possible to define at least one of standard-defined OpaqueData or vendor-defined OpaqueData. Meanwhile, it is possible, in the present embodiment, to use both of the standard-defined OpaqueData and the vendor-defined OpaqueData in combination.

FIGS. 14A and 14B are each a diagram illustrating a format example of a request message of the PSK_EXCHANGE. FIGS. 14A and 14B each illustrate a format example for the request message of the PSK_EXCHANGE included in the MAC target region to be protected by the finished_key in a case where the PSK is used to input a key schedule. FIGS. 15A, 15B, and 15C are each a diagram illustrating a format example of a response message of the PSK_EXCHANGE_RSP. FIGS. 15A, 15B, and 15C each illustrate a format example for the response message of the PSK_EXCHANGE_RSP included in the MAC target region to be protected by the finished_key in a case where the PSK is used to input a key schedule. FIG. 16 is a diagram illustrating a format example of a request message of PSK_FINISH. FIG. 16 illustrates a format example for the request message of the PSK_FINISH in a case where the request message of the PSK_FINISH is transmitted or received.

The PSKHint region may be included in the request message of the PSK_EXCHANGE. The OpaqueData region may be included in at least one of the request message of the PSK_EXCHANGE, the response message of the PSK_EXCHANGE_RSP, the request message of the KEY_EXCHANGE, or the response message of the KEY_EXCHANGE_RSP.

FIG. 17 is a diagram illustrating a format example of the PSKHint region in the request message of the PSK_EXCHANGE. FIG. 18 is a diagram illustrating a format example of the OpaqueData region in the request messages of the KEY_EXCHANGE and the PSK_EXCHANGE. FIG. 19 is a diagram illustrating a format example of the OpaqueData region in the response messages of the KEY_EXCHANGE_RSP and the PSK_EXCHANGE_RSP.

Assume that the response message of the PSK_EXCHANGE_RSP including a ResponderContext region is transmitted from the image sensor 1200 to the application processor 1100 and received by the application processor 1100. In this case, SPDM Session Handshake Phase to be protected by at least some of the write SPDM session key and the read SPDM session key derived from the handshake secret may be started. That is, at least some of the write SPDM session key and the read SPDM session key derived from the handshake secret may be started to be used.

Assume that the response message of the PSK_EXCHANGE_RSP not including the ResponderContext region is transmitted from the image sensor 1200 to the application processor 1100 and received by the application processor 1100. Alternatively, assume that a response message of at least one of FINISH_RSP or PSK_FINISH_RSP is transmitted from the image sensor 1200 to the application processor 1100 and received by the application processor 1100. In these cases, SPDM Application Phase to be protected by at least some of the write SPDM session key and the read SPDM session key derived from a data secret may be started. That is, at least some of the write SPDM session key and the read SPDM session key derived from the data secret may be started to be used.

Figure 20:
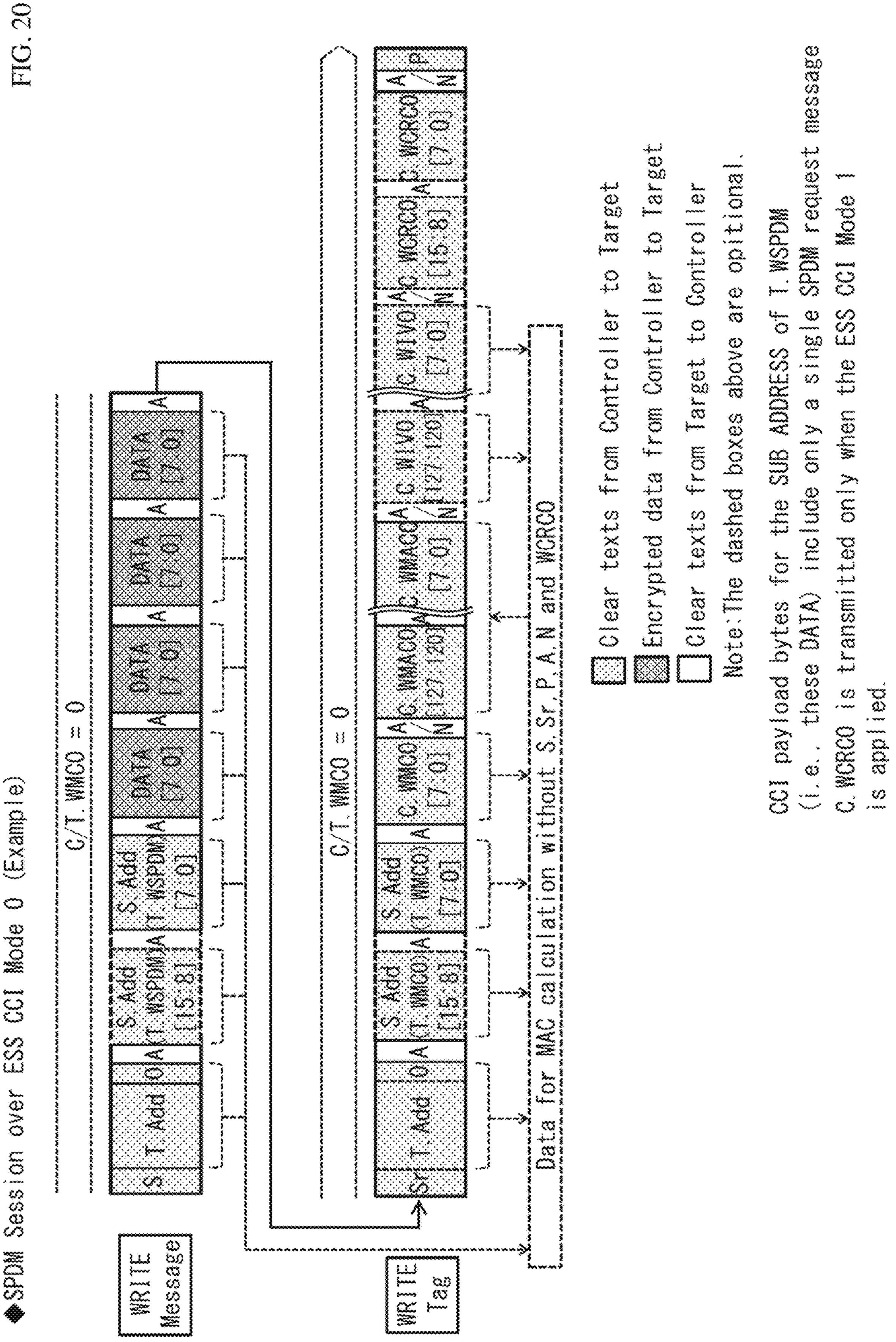
FIG. 20 is a diagram illustrating an example of a packet configuration of write data.
Figure 21:
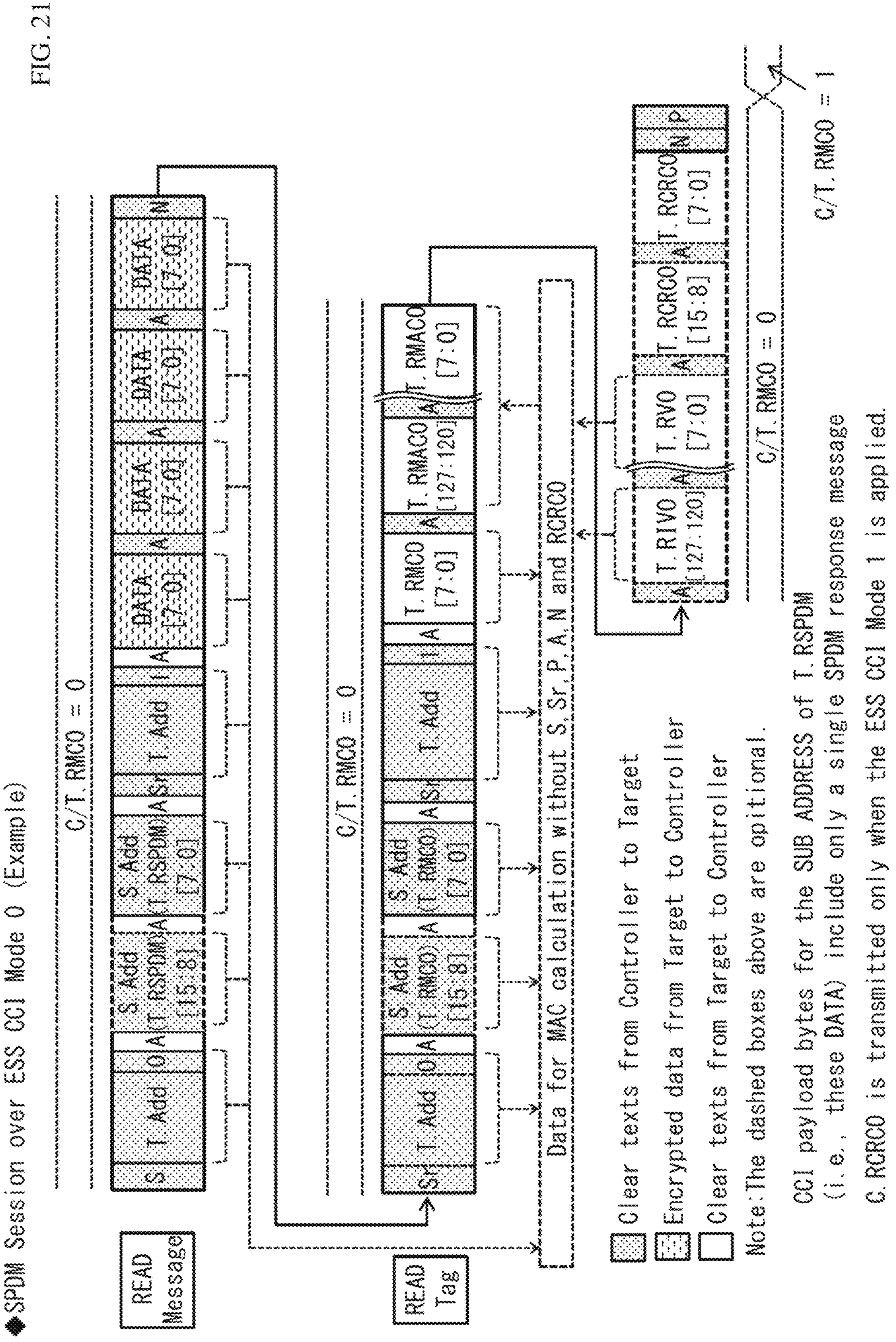
FIG. 21 is a diagram illustrating an example of a packet configuration of read data.

FIG. 20 is a diagram illustrating an example of a packet configuration of write data. FIG. 21 is a diagram illustrating an example of a packet configuration of read data. FIGS. 20 and 21 illustrate examples of a write message and a read message of the ESS CCI mode 0.

The SPDM message of at least one of the SPDM Session Handshake Phase and the SPDM Application Phase may be transmitted or received via the ESS CCI mode 0 (SPDM Session over ESS CCI Mode 0). Here, a portion or all of the write data may be encrypted data, or a portion or all of the read data may be encrypted data. At least a portion or all of the write SPDM message and a portion or all of a write SPDM tag may be protected by the write SPDM message authentication code. At least a portion or all of the read SPDM message and a portion or all of a read SPDM tag may be protected by the read SPDM message authentication code. At least a portion or all of the write SPDM message and a portion or all of the write SPDM tag may be protected by the write CRC (at least one CRC of ESS CCI mode 0, 1, or 2), or a portion or all of the read SPDM message and a portion or all of the read SPDM tag may be protected by the read CRC (at least one CRC of ESS CCI mode 0, 1, or 2).

FIGS. 22 and 23 are each a diagram illustrating a format example of the SPDM Session over ESS CCI Tag Registers.

Unlike at least one of mode 1 or 2 of the SPDM over ESS CCI, WMAC0 and RMAC0 may be extended, or WIV0 and RIV0 may be extended. T. WMC0 is a target-side write SPDM message counter-directed register. T. WMAC0 is a target-side write SPDM message authentication code-directed register. T. WIV0 is a target-side write SPDM initialization vector-directed register. T. WCRC0 is a target-side write SPDM message CRC-directed register. These are a portion of the write SPDM tag.

T. RMC0 is a target-side read SPDM message counter-directed register. T. RMAC0 is a target-side read SPDM message authentication code-directed register. T. RIV0 is a target-side read SPDM initialization vector-directed register. T. RCRC0 is a target-side read SPDM message CRC-directed register. These are a portion of the read SPDM tag.

The WMAC0 may protect (target) at least some of TARGET ADDRESS. SUB ADDRESS, DATA (write data), WMC0, and the WIV0, excluding START condition, Repeated START condition, STOP condition, Acknowledge, Negative Acknowledge, and WCRC0, or may protect (target) implicit data (e.g., count value) that is not transmitted or received by a write transaction. The RMAC0 may protect (target) at least some of the TARGET ADDRESS, the SUB ADDRESS, DATA (read data), RMC0, and the RIV0, excluding the START condition, the Repeated START condition, the STOP condition, the Acknowledge, the Negative Acknowledge, and RCRC0, or may protect (target) implicit data (e.g., count value) that is not transmitted or received by a read transaction.

The WCRC0 may protect (target) at least some of the TARGET ADDRESS, the SUB ADDRESS, the DATA (write data), the WMC0, the WMAC0, and the WIV0, excluding the START condition, the Repeated START condition, the STOP condition, the Acknowledge, and the Negative Acknowledge, or may protect (target) implicit data (e.g., count value) that is not transmitted or received by a write transaction. The RCRC0 may protect (target) at least some of the TARGET ADDRESS, the SUB ADDRESS, the DATA (read data), the RMC0, the RMAC0, and the RIV0, excluding the START condition, the Repeated START condition, the STOP condition, the Acknowledge, and the Negative Acknowledge, or may protect (target) implicit data (e.g., count value) that is not transmitted or received by a read transaction.

FIG. 24 is an explanatory flowchart of an example of a flow of selection of Tag Register. As exemplified in FIG. 24, in a case where AES-CTR mode encryption is selected as the SPDM session (over the ESS CCI mode 0) by the application processor 1100 (step S102; Y), the sensor may select an AES-CTR-oriented ESS CCI Tag register configuration (SPDM Session over ESS CCI Tag Registers format for AES-CTR+AES-CMAC) (step S103). In a case where AES-CBC mode encryption is selected as the SPDM session (over the ESS CCI mode 0) by the application processor 1100 (step S105; Y), the sensor may select an AES-CBC-oriented ESS CCI Tag register configuration (SPDM Session over ESS CCI Tag Registers format for AES-CBC+AES-CMAC) (step S106).

In these two formats, base addresses may be the same in order to make register arrangement efficient (save registers), or the base address may differ in order to ensure the flexibility of register setting. However, the base address of the SPDM Session over ESS CCI mode 0 preferably differs from at least one base address of the mode 1 or 2 of the SPDM over ESS CCI in order to ensure the flexibility of the register setting, but may be the same as at least one base address of the mode 1 or 2 of the SPDM over ESS CCI in order to make the register arrangement efficient (save registers). In a case where the base addresses differ, there is an effect of being able to reset at least one of the WMC or the WMC0 at a free timing. This is preferable in a case where at least one of the WMC or the WMC0 is included in the initialization vector, or in a case where at least one of the WMC or the WMC0 is utilized as a replay attack countermeasure. Likewise, the register of the SPDM over ESS CCI and the register of the ESS CCI session may have the same base address or different base addresses.

As exemplified in FIG. 24, in a case where the AES-CTR mode encryption is selected as the SPDM session (over the ESS CCI mode 0) by the application processor 1100 (step S102; Y), the image sensor 1200 may select an AES-CTR-oriented ESS CCI initialization vector (step S104). In a case where the AES-CBC mode encryption is selected as the SPDM session (over the ESS CCI mode 0) by the application processor 1100 (step S105; Y), the image sensor 1200 may select an AES-CBC-oriented ESS CCI initialization vector (step S107). In these cases, there is an effect of being able to share a slot for a 128-bit initialization vector by the AES-CTR mode encryption and the AES-CBC mode encryption. In addition, there is also an effect of being able to immediately start using message counters (WMC0 and RMC0) corresponding to the ESS CCI Tag register and an arithmetic operation of at least one of the CRC (WCRC0 or RCRC0), without waiting for completion of the selection of the initialization vector required for encryption (and decryption).

It is sufficient for the AES-CBC-oriented ESS CCI initialization vector to be an unpredictable value. The AES-CBC-oriented ESS CCI initialization vector may be generated by an intrinsic random number generator or a pseudo random number generator, or may be generated by applying a Forward Cipher Function to a nonce value using the same session key as the encryption. The WIV0 of a Write tag (WRITE Tag) may store an initialization vector generated on a controller side, or the RIV0 of a read tag (READ Tag) may store an initialization vector generated on a target side. The AES-CTR-oriented ESS CCI Tag register configuration and the AES-CBC-oriented ESS CCI Tag register configuration may be integrated. That is, in a case where the AES-CTR mode encryption is selected, the AES-CTR-oriented ESS CCI initialization vector may be stored in the WIV0 and the RIV0. In that case, the ESS CCI initialization vector is always transmitted or received, thus leading to an effect of avoiding inconsistency in the initialization vector between the SPDM requester and the SPDM responder.

FIGS. 25A and 25B are each a diagram illustrating an example of the initialization vector. In a case where the AES-CTR mode encryption is selected for the SPDM session, the initialization vector configuration illustrated in FIGS. 25A and 25B may be applied. In that case, the initialization vector configuration may include information indicating at least one of Write Transaction or Read Transaction (in particular, a flag of 0 or 1). Such information may be arranged between T. Add and 0^32, for example. The initialization vector configuration may include information indicating at least one of the SPDM Session Handshake Phase or the SPDM Application Phase (in particular a flag of 0 or 1). Such information may be arranged between C. Add and the T. Add, for example.

In a case of the Write Transaction, the initialization vector configuration may include a controller-side address (C. Add), a target-side address (T. Add), an implicit (not transmitted or received in the Write Transaction) additional WMC0 synchronized with the WMC0 (a value of the write SPDM message counter), the WMC0, and Write-pre-counter (a value of a write SPDM pre-counter). In a case of the Read Transaction, the initialization vector configuration may include a controller address (C. Add), a target address (T. Add), an implicit (not transmitted or received in the Read Transaction) additional RMC0 synchronized with the RMC0 (a value of the read SPDM message counter), the RMC0, and Read-pre-counter (a value of a read SPDM Precounter). In a case of at least one of these, the initialization vectors do not overlap between the Write Transaction and the Read Transaction, thus leading to an effect of reducing security risk, and the initialization vectors do not overlap between the SPDM Session Handshake Phase and the SPDM Application Phase, thus leading to an effect of reducing the security risk. It is to be noted that the Write-pre-counter and the Read-pre-counter may each be a separate Pre-counter or may be a combined (same) Pre-counter.

Figure 26:
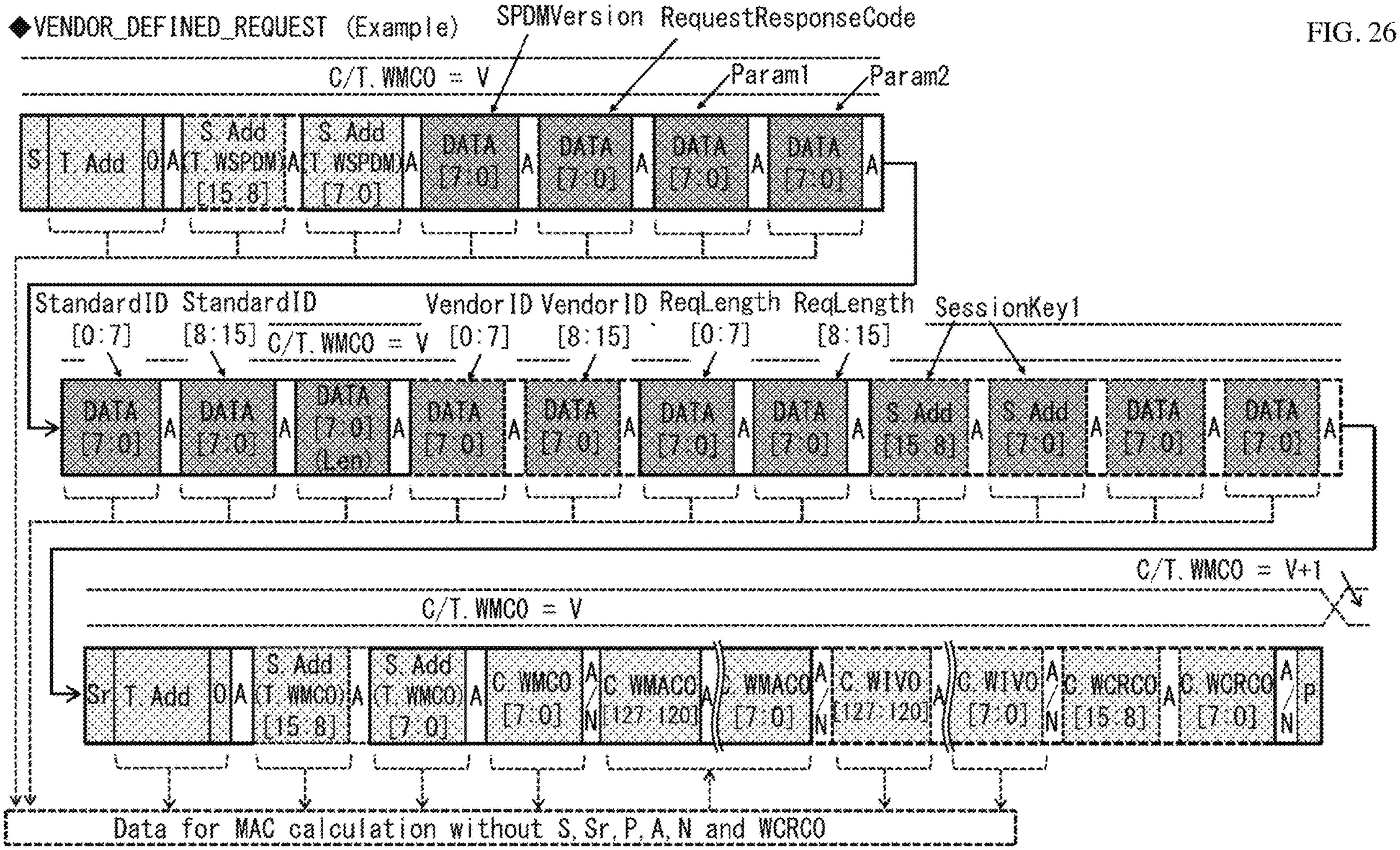
FIG. 26 is a diagram illustrating an example of a packet configuration of write data.
Figure 27:
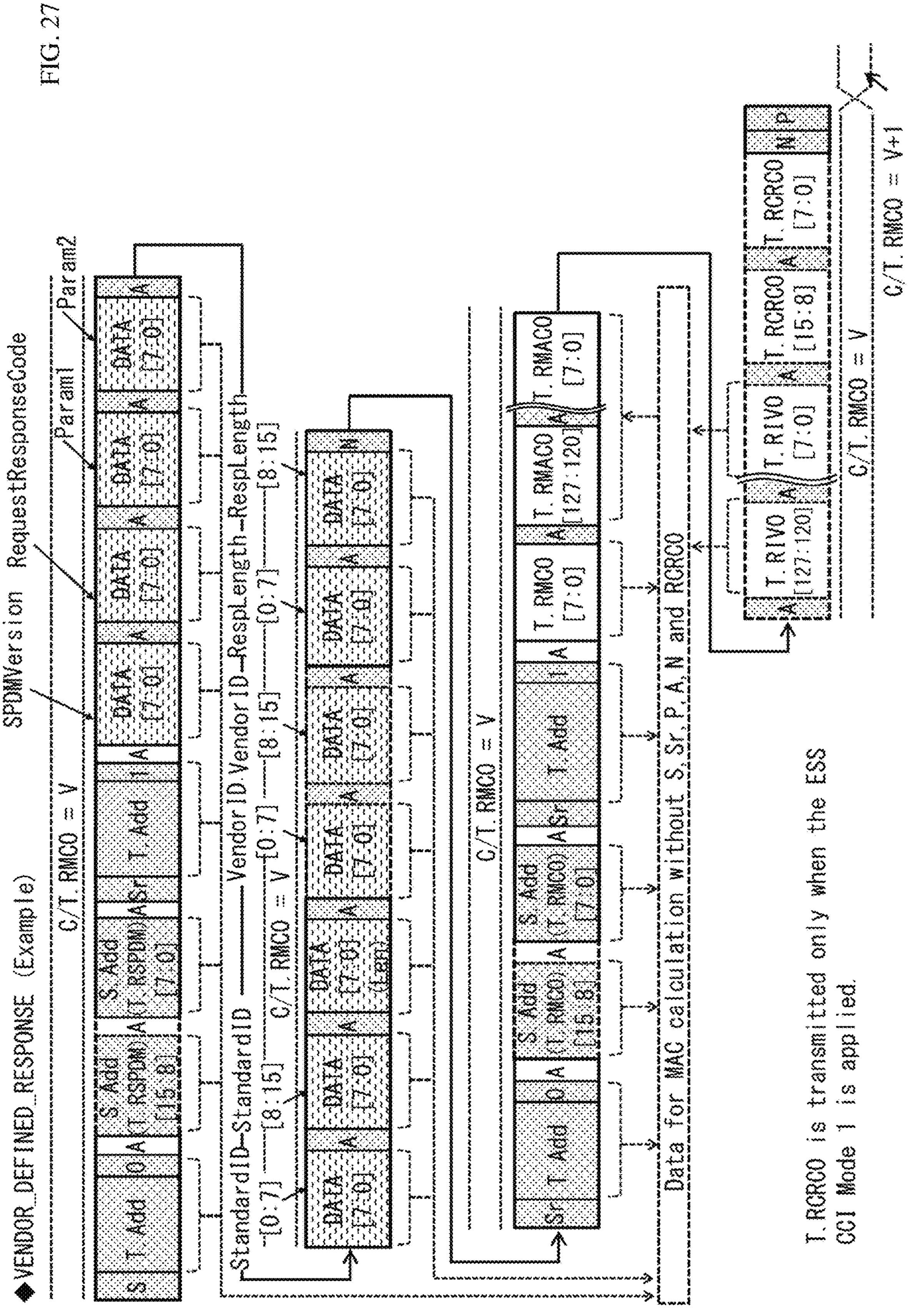
FIG. 27 is a diagram illustrating an example of a packet configuration of read data.

FIG. 26 is a diagram illustrating an example of a packet configuration of write data. FIG. 27 is a diagram illustrating an example of a packet configuration of read data. A VENDOR_DEFINED_REQUEST request message and a VENDOR_DEFINED_RESPONSE response message may be utilized to transmit (Write) a session key to be applied to at least one of the ESS CCI, the SEP, and the FSED from the application processor 1100 to the image sensor 1200. FIGS. 26 and 27 each illustrate a configuration example of data transmitted or received during that time. The VENDOR_DEFINED_RESPONSE response message may be omitted.

FIG. 28 is a diagram illustrating a format example of a request message of the VENDOR_DEFINED_REQUEST. FIG. 28 illustrates a format example for the VENDOR_DEFINED_REQUEST request message of a write transaction. FIG. 29 is a diagram illustrating a format example of the response message of the VENDOR_DEFINED_RESPONSE.

A VendorDefinedReqPayload region of the VENDOR_DEFINED_REQUEST request message may store at least one of a portion or all of an SA_CONFIG register (a configuration register storing Service Association configuration information) for at least one of the ESS CCI, the SEP or the FSED, a portion or all of (a register of) a session key, or a portion or all of a CTRL_CONFIG register (a configuration register storing control configuration information).

The VENDOR_DEFINED_RESPONSE response message may store information indicating successful decryption of the VENDOR_DEFINED_REQUEST request message. The information indicating successful decryption of the VENDOR_DEFINED_REQUEST request message may be stored in a RespLength region of the VENDOR_DEFINED_RESPONSE response message, may be stored in a VendorDefinedRespPayload region of the VENDOR_DEFINED_RESPONSE response message, or may be stored in a SACP message described later.

FIG. 30 is a diagram illustrating an example of a packet configuration of write data. After an ESS CCI (session)-oriented session key is provided from the application processor 1100 to the image sensor 1200, WMAC (Write Message Authentication Code) may be extended, for example, by a shift register or the like, to the ESS CCI Tag Registers utilized for the SPDM over ESS CCI (at least one of ESS CCI mode 1 or 2). That is, application of a security function may be started to at least one of the ESS CCI mode 1 or 2. In addition, writing (write command) for any register may be executed. FIG. 30 illustrates an example in which integrity for at least a portion of a write transaction (Write Transaction) is protected while confidentiality is not protected.

It is to be noted that confidentiality may be further protected. In the ESS CCI mode 0 in which confidentiality is protected, it is desirable to start decrypting write data after successful message authentication (MAC verification) of write data, and thus it is desirable to generate a write tag for one write transaction (from the START condition to the STOP condition); however, the write tag may be generated for a plurality of write transactions. Meanwhile, in the ESS CCI mode 1 in which confidentiality is not protected, the write tag may be generated for the plurality of write transactions, or the write tag may be generated for one write transaction. In a case where the write tag is generated for the plurality of write transactions, there is an effect of being able to perform efficient control data communication.

The WMAC may protect (target) at least some of the TARGET ADDRESS, the SUB ADDRESS, the DATA (write data), and the WMC, excluding the START condition, the Repeated START condition, the STOP condition, the Acknowledge, the Negative Acknowledge, and the WCRC, or may protect (target) implicit data (e.g., count value) that is not transmitted or received by a write transaction. The WCRC may protect (target) at least some of the TARGET ADDRESS, the SUB ADDRESS, the DATA (write data), the WMC, and the WMAC, excluding the START condition, the Repeated START condition, the STOP condition, the Acknowledge, and the Negative Acknowledge, or may protect (target) implicit data (e.g., count value) that is not transmitted or received by a write transaction.

FIG. 31 is a diagram illustrating an example of a packet configuration of read data. After the ESS CCI (session)-oriented session key is provided from the application processor 1100 to the image sensor 1200, RMAC (Read Message Authentication Code) may be extended, for example, by a shift register or the like, to the ESS CCI Tag Registers utilized for the SPDM over ESS CCI (at least one of ESS CCI mode 1 or 2). That is, application of a security function may be started to at least one of the ESS CCI mode 1 or 2. In addition, reading (read command) for any register may be executed. FIG. 31 illustrates an example in which integrity for at least a portion of a read transaction (Read Transaction) is protected while confidentiality is not protected.

It is to be noted that confidentiality may be further protected. In the ESS CCI mode 0 in which confidentiality is protected, it is desirable to start decrypting read data after successful message authentication (MAC verification) of read data, and thus it is desirable to generate a read tag for one read transaction (from the START condition to the STOP condition); however, the read data tag may be generated for a plurality of read transactions. Meanwhile, in the ESS CCI mode 1 in which confidentiality is not protected, the read tag may be generated for the plurality of read transactions, or the read tag may be generated for one read transaction. In a case where the read tag is generated for the plurality of read transactions, there is an effect of being able to perform efficient control data communication.

The RMAC may protect (target) at least some of the TARGET ADDRESS, the SUB ADDRESS, the DATA (read data), and the RMC, excluding the START condition, the Repeated START condition, the STOP condition, the Acknowledge, the Negative Acknowledge, and the RCRC, or may protect (target) implicit data (e.g., count value) that is not transmitted or received by a read transaction. The RCRC may protect (target) at least some of the TARGET ADDRESS, the SUB ADDRESS, the DATA (read data), the RMC, and the RMAC, excluding the START condition, the Repeated START condition, the STOP condition, the Acknowledge, and the Negative Acknowledge, or may protect (target) implicit data (e.g., count value) that is not transmitted or received by a read transaction.

After a session key of the SEP (session) is provided from the application processor 1100 to the image sensor 1200, at least a portion of integrity (and confidentiality) may be protected, and image data communication (SEP session) may be started that is configured by an extended packet that complies with the CSI-2 extension standard. After a session key of the FSED (session) is provided from the application processor 1100 to the image sensor 1200, at least a portion of integrity (and confidentiality) may be protected, and image data communication (FSED session) may be started that is configured by at least one of a basic packet that complies with the CSI-2 standard or an extended packet that complies with the CSI-2 extension standard.

Here, description is given of the basic packet and the extended packet. FIG. 32 is a diagram illustrating a configuration example of the basic packet and the extended packets.

The basic packet may be configured by a packet header (PH) and packet data (payload), and may further include a packet footer (PF). The extended packet may be configured by an extended packet header (ePH) and packet data (payload), and may further include at least one of a packet header, an extended packet footer (at least one of MAC or CRC), or a packet footer. That is, in the extended packet, at least one of the packet header, the extended packet footer (at least one of the MAC or the CRC), or the packet footer may be omitted.

As exemplified in FIG. 32, a portion or all of the extended packet header, the packet data (payload), and the extended packet footer (at least one of the MAC or the CRC) of the extended packet may be configured to correspond to the packet data (payload) of the basic packet. In addition, in contrast to the basic packet, at least one of the extended packet header or the extended packet footer (at least one of the MAC or the CRC) may be extended outward. As exemplified in the first to sixth extended packet configurations, the extended packet has a configuration in which at least one of the extended packet header or the extended packet footer (at least one of the MAC or the CRC) is extended, in contrast to the basic packet.

The image sensor 1200 may use embedded data to thereby include, in a data stream of the image data communication, additional information such as device setting information. The embedded data may include at least one of configuration data on the image sensor, a register value that complies with the standard, a vendor-specific register value, explanatory data in a frame format, or a statistical value. The embedded data may include information related to the image-system data (at least one of the image data or the user-defined data).

The embedded data may be provided with a plurality of lines (rows) of embedded data, depending on the number of register values to be added to the embedded data. A line length of the embedded data may be shorter than a line length of at least one of the image data or the user-defined data, or may be equal to the line length of at least one of the image data or the user-defined data. The first pixel value of the embedded data may indicate a format code to be used for the embedded data.

The embedded data may be stored, for transmission or reception, in at least one of pieces of embedded data indicating a vendor-specific code (Vendor specific), a reserved code (Reserved for future use), and another standard definition code. In the frame, the embedded data is stored at at least one location between the frame start and first image-system data or between last image-system data and the frame end. However, the embedded data located between the last image-system data and the frame end may be omitted, or all of the pieces of the embedded data may be omitted.

FIGS. 33 and 34 are each a diagram illustrating a frame configuration example of image data. FIG. 33 illustrates an example of an FSED frame configuration to which a basic packet configuration is applied, as an example of a frame configuration transmitted or received by the image data communication. FIG. 34 illustrates an example of an SEP frame configuration to which the extended packet configuration is applied, as an example of a frame configuration transmitted or received by the image data communication.

At least one of the image data or the user-defined data may be a portion of a frame that starts at the frame start and ends at the frame end. The embedded data may be transmitted to or received from between the frame start and at least one of the image data or the user-defined data, or the embedded data may be transmitted to or received from between at least one of the image data or the user-defined data and the frame end. At least one of the frame number, the embedded data, the image data, or the user-defined data may be used as the packet data (payload) to transmit or receive at least one of the packet header or the extended packet header to or from immediately before the packet data (payload). At least one of the packet footer or the extended packet footer may be transmitted to or received from immediately after the packet data (payload).

At least one of the packet header or the extended packet header may store information related to the packet data (payload) on the same line. At least one of the packet footer or the extended packet footer may store data (e.g., at least one of a MAC value, a CRC value, or a Checksum value) that protects integrity of at least a portion of all of the packet data (payload) on the same line.

At least one of the packet footer or the extended packet footer may store data that protects integrity of a portion or all of the extended packet header on the same line and a portion or all of the packet data (payload) on the same line. At least one of the packet footer or the extended packet footer may store data that protects integrity of a portion or all of the packet header on the same line, (a portion or all of the extended packet header on the same line), and a portion or all of the packet data (payload) on the same line.

In FIG. 34, the extended packet footer corresponds to a MAC block and a CRC block. At least one of the MAC value or the CRC value stored in the extended packet footer may protect integrity of a portion or all of the extended packet header and a portion or all of the packet data (payload) in one line or a plurality of lines. That is, there may be a line that does not include at least one of the MAC value or the CRC value. As exemplified in FIG. 33, the embedded data may store data that protects integrity of at least a portion or all of the packet data (payload) in the same frame. In addition, the embedded data may store data that protects integrity of a portion or all of the packet header in the same frame and a portion or all of the packet data (payload) in the same frame.

Figure 35:
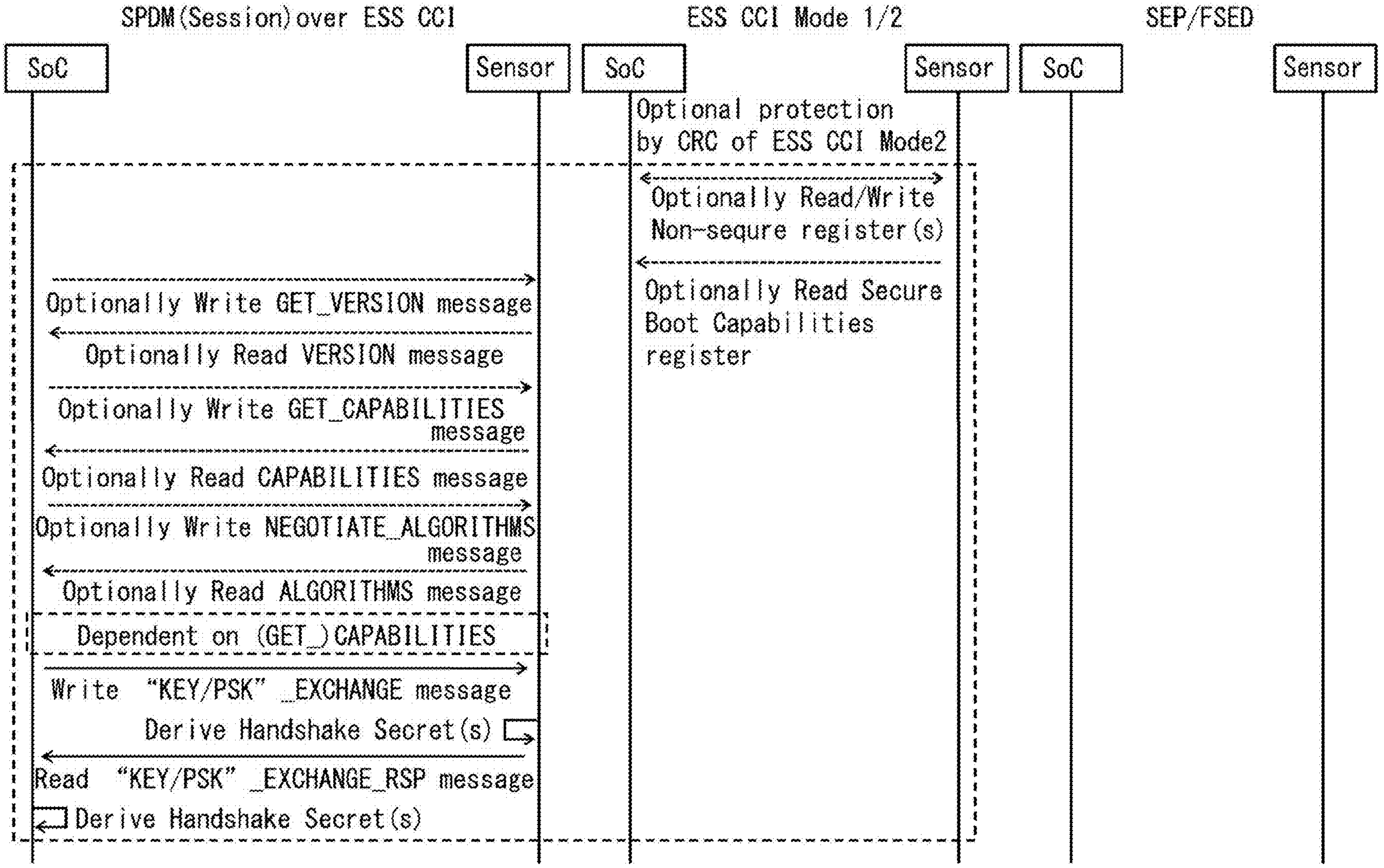
FIG. 35 is an explanatory flowchart of a flow of processing in the Secure Boot Mode 2/3.
Figure 36:
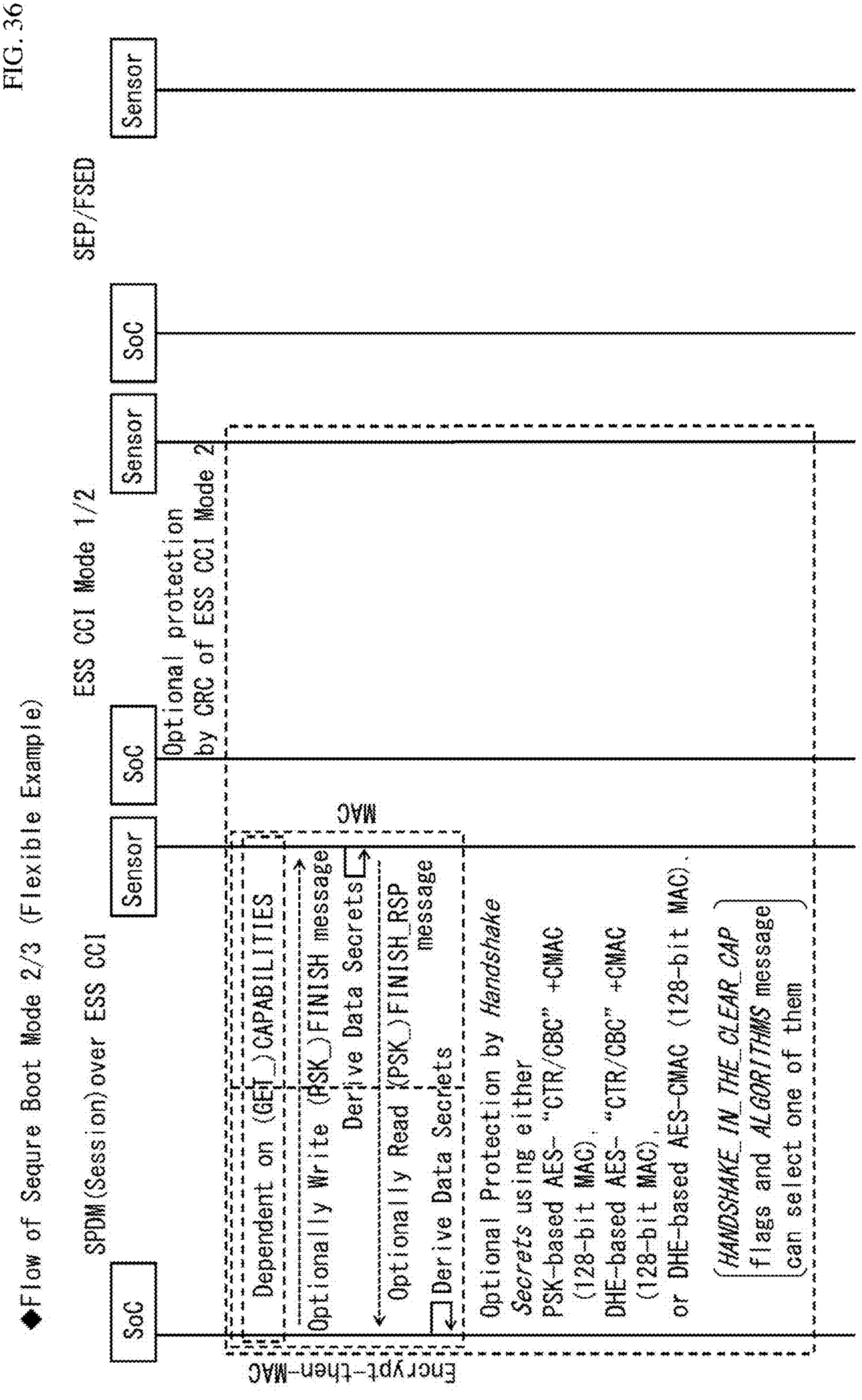
FIG. 36 is an explanatory flowchart of an example of a flow of processing subsequent to FIG. 35.
Figure 37:
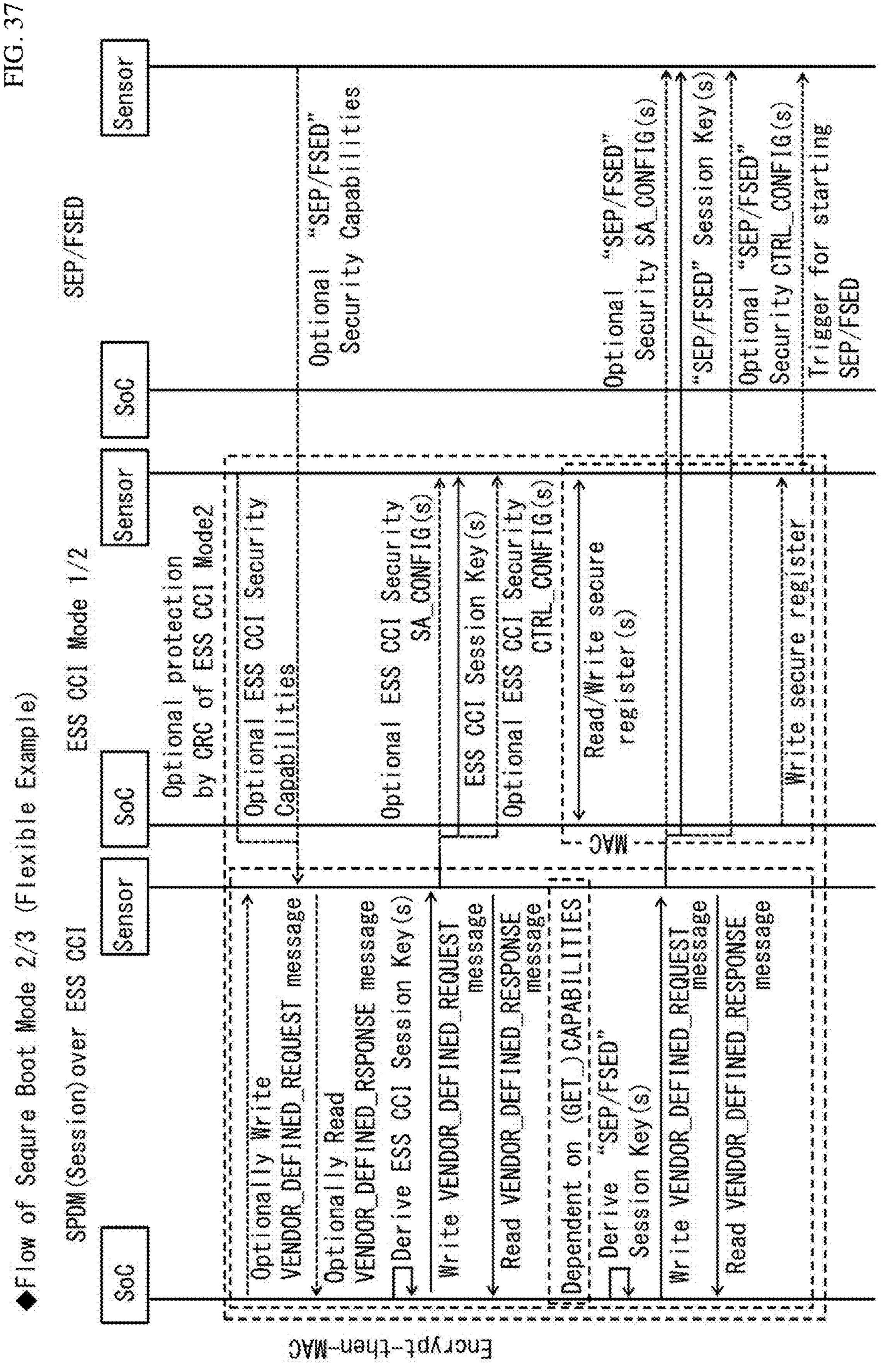
FIG. 37 is an explanatory flowchart of an example of a flow of processing subsequent to FIG. 36.
Figure 38:
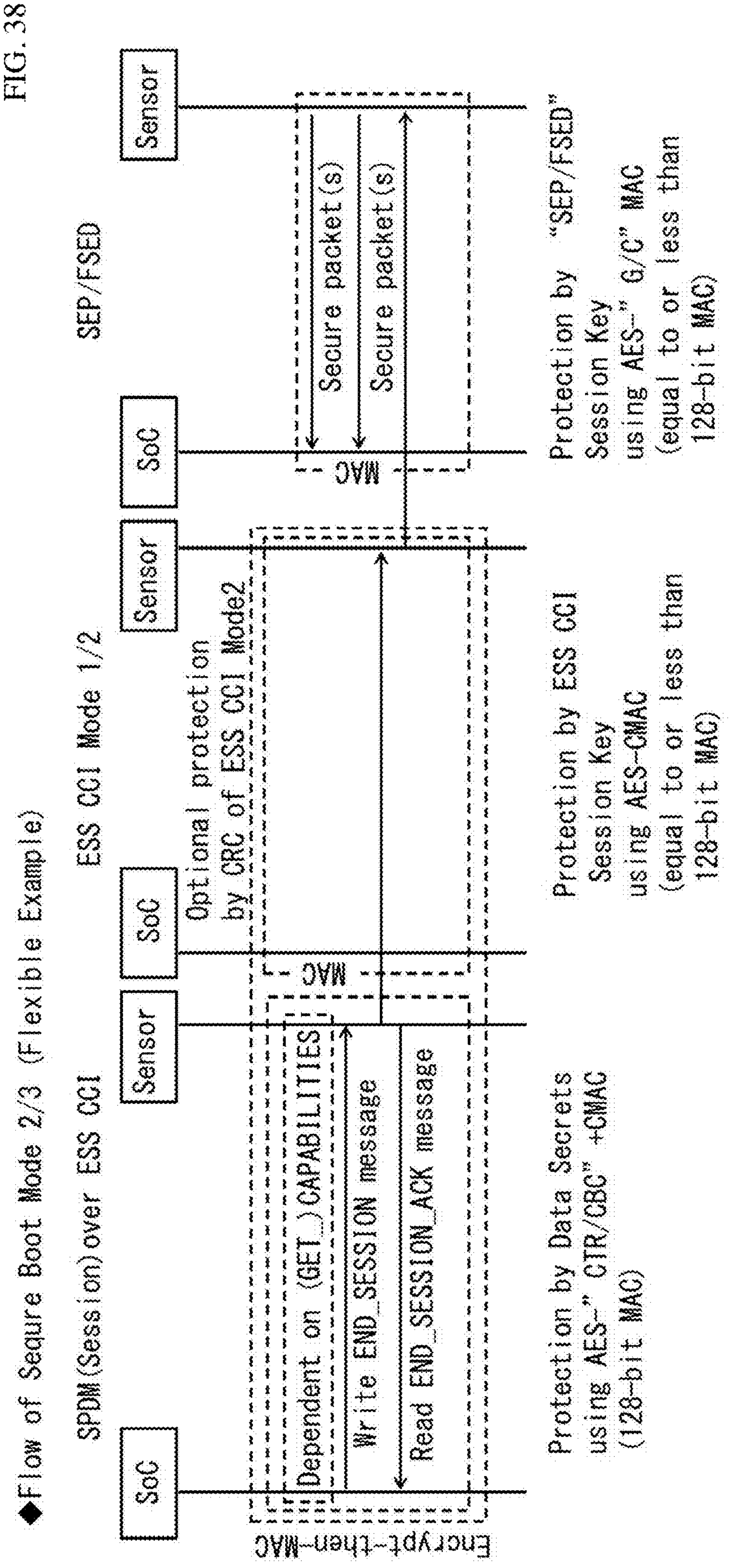
FIG. 38 is an explanatory flowchart of an example of a flow of processing subsequent to FIG. 37.

FIG. 35 is an explanatory flowchart of an example of a flow of processing in the Secure Boot Mode 2/3. FIG. 36 is an explanatory flowchart of an example of a flow of processing subsequent to FIG. 35. FIG. 37 is an explanatory flowchart of an example of a flow of processing subsequent to FIG. 36. FIG. 38 is an explanatory flowchart of an example of a flow of processing subsequent to FIG. 37. FIGS. 35 to 38 each illustrate, as an example of a flexible secure boot, a flowchart example in a case of using at least one of a DHE secret or the PSK applicable to at least one of the Secure Boot mode 2 or the Secure Boot mode 3.

A non-secure register may be written or read before at least one of transmission or reception of the SPDM message is started. For example, a functional register related to the secure boot may be read. At least one SPDM message of a GET_VERSION request message, a VERSION response message, a GET_CAPABILITIES request message, a CAPABILITIES response message, a NEGOTIATE_ALGORITHMS request message, an ALGORITHMS response message, the KEY_EXCHANGE request message, the KEY_EXCHANGE_RSP response message, a FINISH request message, a FINISH_RSP response message, the PSK_EXCHANGE request message, the PSK_EXCHANGE_RSP response message, a PSK_FINISH request message, a PSK_FINISH_RSP response message, a RESPOND IF READY request message, or an ERROR response message may be transmitted or received. Another SPDM message (request message and response message) to be selected depending on at least one of the GET_CAPABILITIES request message, the CAPABILITIES response message, or a CAPABILITIES-related register (or memory) may be transmitted or received.

The SPDM (SPDM Session) over ESS CCI may execute at least one of unidirectional authentication or bidirectional authentication (mutual authentication) between two or more components in the communication system until establishment of Application phase to be protected by a session key derived from Data Secrets. In the Application phase, a portion or all of Capabilities register (a functional register storing supporting functional information) of at least one of the ESS CCI, the SEP, or the FSED, a portion or all of the SA_CONFIG register (a configuration register storing the Service Association configuration information), or a portion or all of the CTRL_CONFIG register (a configuration register storing the control configuration information) may be read or written.

At least one of the Capabilities register, the SA_CONFIG register, or the CTRL_CONFIG register may be directed to a security application or a functional safety application. That is, at least one of the Capabilities register, the SA_CONFIG register, or the CTRL_CONFIG register may be at least one of a security Capabilities register, a security SA_CONFIG register, a security CTRL_CONFIG register, a functional safety Capabilities register, a functional safety SA_CONFIG register, or a functional safety CTRL_CONFIG register.

The start command commanding the start of the image data communication of at least one of the SEP or the FSED may be transmitted or received via at least one of the ESS CCI mode 1 or 2, or may be written into the ESS CCI register. In the communication system, at least one of the SEP or the FSED may be omitted, or may be configured only by the ESS CCI.

The algorithm to be applied to at least one of the ESS CCI mode 0, the ESS CCI mode 1, the ESS CCI mode 2, the SEP, or the FSED may be a single algorithm of at least one of CRC-40 (40-bit CRC), CRC-32 (32-bit CRC), CRC-16 (16-bit CRC), CRC-8 (8-bit CRC), SHA-2 (Secure Hash Algorithm), SHA-3, HMAC (Hash-based MAC), AES (Advanced Encryption Standard)-CMAC (Cipher-based MAC), AES-GMAC (Galois MAC), AES-CBC (Cipher Block Chaining), AES-CTR (Counter), or AES-GCM (Galois/Counter Mode), or a combined algorithm thereof.

Figure 39:
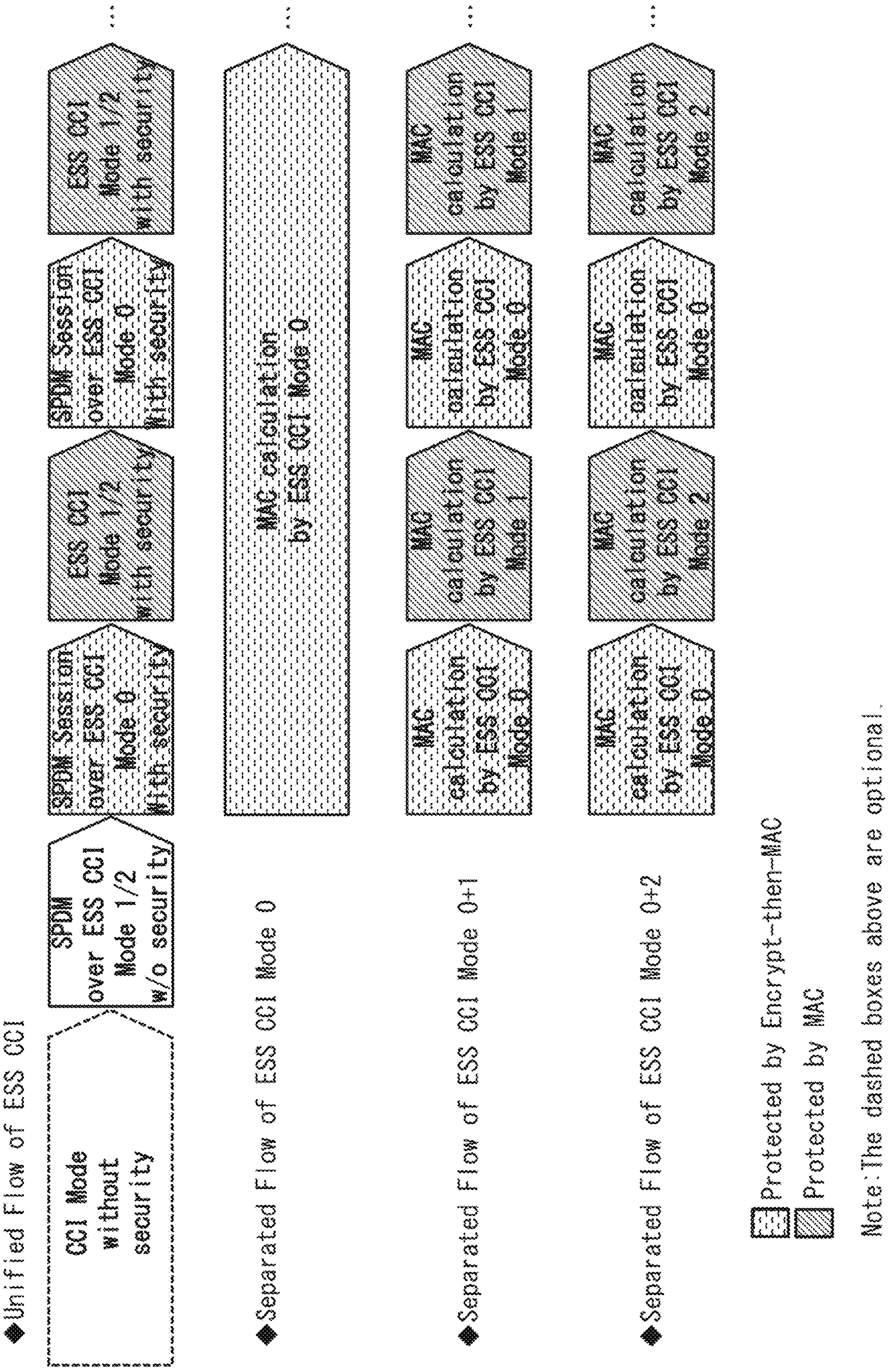
FIG. 39 is an explanatory diagram of an example of a flow of processing of the ESS CCI.

FIG. 39 is a diagram illustrating an example of a flow of processing of the ESS CCI. FIG. 39 in the upper part illustrates Unified Flow as a flowchart example exemplifying a flow in a case of corresponding to at least one of the CCI mode, the ESS CCI mode 0, the ESS CCI mode 1, or the ESS CCI mode 2. In addition, FIG. 39 in the middle part and the lower part illustrates Separated Flow as a flowchart example exemplifying the flow of the CRC arithmetic operation, the MAC arithmetic operation, and the encryption arithmetic operation (including decryption arithmetic operation). As exemplified in FIG. 39, the protection by the CRC exemplified in FIGS. 7 and 8 may be omitted.

As exemplified in FIGS. 7, 8, and 39, the ESS CCI may be started in the ESS CCI mode of at least one of the CCI mode, the ESS CCI mode 1, or the ESS CCI mode 2. The CCI mode may be the ESS CCI mode in which the WMC, the WMAC, the WCRC, the RMC, the RMAC, and the RCRC are not calculated and in which the write tag and the read tag are neither transmitted nor received. The ESS CCI mode 1 may be the ESS CCI mode in which: at least one of the WMC, the WMAC, the WCRC, the RMC, the RMAC, or the RCRC is calculated; at least one of the CRC value and the MAC value for at least a portion of the write message is calculated; the write tag is transmitted or received for each one or more (one or at least one of a plurality of) write transactions; and the read tag is received or transmitted for each one or more (one or at least one of a plurality of) read transactions. The ESS CCI mode 2 may be the ESS CCI mode in which: at least one of the WMC, the WMAC, the WCRC, the RMC, the RMAC, or the RCRC is calculated; and at least one of the write tag or the read tag is stored, for transmission or reception, in the embedded data in a frame to be transmitted or received by the image data communication. After the CCI mode is started, the ESS CCI mode 1 may be started, or the ESS CCI mode 2 may be started.

FIGS. 40A, 40B, and 40C are each an explanatory diagram of a format example of Secure Boot Capabilities Registers. The functional register related to a secure boot may be read before the SPDM message is started to be transmitted or received. For example, at least one piece of information of the following three pieces of information may be stored in the functional register of the image sensor 1200, or may be read from the functional register of the image sensor 1200 to the application processor 1100.

- Information indicating a selectable secure boot mode (SecureBootMode)
- Information indicating a selectable encryption algorithm in a case of using a session key (at least a portion of the write SPDM session key and the read SPDM session key) derived from the DHE secret (DHEbasedAlgorithm)
- Information indicating a selectable encryption algorithm in a case of using a session key (at least a portion of the write SPDM session key and the read SPDM session key) derived from the PSK (PSKbasedAlgorithm)

FIG. 41 is a diagram illustrating an example of a packet configuration of write data. A value of the WMC (C. WMC) counted on a controller side may be written into a target-side WMC (T. WMC) register. A value of the WCRC (C. WCRC) calculated on the controller side may be written into a target-side WCRC (T. WCRC) register. Write commands (WRITE Tag) of these C. WMC and C. WCRC may be executed subsequent to the write command of one or more (one or at least one of a plurality of) write messages (WRITE Message).

The T. WMC and the C. WMC may be counted (e.g., incremented) for each STOP condition for the write command. As for the T. WCRC and the C. WCRC, the CRC may be calculated by targeting at least a portion of the write tag and at least a portion of one or more write messages. FIG. 41 illustrates an example of a CRC arithmetic operation target. A write command of a target-side optional register may be executed before or after a write command of a target-side WSPDM (T. WSPDM) register.

FIG. 42 is a diagram illustrating an example of a packet configuration of read data. A value of the RMC (T. RMC) counted on a target side may be read from a target-side RMC (T. RMC) register. A value of the RCRC (T. RCRC) calculated on the target side may be read from a target-side RCRC (T. RCRC) register. Read commands (READ Tag) of these T. RMC and T. RCRC may be executed subsequent to the read command of one or more (one or at least one of a plurality of) read messages (READ Message) and the read data (read response).

The T. RMC and C. RMC (RMC counted on the controller side) may be counted (e.g., incremented) for each STOP condition for the read command. As for the T. RCRC and the C. RCRC (CRC counted on the controller side), the CRC may be calculated by targeting at least a portion of the read tag and at least a portion of one or more read messages. FIG. 42 illustrates an example of a CRC arithmetic operation target. A read command of the target-side optional register may be executed before or after a read command of a target-side RSPDM (T. RSPDM) register.

FIG. 43 is a diagram illustrating an example of the MAC target region to be protected by the SPDM-finished key. FIG. 43 illustrates an example in which the PSKHint is configured only by the vendor-defined PSKHint and in which the OpaqueData is configured only by the vendor-defined OpaqueData. It is to be noted that, although FIG. 43 illustrates an example of providing an AlignPadding region, a configuration may also be adopted in which the SPDM message (e.g., at least one of the KEY_EXCHANGE request message, the PSK_EXCHANGE request message, the KEY_EXCHANGE_RSP response message, and the PSK_EXCHANGE_RSP response message) is an integral multiple of four bytes, by adjusting a byte length (byte size) of at least one of a RequesterContext region or the ResponderContext region, instead of the AlignPadding region (without providing the AlignPadding region).

The PSKHint region transmitted from the SPDM requester to the SPDM responder may include information by which the type of PSK hint is specified. In that case, there is an effect of being able to apply various types of PSK hints between the SPDM requester and the SPDM responder.

The OpaqueData region to be transmitted from the SPDM requester to the SPDM responder may store information (Algorithm) that specifies, from the SPDM requester to the SPDM responder, at least one type of a key schedule algorithm or an encryption algorithm to be applied to protect the SPDM session. In that case, there is an effect of being able to specify at least one of the key schedule algorithm or the encryption algorithm to be applied to protect the SPDM session while minimizing an amount of information to be stored in the SPDM message. That is, the encryption algorithm and the key schedule algorithm may be specified depending on the NEGOTIATE_ALGORITHMS request message and the ALGORITHMS response message; however, there is an effect of being able to omit the NEGOTIATE_ALGORITHMS request message and the ALGORITHMS response message.

The OpaqueData region transmitted from the SPDM responder to the SPDM requester may store at least one of the following three pieces of data. In that case, there is an effect of being able to omit the VENDOR_DEFINED_RESPONSE response message and the VENDOR_DEFINED_REQUEST request message to read (Read) at least one of a portion or all of the Capabilities register of at least one of the ESS CCI, the SEP, or the FSED, a portion or all of the SA_CONFIG register, or a portion or all of the CTRL_CONFIG register.

A portion or all of the Capabilities register (a functional register storing supporting functional information) of at least one of the ESS CCI, the SEP, or the FSED A portion or all of the SA_CONFIG register (a configuration register storing the Service Association configuration information)

A portion or all of the CTRL_CONFIG register (a configuration register storing the control configuration information)

FIG. 44 is a diagram illustrating a format example of the OpaqueData region in the request messages of the KEY_EXCHANGE and the PSK_EXCHANGE. FIG. 44 illustrates a format example for the OpaqueData region of at least one of the KEY_EXCHANGE request message and the PSK_EXCHANGE request message. FIG. 45 is an explanatory flowchart of an example of a flow of selection of a key schedule.

In a case where the SPDM requester 1120 and the SPDM responder 1220 select key schedule 1 (step S208), there is an effect of omitting the OpaqueData region to be transmitted from the SPDM requester to the SPDM responder while omitting the NEGOTIATE_ALGORITHMS request message and the ALGORITHMS response message. That is, in a case where the key schedule 1 (e.g., a vendor-defined AES-based key schedule) is set as a standard key schedule, there is an effect of being able to minimize an amount of information to be stored in the SPDM message. FIGS. 46A, 46B, and 46C each illustrate a format example of the OpaqueData region in the response messages of the KEY_EXCHANGE_RSP and the PSK_EXCHANGE_RSP (for the OpaqueData region of at least one of the KEY_EXCHANGE_RSP response message or the PSK_EXCHANGE_RSP response message). In addition, FIG. 47 illustrates a format example of the PSKHint region in the request message of the PSK_EXCHANGE.

It is to be noted that a portion or all of the content described as the OpaqueData region of at least one of the KEY_EXCHANGE_RSP response message or the PSK_EXCHANGE_RSP response message may be stored in the OpaqueData region of at least one of the KEY_EXCHANGE request message or the PSK_EXCHANGE request message. For example, Flags region described as at least one of the KEY_EXCHANGE_RSP response message or the PSK_EXCHANGE_RSP response message may be stored in the OpaqueData region of at least one of the KEY_EXCHANGE request message or the PSK_EXCHANGE request message. In that case, it is possible for the SPDM requester to instruct the SPDM responder (e.g., it is possible for the application processor 1100 to instruct the image sensor 1200) on a configuration of the OpaqueData region of at least one of the KEY_EXCHANGE_RSP response message or the PSK_EXCHANGE_RSP response message, and thus there is an effect of being able to appropriately configure the OpaqueData region necessary for the SPDM requester (e.g., being able to change the configuration of the OpaqueData region as needed).

Figure 48:
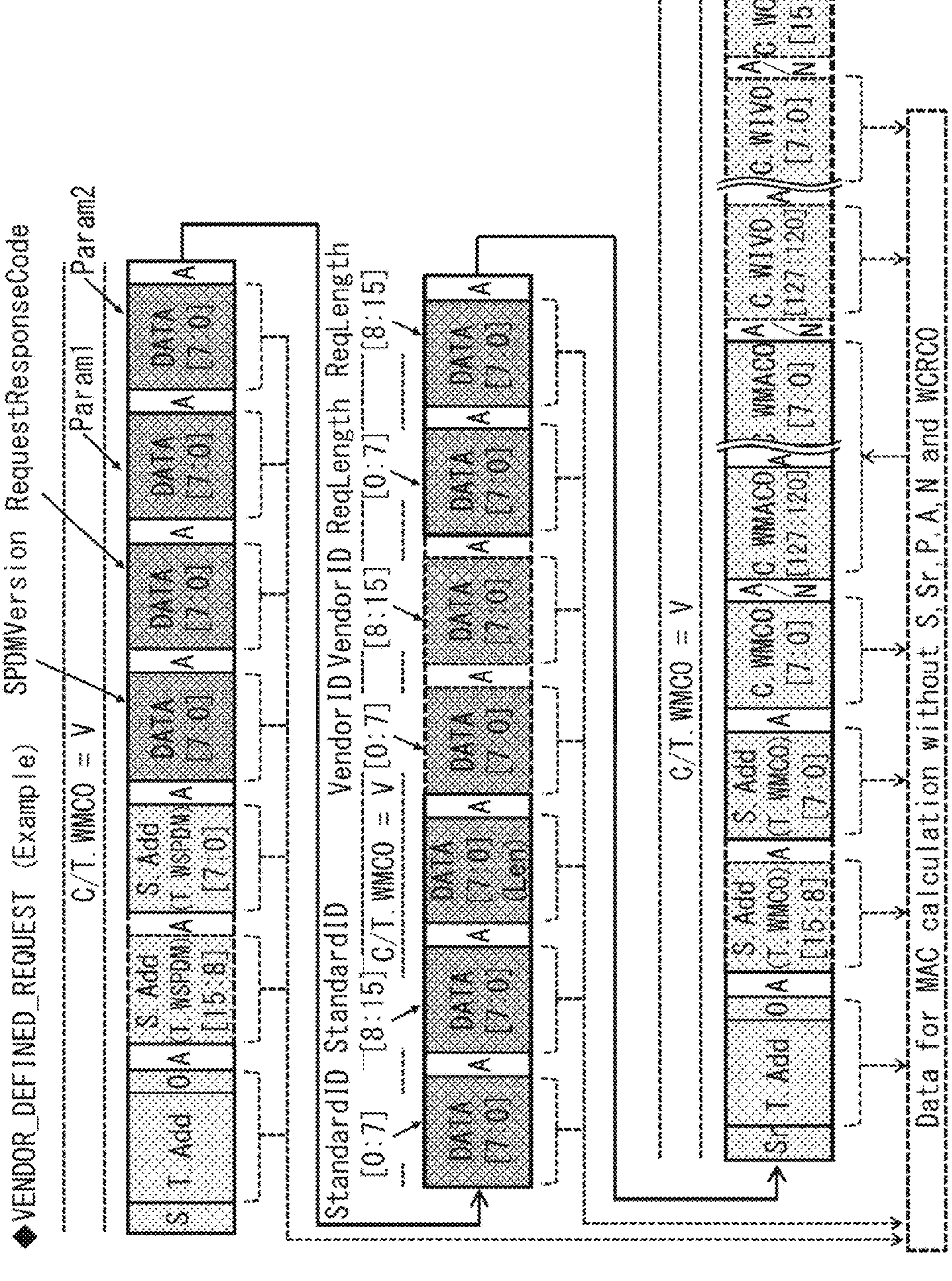
FIG. 48 is a diagram illustrating an example of a packet configuration of write data.
Figure 49:
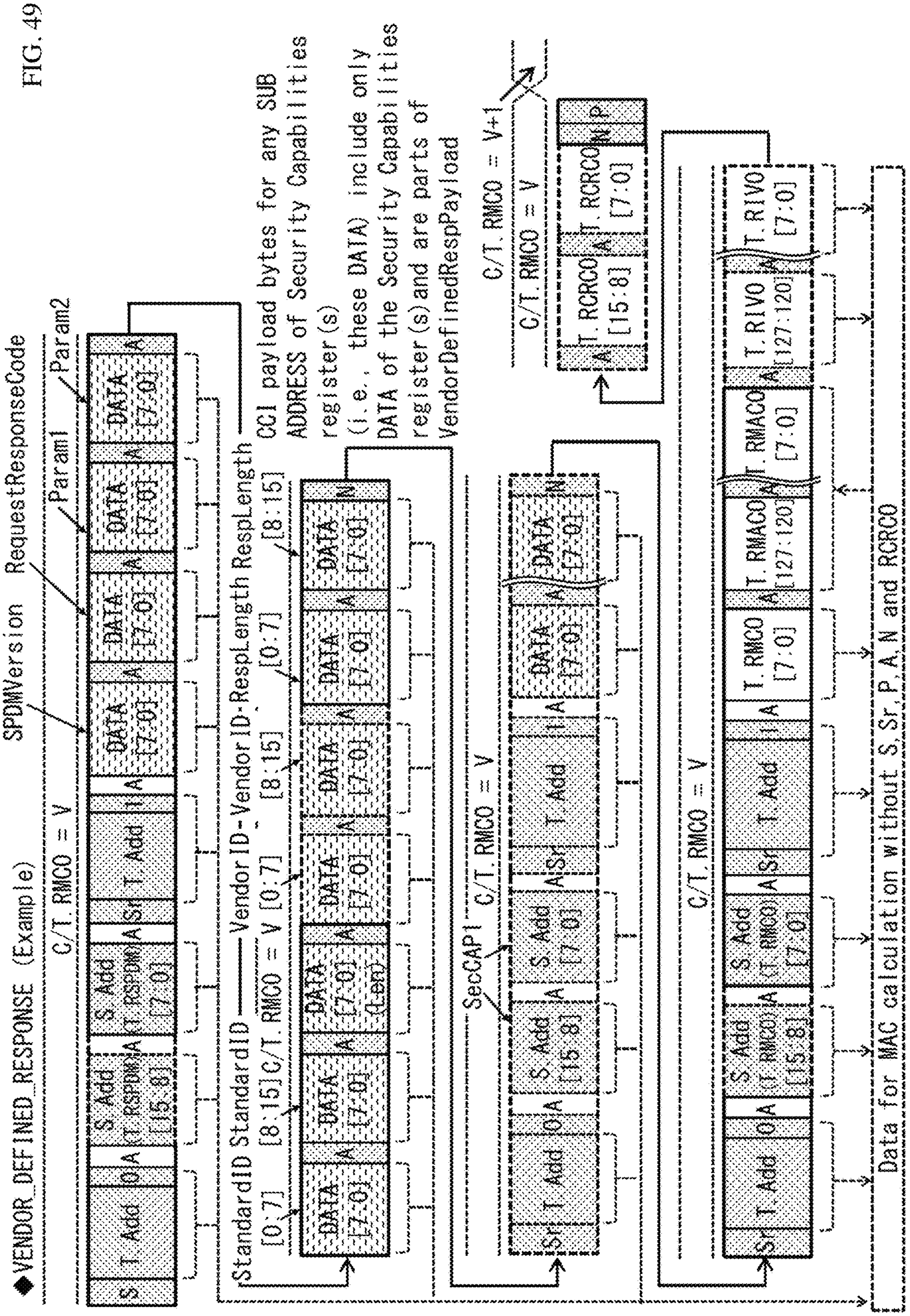
FIG. 49 is a diagram illustrating an example of a packet configuration of read data.

FIG. 48 is a diagram illustrating an example of a packet configuration of write data. FIG. 49 is a diagram illustrating an example of a packet configuration of read data. The target-side RSPDM (T. RSPDM) register may store a portion of the VENDOR_DEFINED_RESPONSE response message that complies with the SPDM standard (DSP0274) of the DMTF, and a portion or all of the remainder of the VENDOR_DEFINED_RESPONSE response message may be stored in the read data (read response) of the read command. In that case, there is an effect of being able to read (Read) from a register by freely specifying a predetermined register while satisfying the requirement of the VENDOR_DEFINED_RESPONSE response message. Specifically, there is an effect of being able to specify sub addresses (register addresses) that differ between the first line and the third line in FIG. 49. In that case, it is desirable for all pieces of read data (read response) of read messages excluding the read tag to be encrypted.

FIG. 50 is a diagram illustrating a format example of the request message of the VENDOR_DEFINED_REQUEST. FIG. 51 is a diagram illustrating a format example of the response message of the VENDOR_DEFINED_RESPONSE. FIGS. 50 and 51 illustrate respective format examples for the VENDOR_DEFINED_REQUEST request message and the VENDOR_DEFINED_RESPONSE response message of the read transaction.

The VendorDefinedRespPayload region of the VENDOR_DEFINED_RESPONSE response message may store at least one of the following three pieces of data.

A portion or all of the Capabilities register (a functional register storing supporting functional information) for at least one of the ESS CCI, the SEP, or the FSED A portion or all of the SA_CONFIG register (a configuration register storing the Service Association configuration information)

A portion or all of the CTRL_CONFIG register (a configuration register storing the control configuration information)

A portion or all of (a register of) the session key

The VENDOR_DEFINED_REQUEST request message may store information indicating that a read transaction is to be started. The information indicating that the read transaction is to be started may be stored in a ReqLength region of the VENDOR_DEFINED_REQUEST request message, may be stored in the VendorDefinedReqPayload region of the VENDOR_DEFINED_REQUEST request message, or may be stored in the SACP message described later. The VENDOR_DEFINED_REQUEST request message may be omitted.

Figure 52:
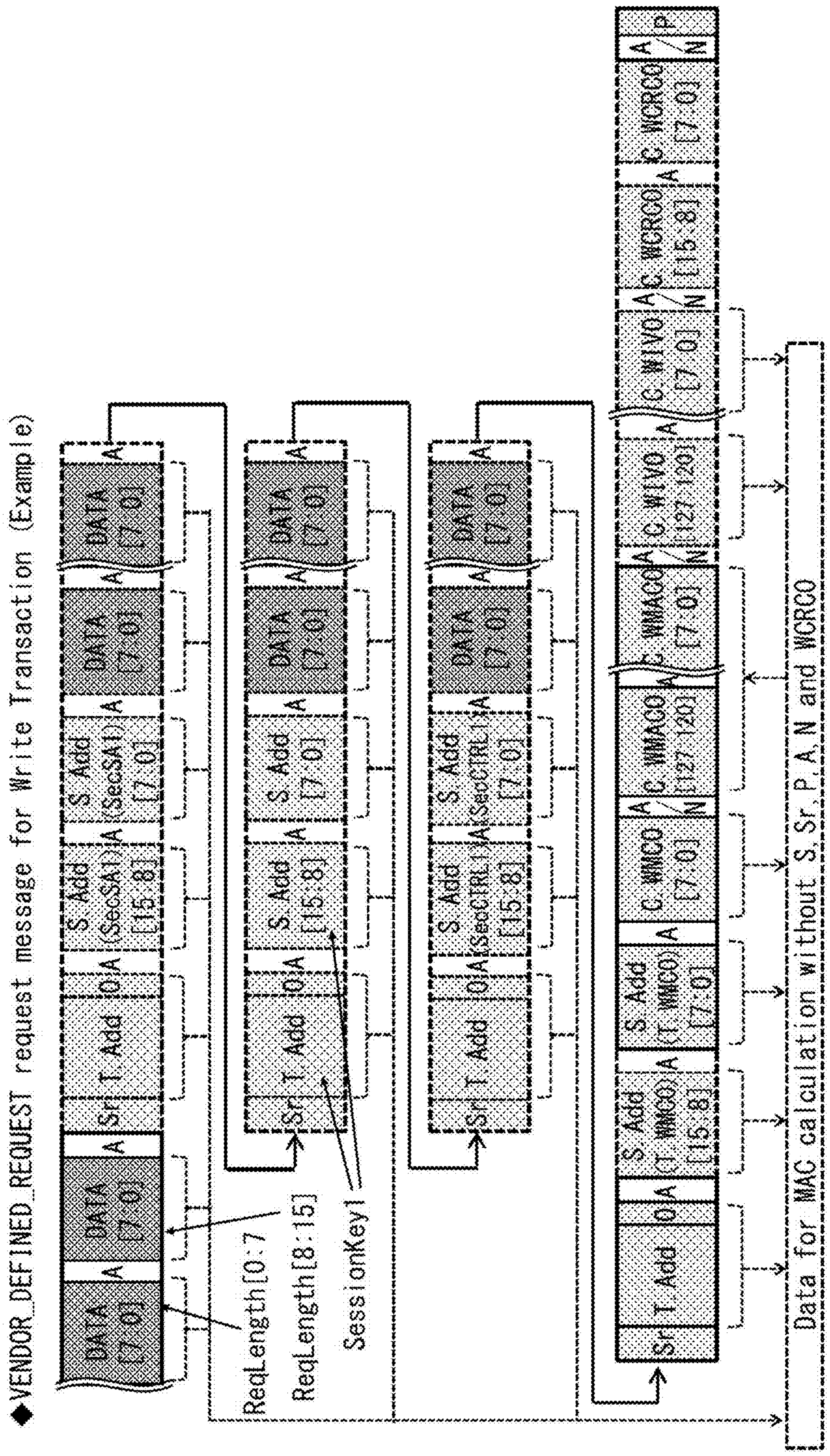
FIG. 52 is a diagram illustrating an example of a packet configuration of write data.

FIG. 52 is a diagram illustrating an example of a packet configuration of write data. The target-side WSPDM (T. WSPDM) register may store a portion of the VENDOR_DEFINED_REQUEST request message that complies with the SPDM standard (DSP0274) of the DMTF, and a portion or all of the remainder of the VENDOR_DEFINED_REQUEST request message may be stored in the write data of the write command. In that case, there is an effect of being able to write (Write) into a register by freely specifying a predetermined register while satisfying the requirement of the VENDR_DEFINED_REQUEST request message. Specifically, there is an effect of being able to specify sub addresses (register addresses) that differ between the first line in FIG. 48 and the first to third lines in FIG. 52. In that case, it is desirable for all pieces of write data of write messages excluding the write tag to be encrypted.

Figure 53:
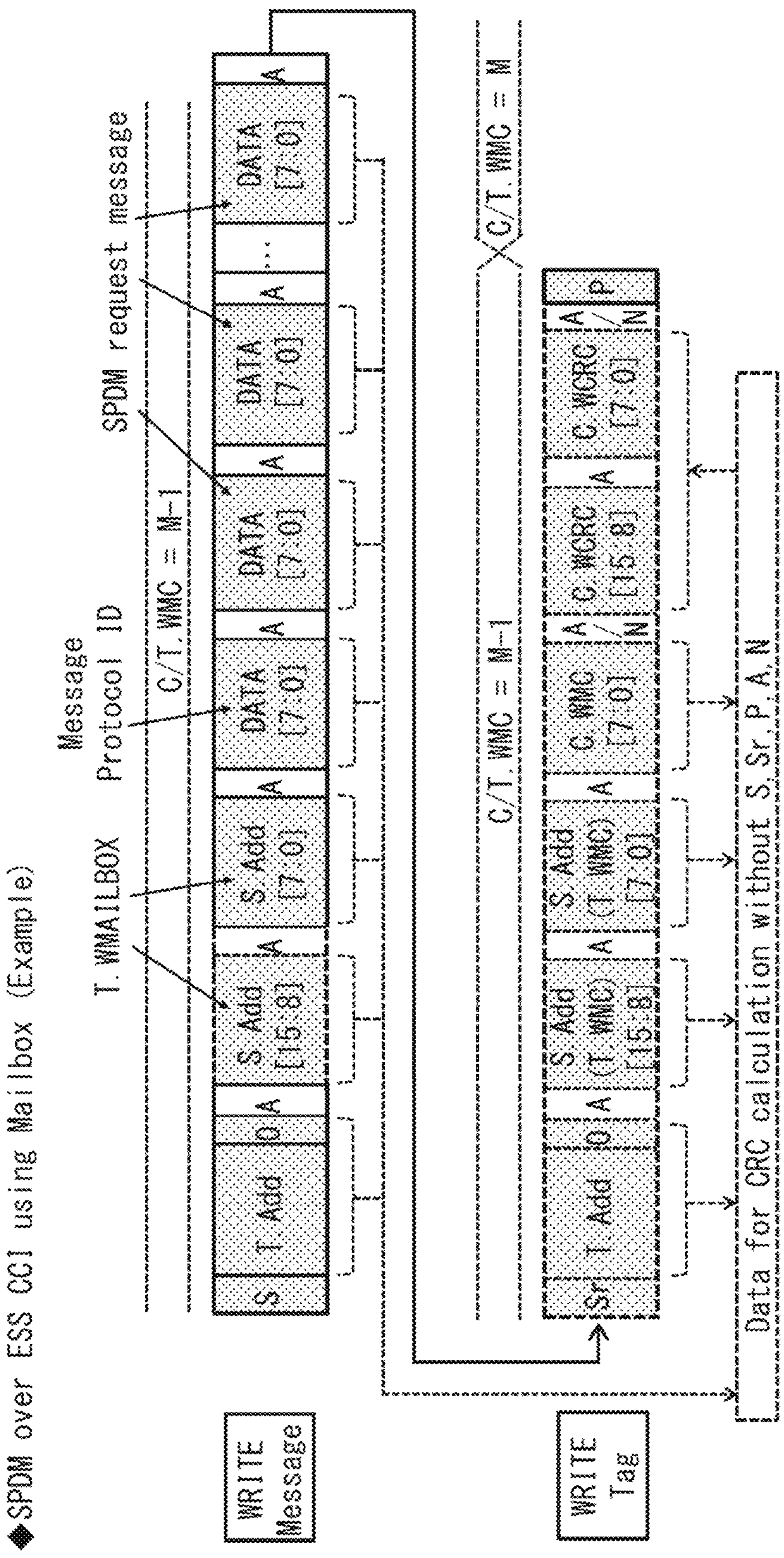
FIG. 53 is a diagram illustrating an example of a packet configuration of write data.
Figure 54:
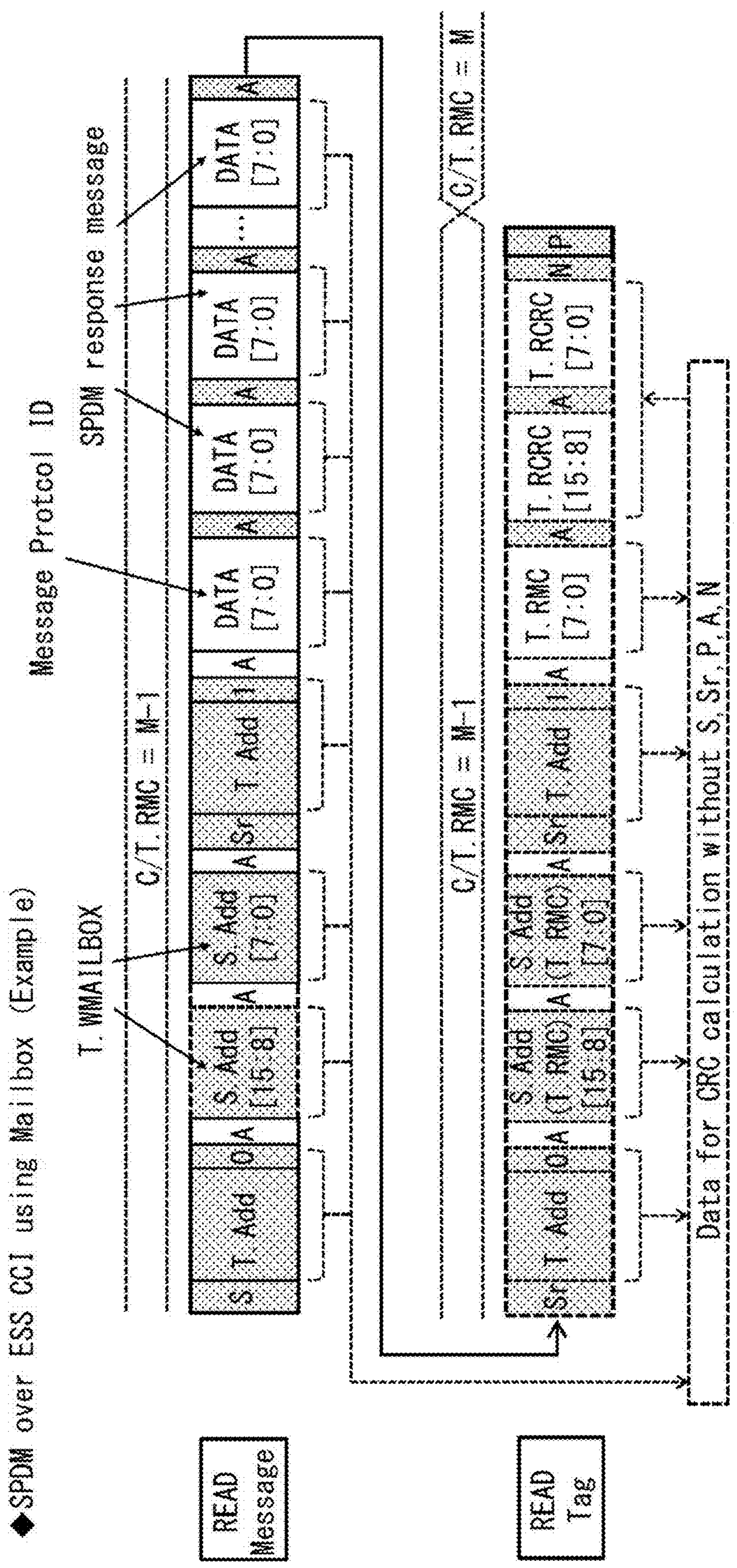
FIG. 54 is a diagram illustrating an example of a packet configuration of read data.

FIG. 53 is a diagram illustrating an example of a packet configuration of write data. FIG. 54 is a diagram illustrating an example of a packet configuration of read data. FIG. 55 is a diagram illustrating a format example of a Message Protocol region.

The SPDM register may be replaced by a MAILBOX register that is also usable in a protocol other than SPDM (Session) over ESS CCI. That is, the target-side WSPDM (T. WSPDM) register may be replaced by a WMAILBOX (T. WMAILBOX) register of a target-side write mailbox. Further, the target-side RSPDM (T. RSPDM) register may be replaced by a RMAILBOX (T. RMAILBOX) of a target-side read mailbox.

In that case, a register is able to be shared among a plurality of protocols, and thus there is an effect of making the register arrangement efficient (save registers). In that case, for example, a Message Protocol ID region may be inserted between the sub address and the SPDM request message and between the target address and the SPDM response message. The Message Protocol ID region may store information as to which at least one protocol of options including the SPDM over ESS CCI, the SPDM Session over ESS CCI, SPDM over DSP0277, and SPDM Session over DSP0277 is indicated.

Figure 56:
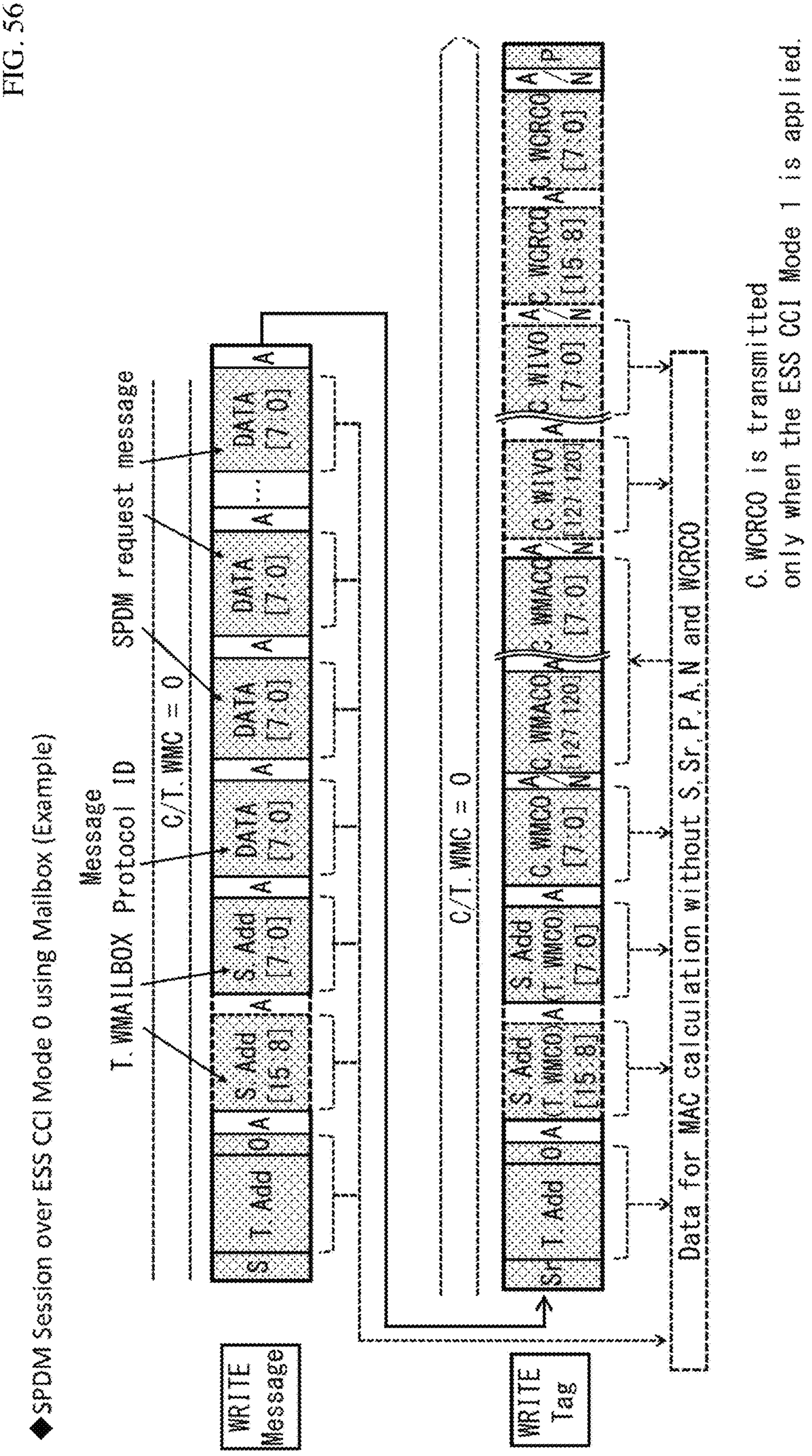
FIG. 56 is a diagram illustrating an example of a packet configuration of write data.
Figure 57:
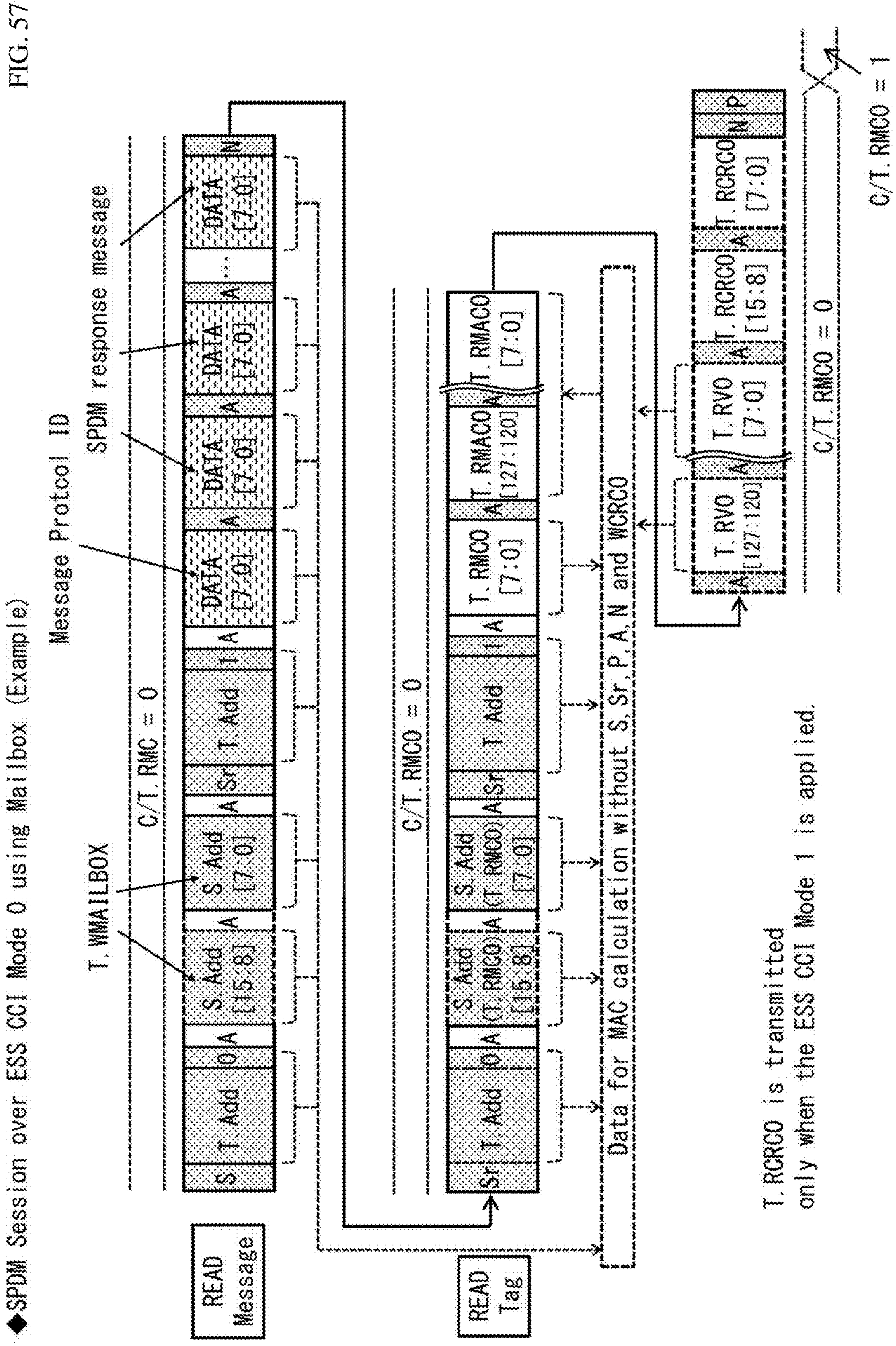
FIG. 57 is a diagram illustrating an example of a packet configuration of read data.

FIG. 56 is a diagram illustrating an example of a packet configuration of write data. FIG. 57 is a diagram illustrating an example of a packet configuration of read data. The Message Protocol ID region may store information as to which of time before establishment of the SPDM session (e.g., the SPDM over ESS CCI) or time after establishment of the SPDM session (e.g., the SPDM Session over ESS CCI) of at least one of the SPDM Session Handshake Phase or the SPDM Application Phase is indicated. In that case, an extra-SPDM session GET_VERSION request message is transmitted or received during the SPDM session in some cases, and thus there is an effect of being able to distinguish between the SPDM message before the establishment of the SPDM session or the SPDM message after the establishment of the SPDM session. In that case, encryption is applied to the SPDM message after the establishment of the SPDM session, while encryption is not applied to the SPDM message before the establishment of the SPDM session. It is therefore desirable for the Message Protocol ID region not to be encrypted.

Figure 58:
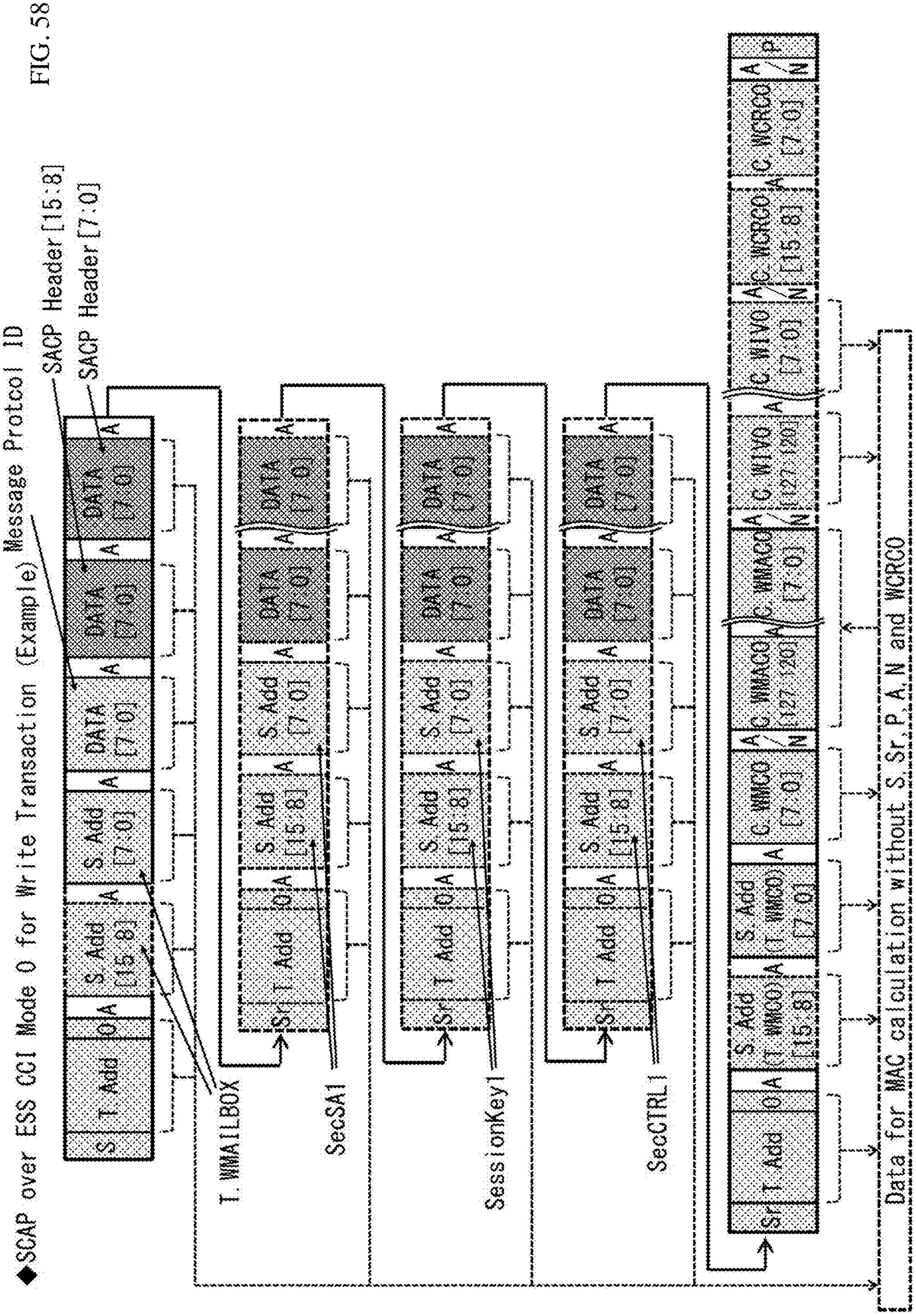
FIG. 58 is a diagram illustrating an example of a packet configuration of write data.
Figure 59:
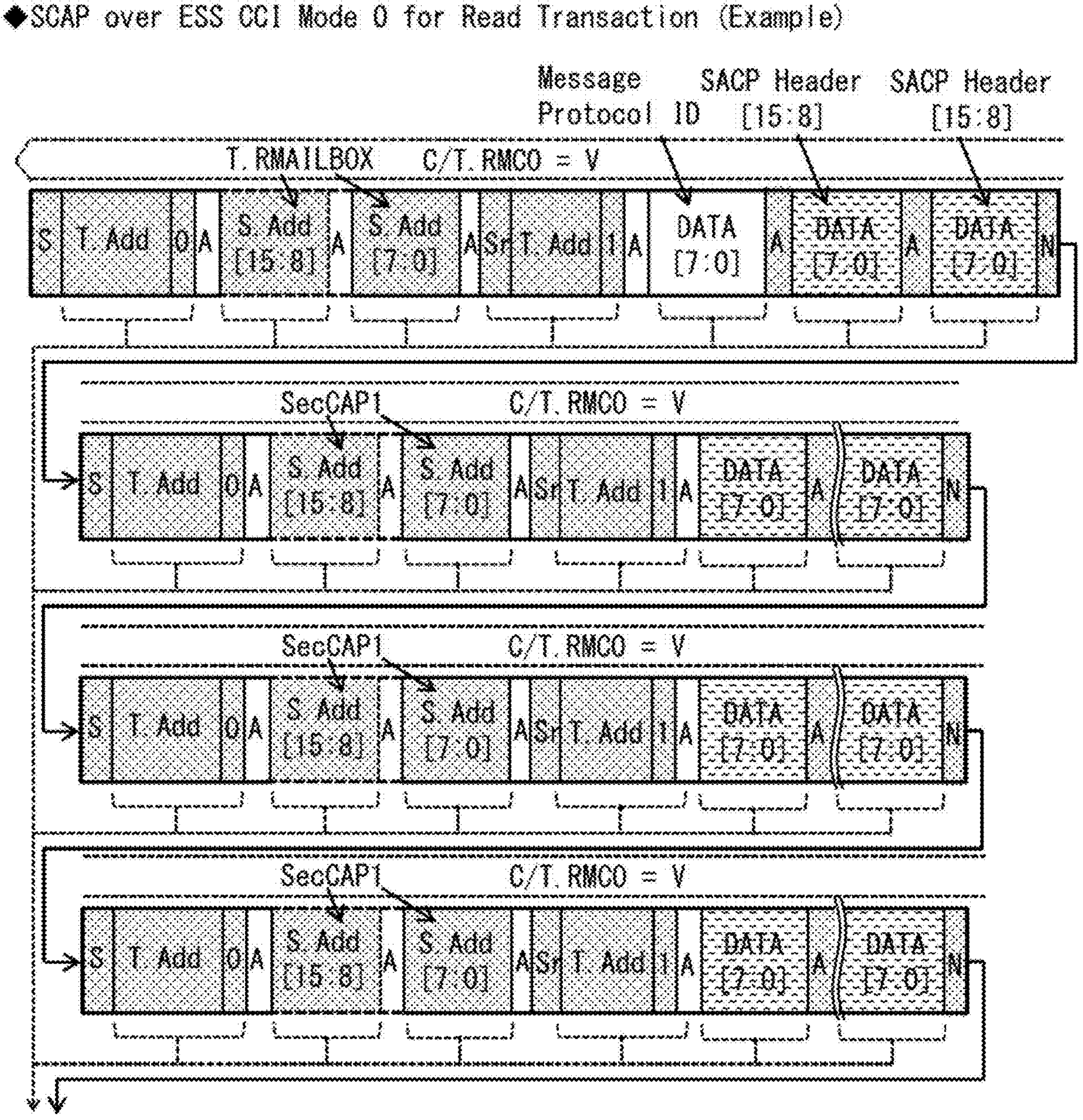
FIG. 59 is a diagram illustrating a format example of the Message Protocol region.

FIG. 58 is a diagram illustrating an example of a packet configuration of write data. FIG. 59 is a diagram illustrating a format example of the Message Protocol region. For example, in a case where SACP (Service Association Configuration Protocol) is defined as a protocol different from the SPDM and the SACP message is transmitted or received, the Message Protocol ID region may store information as to which at least one protocol of options including the SPDM over ESS CCI, the SPDM Session over ESS CCI, and SACP over ESS CCI is indicated.

FIG. 58 illustrates a configuration example of a write transaction in the SACP over ESS CCI. In a case of defining the SACP, the VENDOR_DEFINED_REQUEST request message need not be used; it is sufficient for the WMAILBOX (T. WMAILBOX) register of the target-side write mailbox to store the Message Protocol ID region that is not encrypted and a SACP header region that is encrypted. Therefore, there is an effect of minimized overhead in a case where a message not defined by the SPDM standard is transmitted or received via the ESS CCI mode 0. However, in a case where certain restriction is provided, the Message Protocol ID region may be encrypted. In that case, all pieces of write data are encrypted, thus there is an effect of improved confidentiality.

Figure 60:
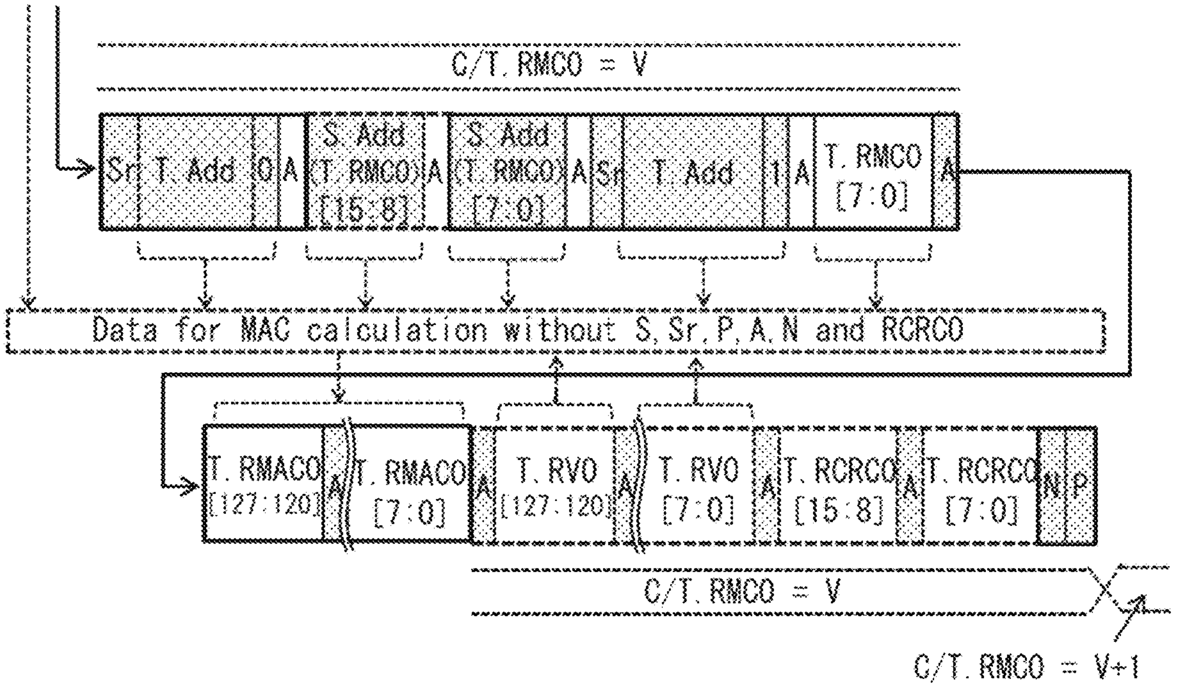
FIG. 60A is a diagram illustrating an example of a packet configuration of read data.
FIG. 60B is a diagram illustrating an example of a packet configuration of read data.

FIG. 60A is a diagram illustrating an example of a packet configuration of read data. FIG. 60B is a diagram illustrating an example of a packet configuration of read data subsequent to FIG. 60A. FIGS. 60A and 60B each illustrate a configuration example of a read transaction in the SACP over ESS CCI. In a case of defining the SACP, the VENDOR_DEFINED_RESPONSE response message need not be used; it is sufficient for the RMAILBOX (T. RMAILBOX) register of the target-side read mailbox to store the Message Protocol ID region that is not encrypted and the SACP header region that is encrypted. Therefore, there is an effect of minimized overhead in a case where a message not defined by the SPDM standard is transmitted or received via the ESS CCI mode 0. However, in a case where certain restriction is provided, the Message Protocol ID region may be encrypted. In that case, all pieces of write data are encrypted, thus there is an effect of improved confidentiality.

It is to be noted that a portion of all of the write SPDM message-directed register WSPDM may be replaced by a write mailbox-directed register WMAILBOX, or a portion or all of the read SPDM message-directed register RSPDM may be replaced by a read mailbox-directed register RMAILBOX, and vice versa. In addition, a portion of all of the write SPDM message-directed register WSPDM may be replaced by a write SACP message-directed register WSACP, or a portion or all of the read SPDM message-directed register RSPDM may be replaced by a read SACP message-directed register RSACP, and vice versa. In addition, a portion or all of the write mailbox-directed register WMAILBOX may be replaced by the write SACP message-directed register WSACP, or a portion or all of the read mailbox-directed register RMAILBOX may be replaced by the read SACP message-directed register RSACP, and vice versa. In addition, at least one expression of these registers may be replaced by a register of another expression. For example, the mailbox-directed register may be replaced by a general-purpose register or a general-purpose message-directed register.

In addition, a portion or all of the description of the SPDM Session over ESS CCI may be replaced by the SACP over ESS CCI. In addition, the SPDM over ESS CCI may be replaced by the SPDM message over ESS CCI, the SPDM Session over ESS CCI may be replaced by SPDM message over SPDM Session over ESS CCI, or the SACP over ESS CCI may be replaced by SACP message over SPDM Session over ESS CCI. In addition, at least a portion of a portion or all of the VENDOR_DEFINED_REQUEST request message and a portion or all of the VENDOR_DEFINED_RESPONSE response message may be replaced by at least one of the SACP messages or a SACP register. In addition, at least a portion of the writing and the reading described as the VENDOR_DEFINED_REQUEST request message and the VENDOR_DEFINED_RESPONSE response message may be replaced by at least one of writing of the SACP message, reading of the SACP message, writing of the SACP register, and reading of the SACP message. That is, some or all of the expressions used in the present specification may be replaced by another expression.

A portion or all of the content described as at least one of the Secure Boot Mode 2 or the Secure Boot Mode 3 may be applied to Secure Boot Mode 1.

Incidentally, the one or the plurality of protection parts PRT protects at least a portion of the image data communication (first communication) in which a frame is transmitted or received cyclically. At least one of the register parts 1111 and 1212 or the one or the plurality of storage parts MEM may include a register of a frame counter that increments, for each frame, a frame count value transmitted or received via the image data communication (first communication). At this time, the frame may include first packet data configured by one piece of packet data and second packet data configured by a plurality of pieces of packet data. The one or the plurality of protection parts PRT may perform an arithmetic operation of a first MAC using at least the frame count value and a portion or all of the first packet data, and may perform an arithmetic operation of a second MAC using at least the frame count value and a portion or all of the second packet data. At least one of the first packet data or the second packet data may include abnormality notification information in a case where there is abnormality in at least one of the frame count value or the frame counter.

The protection part PRT of one of the inside of the image sensor or the inside of the SoC, or the protection part PRT of both of the inside of the image sensor and the inside of the SoC may include an additional frame counter that increments an additional frame count value every time the frame count value is reset to an initial value. At this time, the abnormality notification information is a frame count value, and may be set to a predetermined count value in a case where there is abnormality in at least one of the frame count value or the frame counter.

Here, the additional frame counter may increment the additional frame count value every time a predetermined count value is set. The one or the plurality of protection parts PRT may perform arithmetic operations of the first MAC and the second MAC using at least the additional frame count value.

In addition, in a case where the frame count value is not a predetermined count value, the first MAC may be transmitted or received; in a case where the frame count value is a predetermined count value, the first MAC may not be transmitted or received. Further, in a case where the frame count value is not a predetermined count value, the second MAC may be transmitted or received; in a case where the frame count value is a predetermined count value, the second MAC may not be transmitted or received.

The protection part PRT of one of the inside of the image sensor or the inside of the SoC, or the protection part PRT of both of the inside of the image sensor and the inside of the SoC may include a security-oriented message counter that increments a security-oriented message count value every time a predetermined condition is satisfied. At this time, the protection part PRT of one of the inside of the image sensor or the inside of the SoC, or the protection part PRT of both of the inside of the image sensor and the inside of the SoC may perform arithmetic operations of the first MAC and the second MAC using at least the security-oriented message count value. Different values may be used for the security-oriented message count values in the arithmetic operations of the first MAC and the second MAC. The security-oriented message count value may be reset to an initial value for each frame before the start of the arithmetic operation of the first MAC.

The protection part PRT of one of the inside of the image sensor or the inside of the SoC, or the protection part PRT of both of the inside of the image sensor and the inside of the SoC may include a security-oriented first counter and a security-oriented second counter that increment a security-oriented count value every time a predetermined condition is satisfied. At this time, a security-oriented count value may be used to protect the image data communication (first communication) in the protection part PRT of one of the inside of the image sensor or the inside of the SoC, or in the protection part PRT of both of the inside of the image sensor and the inside of the SoC. The security-oriented count value may be set depending on a result of comparison by a plurality of security-oriented counters including the security-oriented first counter and the security-oriented second counter.

The protection part PRT of one of the inside of the image sensor or the inside of the SoC, or the protection part PRT of both of the inside of the image sensor and the inside of the SoC may include a functional safety-oriented message counter that increments a functional safety-oriented message count value every time a predetermined condition is satisfied. At this time, in the image data communication (first communication), information indicating whether or not the functional safety-oriented message count value is reset to an initial value may be transmitted or received.

The protection part PRT of one of the inside of the image sensor or the inside of the SoC, or the protection part PRT of both of the inside of the image sensor and the inside of the SoC may include an additional frame counter that increments an additional frame count value every time the frame count value is reset to an initial value. At this time, in the image data communication (first communication), information indicating whether or not the additional frame count value needs to be reset to an initial value may be transmitted or received.

The protection part PRT of one of the inside of the image sensor or the inside of the SoC, or the protection part PRT of both of the inside of the image sensor and the inside of the SoC may include an additional frame counter that increments an additional frame count value every time the frame count value is reset to an initial value. At this time, the protection part PRT of one of the inside of the image sensor or the inside of the SoC, or the protection part PRT of both of the inside of the image sensor and the inside of the SoC may perform arithmetic operations of the first MAC and the second MAC using at least the additional frame count value and the first session key which is a portion or all of a first key group. In a case where the protection part PRT of one of the inside of the image sensor or the inside of the SoC, or the protection part PRT of both of the inside of the image sensor and the inside of the SoC further uses a second session key, which is a portion or all of a second key group, instead of the first session key, the additional frame count value may be reset to an initial value, and then the second session key may be started to be used to discard or update all of session keys of the first key group.

The protection part PRT of one of the inside of the image sensor or the inside of the SoC, or the protection part PRT of both of the inside of the image sensor and the inside of the SoC may include an additional frame counter that increments an additional frame count value every time the frame count value is reset to an initial value. At this time, the frame count value may be a frame number. The first packet data stores only the frame number, and may not store the additional frame count value. The second packet data may include at least the frame number.

The frame count value may be transmitted or received after an extended packet header for the first packet data is transmitted or received. At this time, the extended packet header may include a first extended packet header that is MAC target region data and a CRC target region, and a second extended packet header that is MAC non-target region data and CRC target region data. A portion or all of the second extended packet header may be transmitted or received after the first extended packet header and before the frame count value, while information indicating whether or not to be transmitted or received may be stored in the first extended packet header.

The first packet data may include the MAC target region data, the MAC non-target region data, and the first MAC. At this time, the first MAC may protect at least the MAC target region data. A portion or all of the MAC non-target region data is variable length data of which a byte size (data size) is set depending on information stored in the MAC target region data, and may be transmitted or received after the MAC target region data and before the first MAC.

The protection part PRT of one of the inside of the image sensor or the inside of the SoC, or the protection part PRT of both of the inside of the image sensor and the inside of the SoC may protect a portion or all of the control data communication (second communication) that uses at least a portion of the register group. At this time, in the control data communication (second communication), write data and a write MAC that protects at least the write data may be transmitted or received. In the image data communication (first communication), information indicating whether or not the write MAC has been successfully verified may be transmitted or received.

The protection part PRT of one of the inside of the image sensor or the inside of the SoC, or the protection part PRT of both of the inside of the image sensor and the inside of the SoC may protect a portion or all of the control data communication (second communication) that uses at least a portion of the register group. At this time, in the control data communication (second communication), write data and a write MAC that protects at least the write data may be transmitted or received, and at least a portion of a read tag including a read MAC that protects at least read data may be received or transmitted. The read tag may include information indicating whether or not the write MAC has been successfully verified.

The protection part PRT of one of the inside of the image sensor or the inside of the SoC, or the protection part PRT of both of the inside of the image sensor and the inside of the SoC may protect a portion or all of the control data communication (second communication) that uses at least a portion of the register group. At this time, in the control data communication (second communication), the write data which is at least a portion of a write message and at least a portion of a write tag including information to protect at least the write data may be transmitted or received. The write tag may include a write message count value incremented every time the write message satisfies a predetermined condition, and information as to which of the write message or the write tag is indicated.

The protection part PRT of one of the inside of the image sensor or the inside of the SoC, or the protection part PRT of both of the inside of the image sensor and the inside of the SoC may protect a portion or all of the control data communication (second communication) that uses at least a portion of the register group. At this time, in the control data communication (second communication), at least a portion of the read tag including the read MAC that protects at least the read data may be received or transmitted. The read MAC may protect a first read message count value included in the read tag and a second read message count value incremented every time the first read message count value satisfies a predetermined condition. The read tag may include information indicating whether or not the second read message count needs to be reset to an initial value.

The protection part PRT of one of the inside of the image sensor or the inside of the SoC, or the protection part PRT of both of the inside of the image sensor and the inside of the SoC may perform, using an initialization vector including a read pre-count value, an arithmetic operation of a ciphertext, in which a portion or all of the control data communication (second communication) is protected that uses at least a portion of the register group. In the control data communication (second communication), a target address by which a partner of the control data communication (second communication) is specified, a sub address by which a register in the target address is specified, and read data to be sequentially read or singly read from the sub address may be transmitted or received. The read data may be transmitted or received as a ciphertext. The read pre-count value may be incremented by one every time the read data is encrypted by one byte.

Next, description is given of a specific example of various types of processing in the communication system 1000.

Figure 61:
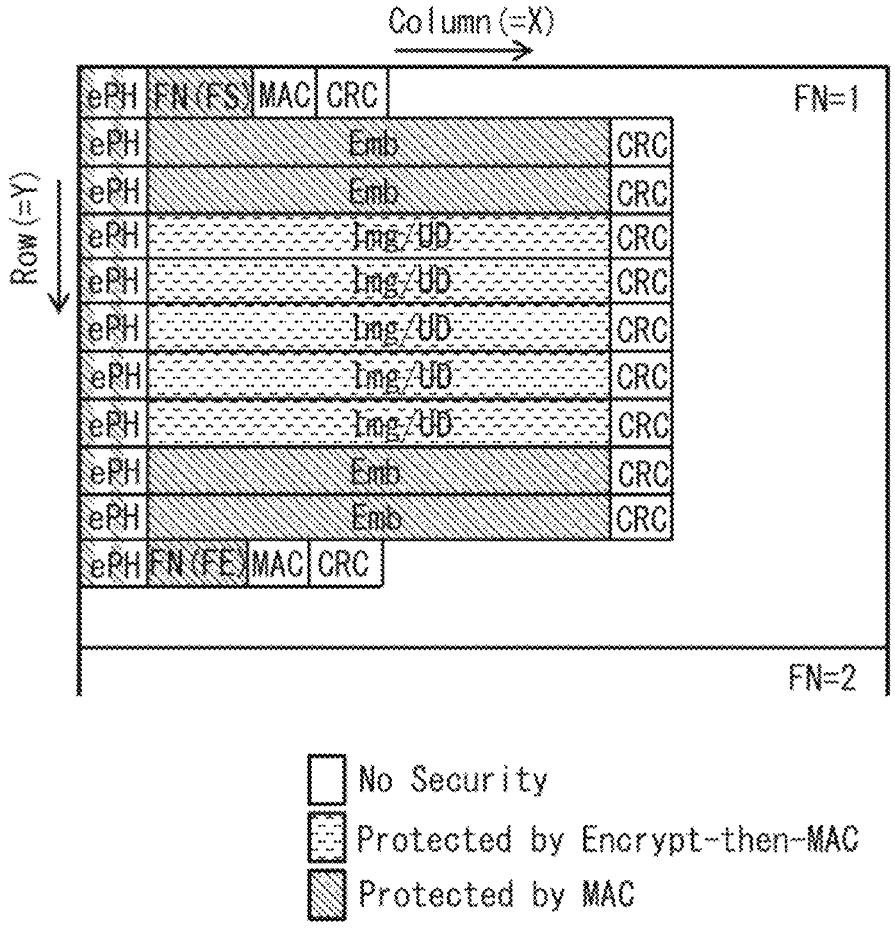
FIG. 61 is a diagram illustrating a frame configuration example of image data.

FIG. 61 is a diagram illustrating a frame configuration example of image data. FIG. 61 illustrates an example of an SEP frame configuration to which the extended packet configuration is applied, as an example of a frame configuration to be transmitted or received by the image data communication.

In a portion or all of at least the packet data (payload) in the image data communication, integrity (Integrity) by the message authentication code (MAC) may be protected as illustrated in FIG. 35, or confidentiality (Confidentiality) by encryption (and decryption) and integrity (Integrity) by the message authentication code (MAC) may be protected as illustrated in FIG. 61.

In a case where the confidentiality and the integrity are protected, protection thereof by the Encrypt-then-MAC (arithmetic operation of MAC for encrypted data) is desirable, but the method for the protection is not limited thereto. The MAC arithmetic operation by the AES-GMAC may be applied to protect the integrity, or the encryption arithmetic operation (or decryption arithmetic operation) by the AES-CTR may be applied to protect the confidentiality. In the MAC arithmetic operation by the AES-GMAC, it is desirable to use a session key and a 96-bit initialization vector to perform the MAC arithmetic operation; in the encryption arithmetic operation (or decryption arithmetic operation) by the AES-CTR, it is desirable to use a session key and a 128-bit initialization vector to perform the MAC arithmetic operation. However, this is not limitative.

Figure 62:
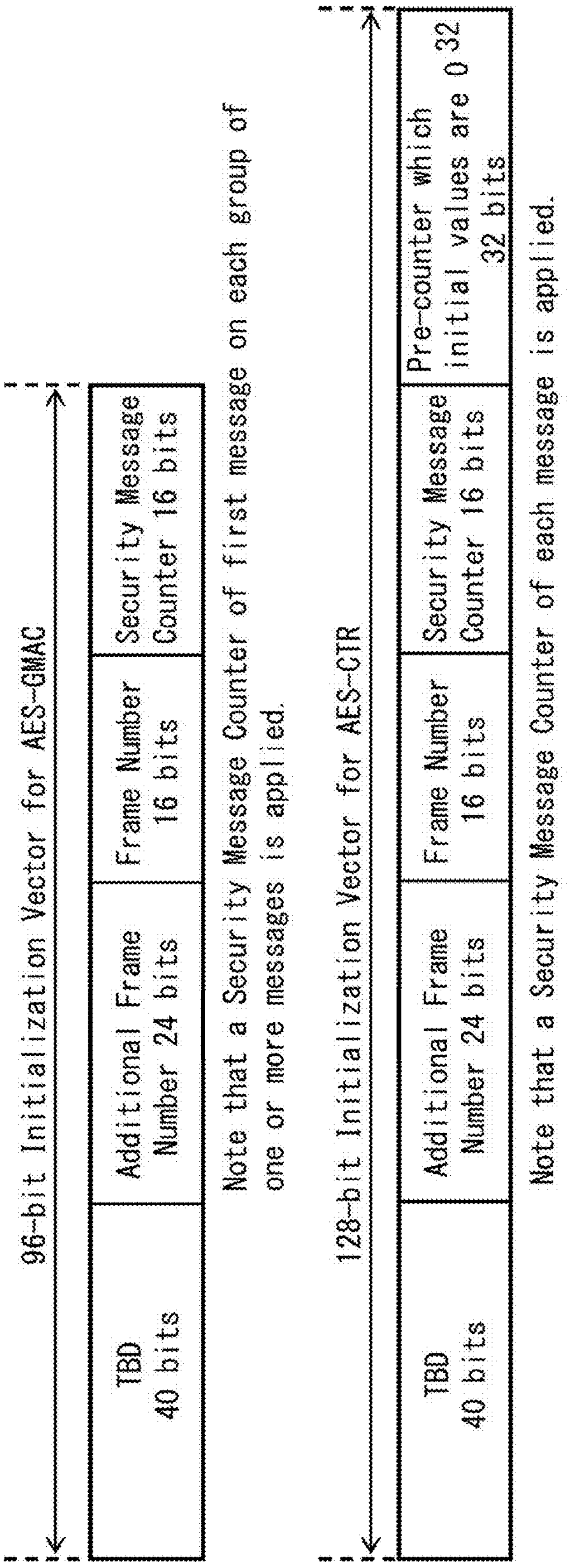
FIG. 62 is a diagram illustrating configuration examples of an AES-GMAC-oriented initialization vector and an AES-CTR-oriented initialization vector.

FIG. 62 illustrates configuration examples of an AES-GMAC-oriented initialization vector and an AES-CTR-oriented initialization vector. The initialization vector oriented for at least one of the AES-GMAC and the AES-CTR may include a security-oriented message count value (a value of the security-oriented message counter), a frame count value (a value of the frame counter), and an additional frame count value (a value of the additional frame counter). The frame count value may be referred to as a frame number. The frame number may be referred to as the frame count value. The additional frame count value may be referred to as the additional frame number. The additional frame number may be referred to as the additional frame count value. The frame count value and the frame number stored in the frame start and the frame end may be the same. That is, the frame counter of the frame count value and the frame counter of the frame number may be the same. In that case, the packet data (payload) of each of the frame start and the frame end is protected. The frame count value and the frame number may be different. That is, a first frame counter of the frame count value and a second frame counter of the frame number may be provided. In that case, there is no restriction on the frame number, which is the packet data (payload) of each of the frame start and the frame end, thus leading to a possibility that an optimum counter for a security application can be configured.

The AES-CTR-oriented initialization vector may include a pre-counter. The security-oriented message count value may be stored in the extended packet header, and may be transmitted from the image sensor to the SoC by the image data communication. The frame count value may be stored in each of the packet data (payload) of the frame start and the packet data (payload) of the frame end, and may be transmitted from the image sensor to the SoC by the image data communication. The additional frame count value may be stored in at least one of the extended packet header or the packet data (payload) of the embedded data, and may be transmitted from the image sensor to the SoC by the image data communication.

FIG. 63 is an explanatory diagram of an example of a countermeasure at the time when there is a failure in one of the frame count value, the additional frame count value, or the security-oriented message count value included in the initialization vector.

First, the image sensor may set the frame count value to an initial value (e.g., one), and may set the additional frame count value to an initial value (e.g., zero) (step S301). Subsequently, the image sensor may reset (reset) the security-oriented message counter (message count value) to an initial value (e.g., zero) cyclically (e.g., per frame) or non-cyclically between transmission or reception of the frame end and transmission or reception of the frame start (i.e., frame blanking period) (step S303). The image sensor may increment the security-oriented message counter (message count value) by one every time the encryption arithmetic operation is performed (step S307). In such a case, there is an effect of being able to safely reset (reset) the security-oriented message counter.

In a case where the frame count value exceeds a predetermined value in the image sensor (step S308; Y), the image sensor may overwrite (reset) the frame count value with a predetermined count value (e.g., one) (step S309). At this time, the image sensor may increment the additional frame count value by one, and may return to step S302 (step S310).

In a case where the next frame is continuously transmitted (step S311; Y), the image sensor may increment the frame count value by one (step S312). In a case where the next frame is not continuously transmitted (step S311; N), the image sensor may increment the frame count value by two (step S313).

In a case where the frame count value is not correctly incremented in the image sensor (step S314; N), the image sensor may overwrite (reset) the frame count value with a predetermined count value (e.g., zero) (step S315). At this time, the image sensor may increment the additional frame count value by one, and then may return to step S302 (step S316). When the frame count value is correctly incremented (step S314; Y), the image sensor may return to step S302 without incrementing the additional frame count value. In such a case, there is an effect of being able to notify, from the image sensor, the SoC of abnormality (e.g., inoperative) in the frame count value, via at least one of the frame start or the frame end, while maintaining uniqueness (i.e., safety) of the initialization vector.

The protection part PRT of one of the inside of the image sensor or the inside of the SoC, or the protection part PRT of both of the inside of the image sensor and the inside of the SoC may include a frame count value-oriented frame counter, an additional frame count value-oriented additional frame counter, and a security-oriented message count value-oriented security-oriented message counter. At this time, the protection part PRT of one of the inside of the image sensor or the inside of the SoC, or the protection part PRT of both of the inside of the image sensor and the inside of the SoC may increment the additional frame count value depending on the frame count value received from the protection part PRT of one of the inside of the image sensor or the inside of the SoC or from other blocks of both of the inside of the image sensor and the inside of the SoC (FIG. 64, steps S406 to S409). FIG. 64 illustrates an example in which the protection part PRT of one of the inside of the image sensor or the inside of the SoC, or the protection part PRT of both of the inside of the image sensor and the inside of the SoC increments the additional frame count value by one in a case where the frame count value is a predetermined count value (e.g., zero or one). It is to be noted that the protection part PRT of one of the inside of the image sensor or the inside of the SoC, or the protection part PRT of both of the inside of the image sensor and the inside of the SoC may increment the additional frame count value by one in a case where the frame count value is continuously a predetermined count value (e.g., zero).

FIG. 65 is an explanatory diagram of a modification example of the countermeasure at the time when there is a failure in one of the frame count value, the additional frame count value, or the security-oriented message count value included in the initialization vector.

In a case where the frame count value is a predetermined count value (e.g., zero) (step S503; Y), the image sensor may disable or finish the encryption arithmetic operation (step S504). In that case, it is desirable for the image sensor to store, in the extended packet header or the embedded data, information indicating whether or not the encryption arithmetic operation has been executed (disabled or finished) in order to notify the SoC of the disablement or the finish of the encryption arithmetic operation. The method of notifying the SoC of the disablement or the finish of the encryption arithmetic operation is not limited thereto. However, the forced termination of the image data communication due to the abnormality in the frame count value means that an output image (in particular, an image stream) of the image sensor suddenly disappears, which may be risky in a case where the image sensor is mounted on a propulsion apparatus. Therefore, it is desirable for the image sensor to disable or finish the encryption arithmetic operation while maintaining the image data communication (i.e., transmission or reception of image-system data). The method of avoiding the risk in a case where the image sensor is mounted on the propulsion apparatus is not limited thereto.

The image sensor may include the security-oriented first counter and the security-oriented second counter that increment a security-oriented count value every time a predetermined condition is satisfied. Here, the security-oriented count value is, for example, at least one of the message count value, the pre-count value, the frame count value, or the additional frame count value. The security-oriented first counter is, for example, at least one of a first message counter, a first pre-counter, the first frame counter, or a first additional frame counter. The security-oriented second counter is, for example, at least one of a second message counter, a second pre-counter, the second frame counter, or a second additional frame counter. At this time, the image sensor may set the security-oriented count value, depending on a result of comparison (a result of consistency or inconsistency) by the security-oriented first counter and the security-oriented second counter.

The image sensor may further include the security-oriented first counter, the security-oriented second counter, and a security-oriented third counter, which increment the security-oriented count value every time a predetermined condition is satisfied. Here, the third counter is, for example, at least one of a third message counter, a third pre-counter, a third frame counter, or a third additional frame counter. At this time, the image sensor may set the security-oriented count value, depending on a result of comparison (a result of majority decision) by the security-oriented first counter, the security-oriented second counter, and the security-oriented third counter (FIG. 66, steps S603 and S604).

The image sensor may increment the message count for each line corresponding to the SEP protocol that satisfies a predetermined condition, or may reset (reset) the value to an initial value (e.g., zero) for each frame. The image sensor may increment the pre-count value every time the 128-bit data is encrypted or decrypted, or may reset (reset) the value to an initial value (e.g., zero) before the start of the encryption or the decryption for each line of an encryption target corresponding to the SEP protocol.

The image sensor may increment the frame count value for each frame, or may reset (reset) the value to an initial value (e.g., one) every time the value exceeds a predetermined value (e.g., the value reaches a maximum value or the maximum value minus one). The image sensor may increment the additional frame count value every time the frame count value satisfies a predetermined condition (e.g., one or zero), or may reset (reset) the value to an initial value (e.g., zero) every time a predetermined condition (e.g., the key group is switched) is satisfied. At least one of those described above brings an effect of maintaining the uniqueness (i.e., safety) of the initialization vector.

Next, description is given, with reference to FIG. 67, of a countermeasure for a failure in the functional safety-oriented message counter or the functional safety-oriented message count value. The functional safety-oriented message count value is a value for determining whether or not data or a message is missing. In order for the SoC to surely perform this determination, a reset flag of the message count is provided. There is a case where the SoC is unable to determine, on the basis of the message count value, whether the message count value is reset or data or a message is missing; to prevent such a case, the reset flag of the message count value is provided.

First, the image sensor may set the functional safety-oriented message count value to an initial value (e.g., zero), and may set the reset flag of the message count value to an initial value (e.g., one) (step S701). In a case where the line (message) satisfies a predetermined condition (step S704; Y), the image sensor may transmit the functional safety-oriented message count value and the reset flag to the SoC (steps S705 and S706). In a case where the functional safety-oriented message count value is a maximum value (step S707; Y), the image sensor may reset the functional safety-oriented message count value to zero, and may set the reset flag to one (steps S711 and S712). Meanwhile, in a case where the functional safety-oriented message count value is not a maximum value (step S707; N), the image sensor may increment the functional safety-oriented message count value by one (step S708).

At this time, the image sensor may determine whether or not the functional safety-oriented message count value is incremented by one (step S709). In a case where the functional safety-oriented message count value is consequently determined to be incremented by one (step S709; Y), the image sensor may set the reset flag to zero (step S710). Meanwhile, in a case where the functional safety-oriented message count value is not determined to be a value incremented by one (step S709; N), the image sensor may reset the functional safety-oriented message count value to zero, and may set the reset flag to one (steps S711 and S712).

The image sensor may transmit, to the SoC, the reset flag and the functional safety-oriented message count value having been updated in this manner. That is, information indicating whether or not the functional safety-oriented message count value has been reset to an initial value may be transmitted or received via the image data communication. In such a case, there is an effect in which the SoC is able to determine whether the message counter has been reset (reset) or the message has been missing. It is to be noted that the information indicating whether or not the functional safety-oriented message count value has been reset to an initial value may be abnormality notification information.

The image sensor may set the additional frame count value, depending on a result of comparison (a result of majority decision) by the security-oriented first counter, the security-oriented second counter, and the security-oriented third counter (FIG. 68, steps S803 and S804). The image sensor may use the result of the majority decision, for example, as the additional frame count value (FIG. 68, step S804). Here, in a case where all of count values (values of the first counter, the second counter, and the third counter) are the same as the result of the majority decision, the image sensor determines that there is no failure (breakdown) in any of the first counter, the second counter, and the third counter, and transmits, as a reset flag, 1b'0 to the SoC. The 1b'0 means that the additional frame count value need not be reset. Meanwhile, all of count values (values of the first counter, the second counter, and the third counter) are not the same, the image sensor determines that there is a failure (breakdown) in one of the first counter, the second counter, or the third counter, and transmits, as a reset flag, 1b'1 to the SoC. The 1b'1 means that the additional frame count value needs to be reset.

The image sensor may transmit, to the SoC, a reset flag (reset flag) indicating that the additional frame count value needs to be reset (reset), via at least one of the extended packet header or the embedded data. That is, information indicating whether or not the additional frame count value needs to be reset to an initial value may be transmitted or received via the image data communication. In that case, there is an effect in which the image sensor is able to request the SoC to reset (reset) the additional frame count value or notify the SoC of reset (reset) thereof, when the image sensor needs to reset (reset) the additional frame count value. Even when the image sensor needs to reset the additional frame count value, the additional frame count values need to be synchronized between the image sensor and the SoC, and thus the image sensor is not able to reset the additional frame count value without permission of the SoC. It is to be noted that the information indicating whether or not the additional frame count value needs to be reset to an initial value may be abnormality notification information. In addition, the information indicating whether or not the additional frame count value needs to be reset to an initial value may be information indicating whether or not at least one of the SEP session key or the FSED session key needs to be updated, which may be abnormality notification information.

Next, description is given, with reference to FIG. 69, of a method of resetting the additional frame count value in the image sensor. After setting the additional frame count value to zero, the image sensor receives, from the SoC, one or a plurality of Even Keys (even key; the first key group) and a command to start using the one or the plurality of Even Keys (steps S901 and 902). Next, the image sensor starts using the one or the plurality of Even Keys (step S904). At this time, the image sensor discards one or a plurality of Odd Keys (step S905). It is to be noted that, step S905 need not be executed at the first time.

In a case where the additional frame count value needs to be updated, the image sensor updates the additional frame count value (step S906; Y, S907). The image sensor executes step S908 after updating of the additional frame count value or in a case where the updating of the additional frame count value is unnecessary. Specifically, the image sensor determines whether or not the one or the plurality of Odd Keys and a command to start the use thereof have been received (step S908). In a case where the one or the plurality of Odd Keys and the command to start the use thereof have been received, the image sensor resets the additional frame count value to zero (step S909). In a case where the one or the plurality of Odd Keys and the command to start the use thereof have not been received, the image sensor executes step S906.

After resetting the additional frame count value to zero in step S909, the image sensor starts using the one or the plurality of Odd Keys (step S911). At this time, the image sensor discards the one or the plurality of Even Keys (step S912).

In a case where the additional frame count value needs to be updated, the image sensor updates the additional frame count value (step S913; Y, S914). The image sensor executes step S915 after updating of the additional frame count value or in a case where the updating of the additional frame count value is unnecessary. Specifically, the image sensor determines whether or not the one or the plurality of Even Keys and the command to start the use thereof have been received (step S915). In a case where the one or the plurality of Even Keys and the command to start the use thereof have been received, the image sensor resets the additional frame count value to zero (step S916). In a case where the one or the plurality of Even Keys and the command to start the use thereof have not been received, the image sensor executes step S913.

In this manner, in response to the transmission or reception of the command to start using the one or the plurality of Even Keys (even key; the first key group) oriented to a predetermined virtual channel (note that the virtual channel may be an extended virtual channel), all of predetermined virtual channel-oriented one or plurality of Odd Keys (odd key; the second key group) may be finished to be used to allow predetermined virtual channel-oriented additional frame count value to be reset (reset) to zero. At this time, predetermined virtual channel-oriented one or plurality of Even Keys may be further started to be used to allow all of the predetermined virtual channel-oriented one or plurality of Odd Keys to be discarded.

In addition, in response to the transmission or reception of the command to start using the one or the plurality of Odd Keys oriented to a predetermined virtual channel, all of the predetermined virtual channel-oriented one or plurality of Even Keys may be finished to be used to allow the predetermined virtual channel-oriented additional frame count value to be reset (reset) to zero. At this time, the predetermined virtual channel-oriented one or plurality of Odd Keys may be further started to be used to allow all of the predetermined virtual channel-oriented one or plurality of Even Keys to be discarded. In that case, there is an effect of being able to reset (reset) the additional frame count value while maintaining the uniqueness (i.e., safety) of the initialization vector and while maintaining the image data communication without stopping.

The plurality of Even Keys (even key; the first key group) may be freely switchable to another even key (an even key 2) different from the current even key (even key 1) when being a different frame count value (when straddling frames). In addition, the plurality of Odd Keys (odd key; the second key group) may be freely switchable to another odd key (odd key 1) different from the current odd key (odd key 1) when being a different frame count value (when straddling frames). In these cases, there is an effect of being able to freely switch a plurality of keys while maintaining the uniqueness (i.e., safety) of the initialization vector. It is to be noted that information indicating whether the session key is the Even Key (even key; the first key group) or the Odd Key (odd key; the second key group) may be associated with (assigned to) the session key via at least one of the SA_CONFIG register or the CTRL_CONFIG register.

Next, description is given of a replay attack countermeasure for the SEP protocol. FIG. 70 illustrates an example of a frame format. In a case where the AES-CMAC is used as a MAC algorithm for the SEP protocol, it is desirable to provide an extended packet header (e.g., ePH13), which is a MAC non-target region not protected by the MAC, between an extended packet header (e.g., ePH9), which is the MAC target region data protected by the MAC, and packet data (payload), which is the MAC target region data protected by the MAC. One reason for this is that an arithmetic operation by the AES-CMAC is not in time in a case where a data amount of image-system data is large because of high-speed image data communication. In that case, the extended packet header (e.g., ePH13) which is the MAC non-target region is desirably the CRC target region protected by the CRC. However, the extended packet header (e.g., ePH13) which is the MAC non-target region may not be the CRC target region.

Meanwhile, in a case where the AES-GMAC is used as the MAC algorithm for the SEP protocol, the extended packet header (e.g., ePH13) which is the MAC non-target region may not be provided. One reason for this is that the AES-GMAC is able to be configured to allow for a parallel arithmetic operation and is therefore suitable for a high-speed arithmetic operation. However, in a case where the AES-GMAC is used as the MAC algorithm and where a circuit load caused by the AES-GMAC is desired to be reduced (i.e., a parallel arithmetic operation is reduced or no parallel arithmetic operation is performed), the extended packet header (e.g., ePH13) which is the MAC non-target region may be provided, which may be the CRC target region protected by the CRC.

The image sensor may switch at least one of an extended packet header configuration, a circuit configuration, or processing, to provide the extended packet header (e.g., ePH13) which is the MAC non-target region in a case of using the AES-CMAC as the MAC algorithm, and not to provide the extended packet header (e.g., ePH13) which is the MAC non-target region in a case of using the AES-GMAC. Information indicating whether or not to provide the extended packet header (e.g., ePH13) which is the MAC non-target region may be stored in an extended packet header (e.g., ePH0) which is the MAC target region data protected by the MAC, in order to be able to detect falsification caused by an attacker.

FIG. 71 illustrates the MAC target region in the AES-GMAC. FIG. 72 illustrates the MAC target region in the AES-CMAC.

In a case where the AES-GMAC is used as the MAC algorithm for the SEP protocol, the above-described initialization vector is used for an arithmetic operation of the MAC, and the initialization vector includes the message count value, the frame count value, and the additional frame count value. Therefore, the use of the initialization vector is a defense measure against a retransmission attack. However, in a case where the AES-CMAC is used as the MAC algorithm for the SEP protocol, the initialization vector is not used for the arithmetic operation of the MAC.

Therefore, in the line including the frame start, an implicit additional frame number (additional frame count value) that is not transmitted or received via the image data communication at least at such a timing may be inserted, as the MAC target region, between the frame number (frame count value) which is the packet data (payload) and MAC (ePF1) which is the extended packet footer. In addition, in the line including the frame end, an implicit additional frame number (additional frame count value) that is not transmitted or received via the image data communication at least at such a thing may be inserted, as the MAC target region, between the frame number (frame count value) which is the packet data (payload) and the MAC (ePF1) which is the extended packet footer. In addition, an implicit frame number (frame count value) and an implicit additional frame number (additional frame count value) that are not transmitted or received via the image data communication at least at such a timing may be inserted, as the MAC target region, immediately before the MAC (ePF1), which is the extended packet footer, for the embedded data between the frame start and the image-system data.

That is, performing the arithmetic operation of the MAC by using, among those, at least one implicit MAC target region brings an effect of taking a countermeasure against the retransmission attack in a case where the AES-CMAC is used as the MAC algorithm. It is to be noted that the SoC is unable to decide the additional frame number (additional frame count value) until the frame number (frame count value) is received, when complying with the above-described increment method of the additional frame number (additional frame count value); therefore, the order of the frame number (frame count value) and the additional frame number (additional frame count value) is desirable, but this is not limitative.

Figure 74:
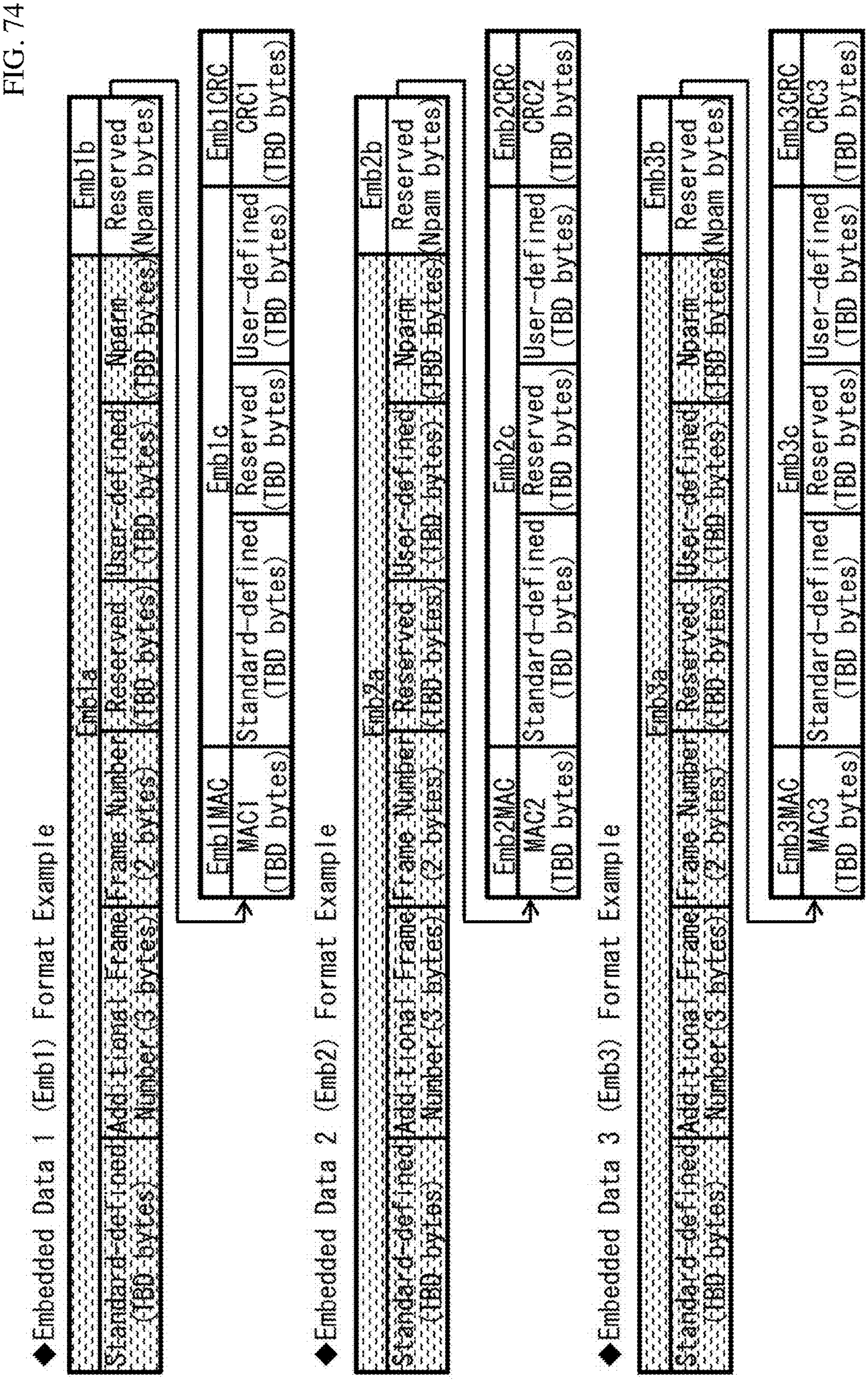
FIG. 74 illustrates an example of formats of embedded data (e.g., Embla, Emb2a, and Emb3a).

Next, description is given of a replay attack countermeasure for the FSED protocol. FIG. 73 illustrates an example of a frame format. FIG. 74 illustrates an example of formats of embedded data (e.g., Embla, Emb2a, and Emb3a). A 24-bit additional frame count value and a 16-bit frame count value may be combined as a 40-bit frame count value; an LSB side thereof may be set as the frame count value, and an MSB side thereof may be set as the additional frame count value, or the MSB side thereof may be set as the frame count value, and the LSB side thereof may be set as the additional frame count value. The additional frame counter and the frame counter may be separate or substantially combined. At least one of the frame count value (frame number) or the functional safety-oriented message count value may be stored in the MAC non-target region data and in the CRC target region data.

It is to be noted that, in a case where the 24-bit additional frame count value and the 16-bit frame count value are combined as the 40-bit frame count value, the image sensor may transmit, to the SoC, a reset flag (reset flag) indicating that the frame count value needs to be reset (reset), via at least one of the extended packet header or the embedded data. That is, information indicating whether or not the frame count value needs to be reset to an initial value may be transmitted or received via the image data communication. In that case, there is an effect in which the image sensor is able to request the SoC to reset (reset) the frame count value or notify the SoC of reset (reset) thereof, when the image sensor needs to reset (reset) the frame count value. Even when the image sensor needs to reset the frame count value, the frame count values need to be synchronized between the image sensor and the SoC, and thus the image sensor is not able to reset the frame count value without permission of the SoC. It is to be noted that the information indicating whether or not the frame count value needs to be reset to an initial value may be abnormality notification information. In addition, the information indicating whether or not the frame count value needs to be reset to an initial value may be information indicating whether or not at least one of the SEP session key or the FSED session key needs to be updated, which may be abnormality notification information.

In a case where the AES-CMAC is used as the MAC algorithm for the FSED protocol, it is desirable to provide embedded data (e.g., at least one of Emb1b, Emb2b, or Emb3b) which is the MAC non-target region not protected by the MAC between the embedded data (e.g., at least one of the Embla, the Emb2a, or the Emb3a) which is the MAC target region data protected by the MAC and the MAC (e.g., at least one of Emb1MAC, Emb2MAC, or Emb3MAC); however, this is not limitative. One reason for this is that the arithmetic operation by the AES-CMAC is not in time in a case where a data amount of the image-system data is large because of high-speed data communication. In that case, the embedded data (e.g., at least one of the Emb1b, the Emb2b, or the Emb3b) which is the MAC non-target region is desirably the CRC target region protected by the CRC; however, this is not limitative.

Meanwhile, in a case where the AES-GMAC is used as the MAC algorithm for the FSED protocol, the embedded data (e.g., at least one of the Emb1b, the Emb2b or the Emb3b) which is the MAC non-target region may not be provided. One reason for this is that the AES-GMAC is able to be configured to allow for a parallel arithmetic operation and is therefore suitable for a high-speed arithmetic operation. However, in a case where the AES-GMAC is used as the MAC algorithm and where a circuit load caused by the AES-GMAC is desired to be reduced (i.e., a parallel arithmetic operation is reduced or no parallel arithmetic operation is performed), the embedded data (e.g., at least one of the Emb1b, the Emb2b, or the Emb3b) which is the MAC non-target region may be provided, which may be the CRC target region protected by the CRC. The image sensor may switch at least one of a packet data configuration, the circuit configuration, or the processing, to provide the embedded data (e.g., at least one of the Emb1b, the Emb2b, or the Emb3b) which is the MAC non-target region in a case of using the AES-CMAC as the MAC algorithm, and not to provide the embedded data (e.g., at least one of the Emb1b, the Emb2b, or the Emb3b) which is the MAC non-target region in a case of using the AES-GMAC. Information indicating whether or not to provide the embedded data (e.g., at least one of the Emb1b, the Emb2b, or the Emb3b) which is the MAC non-target region may be stored in embedded data (e.g., at least one of a Standard-defined region or a User-defined region) which is the MAC target region protected by the MAC, in order to be able to detect falsification caused by an attacker.

FIGS. 75A and 75B each illustrate a format example of a user-defined region. It is to be noted that a portion or all of the user-defined region may be defined as the standard-defined region. In a case where the AES-GMAC is used as the MAC algorithm for the FSED protocol, the above-described initialization vector is used for the arithmetic operation of the MAC, and the initialization vector includes the message count value, the frame count value, and the additional frame count value. Therefore, the use of the initialization vector is a defense measure against a retransmission attack. However, in a case where the AES-CMAC is used as the MAC algorithm for the FSED protocol, the initialization vector is not used for the arithmetic operation of the MAC.

Therefore, in the line including the MAC (e.g., at least one of the Emb1MAC, the Emb2MAC, or the Emb3MAC) as a portion of the packet data (payload) of the embedded data, an explicit additional frame number (additional frame count value) and an explicit frame number (frame count value) may be included as the MAC target region. That is, performing the arithmetic operation of the MAC using the MAC target region including the explicit additional frame number (additional frame count value) and the explicit frame number (frame count value) brings an effect of taking a countermeasure against the retransmission attack in a case where the AES-CMAC is used as the MAC algorithm. It is to be noted that the SoC is able to perform the arithmetic operation of the MAC using the additional frame number (additional frame count value) received while being stored in the embedded data. Therefore, the order of the additional frame number (additional frame count value) and the frame number (frame count value) may be adopted.

The additional frame number (additional frame count value) and the frame number (frame count value) between the standard-defined region and a reserved region in a portion of the embedded data (e.g., at least one of the Emb2a or the Emb3a) may be stored in the user-defined region. However, the reserved region may be the standard-defined region or the user-defined region. In that case, there is an effect of being able to freely set a configuration of the embedded data while taking a countermeasure against the retransmission attack. At least one of the standard-defined region or the user-defined region (e.g., an FSED Security Flags region) may store different values among the Embla (Emb1MAC), the Emb2a (Emb2MAC), and the Emb3a (Emb3MAC); in that case, there is an effect of further taking a countermeasure against the retransmission attack.

In the line including the MAC (e.g., at least one of the Emb1MAC, the Emb2MAC, or the Emb3MAC) as a portion of the packet data (payload) of the embedded data, the packet data (payload) of the embedded data may include at least one of the standard-defined region or the user-defined region. In addition, at least one of the standard-defined region or the user-defined region may store at least one of the FSED Security Flags region, an ESS CCI Security Flags region, or an FSED FuSa Flags region.

- FSED Security Flags region: a region including information indicating whether or not the additional frame number (additional frame count value) needs to be reset (reset) to an initial value (e.g., zero)
- ESS CCI Security Flags region: a region corresponding to a portion or all of an RFLAG region described later in the ESS CCI
- FSED FuSa Flags region: a region including information indicating whether or not the functional safety-oriented message count value (a value of the message counter) has been reset (reset) to an initial value (e.g., zero)

At least one of the standard-defined region or the user-defined region (e.g., the FSED Message Counter region) may store an FSED security-oriented message count value (a value of the message counter) used for the initialization vector of AES-CTR encryption. In particular, in a case where the FSED security-oriented message count value is an implicit message count value, there is an effect of being able to surely synchronize (the FSED security-oriented message count values of) the initialization vectors between the image sensor and the SoC, thus preventing inconsistency (i.e., erroneous decryption) between the initialization vectors.

The image sensor may switch at least one of the packet data configuration, the circuit configuration, or the processing, to allow the MAC target region of at least one of the Emb2a or the Emb3a to differ between a case of using the AES-CMAC as the MAC algorithm and a case of using the AES-GMAC. For example, at least one of the additional frame number (additional frame count value), the frame number (frame count value), and the reserved region in the Emb2a and the Emb3a may be configured to be included in the case of using the AES-CMAC, and not to be included in the case of using the AES-GMAC. In addition, a portion or all of the Emb2a and a portion or all of the Emb3a may be an implicit MAC target region that is not transmitted or received via the image data communication at least at such a timing. For example, at least one of a portion or all of the standard-defined region, a portion or all of the additional frame number (additional frame count value), a portion or all of the frame number (frame count value), a portion or all of the reserved region, or a portion or all of the user-defined region may be an implicit MAC target region that is not transmitted or received via the image data communication at least at such a timing. In addition, the image sensor may switch at least one of the packet data configuration, the circuit configuration, or the processing, to provide an implicit MAC target region in the case of using the AES-CMAC as the MAC algorithm, and not to provide the implicit MAC target region in the case of using the AES-GMAC.

Figure 76:
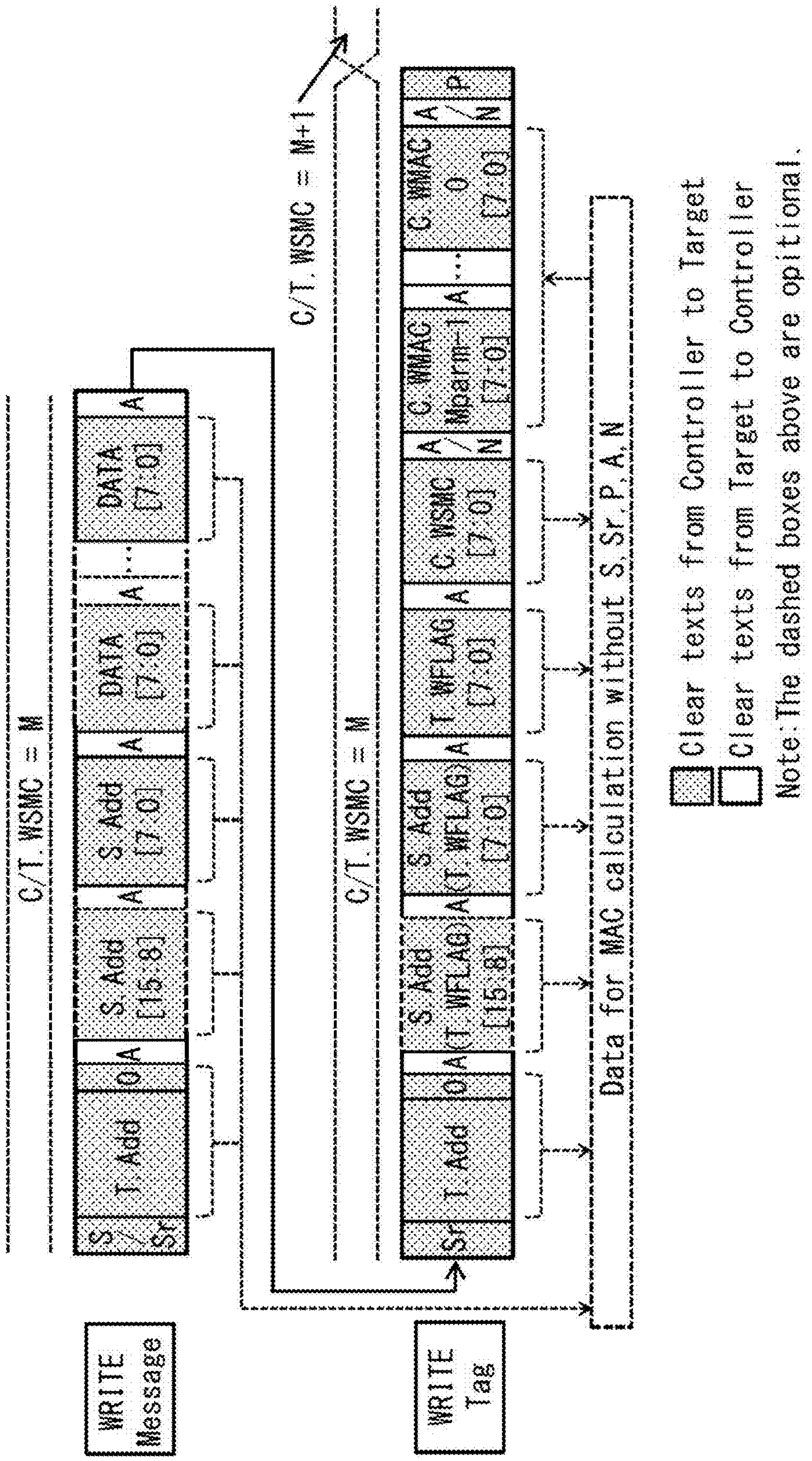
FIG. 76 is a diagram illustrating an example of a packet configuration of write data.
Figure 77:
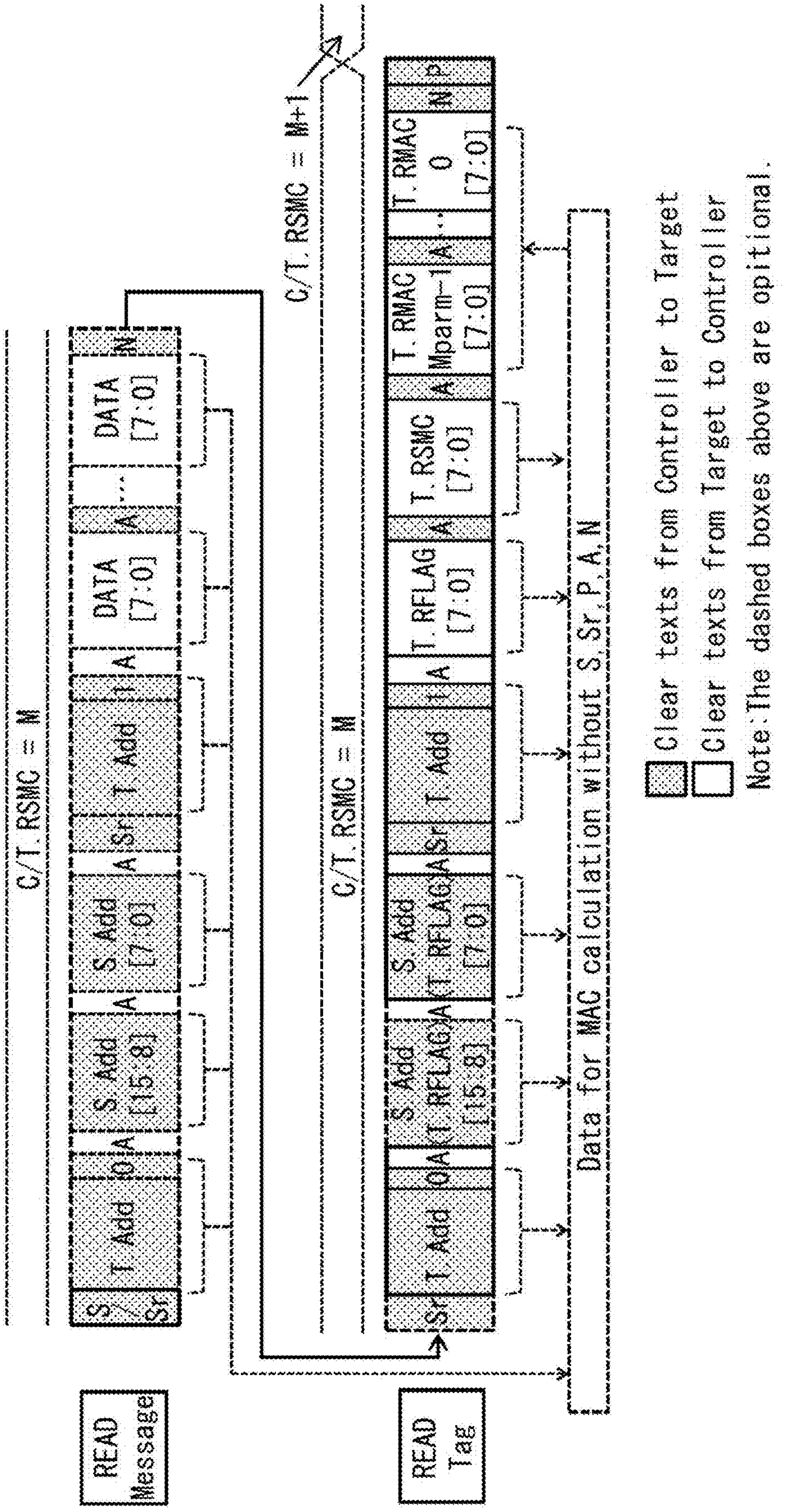
FIG. 77 is a diagram illustrating an example of a packet configuration of read data.

FIG. 76 is a diagram illustrating an example of a packet configuration of write data. FIG. 77 is a diagram illustrating an example of a packet configuration of read data. There is a possibility that ACK/NACK for at least one of message counter verification or the MAC verification in the write tag (i.e., subsequent to at least one of C. WSMC or C. WMAC) may be accidentally falsified by interference or intentionally falsified by an attack. Accordingly, the ACK/NACK of at least one of the message counter verification or the MAC verification may be transmitted or received through protected READ Tag (e.g., while being stored in a register (T. RFLAG) of a read flag on a target side). In that case, there is an effect in which the ACK/NACK in the control data communication is protected by the MAC. Likewise, information corresponding to the ACK/NACK of at least one of the message counter verification or the MAC verification in the control data communication (second communication) may be transmitted or received through the protected image data communication (first communication) (e.g., while being stored in a portion of the embedded data or a portion of the extended packet header protected by the MAC).

Figure 78:
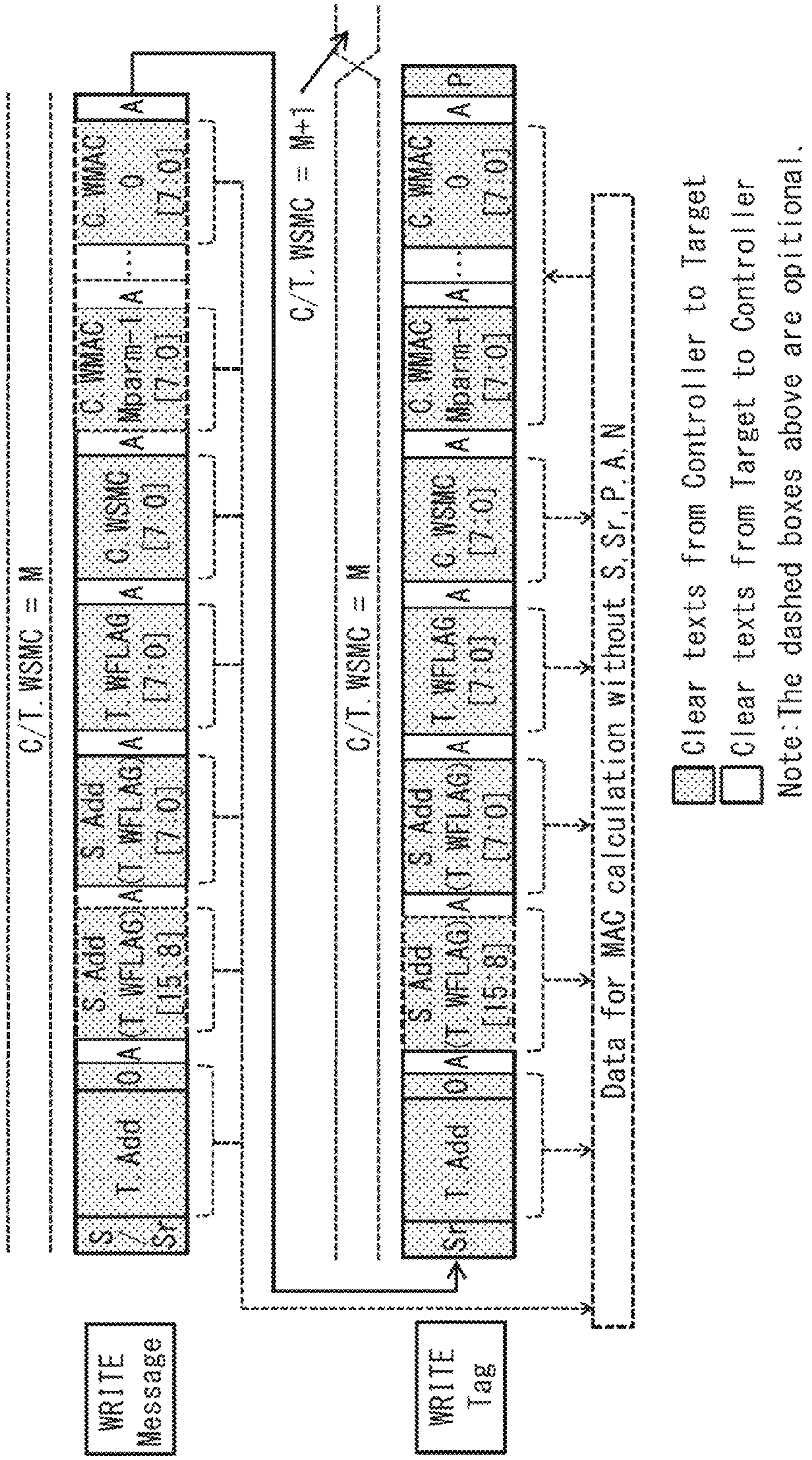
FIG. 78 is a diagram illustrating an example of a packet configuration of write data.
Figure 79:
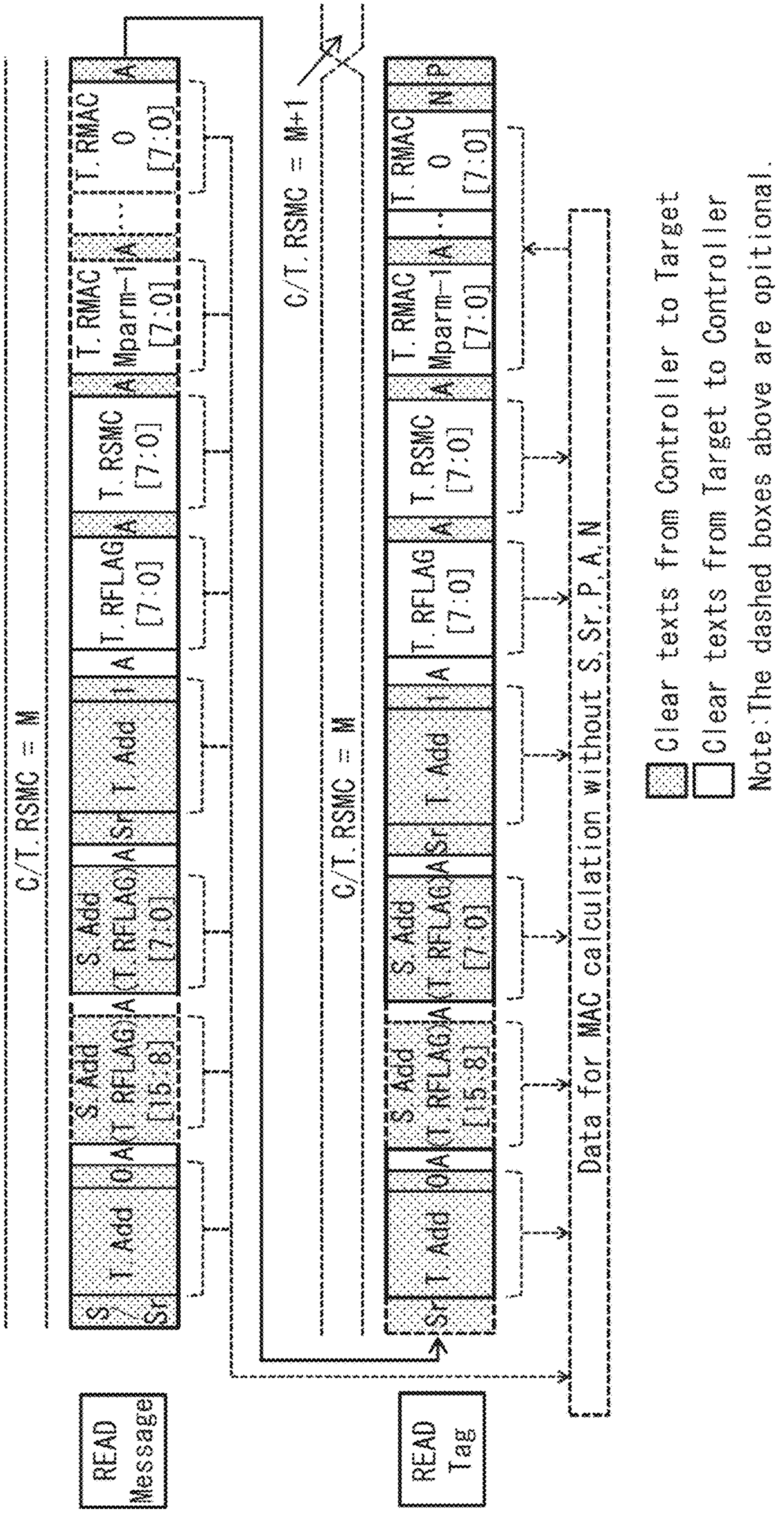
FIG. 79 is a diagram illustrating an example of a packet configuration of read data.

FIG. 78 is a diagram illustrating an example of a packet configuration of write data. FIG. 79 is a diagram illustrating an example of a packet configuration of read data. A portion or all of a register of the write tag may possibly be transmitted or received as the write message, and a portion or all of a register of the read tag may possibly be transmitted or received as the read message. In that case, different values between a portion or all of the register transmitted or received as the write message (read message) and a portion or all of the register transmitted or received as the write tag (read tag) need to be stored. For example, in the case of the write message (read message), the previous MAC or the current MAC (i.e., an intermediate value) may be stored in the register. In the case of the write tag (read tag), the current (i.e., the latest) MAC may be stored in the register. In that case, the image sensor needs to distinguish whether the write message (read message) or the write tag (read tag) is indicated, and needs to determine whether or not the write tag (read tag) is indicated, depending on the presence or absence of the STOP condition (or the Negative Acknowledge immediately before) that is present at the end of the write tag (read tag). This leads to an issue of complicated processing of the image sensor. Therefore, a write flag register (WFLAG) may be defined in the write tag, and a read flag register (RFLAG) may be defined in the read tag.

FIG. 80 illustrates a format example of the ESS CCI Security Tag Registers oriented for at least the ESS CCI mode 1. A portion or all of this format may be appropriated to configure the ESS CCI Security Tag Registers format oriented for at least one of the ESS CCI mode 2 or the ESS CCI mode 0.

The write flag register (WFLAG) may store information indicating whether the writing (one of Sequential Write or Single Write) is a write tag or a write message. The read flag register (RFLAG) may store information indicating whether the reading (one of Sequential Read or Single Read) is a read tag or a read message. The read flag Register (RFLAG) may store information indicating whether the image sensor has detected an error (NACK: Negative Acknowledge) or not (ACK: Acknowledge) for the WMAC immediately before. The read flag Register (RFLAG) may store information indicating whether or not an additional write message count value (a value of an additional message counter) needs to be reset (reset) to an initial value (e.g., zero). In addition, the read flag Register (RFLAG) may store information indicating whether or not an additional read message count value (a value of the additional message counter) needs to be reset (reset) to an initial value (e.g., zero).

It is to be noted that distinguishment between the read tag or the read message using another means may allow information indicating whether the reading (one of the Sequential Read or the Single Read) is the read tag or the read message not to be stored in the read flag register (RFLAG), or may allow the read flag register (RFLAG) not to be provided. For example, when reading the read tag from the read flag register (RFLAG) (Sequential Read) is set as an essential requirement, and reading the read message from other than the read flag register (RFLAG) (Sequential Read) is set as an essential requirement, it is possible to distinguish whether the reading (one of the Sequential Read or the Single Read) is the read tag or the read message. For example, it is assumed that a register of an alias read tag storing the same information as the register of the read tag is provided and that sub addresses (register addresses) are differentiated between the register of the read tag and the register of the alias read tag. When reading the read tag from the register of the read tag (one of the Sequential Read or the Single Read) is set as an essential requirement, and reading the read message from the register of the alias read tag (one of the Sequential Read or the Single Read) is set as an essential requirement, it is possible to distinguish whether the reading (one of the Sequential Read or the Single Read) is the read tag or the read message.

Likewise, distinguishment between the write tag or the write message using another means may allow information indicating whether the writing (one of the Sequential Write or the Single Write) is the write tag or the write message not to be stored in the write flag register (WFLAG), or may allow the write flag register (WFLAG) not to be provided. For example, when writing the write tag from the write flag register (WFLAG) (Sequential Write) is set as an essential requirement, and writing the write message from other than the write flag register (WFLAG) (one of the Sequential Write or the Single Write) is set as an essential requirement, it is possible to distinguish whether the writing (one of the Sequential Write or the Single Write) is the write tag or the write message. For example, it is assumed that a register of an alias write tag storing the same information as the register of the write tag is provided and that sub addresses (register addresses) are differentiated between the register of the write tag and the register of the alias write tag. When writing the write tag from the register of the write tag (Sequential Write) is set as an essential requirement, and writing the write message from the register of the alias write tag (one of the Sequential Write or the Single Write) is set as an essential requirement, it is possible to distinguish whether the writing (one of the Sequential Write or the Single Write) is the write tag or the write message.

The additional write message count value may be incremented every time WSMC of the write message count value (a value of the message counter) is reset (reset) to an initial value (e.g., zero). The additional read message count value may be incremented every time RSMC of a read message count value (a value of the message counter) is reset (reset) to an initial value (e.g., zero). The additional write message count value may be an implicit MAC target region of the write MAC, and may be inserted before or after the write message count value. The additional write message count value may be an implicit MAC target region of the read MAC, and may be inserted before or after the read message count value. Thus, it becomes possible for the SoC to execute at least one of a command or processing to reset the additional message count value to an initial value, thus bringing an effect in which the image sensor is used as a starting point to be able to reset the additional message count value used for the countermeasure against the retransmission attack to an initial value.

It is to be noted that the additional message counters are desirably separate between the additional write message count value and the additional read message count value, but may be substantially combined. In addition, the message counters are desirably separate between the write message count value and read message count value, but may be substantially combined. The additional message counter and the message counter may be separate, or may be substantially combined. In a case where the additional message counter and the message counter are substantially combined, the additional message counter may be replaced by the message counter; the additional write message count value may be replaced by the write message count value; and the additional read message count value may be replaced by the read message count value.

It is to be noted that the information indicating whether or not the additional write message count value (a value of the additional message counter) needs to be reset (reset) to an initial value (e.g., zero) stored in the read flag register (RFLAG) or in the ESS CCI Security Flags region may be information indicating whether or not the ESS CCI session key needs to be updated. Further, the additional write message count value (a value of the additional message counter) may be reset (reset) to an initial value (e.g., zero) in response to the update of the ESS CCI session key.

Likewise, the information indicating whether or not the additional read message count value (a value of the additional message counter) needs to be reset (reset) to an initial value (e.g., zero) stored in the read flag register (RFLAG) or in the ESS CCI Security Flags region may be information indicating whether or not the ESS CCI session key needs to be updated. Further, the additional read message count value (a value of the additional message counter) may be reset (reset) to an initial value (e.g., zero) in response to the update of the ESS CCI session key.

FIG. 81 illustrates a configuration example of the ESS CCI initialization vector used in an AES-CTR encryption mode directed for at least the ESS CCI mode 1, for example. FIG. 82 illustrates an increment method of the initialization vector in CTR mode encryption of the ESS CCI. A portion or all of the ESS CCI initialization vector may be appropriated to configure the ESS CCI initialization vector directed for at least one of the ESS CCI mode 2 or the ESS CCI mode 0.

A write transaction-oriented initialization vector may include an implicit additional write message count value, an explicit write message count value, and an implicit write pre-count value (a value of the pre-counter). A read transaction-oriented initialization vector may include an implicit additional read message count value, an explicit read message count value, and an implicit read pre-count value (a value of the pre-counter).

It is common for the pre-count value to be incremented every time the 128-bit (16-byte) data is encrypted or decrypted. However, in a case where this write pre-count value (read pre-count value) is applied to the write message (read message), there is a possibility that the Single Write (Read) in which only data of one byte is encrypted or decrypted and the Sequential Write (Read) in which data of two bytes or more is encrypted or decrypted may be combined with each other. In addition, there is a possibility that non-encrypted data (clear text) and encrypted data (ciphertext) may be alternately transmitted or received (e.g., ciphertexts are separated from each other, as in clear text, ciphertext, clear text, ciphertext, . . . ). Accordingly, it is not suitable for the pre-count value to be incremented every time the 16-byte data is encrypted or decrypted.

Therefore, at least one of the write pre-count value or the read pre-count value may be configured to be incremented every time one-byte data is encrypted or decrypted. In that case, it is sufficient for at least one of encryption or decryption to be executed for each one byte which is the smallest unit of the write message and the read message. Accordingly, it is not necessary to consider a complicated combination of at least one of the write message or the read message, thus bringing an effect of being able to simplify the processing of the image sensor.

FIG. 83 illustrates an example of a format of a CTL-_CONFIG register. There is an issue in which the image sensor does not perceive whether or not writing by the SoC has been completed, in a case where at least one of a portion or all of the Capabilities register for at least one of the ESS CCI, the SEP, or the FSED, a portion or all of the SA_CONFIG register, a portion or all of the CTRL_CONFIG register, or a portion or all of (a register of) the session key is written from the SoC into the image sensor. That is, there is a case where the image sensor may not perceive whether or not register information writable from the SoC is applicable to the image sensor. For example, there is an issue in which, in a case where the image sensor reflects register information written by the SoC in a certain frame in the image sensor at a time point of starting the next frame, the image sensor does not perceive whether or not the writing by the SoC has really been completed in the certain frame.

Therefore, at least one of a portion (e.g., the end) of the Capabilities register, a portion (e.g., the end) of the SA_CONFIG register, a portion (e.g., the end) of the CTRL-_CONFIG register, or a portion (e.g., the end) of (a register of) the session key may store a TRIGGER register indicating whether or not the image sensor is able to apply the register information in the image sensor to the image sensor (i.e., the SoC instructs the image sensor of the application). In that case, there is an effect of clarifying a timing at which the register information in the image sensor is reflected in the image sensor. The image sensor may reset a value of the TRIGGER register to an initial value (e.g., zero) immediately after the application of the register information to the image sensor.

However, these registers may be replaced by an expression such as a message. That is, for example, the Capabilities register may be replaced by a Capabilities message; the SA_CONFIG register may be replaced by an SA_CONFIG message; the CTRL_CONFIG register may be replaced by a CTRL_CONFIG message; the register of the session key may be replaced by a message of the session key; and the TRIGGER register may be replaced by a TRIGGER message.

<Modification Example>

At least one (an information processor) of the image sensor 1200 or the application processor 1100 may be configured to be mounted on a desired mobile body apparatus. For example, the mobile body apparatus may be a portable mobile apparatus, e.g., at least one of a mobile phone, a smartphone, a digital camera, a game machine, or the like. The mobile body apparatus may be a propulsion apparatus, e.g., at least one of a vehicle, a robot, a drone, or the like enabling propulsion (at least one of moving, traveling, walking, or flying). The mobile body apparatus may be at least one of an autonomous vehicle, an autonomous robot, an autonomous drone, or the like that is mounted with an AI (Artificial Intelligence) function to enable autonomous propulsion. The propulsion of the propulsion apparatus may be controlled by a user of the propulsion apparatus, and the propulsion apparatus may notify the user of at least one of an instruction or warning as needed. Meanwhile, the propulsion apparatus may be configured to allow the propulsion apparatus to automatically control the propulsion of the propulsion apparatus. At least one (information processor) of the image sensor 1200 or the application processor 1100 may be configured to be mounted on a desired fixed apparatus. For example, the fixed apparatus may be at least one of a security apparatus or a monitoring apparatus.

At least one of the timing or the position of the components included in at least one drawing of a block diagram or a flowchart is exemplary, and may be configured differently. There are various modification examples for the embodiments described in each of the examples. That is, in the components of each of the described examples, some of the components may be the same, some of the components may be integrated, some of the components may be combined, or some of the components may be separate. In addition, as for the components of each of the examples described above, some of the components may be omitted, some or all of the components may be changed, or some or all of the components may be modified. In addition, in the components of each of the described examples, some of the components may be replaced by other components, or other components may be added to some or all of the components. Further, in the components of each of the described examples, some or all of the components may be divided into multiple components, some or all of the components may be split into multiple components, or at least some of the multiple divided or split components may have at least one of different functions or different features.

Further, at least some of the components may be moved to form different embodiments. Furthermore, at least one of a binding element or a relay element may be added to a combination of at least some of the components to form a different embodiment. Additionally, at least one of a switching function or a selective function may be added to a combination of at least some of the components to form a different embodiment.

In the present specification, processing performed in accordance with a program by a computer need not necessarily be performed in time series in the order described as a flowchart. That is, the processing performed in accordance with the program by the computer also includes processing (e.g., parallel processing or object-based processing) to be executed in parallel or individually.

In addition, the program may be processed by one computer (processor) or may be subject to distributed processing by multiple computers. Further, the program may be transferred to a remote computer and executed.

Further, as used herein, the term "system" means a set of multiple components (apparatuses, modules (parts), etc.), regardless of whether or not all the components are in the same housing. Therefore, multiple apparatuses contained in separate housings and coupled together via a network and one apparatus containing multiple modules in one housing are each a system.

In addition, for example, the configuration described as one apparatus (or processor) may be divided into multiple configurations, which may be configured as multiple apparatuses (or processors). Conversely, the configurations described above as multiple apparatuses (or processors) may be integrated to be configured as one apparatus (or processor). In addition, a configuration other than the above-described configuration may be added, as a matter of course, to the configuration of each apparatus (or each processor). Further, when the configuration and the operation as the entire system are substantially the same, some of the configurations of a certain apparatus (or processor) may be included in the configuration of another apparatus (or another processor).

In addition, for example, the present technology can employ a cloud computing configuration in which one function is shared and jointly processed by multiple apparatuses via a network.

In addition, for example, the above-described program can be executed in any apparatus. In that case, it is sufficient for the apparatus to have a necessary function (such as a function block) to be able to obtain necessary information.

In addition, for example, the steps described in the above-described flowcharts can be executed by one apparatus, and can also be shared and executed by multiple apparatuses. Further, in a case where multiple pieces of processing are included in one step, the multiple pieces of processing included in the one step can be executed by one apparatus, and can also be shared and executed by multiple apparatuses. In other words, the multiple pieces of processing included in one step can also be executed as processing of multiple steps. Conversely, the processing described as the multiple steps can also be collectively executed as one step.

It is to be noted that, as for the program to be executed by a computer, pieces of processing of steps describing the program may be executed in time series in the order described herein, or may be executed in parallel or individually at a necessary timing such as when a call is made. That is, the pieces of processing of the respective steps may be executed in an order different from the above-described order unless contradiction occurs. Further, the processing of steps describing this program may be executed in parallel with processing of another program, or may be executed in combination with processing of another program.

It is to be noted that the present multiple technologies described herein may be implemented alone independently of one another unless contradiction occurs. It is needless to say that any present multiple technologies may be used together. For example, some or all of the present technologies described in any of the embodiments may be implemented in combination with some or all of the present technologies described in other embodiments. In addition, some or all of any of the above-described present technologies may be implemented together with other technologies not described above.

<Example of Combination of Configurations>

It is to be noted that the present technology may also have the following configurations.

(1)

An information processor including a protection part protecting second communication that uses a portion or all of a register group, in which the register group includes a first register of a write SPDM message, a second register of a read SPDM message, a third register of a write SPDM message counter, a fourth register of a read SPDM message counter, a fifth register of a write SPDM message authentication code, and a sixth register of a read SPDM message authentication code, the protection part derives a write SPDM session key and a read SPDM session key from a key schedule by utilizing the second communication, the protection part generates the write SPDM message authentication code using at least a portion or all of the write SPDM session key, a portion or all of the write SPDM message, and the write SPDM message counter, and the protection part generates the read SPDM message authentication code using at least a portion or all of the read SPDM session key, a portion or all of the read SPDM message, and the read SPDM message counter.

(2)

The information processor according to (1), in which the second communication includes extra-SPDM session communication and intra-SPDM session communication, the write SPDM session key includes a write SPDM encryption key and a write SPDM message authentication code key, the read SPDM session key includes a read SPDM encryption key and a read SPDM message authentication code key, the protection part derives an SPDM-finished key from the key schedule by utilizing the second communication, the protection part performs an arithmetic operation of a message authentication code using at least a portion or all of the write SPDM message, a portion of the read SPDM message, and the SPDM-finished key in the extra-SPDM session communication, the protection part generates the write SPDM message authentication code after bringing a portion or all of the write SPDM message in the intra-SPDM session communication into a state of being encrypted by the write SPDM encryption key, and the protection part generates the read SPDM message authentication code after bringing a portion or all of the read SPDM message in the intra-SPDM session communication into a state of being encrypted by the read SPDM encryption key.

(3)

The information processor according to (1), in which the protection part generates write CRC that protects at least a portion or all of the write SPDM message and the write SPDM message counter, and the protection part generates read CRC that protects at least a portion or all of the read SPDM message and the read SPDM message counter.

(4)

The information processor according to (1), in which the register group includes a register of a write SPDM initialization vector, and a register of a read SPDM initialization vector, the protection part encrypts or decrypts a portion or all of the write SPDM message using at least the write SPDM initialization vector and a portion or all of the write SPDM session key, and the protection part encrypts or decrypts a portion or all of the read SPDM message using at least the read SPDM initialization vector and a portion or all of the read SPDM session key.

(5)

The information processor according to (1), in which the protection part encrypts or decrypts a portion or all of the write SPDM message using at least a write SPDM initialization vector and a portion or all of the write SPDM session key, the protection part encrypts or decrypts a portion or all of the read SPDM message using at least a read SPDM initialization vector and a portion or all of the read SPDM session key, the write initialization vector includes information indicating a write transaction and a value of the write SPDM message counter, the read initialization vector includes information indicating a read transaction and a value of the read SPDM message counter, and the write initialization vector and the read initialization vector include information indicating one of an SPDM session handshake stage or an SPDM application stage.

(6)

The information processor according to (1), in which the register group includes a register of a first communication session key, and a portion of the write SPDM message and the first communication session key as a portion or all of a remainder of the write SPDM message are protected by the write SPDM message authentication code in a state of being encrypted using a portion or all of the write SPDM session key, and transmitted or received by the second communication.

(7)

The information processor according to (1), in which a portion or all of the write SPDM message includes a PSK_EXCHANGE request message including a PSKHint region in which hint information on a pre-shared key is stored, and the PSKHint region includes a standard-defined region and a vendor-defined region.

(8)

The information processor according to (1), in which a portion or all of the write SPDM message includes a PSK_EXCHANGE request message including a PSKHint region in which hint information on a pre-shared key is stored, and the PSKHint region includes information by which a type of the hint information is specified.

(9)

The information processor according to (1), in which a portion or all of at least one of the write SPDM message or the read SPDM message includes at least one of a PSK_EXCHANGE request message, a KEY_EXCHANGE request message, a PSK_EXCHANGE_RSP response message, or a KEY_EXCHANGE_RSP response message including an OpaqueData region, and the OpaqueData region includes a standard-defined region and a vendor-defined region.

(10)

The information processor according to (1), in which a portion or all of the write SPDM message includes at least one of a PSK_EXCHANGE request message or a KEY_EXCHANGE request message including an OpaqueData region, and the OpaqueData region includes at least one of information by which a type of an algorithm to protect the second communication is specified or information by which a type of an algorithm of the key schedule is specified.

(11)

The information processor according to (1), in which a portion or all of the read SPDM message includes at least one of a PSK_EXCHANGE_RSP response message or a KEY_EXCHANGE_RSP response message including an OpaqueData region, and the OpaqueData region includes at least one of information on non-SPDM communication in the second communication or information on first communication in which a frame including a plurality of lines of packet data is transmitted or received.

(12)

The information processor according to (1), in which the first register and the second register each include a register dedicated to an SPDM message.

(13)

The information processor according to (1), in which the first register and the second register each include a register that is sharable between a first protocol and a second protocol, the write SPDM message and the read SPDM message each include protocol ID information by which the first protocol and the second protocol are distinguished from each other, and the protection part transmits or receives the protocol ID information as encrypted data.

(14)

The information processor according to (1), in which the first register and the second register each include a register that is sharable between a first protocol and a second protocol, the write SPDM message and the read SPDM message each include protocol ID information by which the first protocol and the second protocol are distinguished from each other, and the protection part transmits or receives the protocol ID information as non-encrypted data.

(15)

The information processor according to (1), in which the second communication includes extra-SPDM session communication and intra-SPDM session communication, the register group includes a seventh register of a write message counter, and an eighth register of a read message counter, the protection part uses the first register and the second register for the extra-SPDM session communication and the intra-SPDM session communication, the protection part uses the third register, the fourth register, the fifth register, and the sixth register for the intra-SPDM session communication, and the protection part uses the seventh register and the eighth register for the extra-SPDM session communication.

(16)

The information processor according to (1), in which the second communication includes extra-SPDM session communication and intra-SPDM session communication, and the protection part uses the first register, the second register, the third register, the fourth register, the fifth register, and the sixth register for the extra-SPDM session communication and the intra-SPDM session communication.

(17)

The information processor according to (1), in which the second communication includes SPDM communication not protected by at least one of the write SPDM message authentication code or the read SPDM message authentication code, SPDM session communication protected by at least one of the write SPDM message authentication code or the read SPDM message authentication code, and non-SPDM communication protected by a message authentication code different from the write SPDM message authentication code and the read SPDM message authentication code.

(18)

The information processor according to (1), in which the protection part transmits or receives, by utilizing the second communication, a start command of first communication, in which a frame including a plurality of lines of packet data is transmitted or received, in a state of being protected by at least one of the write SPDM message authentication code or another write message authentication code, and the protection part starts, in response to the start command, an arithmetic operation in which the first communication is protected.

(19)

A mobile body apparatus including a protection part protecting second communication between a first device and a second device, in which the register group includes a first register of a write SPDM message, a second register of a read SPDM message, a third register of a write SPDM message counter, a fourth register of a read SPDM message counter, a fifth register of a write SPDM message authentication code, and a sixth register of a read SPDM message authentication code, the protection part derives a write SPDM session key and a read SPDM session key from a key schedule by utilizing the second communication, the protection part generates the write SPDM message authentication code using at least a portion or all of the write SPDM session key, a portion or all of the write SPDM message, and the write SPDM message counter, and the protection part generates the read SPDM message authentication code using at least a portion or all of the read SPDM session key, a portion or all of the read SPDM message, and the read SPDM message counter.

(20)

A communication system including a protection part protecting second communication between a first device and a second device, in which the register group includes a first register of a write SPDM message, a second register of a read SPDM message, a third register of a write SPDM message counter, a fourth register of a read SPDM message counter, a fifth register of a write SPDM message authentication code, and a sixth register of a read SPDM message authentication code, the protection part derives a write SPDM session key and a read SPDM session key from a key schedule by utilizing the second communication, the protection part generates the write SPDM message authentication code using at least a portion or all of the write SPDM session key, a portion or all of the write SPDM message, and the write SPDM message counter, and the protection part generates the read SPDM message authentication code using at least a portion or all of the read SPDM session key, a portion or all of the read SPDM message, and the read SPDM message counter.

In addition, the present technology may also have the following configurations.

(1)

An information processor including:

a protection part that protects at least a portion of first communication in which a frame is transmitted or received cyclically; and a frame counter that increments a frame count value transmitted or received via the first communication for each frame, in which the frame includes first packet data configured by one piece of packet data, and second packet data configured by a plurality of pieces of packet data, the protection part performs an arithmetic operation of a first MAC using at least the frame count value and a portion or all of the first packet data, the protection part performs an arithmetic operation of a second MAC using at least the frame count value and a portion or all of the second packet data, and at least one of the first packet data or the second packet data includes abnormality notification information in a case where there is abnormality in at least one of the frame count value or the frame counter.

(2)

The information processor according to (1), further including an additional frame counter that increments an additional frame count value every time the frame count value is reset to an initial value, in which the abnormality notification information includes the frame count value, and is set to a predetermined count value in a case where there is abnormality in at least one of the frame count value or the frame counter, the additional frame counter increments the additional frame count value every time the predetermined count value is set, and the protection part performs arithmetic operations of the first MAC and the second MAC using at least the additional frame count value.

(3)

The information processor according to (1), in which the abnormality notification information includes the frame count value, and is set to a predetermined count value in a case where there is abnormality in at least one of the frame count value or the frame counter, the first MAC is transmitted or received in a case where the frame count value is not the predetermined count value, and the first MAC is not transmitted or received in a case where the frame count value is the predetermined count value, and the second MAC is transmitted or received in a case where the frame count value is not the predetermined count value, and the second MAC is not transmitted or received in a case where the frame count value is the predetermined count value.

(4)

The information processor according to (1), further including a security-oriented message counter that increments a security-oriented message count value every time a predetermined condition is satisfied, in which the protection part performs arithmetic operations of the first MAC and the second MAC using at least the security-oriented message count value, different values are used for the security-oriented message count value in the arithmetic operation of the first MAC and the arithmetic operation of the second MAC, and the security-oriented message count value is reset to an initial value for each frame before starting the arithmetic operation of the first MAC.

(5)

The information processor according to (1), further including a security-oriented first counter and a security-oriented second counter that increment a security-oriented count value every time a predetermined condition is satisfied, in which the protection part uses the security-oriented count value to protect the first communication, and the security-oriented count value is set depending on a result of comparison by a plurality of security-oriented counters including the security-oriented first counter and the security-oriented second counter.

(6)

The information processor according to (1), further including a functional safety-oriented message counter that increments a functional safety-oriented message count value every time a predetermined condition is satisfied, in which information indicating whether or not the functional safety-oriented message count value is reset to an initial value is transmitted or received in the first communication.

(7)

The information processor according to (1), further including an additional frame counter that increments an additional frame count value every time the frame count value is reset to an initial value, in which information indicating whether or not the additional frame count value needs to be reset to an initial value is transmitted or received in the first communication.

(8)

The information processor according to (1), further including an additional frame counter that increments an additional frame count value every time the frame count value is reset to an initial value, in which the protection part performs arithmetic operations of the first MAC and the second MAC using at least a first session key which is a portion or all of a first key group and the additional frame count value, and in a case where a second session key which is a portion or all of a second key group is used instead of the first session key, the protection part starts using the second session key after resetting the additional frame count value to an initial value, and discards or updates all of session keys of the first key group.

(9)

The information processor according to (1), further including an additional frame counter that increments an additional frame count value every time the frame count value is reset to an initial value, in which the frame count value is a frame number, only the frame number is stored in the first packet data, and the additional frame count value is not stored in the first packet data, and at least the frame number is stored in the second packet data.

(10)

The information processor according to (1), in which the frame count value is transmitted or received after transmission or reception of an extended packet header for the first packet data, the extended packet header includes a first extended packet header and a second extended packet header, the first extended packet header including MAC target region data and a CRC target region, the second extended packet header including MAC non-target region data and CRC target region data, and a portion or all of the second extended packet header is transmitted or received after the first extended packet header and before the frame count value, the first extended packet header storing information indicating whether or not transmission or reception is performed.

(11)

The information processor according to (1), in which the first packet data includes MAC target region data, MAC non-target region data, and the first MAC, the first MAC protects at least the MAC target region data, and a portion or all of the MAC non-target region data includes variable length data of which a data size is set depending on information stored in the MAC target region data, the portion or all of the MAC non-target region data being transmitted or received after the MAC target region data and before the first MAC.

(12)

The information processor according to (1), in which the protection part protects a portion or all of second communication that uses at least a portion of a register group, write data and a write MAC that protects at least the write data are transmitted or received in the second communication, and information indicating whether or not the write MAC is successfully verified is transmitted or received in the first communication.

(13)

The information processor according to (1), in which the protection part protects a portion or all of second communication that uses at least a portion of a register group, write data and a write MAC that protects at least the write data are transmitted or received, and at least a portion of a read tag including a read MAC that protects at least read data is received or transmitted, in the second communication, and the read tag includes information indicating whether or not the write MAC is successfully verified.

(14)

The information processor according to (1), in which the protection part protects a portion or all of second communication that uses at least a portion of a register group, write data which is at least a portion of a write message and at least a portion of a write tag including information to protect at least the write data are transmitted or received, in the second communication, and the write tag includes a write message count value that is incremented every time the write message satisfies a predetermined condition, and information as to which of the write message and the write tag is indicated.

(15)

The information processor according to (1), in which the protection part protects a portion or all of second communication that uses at least a portion of a register group, at least a portion of a read tag including a read MAC that protects at least read data is received or transmitted in the second communication, the read MAC protects a first read message count value included in the read tag and a second read message count value that is incremented every time the first read message count value satisfies a predetermined condition, and the read tag includes information indicating whether or not the second read message count value needs to be reset to an initial value.

(16)

The information processor according to (1), in which the protection part performs an arithmetic operation of a ciphertext, in which a portion or all of second communication is protected that uses at least a portion of a register group, using an initialization vector including a read pre-count value, a target address by which a partner of the second communication is specified, a sub address by which a register in the target address is specified, and read data that is sequentially read or singly read from the sub address are transmitted or received in the second communication, the read data is transmitted or received as a ciphertext, and the read pre-count value is incremented by one every time the read data is encrypted by one byte.

(17)

The information processor according to (1), in which the protection part protects second communication that uses a portion or all of a register group, the register group includes a first register of a write SPDM message, a second register of a read SPDM message, a third register of a write SPDM message counter, a fourth register of a read SPDM message counter, a fifth register of a write SPDM message authentication code, and a sixth register of a read SPDM message authentication code, the protection part derives a write SPDM session key and a read SPDM session key from a key schedule by utilizing the second communication, the protection part generates the write SPDM message authentication code using at least a portion or all of the write SPDM session key, a portion or all of the write SPDM message, and the write SPDM message counter, and the protection part generates the read SPDM message authentication code using at least a portion or all of the read SPDM session key, a portion or all of the read SPDM message, and the read SPDM message counter.

(18)

The information processor according to (1), in which the protection part protects second communication that uses a portion or all of a register group, the register group includes a first register of a write SPDM message, and a second register of a read SPDM message, a portion or all of at least one of the write SPDM message or the read SPDM message includes at least one of a PSK_EXCHANGE request message, a KEY_EXCHANGE request message, a PSK_EXCHANGE_RSP response message, or a KEY_EXCHANGE_RSP response message including an OpaqueData region, and the OpaqueData region includes a standard-defined region and a vendor-defined region.

(19)

A mobile body apparatus including:

a protection part that protects at least a portion of first communication in which a frame is transmitted or received cyclically; and a frame counter that increments a frame count value transmitted or received via the first communication for each frame, in which the frame includes first packet data configured by one piece of packet data, and second packet data configured by a plurality of pieces of packet data, the protection part performs an arithmetic operation of a first MAC using at least the frame count value and a portion or all of the first packet data, the protection part performs an arithmetic operation of a second MAC using at least the frame count value and a portion or all of the second packet data, and at least one of the first packet data or the second packet data includes abnormality notification information in a case where there is abnormality in at least one of the frame count value or the frame counter.

(20)

A communication system including:

a protection part that protects at least a portion of first communication in which a frame is transmitted or received cyclically; and a frame counter that increments a frame count value transmitted or received via the first communication for each frame, in which the frame includes first packet data configured by one piece of packet data, and second packet data configured by a plurality of pieces of packet data, the protection part performs an arithmetic operation of a first MAC using at least the frame count value and a portion or all of the first packet data, the protection part performs an arithmetic operation of a second MAC using at least the frame count value and a portion or all of the second packet data, and at least one of the first packet data or the second packet data includes abnormality notification information in a case where there is abnormality in at least one of the frame count value or the frame counter.

It is to be noted that the present embodiment is not limited to the foregoing embodiment, and may be modified in a wide variety of ways without departing from the gist of the present disclosure. In addition, the effects described herein are merely exemplary and non-limiting, and may have other effects.

The present application claims the benefits of Japanese Priority Patent Application JP2022-083985 filed with the Japan Patent Office on May 23, 2022, and Japanese Priority Patent Application JP2022-108022 filed with the Japan Patent Office on Jul. 4, 2022, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An information processor comprising:

a memory storing a program, and at least one processor configured to execute the program to perform operations comprising:

protecting at least a portion of a first communication in which a frame is transmitted or received cyclically;

incrementing a frame counter that increments a frame count value transmitted or received via the first communication for each frame, wherein the frame includes first packet data configured by one piece of packet data and second packet data configured by a plurality of pieces of packet data, protecting the first communication includes performing an arithmetic operation of a first message authentication code (MAC) using at least the frame count value and a portion or all of the first packet data, protecting the first communication includes performing an arithmetic operation of a second MAC using at least the frame count value and a portion or all of the second packet data, and at least one of the first packet data or the second packet data includes abnormality notification information in a case where there is abnormality in at least one of the frame count value or the frame counter;

incrementing an additional frame counter that increments an additional frame count value every time the frame count value is reset to an initial value, wherein the abnormality notification information comprises the frame count value, and is set to a predetermined count value in a case where there is abnormality in at least one of the frame count value or the frame counter, and the additional frame counter increments the additional frame count value every time the predetermined count value is set; and performing arithmetic operations of the first MAC and the second MAC using at least the additional frame count value.

2. The information processor according to claim 1, wherein the operations further comprising:

incrementing a security-oriented message counter that increments a security-oriented message count value every time a predetermined condition is satisfied; and performing arithmetic operations of the first MAC and the second MAC using at least the security-oriented message count value, wherein different values are used for the security-oriented message count value in the arithmetic operation of the first MAC and the arithmetic operation of the second MAC, and the security-oriented message count value is reset to an initial value for each frame before starting the arithmetic operation of the first MAC.

3. The information processor according to claim 1, wherein the operations further comprising:

incrementing a security-oriented first counter and a security-oriented second counter that increment a security-oriented count value every time a predetermined condition is satisfied; and using the security-oriented count value to protect the first communication, wherein the security-oriented count value is set depending on a result of comparison by a plurality of security-oriented counters including the security-oriented first counter and the security-oriented second counter.

4. The information processor according to claim 1, wherein the operations further comprising:

incrementing a functional safety-oriented message counter that increments a functional safety-oriented message count value every time a predetermined condition is satisfied, wherein information indicating whether or not the functional safety-oriented message count value is reset to an initial value is transmitted or received in the first communication.

5. The information processor according to claim 1, wherein the operations further comprise:

incrementing an additional frame counter that increments an additional frame count value every time the frame count value is reset to an initial value, wherein information indicating whether or not the additional frame count value needs to be reset to an initial value is transmitted or received in the first communication.

6. The information processor according to claim 1, wherein the operations further comprise:

incrementing an additional frame counter that increments an additional frame count value every time the frame count value is reset to an initial value;

performing arithmetic operations of the first MAC and the second MAC using at least a first session key which is a portion or all of a first key group and the additional frame count value; and in a case where a second session key which is a portion or all of a second key group is used instead of the first session key, using the second session key after resetting the additional frame count value to an initial value, and discarding or updating all of session keys of the first key group.

7. The information processor according to claim 1, wherein the frame count value is transmitted or received after transmission or reception of an extended packet header for the first packet data, the extended packet header includes a first extended packet header and a second extended packet header, the first extended packet header comprising MAC target region data and a cyclic redundancy check (CRC) target region, the second extended packet header comprising MAC non-target region data and CRC target region data, and a portion or all of the second extended packet header is transmitted or received after the first extended packet header and before the frame count value, the first extended packet header storing information indicating whether or not transmission or reception is performed.

8. The information processor according to claim 1, wherein the first packet data includes MAC target region data, MAC non-target region data, and the first MAC, the first MAC protects at least the MAC target region data, and a portion or all of the MAC non-target region data comprises variable length data of which a data size is set depending on information stored in the MAC target region data, the portion or all of the MAC non-target region data being transmitted or received after the MAC target region data and before the first MAC.

9. The information processor according to claim 1, wherein the operations further comprise:

protecting a portion or all of second communication that uses at least a portion of a register group, and wherein write data and a write MAC that protects at least the write data are transmitted or received in the second communication, and information indicating whether or not the write MAC is successfully verified is transmitted or received in the first communication.

10. The information processor according to claim 1, wherein the operations further comprise:

protecting a portion or all of second communication that uses at least a portion of a register group, and wherein write data and a write MAC that protects at least the write data are transmitted or received, and at least a portion of a read tag including a read MAC that protects at least read data is received or transmitted, in the second communication, and the read tag includes information indicating whether or not the write MAC is successfully verified.

11. The information processor according to claim 1, wherein the operations further comprise:

protecting a portion or all of second communication that uses at least a portion of a register group, and wherein write data which is at least a portion of a write message and at least a portion of a write tag including information to protect at least the write data are transmitted or received, in the second communication, and the write tag includes a write message count value that is incremented every time the write message satisfies a predetermined condition, and information as to which of the write message and the write tag is indicated.

12. The information processor according to claim 1, wherein the operations further comprise:

protecting a portion or all of second communication that uses at least a portion of a register group, and wherein at least a portion of a read tag including a read MAC that protects at least read data is received or transmitted in the second communication, the read MAC protects a first read message count value included in the read tag and a second read message count value that is incremented every time the first read message count value satisfies a predetermined condition, and the read tag includes information indicating whether or not the second read message count value needs to be reset to an initial value.

13. The information processor according to claim 1, wherein the operations further comprise:

performing an arithmetic operation of a ciphertext, in which a portion or all of second communication is protected that uses at least a portion of a register group, using an initialization vector including a read pre-count value, and wherein a target address by which a partner of the second communication is specified, a sub address by which a register in the target address is specified, and read data that is sequentially read or singly read from the sub address are transmitted or received in the second communication, the read data is transmitted or received as a ciphertext, and the read pre-count value is incremented by one every time the read data is encrypted by one byte.

14. The information processor according to claim 1, wherein the operations further comprise:

protecting a second communication that uses a portion or all of a register group, wherein the register group includes a first register of a write Security Protocol and Data Model (SPDM) message, a second register of a read SPDM message, a third register of a write SPDM message counter, a fourth register of a read SPDM message counter, a fifth register of a write SPDM message authentication code, and a sixth register of a read SPDM message authentication code;

deriving a write SPDM session key and a read SPDM session key from a key schedule by utilizing the second communication;

generating the write SPDM message authentication code using at least a portion or all of the write SPDM session key, a portion or all of the write SPDM message, and the write SPDM message counter; and generating the read SPDM message authentication code using at least a portion or all of the read SPDM session key, a portion or all of the read SPDM message, and the read SPDM message counter.

15. The information processor according to claim 1, wherein the operations further comprise:

protecting a second communication that uses a portion or all of a register group, wherein the register group includes a first register of a write Security Protocol and Data Model (SPDM) message, and a second register of a read SPDM message, a portion or all of at least one of the write SPDM message or the read SPDM message includes at least one of a PSK_EXCHANGE request message, a KEY_EXCHANGE request message, a PSK_EXCHANGE_RSP response message, or a KEY_EXCHANGE_RSP response message including an OpaqueData region, and the OpaqueData region includes a standard-defined region and a vendor-defined region.

16. An information processor comprising:

a memory storing a program, and at least one processor configured to execute the program to perform operations comprising:

protecting at least a portion of a first communication in which a frame is transmitted or received cyclically; and incrementing a frame counter that increments a frame count value transmitted or received via the first communication for each frame, wherein the frame includes first packet data configured by one piece of packet data and second packet data configured by a plurality of pieces of packet data, protecting the first communication includes performing an arithmetic operation of a first message authentication code (MAC) using at least the frame count value and a portion or all of the first packet data, protecting the first communication includes performing an arithmetic operation of a second MAC using at least the frame count value and a portion or all of the second packet data, and at least one of the first packet data or the second packet data includes abnormality notification information in a case where there is abnormality in at least one of the frame count value or the frame counter, the abnormality notification information comprises the frame count value, and is set to a predetermined count value in a case where there is abnormality in at least one of the frame count value or the frame counter, the first MAC is transmitted or received in a case where the frame count value is not the predetermined count value, and the first MAC is not transmitted or received in a case where the frame count value is the predetermined count value, and the second MAC is transmitted or received in a case where the frame count value is not the predetermined count value, and the second MAC is not transmitted or received in a case where the frame count value is the predetermined count value.

17. An information processor comprising:

a memory storing a program, and at least one processor configured to execute the program to perform operations comprising:

protecting at least a portion of a first communication in which a frame is transmitted or received cyclically;

incrementing a frame counter that increments a frame count value transmitted or received via the first communication for each frame, wherein the frame includes first packet data configured by one piece of packet data and second packet data configured by a plurality of pieces of packet data, protecting the first communication includes performing an arithmetic operation of a first message authentication code (MAC) using at least the frame count value and a portion or all of the first packet data, protecting the first communication includes performing an arithmetic operation of a second MAC using at least the frame count value and a portion or all of the second packet data, and at least one of the first packet data or the second packet data includes abnormality notification information in a case where there is abnormality in at least one of the frame count value or the frame counter;

incrementing an additional frame counter that increments an additional frame count value every time the frame count value is reset to an initial value, wherein the frame count value is a frame number, only the frame number is stored in the first packet data, and the additional frame count value is not stored in the first packet data, and at least the frame number is stored in the second packet data.

18. A mobile body apparatus comprising:

a memory storing a program, and at least one processor configured to execute the program to perform operations comprising:

protecting at least a portion of a first communication in which a frame is transmitted or received cyclically;

incrementing a frame counter that increments a frame count value transmitted or received via the first communication for each frame, wherein the frame includes first packet data configured by one piece of packet data and second packet data configured by a plurality of pieces of packet data, protecting the first communication includes performing an arithmetic operation of a first message authentication code (MAC) using at least the frame count value and a portion or all of the first packet data, protecting the first communication includes performing an arithmetic operation of a second MAC using at least the frame count value and a portion or all of the second packet data, and at least one of the first packet data or the second packet data includes abnormality notification information in a case where there is abnormality in at least one of the frame count value or the frame counter;

incrementing an additional frame counter that increments an additional frame count value every time the frame count value is reset to an initial value, wherein the abnormality notification information comprises the frame count value, and is set to a predetermined count value in a case where there is abnormality in at least one of the frame count value or the frame counter, and the additional frame counter increments the additional frame count value every time the predetermined count value is set; and performing arithmetic operations of the first MAC and the second MAC using at least the additional frame count value.

19. A mobile body apparatus comprising:

a memory storing a program, and at least one processor configured to execute the program to perform operations comprising:

protecting at least a portion of a first communication in which a frame is transmitted or received cyclically;

incrementing a frame counter that increments a frame count value transmitted or received via the first communication for each frame, wherein the frame includes first packet data configured by one piece of packet data and second packet data configured by a plurality of pieces of packet data, protecting the first communication includes performing an arithmetic operation of a first message authentication code (MAC) using at least the frame count value and a portion or all of the first packet data, protecting the first communication includes performing an arithmetic operation of a second MAC using at least the frame count value and a portion or all of the second packet data, and at least one of the first packet data or the second packet data includes abnormality notification information in a case where there is abnormality in at least one of the frame count value or the frame counter;

the abnormality notification information comprises the frame count value, and is set to a predetermined count value in a case where there is abnormality in at least one of the frame count value or the frame counter, the first MAC is transmitted or received in a case where the frame count value is not the predetermined count value, and the first MAC is not transmitted or received in a case where the frame count value is the predetermined count value, and the second MAC is transmitted or received in a case where the frame count value is not the predetermined count value, and the second MAC is not transmitted or received in a case where the frame count value is the predetermined count value.

20. A non-transitory computer readable medium storing a program, the program being executable by a processor to perform operations comprising:

protecting at least a portion of a first communication in which a frame is transmitted or received cyclically;

incrementing a frame counter that increments a frame count value transmitted or received via the first communication for each frame, wherein the frame includes first packet data configured by one piece of packet data and second packet data configured by a plurality of pieces of packet data, protecting the first communication includes performing an arithmetic operation of a first message authentication code (MAC) using at least the frame count value and a portion or all of the first packet data, protecting the first communication includes performing an arithmetic operation of a second MAC using at least the frame count value and a portion or all of the second packet data, and at least one of the first packet data or the second packet data includes abnormality notification information in a case where there is abnormality in at least one of the frame count value or the frame counter;

incrementing an additional frame counter that increments an additional frame count value every time the frame count value is reset to an initial value, wherein the abnormality notification information comprises the frame count value, and is set to a predetermined count value in a case where there is abnormality in at least one of the frame count value or the frame counter, and the additional frame counter increments the additional frame count value every time the predetermined count value is set; and performing arithmetic operations of the first MAC and the second MAC using at least the additional frame count value.

21. A non-transitory computer readable medium storing a program, the program being executable by a processor to perform operations comprising:

protecting at least a portion of a first communication in which a frame is transmitted or received cyclically; and incrementing a frame counter that increments a frame count value transmitted or received via the first communication for each frame, wherein the frame includes first packet data configured by one piece of packet data and second packet data configured by a plurality of pieces of packet data, protecting the first communication includes performing an arithmetic operation of a first message authentication code (MAC) using at least the frame count value and a portion or all of the first packet data, protecting the first communication includes performing an arithmetic operation of a second MAC using at least the frame count value and a portion or all of the second packet data, and at least one of the first packet data or the second packet data includes abnormality notification information in a case where there is abnormality in at least one of the frame count value or the frame counter, the abnormality notification information comprises the frame count value, and is set to a predetermined count value in a case where there is abnormality in at least one of the frame count value or the frame counter, the first MAC is transmitted or received in a case where the frame count value is not the predetermined count value, and the first MAC is not transmitted or received in a case where the frame count value is the predetermined count value, and the second MAC is transmitted or received in a case where the frame count value is not the predetermined count value, and the second MAC is not transmitted or received in a case where the frame count value is the predetermined count value.

* * * * *